US009992710B2

(12) United States Patent
Shalev et al.

(10) Patent No.: US 9,992,710 B2
(45) Date of Patent: Jun. 5, 2018

(54) COMMUNICATION APPARATUS

(71) Applicants: Doron Shaul Shalev, Alfei-Menashe (IL); Jacob Fastovsky, Holon (IL); Aliza Breuer, Jordan-Valley (IL)

(72) Inventors: Doron Shaul Shalev, Alfei-Menashe (IL); Jacob Fastovsky, Holon (IL); Aliza Breuer, Jordan-Valley (IL)

(73) Assignee: Bao Tran, Saratoga, CA (US)

( * ) Notice: Subject to any disclaimer, the term of this patent is extended or adjusted under 35 U.S.C. 154(b) by 0 days. days.

(21) Appl. No.: 15/630,948

(22) Filed: Jun. 22, 2017

(65) Prior Publication Data

US 2017/0295522 A1    Oct. 12, 2017

Related U.S. Application Data

(63) Continuation-in-part of application No. 14/765,333, filed as application No. PCT/IL2014/050117 on Feb. 4, 2014.

(60) Provisional application No. 61/906,929, filed on Nov. 21, 2013.

(51) Int. Cl.
*H04W 36/00* (2009.01)
*H04W 92/02* (2009.01)
*H04W 84/12* (2009.01)

(52) U.S. Cl.
CPC ........ *H04W 36/0022* (2013.01); *H04W 84/12* (2013.01); *H04W 92/02* (2013.01)

(58) Field of Classification Search
CPC .. H04W 36/0022; H04W 92/02; H04W 84/12
See application file for complete search history.

(56) References Cited

U.S. PATENT DOCUMENTS

| | | | | |
|---|---|---|---|---|
| 2001/0053145 A1* | 12/2001 | Willars | ............... | H04L 12/4604 370/352 |
| 2004/0076179 A1* | 4/2004 | Kaminski | ............... | H04W 4/18 370/466 |
| 2004/0125758 A1* | 7/2004 | Hayduk | ................ | H04W 92/00 370/310 |
| 2005/0271025 A1* | 12/2005 | Guethaus | ............ | H04W 74/008 370/342 |
| 2007/0070960 A1* | 3/2007 | Barak | ................. | H04W 76/025 370/338 |
| 2007/0217349 A1* | 9/2007 | Fodor | ................. | H04L 12/5692 370/310.2 |
| 2009/0265543 A1* | 10/2009 | Khetawat | .............. | H04L 63/104 713/151 |
| 2011/0149848 A1* | 6/2011 | Ho | ........................ | H04W 28/06 370/328 |
| 2012/0077500 A1* | 3/2012 | Shaheen | ........... | H04W 36/0061 455/436 |
| 2012/0120831 A1* | 5/2012 | Gonsa | ................. | H04W 76/025 370/252 |

(Continued)

OTHER PUBLICATIONS

Ralf Kreher and Torsten Rildebusch, UMTS signaling dated 2007, John Wiley & Sons Ltd, second edition.*

(Continued)

*Primary Examiner* — Noel R Beharry
*Assistant Examiner* — Wilfred Thomas
(74) *Attorney, Agent, or Firm* — Tran & Associates

(57) ABSTRACT

A communication system that allows for automatic switching between cellular and a wireless local area network is disclosed.

23 Claims, 47 Drawing Sheets

(56) References Cited

U.S. PATENT DOCUMENTS

| | | | | |
|---|---|---|---|---|
| 2012/0173661 A1* | 7/2012 | Mahaffey | ................ | H04L 67/14 709/217 |
| 2014/0075502 A1* | 3/2014 | Aissi | ...................... | G06F 21/60 726/1 |
| 2014/0113590 A1* | 4/2014 | Meylan | ................ | H04W 72/10 455/411 |
| 2015/0305072 A1* | 10/2015 | Nylander | ................ | H04W 8/04 370/338 |

OTHER PUBLICATIONS

Enterprise Small cell Architecture Sep. 2012, SpiderCloud Wireless, Inc.*

TaeHoon Lee, SungHoon Seo, UiTaek Lee, and JooSeok Song, A New Soft Handover Mechanism using DCHs in 3GPP HSDPA Networks, May 2009 Journal of Networks, vol. 4, No. 3.*

Debjani De, Ravi Raj Bhat and V. Srinivasa Rao—A protocol solution for scaling femtocells, Sep. 2011.*

* cited by examiner

Table 1

| Primitive name | Request | Indication | Confirmation |
|---|---|---|---|
| RLC-AM-DATA | Data, CNF, MUI, UE-ID | Data | MUI |
| RLC-UM-DATA | Data, MUI, UE-ID | Data | Not Defined |
| RLC-TM-DATA | Data, MUI, UE-ID | Data | Not Defined |
| CRLC-CONFIG | E/R, Mode | Not Defined | Not Defined |
| CRLC-SUSPEND (UM/AM only) | w/o Parameters | Not Defined | w/o Parameters |
| CRLC-RESUME (UM/AM only) | w/o Parameters | Not Defined | Not Defined |

| Next state / Current state | OFF_ST | NO_LINE_ST | NO_SECURED_CONNECTION_ST | SECURED_CONNECTION_ST | EMERGENCY_ST |
|---|---|---|---|---|---|
| OFF_ST | CD_Plugged_In_EV OP01 | Secure_Boot_Success_EV OP05 | | | |
| NO_LINE_ST | CD_Unplugged_EV OP19 User_Init_Shutdown_EV OP21 | | HNB_GW_Con_Available_EV OP04 User_Init_Secured_Con_EV OP05 | | |
| NO_SECURED_CONNECTION_ST | CD_Unplugged_EV OP19 User_Init_Shutdown_EV OP21 | Broken_Line_EV OP05 | NT_TE_USIM_Not_Pres_EV OP04 USIM_Present_EV OP06 Auth_Failure_EV OP15 User_Init_Secured_Con_EV OP04 | Auth_Success_EV OP15 | |
| SECURED_CONNECTION_ST | CD_Unplugged_EV OP19 User_Init_Shutdown_EV OP21 | Broken_Line_EV OP05 Signal_Enters_Red_EV OP10 | NT_TE_USIM_Not_Pres_EV OP10 CN_Init_Disconnect_EV OP10 User_Init_Disconnect_EV OP10 | Signal_Enters_Yellow_EV OP15 | TE_USIM_Not_Pres_EV OP14 |
| EMERGENCY_ST | CD_Unplugged_EV OP19 User_Init_Shutdown_EV OP21 | Signal_Enters_Red_EV OP10 Broken_Line_EV OP05 | User_Init_Disconnect_EV OP10 CN_Init_Disconnect_EV OP10 | NT_TE_USIM_Pres_EV OP08 | Signal_Enters_Yellow_EV OP15 |

FIG. 20

Communication Interface Legend

| Type | Physical | | Logical | |
|---|---|---|---|---|
| | 2399A | | 2399B | |
| Via Wireless | 2399C ⟶ | | 2399E ⟶ | |
| Via Wire | 2399D ⟶ | | 2399F ⟶ | |
| Via Inter-Layer 3GPP protocol | N/A | | 2399G ⟶ | |
| Via Inter Process Communication | N/A | | 2399H ⟶ | |

FIG. 23

| | | | |
|---|---|---|---|
| 3GPP | 3rd Generation Partnership Project | DSL | Digital Subscriber Line |
| A-IWF | Access-termination-to-network-termination IWF | DTCH-SAP | Dedicated Traffic CHannel SAP |
| A-LC | Access-termination LC layer/entity | E/R | Establishment/Release |
| A-LCH-SAP | Access-termination LCH SAP | EV/OP | EVent/OPeration pair |
| A-MAC-Void | Access-termination MAC Void layer/entity | FSM | Finite State Machine |
| AMD | Acknowledged Mode Data | H-IWF | HNB IWF |
| A-Phy-Void | Access-termination Phy Void layer/entity | H-MAC | HNB MAC layer/entity |
| A-RC | Access-termination RC layer/entity | HMS | HNB Management System |
| AT | Access Termination protocol stack | HNB | Home Node-B |
| AT/NT | AT and NT protocol stacks | HNB-AN | HNB Access Network |
| A-TrL | Access-termination TrL layer/entity (A-TrL) | HNBAP | HNB Application Part |
| BCCH-SAP | Broadcast Control CHannel SAP | HNB-GW | HNB Gateway |
| CA | Communication Apparatus | H-Phy | HNB Phy layer/entity |
| CA-AN | CA Access Network | H-RLC | HNB RLC layer/entity |
| CCCH-SAP | Common Control CHannel SAP | H-RRC | HNB RRC layer/entity |
| CD | Communication Device | HW RoT | HardWare Root of Trust |
| CD-A | Type-A CD | I/F | Interface |
| CD-B | Type-B CD | IEEE | International Electrical and Electronics Engineers |
| CD-C | Type-C CD | I-Mode | Iuh Mode of operation |
| CD-D | Type-D CD | IMSI | International Mobile Subscriber Identity |
| CNF | Confirmation Request | IP AP | Internet Protocol Access Point |
| C-Plane | Control Plane | IP Network | Internet Protocol Network |
| CTCH-SAP | Common Traffic Channel SAP | IPC | Inter Process Communication |
| DCCH-SAP | Dedicated Control CHannel SAP | IPsec ESP | Internet Protocol security Encapsulating Security Payload |
| | | ISP | Internet Service Provider |

FIG. 24A

| | | | |
|---|---|---|---|
| I-TA | I-Mode Trusted Application | TE-AT | TE and AT |
| Iu | Interface between RNC and CN | TEE | Trusted Execution Environment |
| Iub | Interface between Node-B and RNC | TICP | Transport Interface Common Point |
| Iuh | Interface between HNB and HNB-GW | T-LC | Terminal-equipment LC layer/entity |
| IWF | Inter-Working Function | T-LCH-SAP | Terminal-equipment LCH SAP |
| LC | Link Control layer/entity | T-MAC-Void | Terminal-equipment MAC Void layer/entity |
| LC-AM | Link Control Acknowledged Mode entity | TMD | Transparent Mode Data |
| LCH | Logical CHannel | TOS | Trusted OS |
| LC-TM | Link Control Transparent Mode entity | T-Phy-Void | Terminal-equipment Phy Void layer/entity |
| LC-UM | Link Control Unacknowledged Mode entity | T-RC | Terminal-equipment RC layer/entity |
| LL | Logical Link | TrL | Transport Layer |
| MNO | Mobile Network Operator | T-TrL | Terminal-equipment TrL layer/entity (T-TrL) |
| MSC | Message Sequence Chart | UE | User Equipment |
| NT | Network Termination protocol stack | UICC | Universal Intergrated Circuit Card |
| OMTP | Open Mobile Terminal Platform | U-MAC | UE MAC layer/entity |
| PCCH-SAP | Paging Control CHannel SAP | UMD | Unacknowledged Mode Data |
| RAs | Rich Applications | U-Mode | Uu Mode of operation |
| RC | Resource Control layer/entity | U-Phy | UE Phy layer/entity |
| REE | Rich Execution Environment | U-RLC | UE RLC layer/entity |
| ROS | Rich Operating System | U-RRC | UE RRC layer/entity |
| RUA | RANAP User Adaptation | U-TA | U-Mode Trusted Application |
| SCTP | Stream Control Transmission Protocol layer/entity | U-TA | U-Mode Trusted Application |
| SeGW | Security GateWay | WAN | Wide Area Network |
| SoC | System on Chip | WLAN | Wireless Local Area Network |
| TE | Terminal Equipment protocol stack | (W)LAN | (W)LAN is either LAN or WLAN |

FIG. 24B

| | | | |
|---|---|---|---|
| 3GPP | 3rd Generation Partnership Project | HNS | HNB Subsystem |
| 4G | 4th Generation | HP | Hosting Party |
| A-IWF | Access-termination-to-network-termination IWF | HW RoT | HardWare Root of Trust |
| A-LC | Access-termination LC layer/entity | IEEE | International Electrical and Electronics Engineers |
| AME | Access Manager Entity | I-Mode | Iuh Mode of operation |
| AP | Access Point | IMSI | International Mobile Subscriber Identity |
| AT | Access Termination protocol stacks | IP AP | Internet Protocol Access Point |
| AT/NT | AT and NT protocol stacks | IP Network | Internet Protocol Network |
| A-TrL | Access-termination Transport Layer entity | IPC | Inter Process Communication |
| CA | Communication Apparatus | IPsec ESP | Internet Protocol security Encapsulating Security Payload |
| CD | Communication Device | Iu | Interface between RNC and CN |
| CD-RRC | CD Radio Resource Control Layer/Entity | Iub | Interface between Node-B and RNC |
| C-Plane | Control Plane | Iuh | Interface between HNB and HNB-GW |
| C-RRC-SAP | RRC Control SAP | IWF | Inter-Working Function |
| C-SAP | Control SAP | LC | Link Control layer/entity |
| HMS | HNB Management System | L-GW | Local Gateway |
| HNB | Home Node-B | MNO | Mobile Network Operator |
| HNB-GW | HNB GateWay | NGH | Next Generation Hotspot |

FIG. 38A

| NT | Network Termination protocol stacks | TICP | Transport Interface Common Point entity |
|---|---|---|---|
| OTT | Over The Top | T-LC | Terminal-equipment LC layer/entity |
| QoE | Quality of Experience | TOS | Trusted Operating System |
| RAs | Rich Applications | TrL | Transport Layer entity |
| REE | Rich Execution Environment | T-TrL | Terminal-equipment Transport Layer entity |
| RNA | RNSAP User Adaptation | UE | User Equipment |
| ROS | Rich Operating System | UE-LL | UE Lower Layers |
| RUA | RANAP User Adaptation | UICC | Universal Intergrated Circuit Card |
| SCTP | Stream Control Transmission Protocol layer/entity | U-L1 | UE Layer1 Entity |
| SeGW | Security GateWay | U-L2 | UE Layer2 Entity |
| SHO | Soft HandOver | U-Mode | Uu Mode of operation |
| SoC | System on Chip | U-Plane | User Plane |
| SST | Seamless Session Transfer | U-RLC | UE RLC entity |
| TA | Trusted Application | UuS | Uu Stratum |
| TE | Terminal Equipment protocol stacks | WAP | Wi-Fi Access Point |
| TEE | Trusted Execution Environment | WLAN | Wireless Local Area Network |
| TE-LL | TE Lower Layers | (W)LAN | LAN/WLAN |

FIG. 38B

COMMUNICATION APPARATUS

This application is a continuation in part application of Ser. No. 14/765,333 filed Aug. 8, 2015, which claims priority to PCT/IL2014/050117 filed Apr. 2, 2014 and Provisional Applications 61/906,929 filed Nov. 21, 2013 and 61/768,239 filed Feb. 22, 2013, the contents of which are incorporated by reference.

BACKGROUND

The present system pertains to a Communication Apparatus (CA) with integrated functionalities of a User Equipment (UE) and a Home Node-B (HNB).

In order to avoid over complicating the description, the meaning and/or definition of each term or abbreviation is given only for the 1st encounter in the background and summary sections of the present patent application. As a convenience to the reader, a glossary table of the non-standard abbreviations and terms is provided in FIG. 24A and FIG. 24B and the reader can usefully refer to this glossary.

In recent years, there is a dramatic rise in data traffic experienced in mobile networks due to the proliferation of Smartphones, Tablets and other UEs, which are capable of video streaming, file downloading and other data intensive applications. Another contribution to the increased mobile data traffic is the increased deployment of Machine to Machine (M2M) devices and Smart Home devices. It has been reported that Global mobile data traffic doubles each year, i.e. forecast to increase 1,000-fold between 2010 and 2020.

From the customer's perspective, it is only natural that he/she expects to receive the same services, at the same quality, from their Mobile Network Operator (MNO) as he/she used to have from their Network Service Provider (NSP). This is even exacerbated by the growing trend of customers wishing a "one stop shop" for all their communications needs. As a result there is a trend for consolidation in the industry, in which NSPs, either Land line or Cable operators, are merging with MNOs to provide "Quad Play" plans which include Land line phone, Internet, TeleVision (TV) & Mobile phone services.

From a technical perspective, as the generations for cellular technology are progressing, from 2nd Generation (2G) to 3rd Generation (3G) to 4th Generation (4G), the frequency band allocations are generally getting higher. Therefore it is getting more difficult to achieve coverage and capacity, especially in urban and dense urban areas, due to wave propagation limitations. This is even exacerbated by the proportional increase of indoor usage. It has been reported that mobile traffic indoors is more than 60% of all mobile traffic as of 2012, with a trend to reach more than 80% in coming years.

From the MNOs' perspective, they are facing a big challenge. As networks reach full capacity, it is more likely to result in an increase of data traffic jams, and hence a degradation in the Quality of Service (QoS) for mobile users, especially indoors, which will result in increased dissatisfaction and churn by their customers. Therefore the MNOs need urgently to increase coverage and capacity. However doing so in the conventional way, i.e. increasing network resources is both very expensive and time consuming, mainly due to technical complexities and local regulations regarding building of cellular towers. Analysts show that data volumes are likely to rise faster than the revenue used to build and maintain the networks. This cost vs. revenue gap is exacerbated by a business model used by some MNOs which offer a flat rate for unlimited data usage. It is therefore apparent that mobile broadband is at a crossroads as networks and business models are strained by bandwidth demand that is unmatched by revenue generation.

Another challenge MNOs face is the trend for increased usage of Over the Top (OTT) services like Skype & Viber for replacing cellular voice calls, WhatsApp for replacing Short Message Service (SMS) and Netflix, Hulu & Tango for replacing TV & video services. This is even exacerbated where flat rate data plans exist. This trend, will eventually transform the MNOs into a "dumb pipe" providers. These services, especially the TV & video, require large amount of data traffic, whereas growing proportion of the revenues go to the value added providers which are the OTT operators. MNOs cannot block these services, in most places, due to Network Neutrality regulations. The OTT challenge is even exacerbated when the MNO's subscribers are offloading themselves from the MNO's network into another network, e.g. Wi-Fi/Internet, while using the OTT service, causing the MNO to entirely lose control of what they are doing.

Another issue currently pending an appropriate solution is the roaming tariffs, especially the Data roaming tariffs for customers who are traveling abroad.

The roaming tariffs for leisure and business travelers can be very high for data calls, relative to the local tariffs. This depends on the home country, the visiting country and the specific MNOs involved. There have been reports on "bill shock" experienced by customers who were using their UE abroad in the same fashion they used to at home, not being aware of the roaming tariffs. In some regions, like the European Union (EU), the regulator is trying to deal with the issue by posing strict regulations on roaming tariffs. In other regions this is left to market forces.

MNOs cannot offer HNBs to their roaming customers, as the cellular spectrum in each country is licensed to its local MNOs.

There is therefore a need to overcome or improve at least one of the problems of the prior art. In particular there is a need to address the capacity & coverage needs of the MNOs and the roaming needs of the traveling customers, in improving the provision of mobile voice and broadband data services, either at home or abroad.

SUMMARY

In accordance with the purposes of the present system, as embodied and broadly described herein, the present system includes a Communication Apparatus hereinafter referred as the CA, embedded in a Communication Device (CD), with integrated functionalities of: (1) A 3rd Generation Partnership Project (3GPP) User Equipment (UE); and (2) a Home Node-B (HNB) according to the 3GPP Technical Specification (TS) TS 25.467. The CA interconnects to a 3GPP Core Network (CN) through successive steps. In a first step, the CA interconnects to a 3GPP HNB GateWay (HNB-GW) over an Internet Protocol Network (IP Network), also known as The Internet, over an Iuh Interface according to the 3GPP TS 25.468 & TS 25.469. In a second step, the HNB-GW interconnects to the CN over an Iu Interface according to the 3GPP TS 25.410. It should be apparent to any person skilled in the art that the IP Network is also known as the Broadband IP Network and these terms are being used interchangeably.

The CA as described comprises three multi-layered protocol stacks for implementing control plane functionality, user plane functionality, management functionality and User-to-user (Uu) Air Interface functionality. A Terminal Equipment protocol stacks (TE) provide UE functionality. An Access Termination protocol stacks (AT) provide HNB radio functionality. A Network Termination protocol stacks (NT) provide HNB network functionality. A Ui interface provides Uu Air interface functionality comprised of a Transport Layer (TrL) between the TE and AT (TE-AT). It should be apparent to any person skilled in the art that the TrL comprise the prior art Medium Access Control (MAC) and Physical Layer (Phy) functionalities. The CA as described also comprises an Inter-Working Function (IWF) layer, for providing the relay and translation functionalities between the AT and the NT. In another embodiment the TE and the AT functionalities are integrated into a TE-AT emulator application, which connects directly to the NT.

It should be apparent to any person skilled in the art that the CA as described is operating according to the 3GPP Universal Mobile Telecommunications System (UMTS) network standards, also known as 3rd Generation (3G) network standards. However with the appropriate changes as described in the 3GPP Technical Report (TR) TR 23.830 and the TS 36.300, the CA can operate according to the 3GPP Long Term Evolution (LTE) network standards, also known as 4th Generation (4G) network standards.

The CA as described operates in a single mode supporting one cellular standard, either the 3G standard or the 4G standard, however in another embodiment it can operate in a multi-mode, supporting both standards.

In the preferred embodiments, the TrL is implemented by various Inter-Process Communication (IPC) methods.

The described interconnection to a CN, over an IP Network, enables the CA to offload traffic from a Radio Access Network (RAN), thus enabling better Quality of Service (QoS) in the RAN service area. Integration of UE functionality and HNB functionality into one CA, enables preservation of UE mobility, as well as using the HNB functionality for interconnection to the CN, in places where an access to a traditional RAN is not possible.

The use of the term CD in the present system embodiments is broadly describing devices which are capable to connect to an IP Network, either by wire or by wireless. These devices comprise an embedded CA and can comprise an embedded UE. These devices include, but not limited to, a Mobile Internet Device (MID), Ultra Mobile Personal Computer (UMPC), Notebook, Netbook, Camera, e-Reader, e-Camera, Desktop Personal Computer (PC), Smartphones, Tablets, Gaming Consoles and Machine to Machine (M2M) devices.

Some embodiments describe a CA, which has an embedded Wireless Local Area Network (WLAN) radio, which interconnects to a CN through successive steps. In a first step, the CA interconnects to an Internet Protocol (IP) Access Point (AP), via the WLAN radio. In a second step, the IP AP interconnects to a HNB-GW over an IP Network. In a third step, the HNB-GW interconnects to the CN. Described WLAN radio can belong to one, or a combination thereof, but not limited to any short range wireless standards, e.g. a WiFi radio according to the International Electrical and Electronics Engineers (IEEE) 802.11 family of standards, or a Bluetooth radio according to the Bluetooth standard.

Some embodiments describe a CA, which has an embedded Local Area Network (LAN) adapter, which interconnects to a CN through successive steps. In a first step, the CA interconnects to an IP AP via the LAN cable. In a second step, the IP AP interconnects to a HNB-GW over an IP Network. In a third step, the HNB-GW interconnects to the CN. Described LAN adapter can belong to one, or a combination thereof, but not limited to any wired standards, e.g. an Ethernet type according to the IEEE 802.3 family of standards, or a FireWire type according to the IEEE 1394 standard, or a Universal Serial Bus (USB) type according to the USB 2.0/3.0 standards.

Some embodiments describe an interconnection between a CA and an IP Network using an IP AP, which has an embedded LAN module and an embedded Wide Area Network (WAN) adapter. A LAN module can be a Wireless-LAN radio, or can be a Wired-LAN adapter, or a combination thereof. A WAN adapter can belong to one, or a combination thereof, but not limited to any long range backhaul standards, e.g. a Coaxial Cable type according to the Data Over Cable Service Interface Specifications (DOCSIS) standard, or a Twisted-Wire Pair type, according to the Digital Subscriber Line (DSL) family of standards, or a Optic Fiber type according to the Fiber To The x (FTTx) family of standards, or a Line Of Sight (LOS) radio link, or a Non Line Of Sight (NLOS) radio link.

Some embodiments describe a CD comprising both the CA and an embedded UE, which interconnects to a CN via two alternate routes through successive steps. In one route at a first step, the UE interconnects to a Node-B. At a second step, the Node-B interconnects to a Radio Network Controller (RNC). At a third step, the RNC interconnects to the CN. In another route at a first step, the UE interconnects to an external HNB. At a second step the external HNB interconnects to an IP AP. At a third step, the IP AP interconnects to a HNB-GW over an IP Network. At a forth step, the HNB-GW interconnects to the CN. Described UE can be operating according to the 3G or to the 4G standards, or according to a combination thereof.

Some embodiments describe a LAN connection between the CA and an IP AP, wherein interface radios and/or adapters on the CA and the IP AP operate in accordance with different standards.

BRIEF DESCRIPTION OF THE DRAWINGS

FIG. 10B illustrates the table of primitives between the LC Layer and the Upper Layers (UPLRs).

FIG. 20 is a Finite State Machine (FSM) table for the CD Type-B in some embodiments.

FIG. 23 illustrates the communication interface legend used in the present patent application.

FIG. 24A shows a table of abbreviations and terms used in the present patent application, and FIG. 24B is the continuation of FIG. 24A.

FIG. 38A shows a table of abbreviations and terms used in the present patent application; and FIG. 38B is the continuation of FIG. 38A.

DETAILED DESCRIPTION

Figure 1:
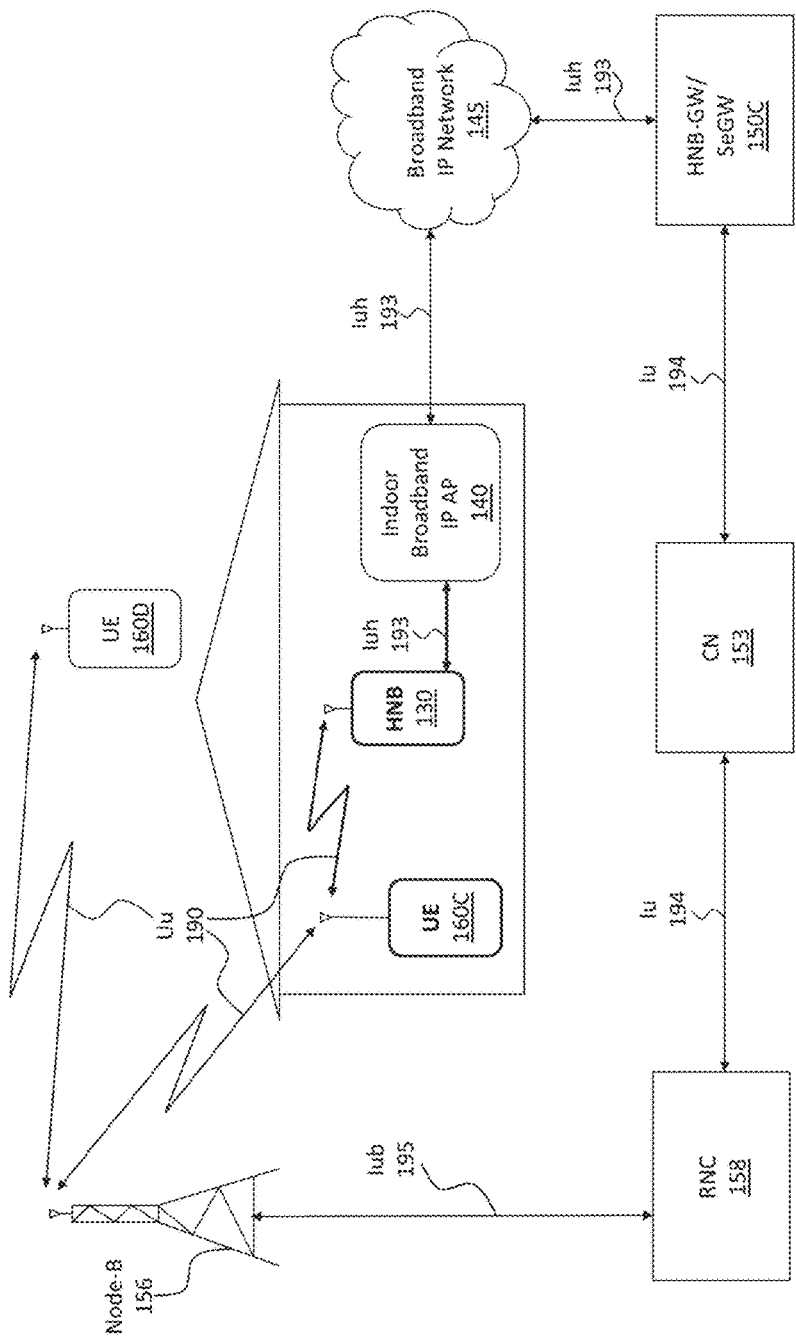
FIG. 1 illustrates a conventional 3G Universal Mobile Telecommunications System (UMTS) network, according to the prior art.

In the following paragraphs, the present system will be described in detail by way of example with reference to the attached drawings. Throughout this description, the preferred embodiment and examples shown should be considered as exemplars, rather than as limitations on the present system. As used herein, the "present system" refers to any one of the embodiments of the invention described herein, and any equivalents. Furthermore, reference to various feature(s) of the "present system" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 illustrates a conventional 3G Universal Mobile Telecommunications System (UMTS) network, according to the prior art.

In order to avoid over complicating the description, the meaning and/or definition of each term or abbreviation is given only for the 1st encounter in the detailed description section of the present patent application. As a convenience to the reader, a glossary table of the non-standard abbreviations and terms is provided in FIG. 24A and FIG. 24B and the reader can usefully refer to this glossary.

The present patent application refers to several 3rd Generation Partnership Project (3GPP) Specifications. Unless otherwise specified all references refer to 3GPP Release 9 (Rel-9) Specifications.

The figure includes the following 3GPP entities: (1) The Node-B 156; (2) a Radio Network Controller (RNC), the RNC 158; (3) a Core Network (CN), the CN 153; (4) a Home Node-B (HNB), the HNB 130; (5) a HNB GateWay/Security GateWay (HNB-GW/SeGW), the HNB-GW/SeGW 150C; (6) a User Equipment (UE), the Outdoor UE 160D; and (7) the Indoor UE 160C.

The figure also includes interfaces as described in the 3GPP Specifications: (1) The Uu Air Interface 190, also known as the Radio Interface, between the Node-B 156 and plurality of Outdoor UEs 160D and/or Indoor UEs 160C; (2) the Uu Air Interface 190 between the HNB 130 and plurality of Indoor UEs 160C; (3) the Iub Interface 195 between RNC 158 and plurality of the Node-Bs 156; (4) the Iu Interface 194 between the CN 153 and plurality of RNCs 158; (5) the Iu Interface 194 between the CN 153 and plurality of HNB-GW/SeGWs 150C; and (6) the Iuh Interface 193 between the HNB-GW/SeGW 150C and plurality of HNBs 130.

The figure also includes: (1) An Internet Protocol (IP) Access Point (AP), the Indoor Broadband IP AP 140; and (2) the Broadband IP Network 145.

It should be apparent to any person skilled in the art that in order to simplify this figure and its description, each entity having plurality of members is represented by one member.

The telecommunication system, as described in this patent application, is specified by the 3GPP comprising of a CN 153 and a Radio Access Network (RAN) that can be either the Universal Mobile Telecommunications System (UMTS) Terrestrial Radio Access Network (UTRAN) or the Evolved UTRAN (E-UTRAN), or both. The UTRAN comprises: (1) Plurality of the Node-Bs 156 and plurality of the RNCs 158; and (2) plurality of the HNBs 130 and plurality of the HNB-GW/SeGWs 150C. On one side, the UTRAN is connected to the CN 153 over the Iu Interface 194. On the other side, the UTRAN is connected to the Outdoor UE 160D or Indoor UE 160C over the Uu Air Interface 190.

It should be apparent to any person skilled in the art that the telecommunication system, as described in this patent application, is operating according to the 3GPP UMTS Network Specifications, also known as the 3rd Generation (3G) network standards, comprising an UTRAN and a 3G CN. However with the appropriate changes as described in the 3GPP Technical Report (TR) TR 23.830 and further described in the 3GPP Technical Specification (TS) TS 36.300, the telecommunication system operates according to the 3GPP Long Term Evolution (LTE) Network Specifications, also known as the 4th Generation (4G) network standards, comprising an E-UTRAN and a 4G CN.

In the outdoor environment, the UTRAN is created by the Node-B 156 and controlled by the RNC 158. In the indoor environment, the UTRAN, also known as the HNB Access Network (HNB-AN), is created by the HNB 130, in collaboration with the HNB-GW/SeGW 150C, wherein the HNB 130 and the HNB-GW/SeGW 150C terminate the Iuh Interface 193 at both sides, as described with reference to the HNB-AN 450 in FIG. 4.

A: UE

The Outdoor UE 160D or Indoor UE 160C is a 3GPP device communicating with the UTRAN by means of licensed spectrum of a Mobile Network Operator (MNO). The Outdoor UE 160D, located in the outdoor environment, is used to access services of the MNO via the Node-B 156 of the UTRAN. The Indoor UE 160C, located in the indoor environment, is used to access services of the MNO via the HNB 130 of the UTRAN, or via the Node-B 156 of the UTRAN. The handover of the Outdoor UE 160D from the Node-B 156 to another one, and vice versa, is done by the RNC 158 in accordance with the 3GPP Specifications. The handover of the Indoor UE 160C from the Node-B 156 to the HNB 130 and vice versa is done by the RNC 158 in collaboration with the HNB-GW/SeGW 150C, in accordance with the 3GPP Specifications. The Indoor UE 160C connects to the HNB 130 or to the Node-B 156 using the same Uu Air Interface 190 as the Outdoor UE 160D does with the Node-B 156. The UE as described operates in a single mode supporting one cellular standard, either the 3G standard or the 4G standard, however in another embodiment it operates in a multi-mode, supporting both standards. It should be apparent to any person skilled in the art that the Indoor UE 160C and the Outdoor UE 160D have the same functionalities and can exchange their places. Depending on the current geographical location of the Outdoor UE 160D or the Indoor UE 160C, the connection can be established to either a Home Public Land Mobile Network (HPLMN) or to a Visited Public Land Mobile Network (VPLMN) during roaming. The HPLMN and VPLMN are further detailed, in the case of the HNB-AN, with reference to FIG. 4.

B: Node-B

The Node-B 156 is an UTRAN Access Point (AP) providing the Uu Air Interface 190 long range connectivity for plurality of Outdoor UEs 160D and Indoor UEs 160C. The Node-B 156 is managed and operated by the MNO and is communicating with the Outdoor UE 160D or Indoor UE 160C. The Node-B 156 has to provide service to a large number of UEs and must do so without losing connectivity over large service coverage regions. Accordingly, the MNO deploys the Node-Bs 156, with overlapping service coverage regions, in order to create an uninterrupted service coverage region, wherein the overlapping service coverage regions are used to trigger the handover of the Outdoor UE 160D. The functions of the Node-B 156 comprise: (1) Air Interface transmission/reception; (2) modulation/demodulation; (3) physical channel coding; (4) micro diversity; (5) error handing; (6) closed loop power control. In general a detailed description of the Node-B 156 is outside the scope of this patent application, however specific details are given where applicable.

C: RNC

The RNC 158 is a controlling element in the UTRAN and is responsible for controlling plurality of the Node-Bs 156 that are connected to the RNC 158 over the Iub Interface 195. The RNC 158 carries out radio resource management; some of the mobility management functions and is the point where ciphering/deciphering is done before user data is sent to/from the Outdoor UE 160D or the Indoor UE 160C. The RNC 158 is connected to the CN 153 over the Iu Interface 194 as described in the 3GPP Specifications, which comprises two sub-interfaces: (1) An Iu-CS Interface (not shown) connecting the RNC 158 to the Circuit Switched (CS) domain of the CN 153 via the Media Gateway (MGW); and (2) an Iu-PS Interface (not shown) connecting the RNC 158 to the Packet Switched (PS) domain of the CN 153 via the Serving GPRS Support Node (SGSN). The functions of RNC 158 comprise: (1) Radio Resource Control management; (2) admission control; (3) channel allocation; (4) power control settings; (5) handover control; (6) macro diversity; (7) ciphering; (8) segmentation or reassembly; (9) broadcast signaling; and (10) open loop power control. In general a detailed description of the RNC 158 is outside the scope of this patent application, however specific details are given where applicable.

D: CN

As described in the 3GPP TR 21.905, the CN 153 is an architectural term relating to the part of 3GPP System which is independent of the access technology of the UE. The functions of the CN 153 comprise: (1) Aggregation of calls; (2) authentication of UEs 160D and 160C; (3) call control and switching; (4) charging; (5) service invocation; (6) gateways to other service providers; (7) Operation and Maintenance (O&M); and (8) subscriber database. In general a detailed description of the CN 153 is outside the scope of this patent application, however specific details are given where applicable.

E: HNB

HNB 130 is an UTRAN AP providing the Uu Air Interface 190 short range connectivity for plurality of Indoor UEs 160C. The HNB 130 is managed and operated by the MNO and is communicating with the Indoor UE 160C. The HNB 130 differs from the Node-B 156 in the following aspects: (1) the HNB 130 is a low power short range device, servicing few UEs in a small service coverage region, as opposed to the Node-B 156 which is a high power long range device, servicing many UEs in a large service coverage region; (2) the service coverage region established by the HNB 130 does not need to be adjacent to any other HNB 130 service coverage region, as opposed to the requirements for the Node-Bs 156; (3) the HNB 130 can be deployed on an ad hoc basis based on user's needs, wherein the operating parameters are configured automatically by a Self-Organized Network (SON) system, as opposed to the deployment of the Node-Bs 156 which requires pre-planning and manual configuration by the MNO; (4) the HNB 130 is using the Broadband IP Network 145 as the backhaul means towards the CN 153, as opposed to the Node-B 156 which is using a dedicated backhaul means towards the CN 153; and (5) the HNB 130 functions comprise the Node-B 156 functions and part of the RNC 158 functions. In some embodiments, the HNB 130 is equipped with a Universal Subscriber Identity Module (USIM) hosted by a Universal Integrated Circuit Card (UICC), which is used for hosting party authentication as described in reference to FIG. 14.

F: Broadband IP Network

The Broadband IP Network 145 represents all the elements that collectively provide backhaul means for the HNB 130 and support IP connectivity between the HNB 130 and the HNB-GW/SeGW 150C. The HNB 130 communicatively couples the Indoor UEs 160C to the HNB-GW/SeGW 150C over the Broadband IP Network 145 over the Iuh Interface 193. In some embodiments the Broadband IP Network 145 utilizes the customer's internet connection. The Broadband IP Network 145 is assumed to be an untrusted public IP network. The Broadband IP Network 145 comprises: (1) Wireless Internet Service Provider (WISP) IP network systems, e.g. Cellular, Carrier-grade WiFi; or (2) Wireline service providers IP network systems, e.g. Cable, Digital Subscriber Line (DSL), Fiber; (3) Internet Service Provider (ISP) IP network systems; and (4) Network Address Translation (NAT) functions, either standalone or integrated into one or more of the above systems. It should be apparent to any person skilled in the art that in some embodiments the Indoor Broadband IP AP 140 is a separate entity as shown in this figure, however in other embodiments it is part of the Broadband IP Network 145.

G: Indoor Broadband IP AP

Figure 3:
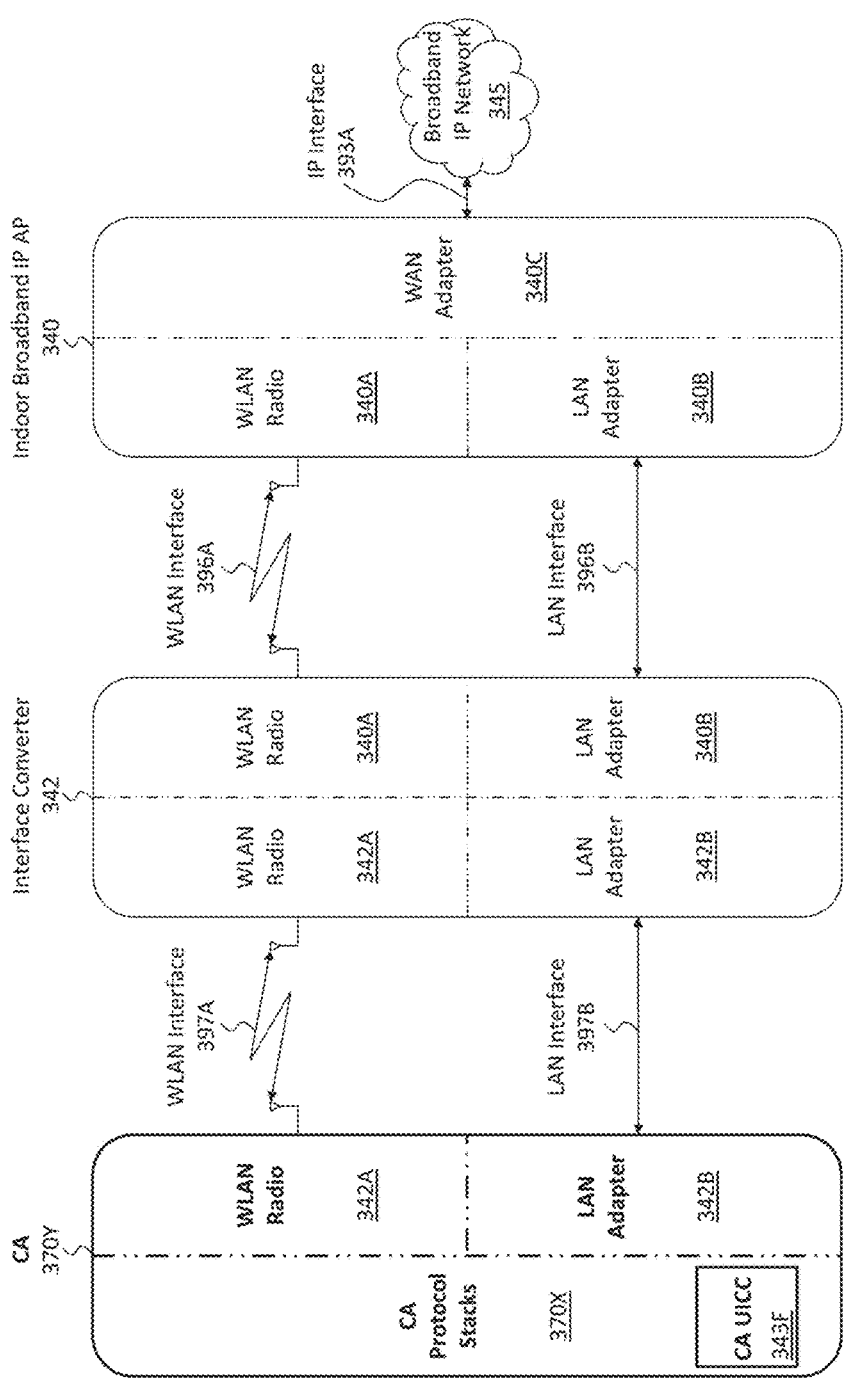
FIG. 3 illustrates the CA Wide Area Network (WAN) connectivity in some embodiments.

The Indoor Broadband IP AP 140, as described with reference to 340 in FIG. 3, is the device connecting the HNB 130 to the Broadband IP Network 145 over the Iuh Interface 193.

H: HNB-GW/SeGW

The HNB-GW and the SeGW are two logical entities of the MNO's network. It should be apparent to any person skilled in the art that these entities can be implemented and deployed as one physical device as the HNB-GW/SeGW 150C described in this figure, or as separate physical devices 450A and 450B as described with reference to FIG. 4. The functions of the HNB-GW/SeGW 150C comprise: (1) Establishing secured communication channels with the HNBs 130; (2) protecting CN 153 entities against threats coming from the untrusted Broadband IP Network 145; (3) supporting the HNB 130 registration and the Indoor UE 160C registration; and (4) aggregation of HNBs 130 and error handling. It should be apparent to any person skilled in the art that the HNB-GW/SeGW 150C functions also comprise part of the RNC 158 functions. The HNB-GW/SeGW 150C and the CN 153 are communicating over the Iu Interface 194. The HNB-GW and the SeGW entities are further described with reference to FIG. 4.

Figure 2:
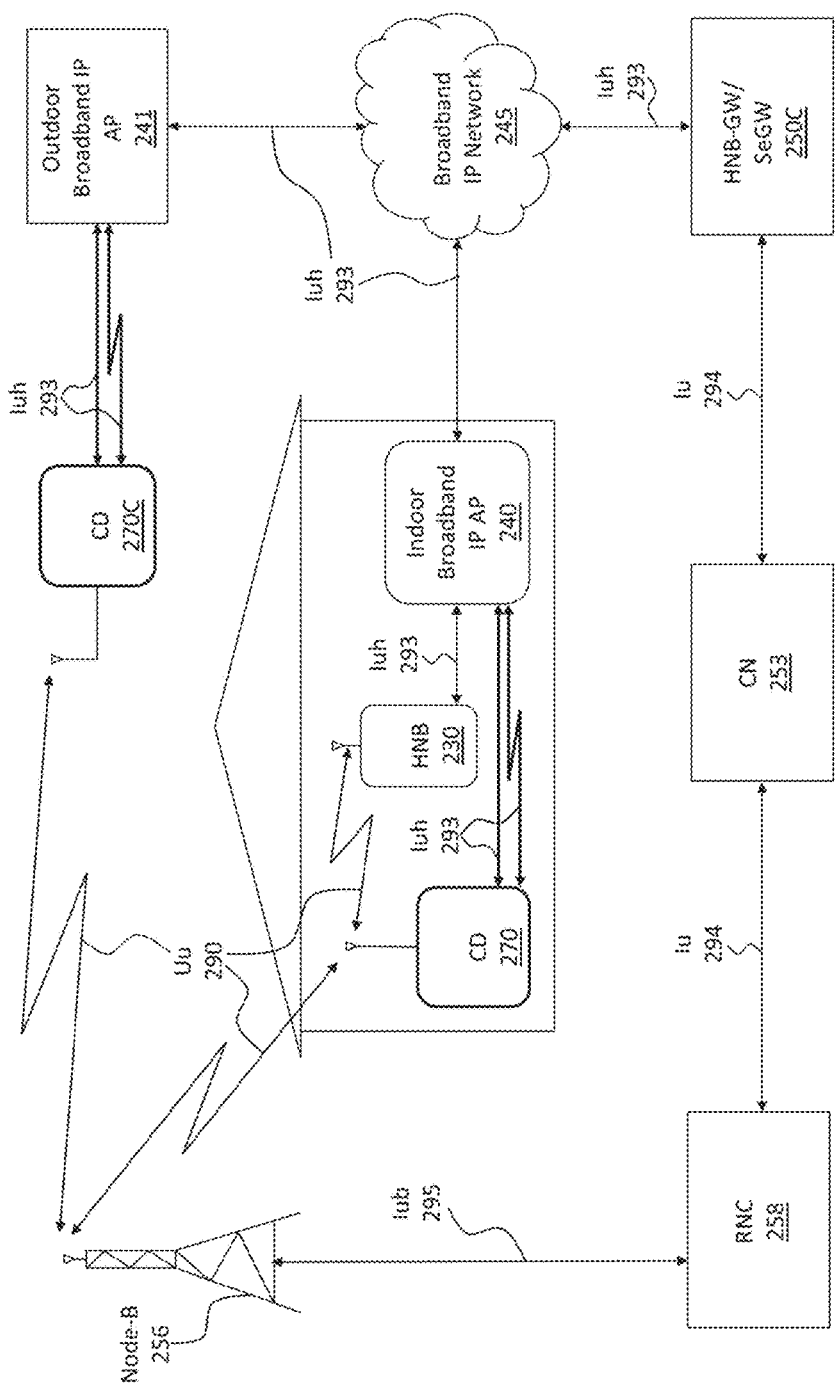
FIG. 2 illustrates a 3G UMTS network for Communication Device (CD) deployments in some embodiments.

FIG. 2 illustrates a 3G UMTS network for Communication Device (CD) deployments in some embodiments.

The figure includes: (1) the 3GPP Node-B 256; (2) the 3GPP RNC 258; (3) the 3GPP CN 253; (4) the 3GPP HNB 230; (5) the 3GPP HNB-GW/SeGW 250C; (6) a Communication Device (CD), the Outdoor CD 270C; (7) the Indoor CD 270; (8) the Broadband IP Network 245; (9) the Indoor Broadband IP AP 240; and (10) the Outdoor Broadband IP AP 241. It should be apparent to any person skilled in the art that the Indoor Broadband IP AP 240 and the Outdoor Broadband IP AP 241 can be identical Software-wise and Hardware-wise, and can be different Mechanical-wise due to different environmental hardening requirements.

The figure also includes interfaces as described in the 3GPP Specifications: (1) the Uu Air Interface 290 between the Node-B 256 and plurality of Outdoor CDs 270C and/or Indoor CDs 270; (2) the Uu Air Interface 290 between the HNB 230 and plurality of Indoor CDs 270; (3) the Iub Interface 295 between RNC 258 and plurality of Node-Bs 256; (4) the Iu Interface 294 between the CN 253 and plurality of RNCs 258; (5) the Iu Interface 294 between the CN 253 and plurality of HNB-GW/SeGWs 250C; (6) the Iuh Interface 293 between the HNB-GW/SeGW 250C and plurality of HNBs 230; and (7) the Iuh Interface 293 between the HNB-GW/SeGW 250C and plurality of Outdoor CDs 270C and/or Indoor CDs 270.

It should be apparent to any person skilled in the art that in order to simplify this figure and its description, each entity having plurality of members is represented by one member.

It should be apparent to any person skilled in the art, that either the Indoor CD 270 or the Outdoor CD 270C, can be one of a Type-A CD (CD-A), the CD-A 1670A, a Type-B CD (CD-B), the CD-B 1770B, a Type-C CD (CD-C), the CD-C 1870C or a Type-D CD (CD-D), the CD-D 1970D as shown in FIG. 16, FIG. 17, FIG. 18 and FIG. 19 respectively.

The Indoor CD 270 or the Outdoor CD 270C, communicates with CN 253 in two different modes of operation: (1) The prior art Uu Mode of operation (U-Mode) wherein the Indoor CD 270 or the Outdoor CD 270C, comprising both CA and UE (not shown), using the UE section for getting services from the MNO over the Uu Air Interface 290, as described with reference to FIG. 1; and (2) the present system Iuh Mode of operation (I-Mode) wherein the Indoor CD 270 or the Outdoor CD 270C getting services from a Cellular Service Provider (CSP) over the Iuh Interface 293, wherein the CSP can be either a MNO or a Mobile Virtual Network Operator (MVNO). It should be apparent to any person skilled in the art, that MVNOs are operating according to different business models, however for the purpose of this patent application, the MVNO definition include only operators which do not have RAN.

The choice whether to operate in the U-Mode or the I-Mode is dependent on several factors such as CD type i.e. having an embedded UE or not and the availability of Node-B/HNB/(W)LAN connection, wherein the (W)LAN is either Local Area Network (LAN) or Wireless Local Area Network (WLAN), as further described with reference to FIG. 3.

In the U-Mode of operation, the Outdoor CD 270C communicates with the CN 253 only via the Node-B 256. On the other hand the Indoor CD 270 can communicate with the CN 253 either via the Node-B 256 or the HNB 230. The handover of the Indoor CD 270 from the Node-B 256 to the HNB 230 and vice versa is done by the RNC 258 in collaboration with the HNB-GW/SeGW 250C, in accordance with the 3GPP Specifications.

In the I-Mode of operation, the Indoor CD 270 or the Outdoor CD 270C communicates with the HNB-GW/SeGW 250C over the Broadband IP Network 245 without any RAN intermediation. Such communication is based on a wired or a wireless connection created by the Indoor Broadband IP AP 240, or the Outdoor Broadband IP AP 241 respectively.

The Indoor CD 270 or the Outdoor CD 270C has an option to operate in the I-Mode whenever connection is available via the Indoor Broadband IP AP 240 or the Outdoor Broadband IP AP 241 respectively.

It should be apparent to any person skilled in the art that in some embodiments, the Indoor CD 270 or the Outdoor CD 270C can get simultaneous services established in different modes of operation, e.g. a CS call established in the U-Mode and a PS call established in the I-Mode.

FIG. 3 illustrates the CA Wide Area Network (WAN) connectivity in some embodiments.

The figure includes: (1) The CA 370Y; (2) the Interface Converter 342; (3) the Indoor Broadband IP AP 340, wherein the Indoor Broadband IP AP 340 can be the Outdoor Broadband IP AP 241 as shown in FIG. 2; and (4) the Broadband IP Network 345.

The CA 370Y comprises: (1) The CA Protocol Stacks 370X; (4) the LAN Adapter 342B; (5) the WLAN Radio 342A; and (6) a multi International Mobile Subscriber Identity (IMSI), the Multi IMSI UICC 343F as detailed with reference to FIG. 14. It should be apparent to any person skilled in the art that the CA 370Y can comprise the WLAN Radio 342A, or the LAN Adapter 342B, or both.

The Interface Converter 342 comprises: (1) The WLAN Radio 342A; (2) the LAN Adapter 342B; (3) the WLAN Radio 340A; and (4) the LAN Adapter 340B.

The Indoor Broadband IP AP 340 comprises: (1) The WLAN Radio 340A; (2) the LAN Adapter 340B; and (3) a Wide Area Network (WAN) adapter, the WAN Adapter 340C. It should be apparent to any person skilled in the art that the Indoor Broadband IP AP 340 can comprise the WLAN Radio 340A, or the LAN Adapter 340B, or both.

The figure also include the following interfaces: (1) The WLAN Interface 397A, for linking the WLAN Radios 342A; (2) the LAN Interface 397B, for linking the LAN Adapters 342B; (3) the WLAN Interface 396A, for linking the WLAN Radios 340A; (4) the LAN Interface 396B, for linking the LAN Adapters 340B; and (5) the IP Interface 393A, for interfacing the WAN Adapter 340C with the HNB-GW (not shown) over the Broadband IP Network 345.

It should be apparent to any person skilled in the art that: (1) The WLAN Interfaces 396A or 397A, are belonging to, but not limited to, any of the multitude short range wireless standards, e.g. a "WiFi" radio according to the IEEE 802.11 family of standards, or a "Bluetooth" radio according to the Bluetooth standard; (2) the LAN Interfaces 396B or 397B, are belonging to, but not limited to, any of the multitude wired standards, e.g. an Ethernet type according to the IEEE 802.3 family of standards, or a FireWire type according to the IEEE 1394 standard, or a Universal Serial Bus (USB) type according to the USB 2.0/3.0 standards; and (3) the IP Interface 393A is belonging to, but not limited to, any of the long range backhaul standards, e.g. a Coaxial Cable type according to the Data Over Cable Service Interface Specifications (DOCSIS) standard, or a Twisted Wire Pair type, according to the DSL family of standards, or an Optic Fiber type according to the Fiber To The x (FTTx) family of standards, or a Line Of Sight (LOS) radio link standard, or a Non Line Of Sight (NLOS) radio link standard.

The CA 370Y and the Indoor Broadband IP AP 340 are communicating via either: (1) A wireless link with endpoints comprising the WLAN Radio 342A and the WLAN Radio 340A respectively; or (2) a wired link with endpoints comprising the LAN Adapter 342B and the LAN Adapter 340B respectively.

In some embodiments, the link endpoints are compatible, i.e. operating according to the same standard, therefore the Interface Converter 342 is not needed. In other embodiments the link endpoints are incompatible, i.e. operating in accordance with different standards and the Interface Converter 342 converts between the physical and protocol entities of the two standards. The HardWare (HW) and the SoftWare (SW) components of the Interface Converter 342 are not shown, however it should be apparent to any person skilled in the art that the Interface Converter 342 can convert from any (W)LAN standard to any other (W)LAN standard.

The following example illustrates one possible configuration: (1) The CA 370Y has only physical interface, i.e. the WLAN Radio 342A operating in accordance with the Bluetooth standard; (2) the Indoor Broadband IP AP 340 has only LAN Adapter operating in accordance with the Ethernet standard; and (3) the Indoor Broadband IP AP 340 has the WAN adapter 340C operating in accordance with a DSL standard. In this example, the communication between the CA 370Y and the HNB-GW (not shown) is characterized by the following steps: (1) the CA 370Y communicates with the Interface Converter 342 over the WLAN Interface 397A, which is in this case a Bluetooth Interface, wherein both ends of the communication link comprising the WLAN Radios 342A; (2) the Interface Converter 342 converts the physical and protocol entities of the Bluetooth Interface into the physical and protocol entities of the Ethernet Interface respectively; (3) the Interface Converter 342 communicates with the Indoor Broadband IP AP 340 over the LAN Interface 396B, which is in this case an Ethernet Interface, wherein both ends of the communication link comprising the LAN Adapters 340B; (4) the Indoor Broadband IP AP 340 converts the physical and protocol entities of the Ethernet Interface into the physical and protocol entities of the DSL Interface respectively; and (5) the Indoor Broadband IP AP 340 communicates with the HNB-GW over the IP Interface 393A, which is in this case a DSL Interface, over the Broadband IP Network 345.

Steps (1) through (5) are reversed when the HNB-GW is communicating with the CA 370Y.

Figure 4:
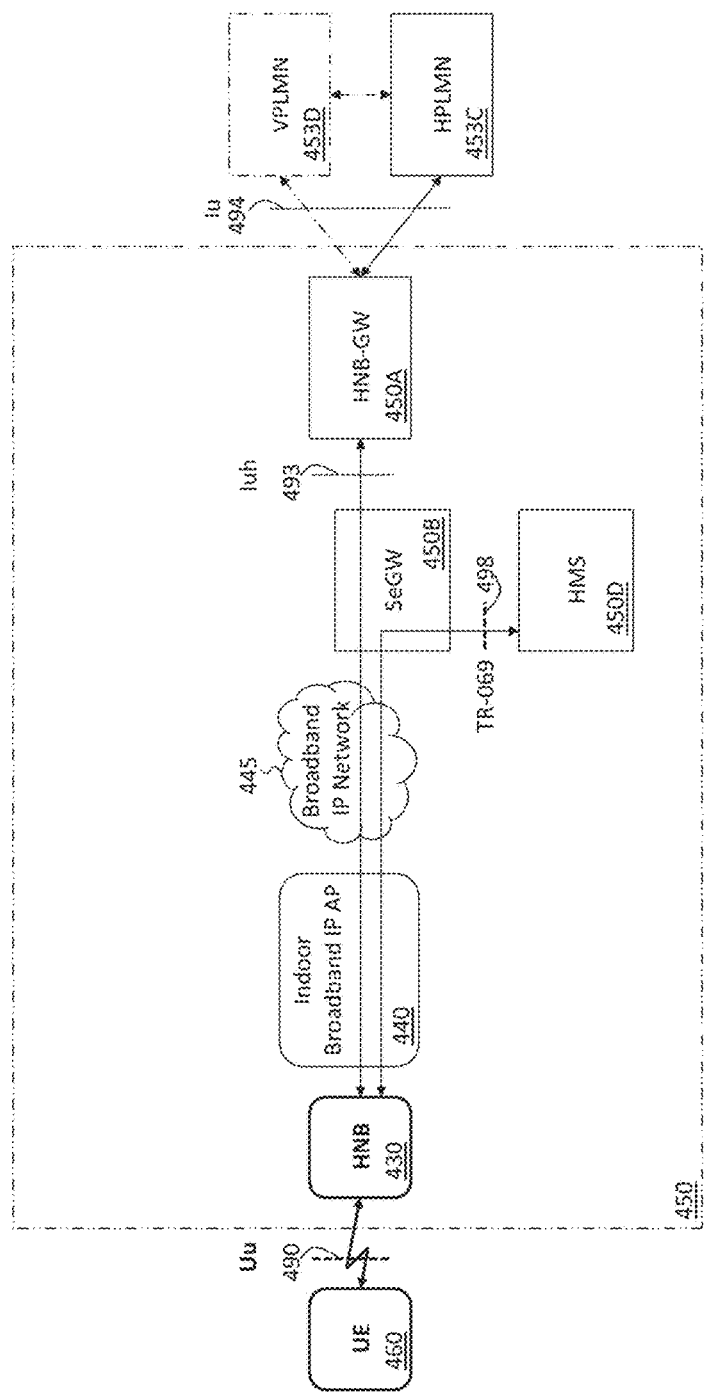
FIG. 4 illustrates the Home Node-B Access Network (HNB-AN), according to the prior art.

FIG. 4 illustrates the Home Node-B Access Network (HNB-AN), according to the prior art.

The figure includes the network entities that comprise a HNB-AN. The HNB-AN 450 comprises: (1) The HNB 430; (2) the Indoor Broadband IP AP 440; (3) the Broadband IP Network 445; (4) the SeGW 450B; (5) the HNB-GW 450A; and (6) a HNB Management System (HMS), the HMS 450D. In another embodiment (not shown) the Indoor Broadband IP AP 440 can be either the Indoor Broadband IP AP 240 or the Outdoor Broadband IP AP 241, as shown in FIG. 2.

The figure also includes the following entities: (1) The UE 460 communicating with the HNB 430 over the Uu Air Interface 490; (2) the HPLMN 453C representing the home CN; and (3) the VPLMN 453D representing the visited CN during roaming.

The figure also includes the following interfaces: (1) The 3GPP Uu Air Interface 490, also known as the Radio Interface, between the HNB 430 and plurality of UEs 460; (2) the 3GPP Iuh Interface 493 between the HNB-GW 450A and plurality of HNBs 430; (3) the 3GPP Iu Interface 494 between the HPLMN 453C, or the VPLMN 453D, and plurality of HNB-GWs 450A; and (4) the TR-069 Interface 498 between the HNB 430 and the HMS 450D, wherein the TR-069 Interface 498 is based on the Broadband Forum TR-069 family of standards.

The overall architectures of the UMTS and the UTRAN are described in the 3GPP TS 25.401 and the TS 25.410 respectively. The HNB-GW 450A serves as a concentrator for the plurality of the HNB 430 connections.

The HNB 430 functionalities comprise: (1) Providing the Uu Air Interface 490 towards the UEs 460; (2) providing the Iuh Interface 493 towards the HNB-GW 450A; (3) providing the Node-B and some of the RNC functionalities, as described in the 3GPP TS 25.467; (4) supporting the HNB 430 registration and the UE 460 registration over the Iuh Interface 493; and (5) other functionalities as described with reference to the HNB 1430 in FIG. 14.

The Indoor Broadband IP AP 440 is termination point, e.g. a modem/router, of the Broadband IP Network 445.

The SeGW 450B functionalities comprise: (1) Providing the HNB 430 with secured tunnel access to the HMS 450D and the HNB-GW 450A, wherein the secured tunnel can be based on the Internet Protocol security Encapsulating Security Payload (IPsec ESP), or another security protocol; and (2) authenticating the HNB 430.

The HNB-GW 450A functionalities comprise: (1) Providing the Iuh Interface 493 towards the HNBs 430; and (2) supporting the HNB 430 registration and the UE 460 registration over the Iuh Interface 493.

The HMS 450D is based on the TR-069 standard published by the Broadband Forum and specifically the TR-196 "Femto Access Point Service Data Model". The HMS 450D functionalities comprise: (1) Facilitating the HNB-GW 450A discovery; (2) provisioning of configuration data to the HNB 430; and (3) assigning the appropriate serving elements i.e. the SeGW 450B and the HNB-GW 450A. Data sent on the TR-069 Interface 498 is secured by the IPsec ESP Secured Tunnel, created by the SeGW 450B during mutual authentication with the HNB 430.

As described in the 3GPP TS 32.583, the HMS 450D and/or the HNB-GW 450A perform location verification of the HNB 430.

In some embodiments, the backhaul between the HNB 430 and the SeGW 450B is based on the Broadband IP Network 445 and unsecured. As described in the 3GPP TS 33.320, the SeGW 450B is an element at the edge of the CN terminating security associations for the backhaul link between the plurality of HNBs 430 and either the HPLMN 453C or the VPLMN 453D. The SeGW 450B performs mutual authentication with the HNB 430. Authentication types comprise: (1) The HNB 430 device certificate authentication, which is mandatory; and (2) the optional Hosting Party (HP) authentication, as described with reference to FIG. 14. For the HNB 430 authentication, a globally unique identifier, in IMSI format, is used for Extensible Authentication Protocol Authentication and Key Agreement (EAP-AKA) based authentication. This special IMSI identifies the HNB 430 in the Home Location Register (HLR) and avoids confusion with the IMSI of the UE 460. The specific IMSI structure is out of scope of this patent application and depends on the MNO policy. The SeGW 450B establishes secured association of the HNB 430 and the HNB-GW 450A and further to the HPLMN 453C or the VPLMN 453D. Any communication between the HNB 430 and the HNB-GW 450A is tunneled via the SeGW 450B with encryption and data integrity check. The SeGW 450B establishes IPsec ESP Secured Tunnels with the HNB 430 using the Integrity Key Exchange Version 2 (IKEv2) protocol signaling. The IPsec ESP Secured Tunnel is responsible for delivering all voice and data between the HNB 430 and the HPLMN 453C or the VPLMN 453D in a secured manner. The SeGW 450B manages all traffic to/from the HNB-GW 450A and from/to the HNB 430.

The UE 460 accesses the CN via the HNB-AN 450 utilizing the Uu Air Interface 490. The UE 460 is authenticated with its own credentials by the HPLMN 453C or the VPLMN 453D. The security of the Uu Air Interface 490, between the UE 460 and the HNB 430, follows the UTRAN security as described in the 3GPP TS 33.102. The Uu Air Interface 490 is protected by optional encryption and integrity checks. Other UE 460 functionalities are described with reference to the UE 1460 in FIG. 14.

The HPLMN 453C is the Public Land Mobile Network (PLMN) in which the UE 460 is subscribed. The VPLMN 453D serves the UE 460 in roaming cases. To give services to the UE 460, the VPLMN 453D interrogates the HLR (not shown) of the HPLMN 453C. Two cases should be considered: (1) The Non-Roaming case, in which the HPLMN 453C authenticates the UE 460, then provides services to the UE 460; and (2) the Roaming case, in which the VPLMN 453D refers to the HLR (not shown) of the HPLMN 453C, for authentication credentials and service approval for the UE 460, then provides services to the UE 460.

Figure 5:
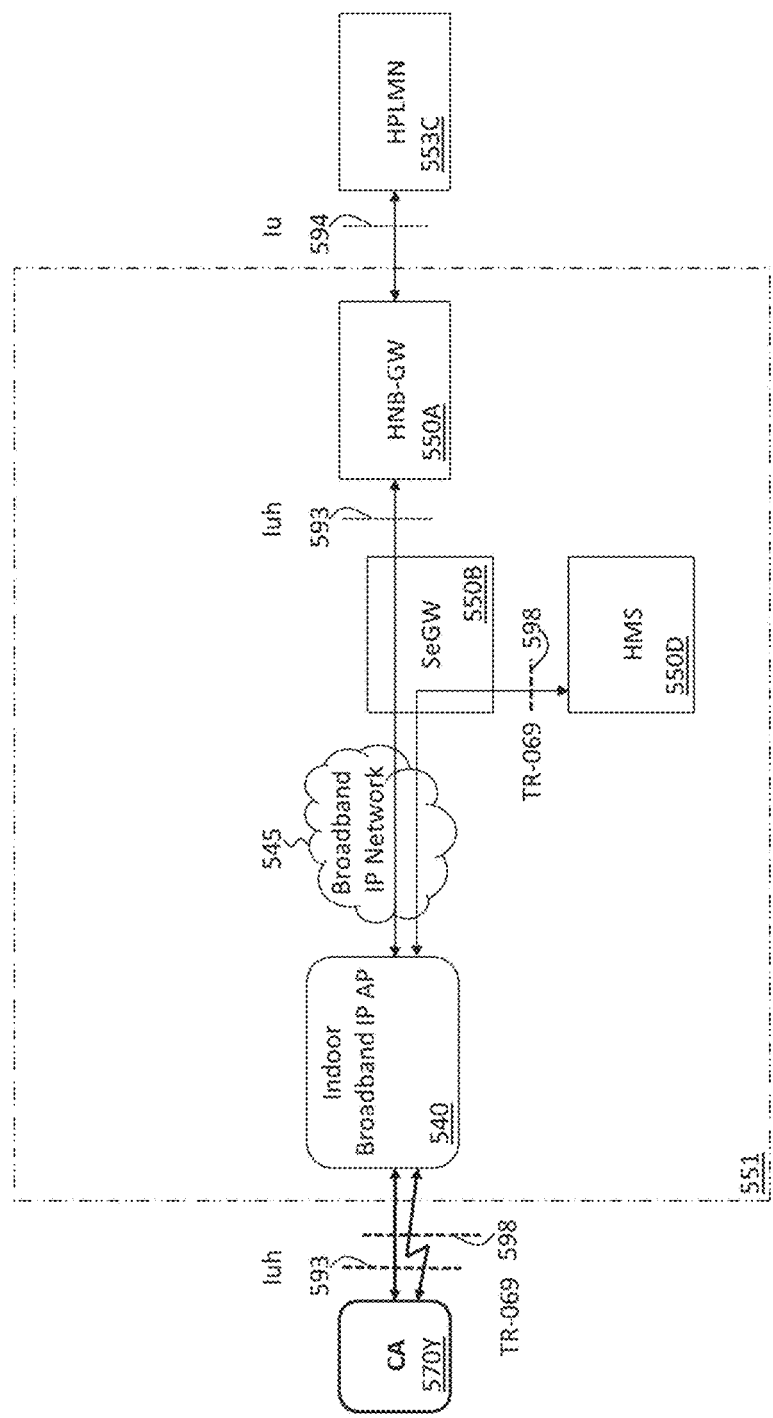
FIG. 5 illustrates the CA Access Network in some embodiments.

FIG. 5 illustrates the CA Access Network in some embodiments.

The figure includes the network entities that comprise A CA Access Network (CA-AN). The CA-AN 551 comprises: (1) The Indoor Broadband IP AP 540; (2) the HNB-GW 550A; (3) the Broadband IP Network 545; (4) the SeGW 550B; and (5) the HMS 550D. In another embodiment (not shown) the Indoor Broadband IP AP 540 can be either the Indoor Broadband IP AP 240 or the Outdoor Broadband IP AP 241, as shown in FIG. 2.

The figure also includes the following entities: (1) The CA 570Y communicating with the HNB-GW 550A over the Iuh Interface 593; and (2) the HPLMN 553C representing the home CN.

The figure also includes the following interfaces: (1) The 3GPP Iuh Interface 593 between the HNB-GW 550A and plurality of CAs 570Y; (2) the 3GPP Iu Interface 594 between the HPLMN 553C and plurality of HNB-GWs 550A; and (3) the Broadband Forum TR-069 Interface 598 between the CA 570Y and the HMS 550D. It should be apparent to any person skilled in the art that the Iuh Interface 593 and the TR-069 Interface 598, between the CA 570Y and the Indoor Broadband IP AP 540, can be implemented using a wired or a wireless medium, as shown in the figure.

The CA 570Y functionalities comprise: (1) providing the Iuh Interface 593 towards the HNB-GW 550A; (3) providing the Node-B and some of the RNC functionalities, as described in the 3GPP TS 25.467; and (4) other functionalities as described with reference to the CA 1470Y in FIG. 14.

The functionalities of the other entities shown in the figure, are described with reference to the corresponding entities in FIG. 4. When comparing the two Access Networks (AN), the main difference between the HNB-AN 450 and the CA-AN 551 is that the HNB-AN 450 can belong to either a home network or to a visited network, therefore the UE 460 can get services from either the HPLMN 453C or the VPLMN 453D respectively, wherein the CA-AN 551 belongs to a home network only, therefore the CA 570Y gets services from the HPLMN 553C only, even during roaming.

In the HNB-AN 450 architecture, as described with reference to prior art with reference to FIG. 4, there is a regulatory requirement implementation for the HNB 430 location verification derived from the use of licensed spectrum. The HNB 430 deployed in an unauthorized location is rejected for services. The CA 570Y has no radio and it does not use licensed spectrum, therefore the location requirement for the CA 570Y can be nullified. In some embodiments the CA 570Y provides location information to the verifying node, i.e. the HNB-GW 550A, the SeGW 550B or the HMS 550D, as described in the 3GPP TS 33.320, comprising the following methods for deriving the location information: (1) The IP address linked to the physical access line location identifier provided by the ISP; and (2) the geo-coordinates provided by a co-located Global Navigation Satellite System (GNSS) receiver, e.g. GPS. In other embodiments the CA 570Y is co-located with a UE, enabling the derivation of the location information by triangulation method, using neighbor Node-Bs. Different deployment scenarios influence the availability, accuracy and reliability of these methods.

Figure 6:
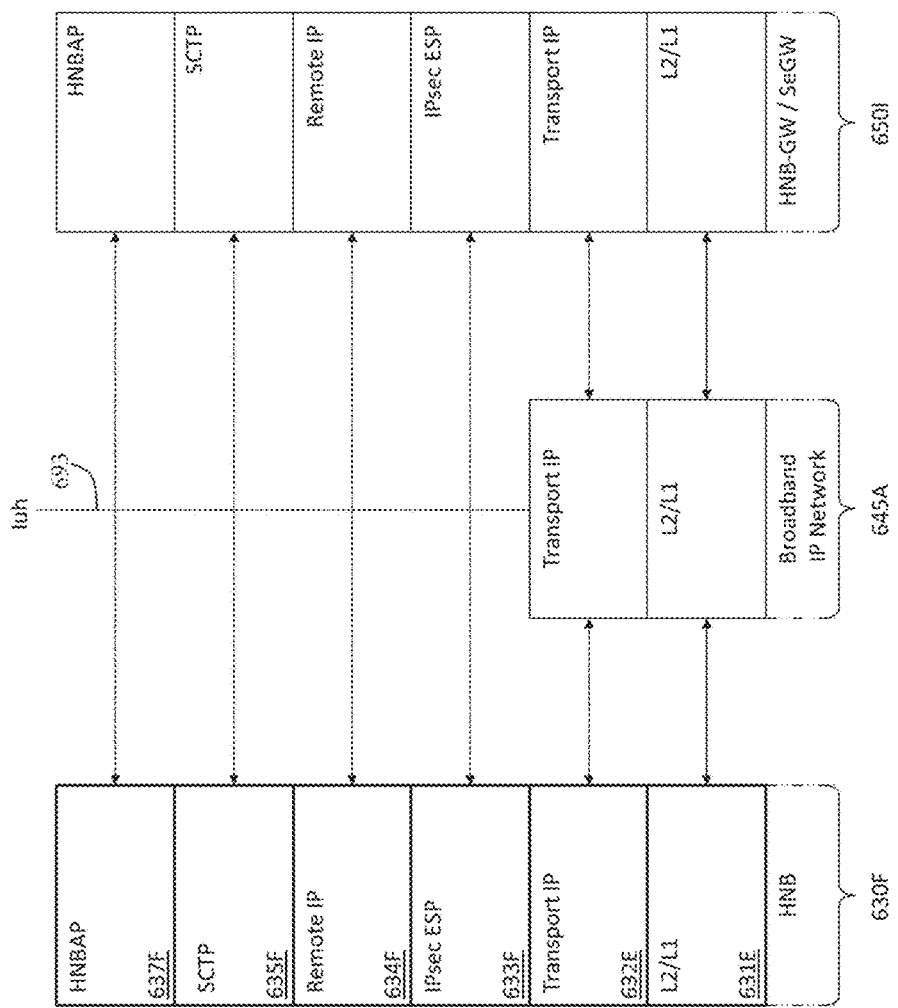
FIG. 6 illustrates the protocol architecture supporting the HNB Application Part (HNBAP) over the Iuh Interface, according to the prior art.

FIG. 6 illustrates the protocol architecture supporting the HNB Application Part (HNBAP) over the Iuh Interface, according to the prior art.

The figure includes: (1) The HNB Control Plane (C-Plane) Protocol Stack 630F; (2) the HNB C-Plane portion of the HNB-GW/SeGW Protocol Stacks 650I, comprised of the peer entities of the HNB C-Plane Protocol Stack 630F; and (3) the Broadband IP Network Protocol Stack 645A providing the transport service for the peer entities of the HNB Protocol Stack 630F and the HNB-GW/SeGW Protocol Stacks 650I.

The figure also includes the Iuh Interface 693 between the peer entities of the HNB Protocol Stack 630F and the HNB-GW/SeGW Protocol Stacks 650I, supported by the peer entities of the Broadband IP Network Protocol Stack 645A. It should be apparent to any person skilled in the art that the unreferenced entities in the figure are peer entities to the described entities, having the same functionality.

The HNB C-Plane Protocol Stack 630F comprises: (1) A HNB Application Part (HNBAP), the HNBAP Layer 637F; (2) a Stream Control Transmission Protocol layer/entity (SCTP), the SCTP Layer 635F; (3) the Remote IP Layer 634F; (4) the IPsec ESP Layer 633F; (5) the Transport IP Layer 632E; and (6) the L2/L1 Access Layer 631E. It should be apparent to any person skilled in the art that the L1, L2 and L3 abbreviations used in this patent application refer to the Layer-1, Layer-2 and Layer-3 respectively, as known in the art.

HNBAP Functionality.

As described in the 3GPP TS 25.469, the HNBAP Layer 637F supports signaling service between the HNB Protocol Stack 630F and the HNB-GW/SeGW Protocol Stacks 650I to fulfill the HNBAP Layer 637F functionalities. The HNBAP Layer 637F comprises the following functions: (1) Management of the underlying transport i.e., the SCTP Layer 635F connection; (2) the HNB-GW/SeGW Protocol Stacks 650I discovery; and (3) the HNB Protocol Stack 630F registration procedures. In some embodiments, the HNBAP Layer 637F also provides a resource management comprising of: (1) The UE (not shown) registration; (2) registration updates; and (3) Access Identification of the HNB Protocol Stack 630F.

HNB C-Plane, Lower Layers Functionalities.

The SCTP Layer 635F provides reliable transport for the HNBAP Layer 637F between the HNB Protocol Stack 630F and the HNB-GW/SeGW Protocol Stacks 650I, using the Remote IP Layer 634F. It should be apparent to any person skilled in the art that other reliable transport protocol layers can be used instead of the SCTP Layer 635F. The IPsec ESP Layer 633F operates in tunnel mode and provides communication encryption and data integrity for the data that is passed using the Upper Layers (UPLRs). The L2/L1 Access Layer 631E and the Transport IP Layer 632E provide the connectivity between the HNB Protocol Stack 630F and the HNB-GW/SeGW Protocol Stacks 650I.

Figure 7:
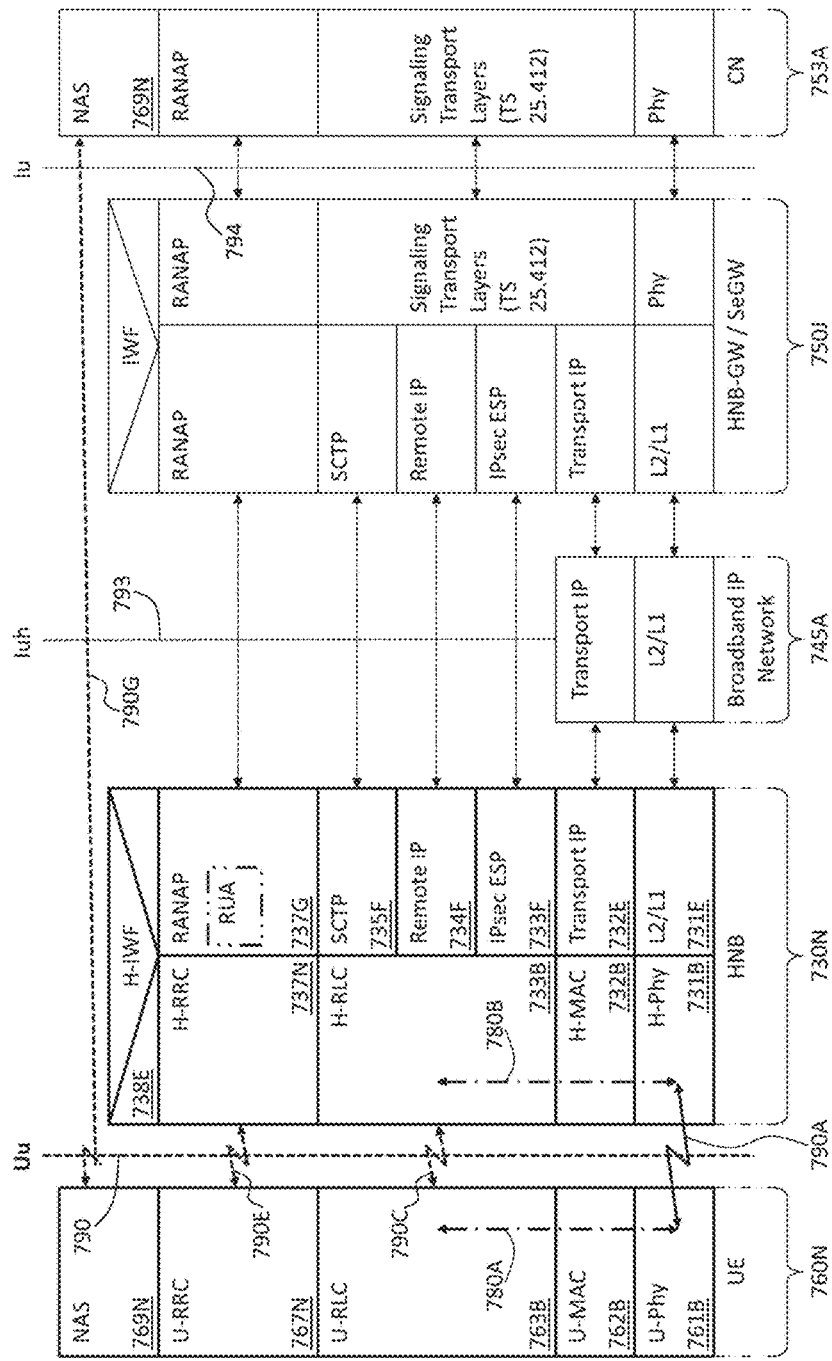
FIG. 7 illustrates the User Equipment (UE)/HNB Control Plane (C-Plane) protocol architecture, according to the prior art.

FIG. 7 illustrates the User Equipment (UE)/HNB Control Plane (C-Plane) protocol architecture, according to the prior art.

The figure includes the following C-Plane Protocol Stacks: (1) the HNB Protocol Stacks 730N; (2) the HNB-GW/SeGW Protocol Stacks 750J; (3) the CN Protocol Stack 753A; (4) the UE Protocol Stack 760N; and (5) the Broadband IP Network Protocol Stack 745A providing the transport service for the peer entities of the HNB-GW/SeGW Protocol Stacks 750J and the HNB Protocol Stacks 730N.

The figure also includes interfaces as described in the 3GPP Specifications: (1) The Uu Air Interface 790 between the peer entities of the UE Protocol Stack 760N and the HNB Protocol Stacks 730N; (2) the Iuh Interface 793 between the peer entities of the HNB Protocol Stacks 730N and the HNB-GW/SeGW Protocol Stacks 750J, supported by the peer entities of the Broadband IP Network Protocol Stack 745A; and (3) the Iu Interface 794 between the peer entities of the HNB-GW/SeGW Protocol Stacks 750J and the CN Protocol Stack 753A. It should be apparent to any person skilled in the art that the Uu Air Interface 790 supports the simultaneous communication between multiple instances of the UE Protocol Stack 760N and the HNB Protocol Stacks 730N. For the clarity of the figure, only one instance is shown. It should also be apparent to any person skilled in the art that the unreferenced entities in the figure are: (1) Either peer entities to the described entities, having the same functionality; or (2) entities which are not directly related to the present system and are described in the 3GPP Specifications.

The C-Plane Protocol Stack architecture of the Uu Air Interface 790, used for communications between the UE Protocol Stack 760N and the HNB Protocol Stacks 730N comprises: (1) The peer entities of the Radio Resource Control (RRC), A UE RRC layer/entity (U-RRC), the U-RRC Layer 767N and a HNB RRC layer/entity (H-RRC), the H-RRC Layer 737N; (2) the peer entities of the Radio Link Control (RLC), A UE RLC layer/entity (U-RLC), the U-RLC Layer 763B and a HNB RLC layer/entity (H-RLC), the H-RLC Layer 733B; (3) the peer entities of the Medium Access Control (MAC), a UE MAC layer/entity (U-MAC), the U-MAC Layer 762B and a HNB MAC layer/entity (H-MAC), the H-MAC Layer 732B; and (4) the peer entities of the Physical Layer (Phy), a UE Phy layer/entity (U-Phy), the U-Phy Layer 761B and a HNB Phy layer/entity (H-Phy), the H-Phy Layer 731B.

The C-Plane Protocol Stack architecture also comprises the peer entities of a Non Access Stratum (NAS) layer, the NAS Layer 769N of both the UE Protocol Stack 760N and the CN Protocol Stack 753A which are connected over a Logical Link (LL), the LL 790G, wherein the NAS messages are carried transparently between the peer entities of the NAS Layer 769N using direct transfer mechanism.

The LLs between the peer entities of the UE Protocol Stack 760N and the HNB Protocol Stacks 730N comprise: (1) The LL 790E between the U-RRC Layer 767N and the H-RRC Layer 737N; and (2) the LL 790C between the U-RLC Layer 763B and the H-RLC Layer 733B.

The figure also illustrates in a hop-by-hop manner the data path between the peer entities of the RLC, the U-RLC Layer 763B and the H-RLC Layer 733B, comprising the following connection hops: (1) The hop 780A on the UE Protocol Stack 760N, from the U-RLC Layer 763B, via the U-MAC Layer 762B, to the U-Phy Layer 761B; (2) the physical hop 790A over the Uu Air Interface 790; and (3) the hop 780B on the HNB Protocol Stacks 730N, from the H-Phy Layer 731B, via the H-MAC Layer 732B, to the H-RLC Layer 733B. It should be apparent to any person skilled in the art that these hops are bidirectional, i.e. described sequence reversed.

The HNB Protocol Stacks 730N comprise the following: (1) The radio side comprising the C-Plane peer entities of the UE Protocol Stack 760N, as described above; (2) the network side which is terminated by the peer entities in the HNB-GW/SeGW Protocol Stacks 750J; and (3) an Inter-Working Function (IWF), i.e. a HNB IWF (H-IWF), the H-IWF entity 738E, characterized by the following: (a) Performing protocol conversion between the Radio Protocol Stack and the Network Protocol Stack; and (b) relay messages and data between the two protocols.

The network side comprises: (1) The Radio Access Network Application Part (RANAP) Layer 737G which includes the RANAP User Adaptation (RUA) Sub-Layer; (2) the SCTP Layer 735F; (3) the Remote IP Layer 734F; (4) the IPsec ESP Layer 733F; (5) the Transport IP Layer 732E; and (6) the L2/L1 Access Layer 731E.

C-Plane Functionality for Supporting the UE.
NAS Functionality.

The NAS Layer 769N performs various procedures comprising of: (1) Call Management (CM); (2) General Packet Radio Service (GPRS); (3) Mobility Management (MM); (4) Session Management (SM); and (5) Short Message Services (SMS).

RRC Functionality.

According to the 3GPP TS 25.331, the U-RRC Layer 767N and the H-RRC Layer 737N main functionalities comprising of: (1) Arbitration of radio resources on the uplink Dedicated Channel (DCH); (2) assignment, reconfiguration and release of radio resources for the RRC connection; (3) broadcast of information related to the Access Stratum; (4) broadcast of information related to the NAS Layer 769N; (5) Cell Broadcast Service (CBS) control; (6) control of ciphering; (7) control of requested QoS; (8) establishment, maintenance and release of the RRC connection; (9) establishment, reconfiguration and release of radio bearers; (10) initial cell selection and cell re-selection; (11) outer loop power control; (12) paging; (13) RRC connection mobility functions; (14) RRC message integrity protection; and (15) UE measurement reporting and control of the reporting RLC Functionality.

As described in the 3GPP TS 25.301 and the TS 25.322, the U-RLC Layer 763B and the H-RLC Layer 733B provide the following services to the UPLRs via their Service Access Points (SAPs): (1) The Acknowledged Mode (AM), the Transparent Mode (TM) and the Unacknowledged Mode (UM) data transfer; (2) maintenance of QoS as requested by the UPLRs; and (3) notification of unrecoverable errors.

MAC Functionality.

According to the TS 25.301 and TS 25.321, the U-MAC Layer 762B and the H-MAC Layer 732B provide the following services to the UPLRs: (1) Data transfer; (2) reallocation of radio resources and MAC parameters; and (3) reporting of measurements. The MAC provides data transfer services to the UPLRs in terms of Logical CHannels (LCHs). The LCH concept is further described in the 3GPP TR 21.905. Each LCH type is characterized by the type of information transferred. The LCHs are generally classified in two groups: (1) Control channels for the transfer of C-Plane information; or (2) traffic channels for the transfer of the User Plane (U-Plane) information.

Phy Functionality.

According to the TS 25.301, the U-Phy Layer 761B and the H-Phy Layer 731B offer information transfer services to the higher layers in terms of transport channels. The transport channels are classified by the mechanism and the characteristics by which data is transferred over the Uu Air Interface 790.

C-Plane Functionality for Supporting the HNB.
RANAP/RUA Functionality.

The RANAP Layer 737G, as described in the TS 25.413, is used for CS/PS signaling between the HNB Protocol Stacks 730N and the CN Protocol Stack 753A. The RANAP Layer 737G comprises a protocol used for UMTS signaling between the CN Protocol Stack 753A and the UTRAN of a licensed spectrum MNO. The HNB-GW/SeGW Protocol Stacks 750J relays the RANAP Layer 737G messages between the HNB Protocol Stacks 730N and the CN Protocol Stack 753A. In some embodiments, the HNB-GW/SeGW Protocol Stacks 750J terminates and re-originates some RANAP Layer 737G messages, which is done by an IWF.

The RUA Sub-Layer, as described the in the 3GPP TS 25.468, has been added by the 3GPP in order to support RANAP signaling in the UTRAN built with HNBs/HNB-GWs, while preserving backward RANAP signaling compatibility in the UTRAN built with Node-Bs/RNCs. The key function of this Adaptation Sub-Layer is to provide the functionality, over the Iuh Interface 793, of transporting the RANAP Layer 737G messages and control functions, as described in the 3GPP TS 25.413, between the HNB Protocol Stacks 730N and the HNB-GW/SeGW Protocol Stacks 750J. Specifically, the RUA Sub-Layer encapsulates the RANAP Layer 737G messages in a RUA header for transport between the HNB Protocol Stacks 730N and the HNB-GW/SeGW Protocol Stacks 750J. The RUA Sub-Layer minimizes the decoding and processing of RANAP Layer 737G messages at the HNB-GW/SeGW Protocol Stacks 750J. The HNB-GW/SeGW Protocol Stacks 750J does not decode and process the RANAP Layer 737G message. Instead, the HNB-GW/SeGW Protocol Stacks 750J processes information within the RUA header in order to determine the destination within the CN Protocol Stack 753A. The RUA Sub-Layer also eliminates the need for the HNB-GW/SeGW Protocol Stacks 750J to process and decode the NAS Layer 769N messages sent over the LL 790G.

The C-Plane functionalities for the Lower Layers, i.e. the SCTP Layer 735F, the Remote IP Layer 734F, the IPsec ESP Layer 733F, the Transport IP Layer 732E and the L2/L1 Access Layer 731E, are described with reference to FIG. 6, wherein the reliable transport is for the RANAP Layer 737G and the RUA Sub-Layer.

Figure 8:
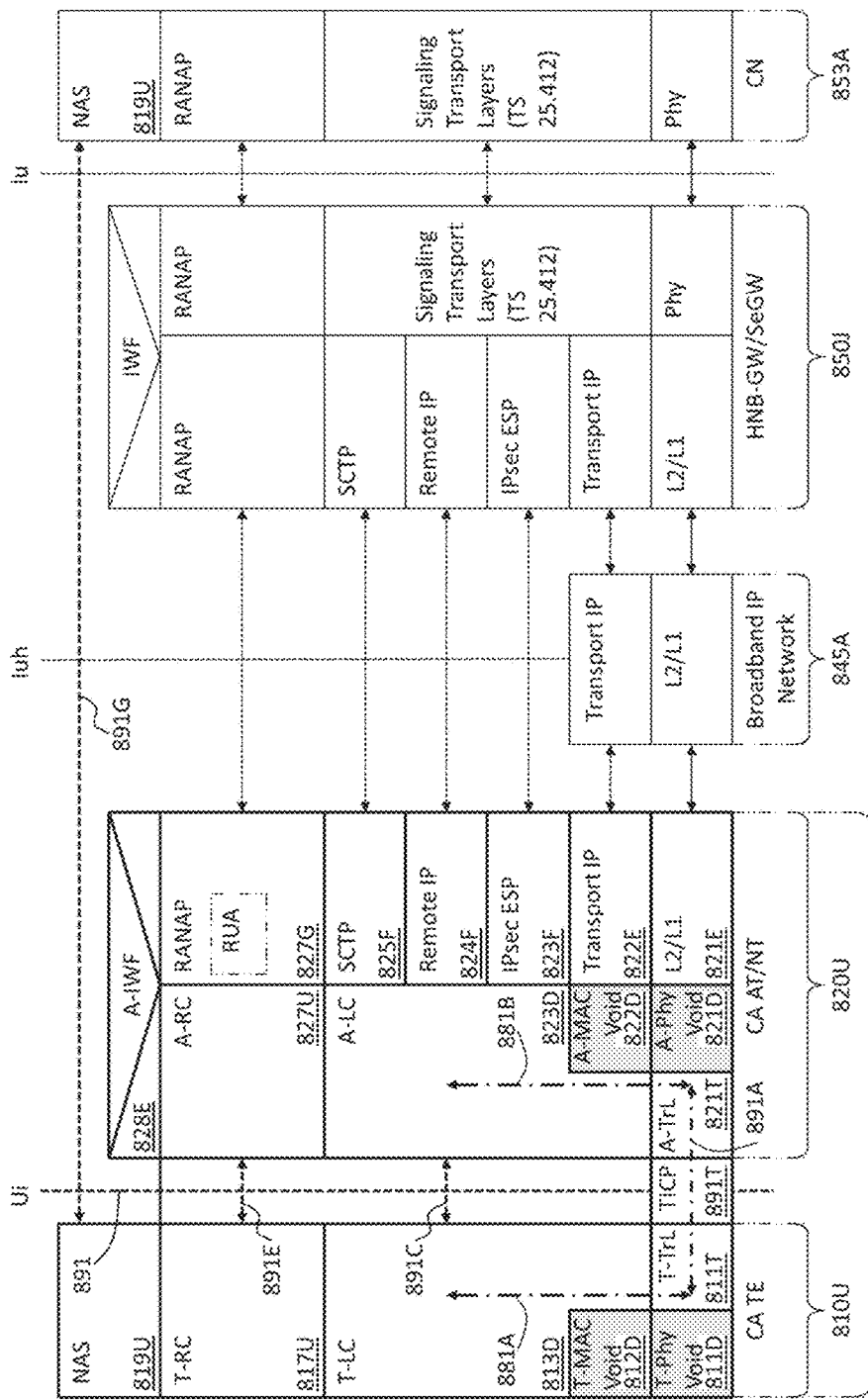
FIG. 8 illustrates the CA C-Plane protocol architecture in some embodiments.

FIG. 8 illustrates the CA C-Plane protocol architecture in some embodiments.

The figure includes the following C-Plane Protocol Stacks: (1) the CA Protocol Stacks 870U; (2) the HNB-GW/SeGW Protocol Stacks 850J; (3) the CN Protocol Stack 853A; and (4) the Broadband IP Network Protocol Stack 845A providing the transport service for the peer entities of the HNB-GW/SeGW Protocol Stacks 850J and the CA Protocol Stacks 870U.

The C-Plane Protocol Stack architecture of the Ui Interface 891, used for communications between a CA Terminal Equipment protocol stack (TE), the CA TE 810U and the CA AT/NT 820U comprises: (1) The Resource Control layer/entity (RC) peers: (a) A Terminal-equipment RC layer/entity (T-RC), the T-RC Layer 817U; and (b) an Access-termination RC layer/entity (A-RC), the A-RC Layer 827U; (2) the Link Control layer/entity (LC) peers; (a) A Terminal-equipment LC layer/entity (T-LC), the T-LC Layer 813D; and (b) an Access-termination LC layer/entity (A-LC), the A-LC Layer 823D; and (3) the peer entities of the Transport Layer (TrL), A Terminal-equipment TrL layer/entity (T-TrL), the T-TrL 811T and an Access-termination TrL layer/entity (A-TrL), the A-TrL 821T. The Ui Interface 891 is implemented by an Inter Process Communication (IPC) method. As shown on the figure, the following prior art layers are void: (1) a Terminal-equipment MAC Void layer/entity (T-MAC-Void), the T-MAC-Void Layer 812D and an Terminal-equipment Phy Void layer/entity (T-Phy-Void), the T-Phy-Void Layer 811D of the CA TE 810U; and (2) an Access-termination MAC Void layer/entity (A-MAC-Void), the A-MAC-Void Layer 822D and an Access-termination Phy Void layer/entity (A-Phy-Void), the A-Phy-Void Layer 821D of the CA AT/NT 820U.

The C-Plane Protocol Stack architecture also comprises the peer entities of the NAS Layer 819U of both the CA TE 810U and the CN Protocol Stack 853A which are connected over the LL 891G, wherein the NAS messages are carried transparently between the peer entities of the NAS Layer 819U using direct transfer mechanism.

The LLs between the peer entities of the CA TE 810U and the CA AT/NT 820U comprise: (1) The LL 891E between the T-RC Layer 817U and the A-RC Layer 827U; and (2) the LL 891C between the T-LC Layer 813D and the A-LC Layer 823D.

The figure also illustrates a hop-by-hop a bi-directional data pass between two peer entities, the T-LC Layer 813D and the A-LC Layer 823D comprising the following hops: (1) The Data Hop 881A between the T-LC Layer 813D and the T-TrL 811T; (2) the Data Hop 891A, of the Ui Interface 891, between the T-TrL 811T and the A-TrL 821T; and (3) the Data Hop 881B, between the A-LC Layer 823D and the A-TrL 821T. The intermediation Transport Interface Common Point entity (TICP), the TICP 891T, which belongs to the hosting Operating System (OS), gives transport services to both the T-TrL 811T and the A-TrL 821T in terms of the Data Hop 891A.

In some embodiments, as shown on the figure, the Data Hop 891A is based on the Shared Memory IPC method. The TICP 891T represents some pre-allocated portion of the physical memory, controlled by the OS, which is designated specifically for inter-communication between peer entities. In other embodiments, other IPC methods are used, as described with reference to FIG. 12.

The CA Protocol Stacks 870U comprise: (1) The CA TE 810U, comprising the C-Plane peer entities as described above; and (2) the CA AT/NT 820U comprising three parts: (a) the Access Termination protocol stack (AT), comprising the C-Plane peer entities as described above; (b) the Network Termination protocol stack (NT), which is terminated by the peer entities in the HNB-GW/SeGW Protocol Stacks 850J; and (3) an Access-termination-to-network-termination IWF (A-IWF), the A-IWF Entity 828E, characterized by the following: (a) Performing protocol conversion between the CA AT and the CA NT; and (b) relaying messages and data between the two protocols.

The NT comprises: (1) The RANAP Layer 827G which includes the RUA Sub-Layer; (2) the SCTP Layer 825F; (3) the Remote IP Layer 824F; (4) the IPsec ESP Layer 823F; (5) the Transport IP Layer 822E; and (6) the L2/L1 Access Layer 821E.

C-Plane Functionality for Supporting the CA.

RC Functionality.

The functionalities of the T-RC Layer 817U and the A-RC Layer 827U in the present system, are similar to the prior art U-RRC Layer 767N and the H-RRC Layer 737N respectively, as described with reference to FIG. 7, i.e.: (1) Optional assignment, reconfiguration and release of resources for the RC connection; (2) Broadcast of information related to the NAS; (3) Control of requested QoS; (4) optional establishment, maintenance and release of an RC connection; and (5) Paging.

It should be apparent to any person skilled in the art that in the present system, as the T-RC Layer 817U and the A-RC Layer 827U utilize the Ui Interface 891 implemented by an IPC method, there is no need to establish the prior art RRC connection each time the CA TE 810U tries to communicate with the CN Protocol Stack 853A. In some embodiments, the RRC connection is established just after power up or after reset, between the T-RC Layer 817U and the A-RC Layer 827U, and is kept opened until the CA Protocol Stacks 870U power off or reset. In other embodiments, the prior art principles of RRC connection establishment can be utilized to keep backward compatibility with the legacy protocol stacks.

LC Functionality.

Figure 9:
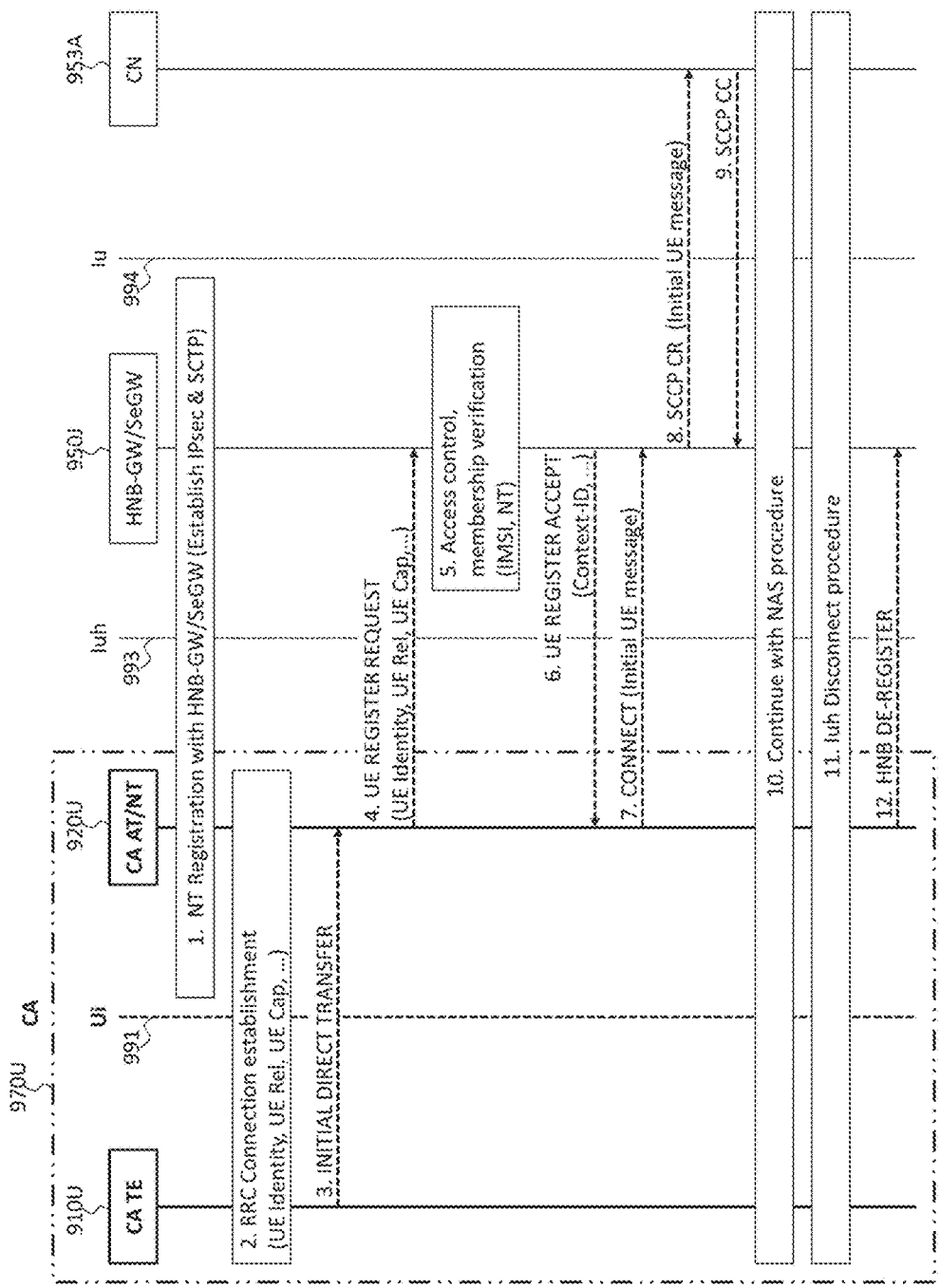
FIG. 9 illustrates the Message Sequence Chart (MSC) for the CA registration in some embodiments.

The functionalities of the T-LC Layer 813D and the A-LC Layer 823D in the present system, are similar to the prior art U-RLC Layer 763B and the H-RLC Layer 733B respectively, as described with reference to FIG. 7. However, the LC peer entities communicate logically, by means of the LL 891C, over the Ui Interface 891 using the TrL implemented by an IPC method, as described with reference to FIG. 11, wherein the prior art RLC entities communicate logically, by means of the LL 790C, over the Uu Air Interface 790, using the MAC & Phy Layers, as described with reference to FIG. 7. It should be apparent to any person skilled in the art that for the reliability, security and throughput on the Ui Interface link, the LC Layer needs lower complexity algorithms in comparison with the prior art RLC Layer, as the transfer between the peer LC entities is characterized by the following: (1) Guaranteed, therefore there is no need for re-transmissions; (2) free of errors and duplications, therefore there is no need for error detection and recovery; (3) always in-sequence, i.e. the order of the Protocol Data Units (PDUs) reception is the same as the order of the PDUs submission, therefore there is no need for re-ordering of the PDUs; (4) secured, because both peer LC entities are hosted by the Trusted Execution Environment (TEE), as described with reference to FIG. 16, therefore there is no need for additional ciphering/deciphering between the peer LC entities; (5) limited only by the OS in terms of message length, i.e. unlimited for all practical purposes, therefore the segmentation/concatenation procedures can be nullified; and (6) single entity support i.e. the Ui Interface 891 supports the communication between only one instance of the CA TE 810U and the CA AT/NT 820U, wherein the Uu Air Interface 790 supports the simultaneous communication between multiple instances of the UE Protocol Stack 760N and the HNB Protocol Stacks 730N as described with reference to FIG. 7. Therefore, it should be apparent to any person skilled in the art that although the LC Layer functionality is derived from the 3GPP RLC Layer functionality, some of the RLC functionalities, as described above, are redundant for the proper operation of the LC Layer, i.e. the LC Layer is a degenerated version of the 3GPP RLC Layer. In the preferred embodiment, these redundant functionalities are omitted from the LC Layer. In another embodiment (not shown), the CA comprises the RLC Layer instead of the LC Layer, wherein the CA further comprises: (1) An Abstraction Layer between the RLC Layer and the TrL, which intercepts the redundant RLC messages and deals with them in a way to prevent undesirable CA behavior; or (2) an additional functionality of the TrL, providing the functionality of the Abstraction Layer. Consequently the examples of data flow and Message Sequence Charts (MSCs), as shown e.g. in FIG. 9, are derived from the prior art MSCs by removing the redundant functionalities, however the names of the primitives, messages and parameters are kept according to the 3GPP Specifications. The same reasoning and the same naming conventions are applied for the comparison of the CA RC and the prior art RRC Layers.

MAC and Phy Functionalities.

It should be apparent to any person skilled in the art that in lieu of the redundancy derived from the implementation of the Ui Interface 891, as described in the previous section, the prior art MAC and Phy functionalities are nullified in the present system, therefore the peer MAC Layers and the peer Phy Layers are void, as shown in the figure. Furthermore, the T-TrL 811T is used instead of the T-Phy-Void Layer 811D and the A-TrL 821T is used instead of the A-Phy-Void Layer 821D.

The C-Plane functionalities for the NAS Layer 819U, the RANAP Layer 827G and the RUA Sub-Layer are described with reference to FIG. 7. The C-Plane functionalities for the other layers of the NT portion of the CA AT/NT 820U, i.e. the SCTP Layer 825F, the Remote IP Layer 824F, the IPsec ESP Layer 823F, the Transport IP Layer 822E and the L2/L1 Access Layer 821E, are described with reference to FIG. 6, wherein the reliable transport is for the RANAP Layer 827G and the RUA Sub-Layer.

Paging and QoS Functionalities

In the prior art, the paging service sends information to a specific UE or UEs as described in the 3GPP TS 25.301. The information is broadcasted in a certain geographical area but is addressed to a specific UE or UEs. In some embodiments of the present system the information, for paging and notification services, is transferred internally inside the CA Protocol Stack 870U, from the NT portion of the CA AT/NT 820U, over the Ui Interface 891, towards the CA TE 810U. Responses, as appropriate, are transferred in the opposite direction.

In the prior art, the 3GPP Specification defines the levels of QoS required for the various Radio Bearers, including the allocation of sufficient radio resources, which are being dealt by the MAC and Phy Layers. It should be apparent to any person skilled in the art that the implementation of the Ui Interface 891, as described in the previous sections, provides the means for the required QoS.

FIG. 9 illustrates the Message Sequence Chart (MSC) for the CA registration in some embodiments.

The figure illustrates the CA Protocol Stacks 970U registration procedure characterized by the following sub-stages: (1) The CA AT/NT 920U registration with the serving HNB-GW/SeGW Protocol Stacks 950J as described with reference to Step 1 below; and (2) the CA TE 910U registration with the serving HNB-GW/SeGW Protocol Stacks 950J as described with reference to Step 4 through Step 9 below.

The CA AT/NT 920U registration sub-stage is performed upon power up or reset of the CD. The CA AT/NT 920U registration procedure utilizes the HNB registration procedure as described in the 3GPP TS 25.467. To perform registration procedure, the CA AT/NT 920U establishes IPsec ESP Secured Tunnel and sets up a reliable transport session, e.g. SCTP, for the Iuh Interface 993 signaling on the serving HNB-GW/SeGW Protocol Stacks 950J.

The CA TE 910U registration sub-stage is triggered when the CA TE 910U attempts to access the CA AT/NT 920U by means of an initial NAS message, e.g., LOCATION UPDATING REQUEST. The CA TE 910U and the CA AT/NT 920U communicate over the Ui Interface 991. The CA Protocol Stacks 970U and the HNB-GW/SeGW Protocol Stacks 950J communicate over the Iuh Interface 993. The HNB-GW/SeGW Protocol Stacks 950J and the CN Protocol Stack 953A communicate over the Iu Interface 994. The CA Protocol Stacks 970U registration procedure is characterized by the following steps:

Step 1: The CA Protocol Stacks 970U registers the CA AT/NT 920U entity with the HNB-GW/SeGW Protocol Stacks 950J utilizing the HNB registration procedure as described in the 3GPP TS 25.467. During the registration procedure, the CA AT/NT 920U is identified by an IMSI stored in the UICC (not shown) as the prior art HNB does for the hosting party identity. It should be apparent to any person skilled in the art that with regard to the specific implementation, this step of registration procedure can be done during earlier stages, e.g. after secure boot and protocol stack initialization, and the CA Protocol Stacks 970U can keep the CA AT/NT 920U being registered until the arrival of one of the following events: (1) De-registration Request from any side; (2) Reset; or (3) Power Off.

Step 2: Upon the UPLRs request, the CA TE 910U initiates an initial NAS procedure, e.g. Location Updating procedure, by optional establishing an RRC connection with the CA AT/NT 920U. As described above regarding the CA AT/NT 920U, the RRC connection can be established earlier and the CA Protocol Stacks 970U can keep it established until the arrival of one of the following events: (1) De-registration Request from any side; (2) Reset; or (3) Power Off. The UE identity i.e. equivalent to the TE identity, the UE Capabilities i.e. equivalent to the TE capabilities and the Establishment Cause, are reported to the CA AT/NT 920U as part of the RRC Connection establishment procedure.

Step 3: The CA TE 910U then transmits over the Ui Interface 991 the RRC INITIAL DIRECT TRANSFER message carrying the Initial NAS message, e.g. the LOCATION UPDATING REQUEST message, with some form of the UE Identity. In the prior art, upon reception of the INITIAL DIRECT TRANSFER message from the UE, the HNB checks the UE Capabilities and optionally performs Access Control. In the present system the CA AT/NT 920U does not check the CA TE 910U capabilities or perform Access Control, as these attributes are known a-priori to the CA AT/NT 920U.

Step 4: The CA Protocol Stacks 970U, i.e. the CA AT/NT 920U, attempts to register the CA TE 910U with the HNB-GW/SeGW Protocol Stacks 950J by transmitting the message UE REGISTER REQUEST. The message comprises at least: (1) The CA TE 910U Identity, derived from the UE Identity parameter, which has been provided in Step 2; (2) the CA TE 910U Capabilities, derived from the UE Capabilities parameter, which have been provided in Step 2; and (3) the Registration Cause, e.g. the indication regarding the CA TE 910U registration for an Emergency Call.

Step 5: The HNB-GW/SeGW Protocol Stacks 950J checks the CA TE 910U capabilities, derived from the UE Capabilities parameter, and the Registration Cause. The HNB-GW/SeGW Protocol Stacks 950J performs Access Control or membership verification for the particular CA TE 910U attempting to utilize the specific CA AT/NT 920U. If the CA TE 910U requests Emergency Call services, it is always admitted to the HNB-GW/SeGW Protocol Stacks 950J.

Step 6: If the HNB-GW/SeGW Protocol Stacks 950J accepts the CA TE 910U registration attempt it allocates a Context-ID for the CA TE 910U and responds with the HNBAP UE REGISTER ACCEPT message, including the Context-ID, towards the CA AT/NT 920U. Alternatively, if the HNB-GW/SeGW Protocol Stacks 950J does not accept the incoming CA TE 910U registration Request then the HNB-GW/SeGW Protocol Stacks 950J responds with the HNBAP UE REGISTER REJECT message (not shown).

Step 7: The CA AT/NT 920U then sends the RUA CONNECT message containing the RANAP Initial UE message towards the HNB-GW/SeGW Protocol Stacks 950J.

Step 8: The reception of the RUA CONNECT message at the HNB-GW/SeGW Protocol Stacks 950J triggers the setup of the Signalling Connection Control Part (SCCP) connection by the HNB-GW/SeGW Protocol Stacks 950J towards the CN Protocol Stack 953A. The HNB-GW/SeGW Protocol Stacks 950J then forwards the RANAP Initial UE message to the CN Protocol Stack 953A by the SCCP Connection Request (CR) message.

Step 9: The CN Protocol Stack 953A responds with the SCCP Connection Confirm (CC) message.

Step 10: The CA TE 910U continues with the NAS procedure, e.g. Location Updating procedure, towards the CN Protocol Stack 953A, via the CA AT/NT 920U and the HNB-GW/SeGW Protocol Stacks 950J using the Ui Interface 991.

Step 11: The CA AT/NT 920U initiates Iuh Disconnect procedure, as described in the 3GPP TS 25.467, to release the signaling connection associated with the CA TE 910U across the Iuh Interface 993. The HNB-GW/SeGW Protocol Stacks 950J is then responsible to co-ordinate the release of the connection across the Iuh Interface 993 and the corresponding connection across the Iu Interface 994, which is triggered by the CN Protocol Stack 953A. The Iuh Disconnect procedure also comprises optional de-registration of the CA TE 910U in the HNB-GW/SeGW Protocol Stacks 950J, which allows the HNB-GW/SeGW Protocol Stacks 950J to clear the context associated with the CA TE 910U.

Step 12: Whenever the CA AT/NT 920U needs to terminate operations, it sends HNB DE-REGISTER message towards the HNB-GW/SeGW Protocol Stacks 950J. Upon reception of the HNB DE-REGISTER message, the HNB-GW/SeGW Protocol Stacks 950J releases all resources associated with the CA AT/NT 920U. The de-registration procedure can be invoked also by the HNB-GW/SeGW Protocol Stacks 950J by sending the HNB DE-REGISTER message towards the CA AT/NT 920U.

While connected with the HNB-GW/SeGW Protocol Stacks 950J, and with reference to FIG. 8, the SCTP Layer 825F of the CA AT/NT 920U periodically sends the SCTP HEARTBEAT message (not shown) to the HNB-GW/SeGW Protocol Stacks 950J to check connection existence. If the HNB-GW/SeGW Protocol Stacks 950J detects that IP connectivity with the CA Protocol Stacks 970U is broken due to some broadband network problem, it releases resources assigned to the CA Protocol Stacks 970U, e.g. SCTP connection, locally de-registers the CA AT/NT 920U and, optionally, removes all contexts of the CA TE 910U. If the CA Protocol Stacks 970U detect a loss of connectivity with the HNB-GW/SeGW Protocol Stacks 950J, it attempts to re-establish connectivity and re-register the CA Protocol Stacks 970U with the HNB-GW/SeGW Protocol Stacks 950J.

The ERROR INDICATION messages (not shown) are sent by either the CA AT/NT 920U or the HNB-GW/SeGW Protocol Stacks 950J to report detected errors to the other side.

Figure 10A:
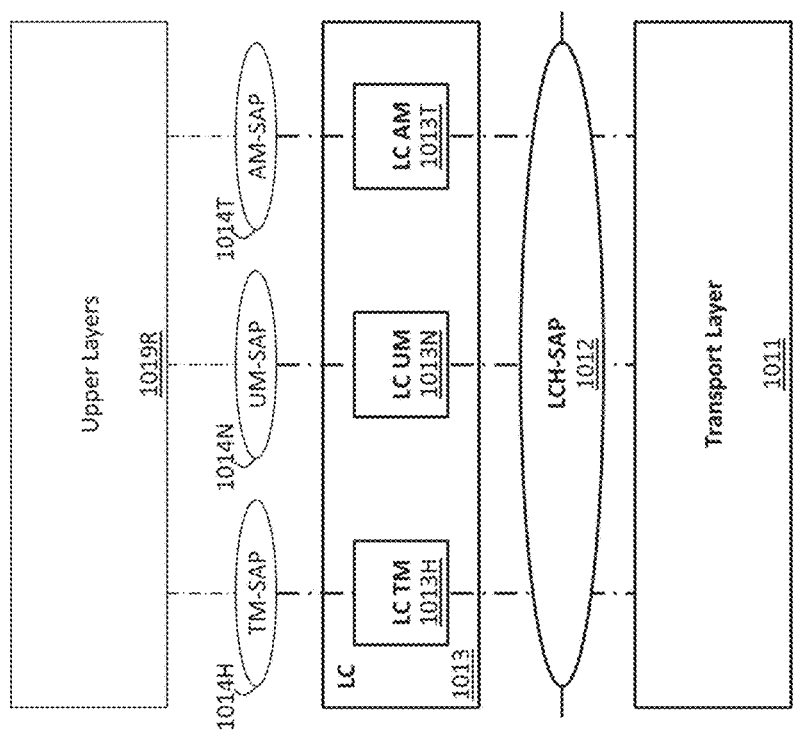
FIG. 10A illustrates the Link Control (LC) Layer relationships with other Layers.

FIG. 10A illustrates the Link Control (LC) Layer relationships with other Layers.

The figure includes: (1) The LC Layer 1013; (2) The UPLRs 1019R; (3) the TrL 1011; and (4) the LCH Service Access Point (SAP) 1012 wherein the TrL 1011 gives its services to the LC Layer 1013, as further detailed in FIG. 11, FIG. 12 and FIG. 13.

The LC Layer 1013 is comprised of three LC entity types: (1) A Link Control Transparent Mode entity (LC-TM), the LC-TM 1013H; (2) a Link Control Unacknowledged Mode entity (LC-UM), the LC-UM 1013N; and (3) a Link Control Acknowledged Mode entity (LC-AM), the LC-AM 1013T. As described with reference to FIG. 8 the ciphering/deciphering and segmentation/concatenation procedures, of the messages between peer LC entities, are not performed.

The figure also includes the following SAPs: (1) The TM SAP 1014H; (2) the UM SAP 1014N; and (3) the AM SAP 1014T. These SAPs are used by the corresponding entities of the LC Layer 1013 for providing the UPLRs 1019R with the TM, UM, and AM data transfer services.

The primitives between the TrL and LC are: (1) The TRL-DATA-Req; and (2) the TRL-DATA-Ind. Both primitives have the following parameters: (1) The Data parameter that is mapped from/to the LC Service Data Unit (SDU); (2) the LCH-Identity parameter, indicating the LCH that the Data is sent to or received from; and (3) the UE-Identity parameter. TRL-DATA-Req is used by the UPLRs to request transmission of a SDU. TRL-DATA-Ind is used by the TrL entity to deliver to the UPLRs a TRL SDU that has been received from a peer entity.

A single primitive which belongs to the UPLRs 1019R, the CPHY-RL-SETUP-Req with the LCH-Identity parameter, is used between the TrL and the RC. This primitive is used by the RC Layer for requesting the TrL to create and initialize the LCH, wherein the LCH-Identity parameter indicates the LCH identity.

The primitives between the LC Layer 1013 and the UPLRs 1019R are depicted in Table-1 shown in FIG. 10B. The rows of Table-1 represent the primitives that are used in the interaction between the LC Layer 1013 and the UPLRs 1019R, whilst the columns represent specific types of those primitives, namely "Request", "Indication", or "Confirmation". The meaning of the types is the same as in the 3GPP Specifications. Each cell of Table-1 defines a list of parameters for the specific primitive in the row and of the specific type in the column. The "Not Defined" token in a cell means that the specific type, in the column title of the corresponding primitive in the row, is not defined in the present system. The "w/o Parameters" token in a cell means that the specific type, in the column title of the corresponding primitive in the row, does not have parameters.

RLC-AM-DATA-Req is used by the UPLRs 1019R to request transmission of a LC SDU in AM. RLC-AM-DATA-Ind is used by the LC-AM 1013T to deliver to the UPLRs 1019R a LC SDU that has been received in AM. The RLC-AM-DATA-Cnf is used by the LC-AM 1013T to confirm to the UPLRs 1019R the sending of a LC SDU to the peer LC-AM (not shown). The RLC-UM-DATA-Req is used by the UPLRs 1019R to request transmission of a LC SDU in UM. The RLC-UM-DATA-Ind is used by the LC-UM 1013N to deliver to the UPLRs 1019R a LC SDU that has been received in UM. The RLC-UM-DATA-Cnf is used by the LC-UM 1013N to report to the UPLRs 1019R regarding a discarded LC SDU. This is used for backward compatibility with the 3GPP RRC. The RLC-TM-DATA-Req is used by the UPLRs 1019R to request transmission of a LC SDU in TM. The RLC-TM-DATA-Ind is used by the LC-TM 1013H to deliver to the UPLRs 1019R a LC SDU that has been received in TM. The RLC-TM-DATA-Cnf is used by the LC-TM 1013H to report to the UPLRs 1019R regarding a discarded LC SDU.

The CRLC-CONFIG-Req is used by the UPLRs 1019R to establish a new LC Entity, or to release an already running LC Entity. The CRLC-SUSPEND-Req is used by the UPLRs 1019R to suspend the LC-UM 1013N or the LC-AM 1013T. The CRLC-SUSPEND-Cnf is used by the LC-UM 1013N or the LC-AM 1013T to confirm that the entity is suspended. The CRLC-RESUME-Req is used by the UPLRs 1019R to resume the LC-UM 1013N or the LC-AM 1013T, after the LC-UM 1013N or the LC-AM 1013T has been suspended.

The parameters of the primitives between the LC Layer 1013 and the UPLRs 1019R comprise the following: (1) The Data parameter, wherein this parameter is a LC SDU that is mapped onto the Data field in the LC PDU; (2) the Confirmation Request (CNF) parameter, wherein this parameter indicates whether the transmitting side of the LC-AM 1013T needs to confirm the sending of the LC SDU; (3) the Message Unit Identifier (MUI) parameter, wherein this parameter is an identity of the LC SDU, which is used to indicate which LC SDU is confirmed with the RLC-AM-DATA-Cnf primitive; (4) the Establishment/Release (E/R) parameter, wherein this parameter indicates the need for establishment of a new LC Entity, or release of an already running LC Entity, and wherein If release is requested, then all protocol parameters, variables and timers are released and the specified LC entity enters the NULL state; (5) the UE-ID parameter, wherein this parameter is the UE identification that is used with the associated LC SDU; and (6) the Mode parameter, wherein this parameter is an enumerated field i.e. Acknowledged, Unacknowledged, and Transparent, that specifies the operation mode of the specified LC entity.

The LC-TM 1013H follows the state model of the prior art RLC-TM, as described in the 3GPP TS 25.322, and can be in one of the two following states: (1) The NULL state in which the LC-TM 1013H does not exist; or (2) The DATA_TRANSFER_READY state in which TM data exchange enabled between the peer entities of the LC-TM.

At the NULL state and upon reception of the CRLC-CONFIG-Req primitive from the UPLRs 1019R indicating establishment (E/R=Establish), the LC-TM 1013H is created and enters the DATA_TRANSFER_READY state.

At the DATA_TRANSFER_READY state and upon reception of the CRLC-CONFIG-Req primitive from the UPLRs 1019R indicating release (E/R=Release), the LC-TM 1013H is terminated and enters the NULL state.

The LC-TM data transfer procedure follows the RLC-TM data transfer procedure of the prior art, as described in the 3GPP TS 25.322. It is used for transferring data between the peer entities of the LC-TM. The procedure applies to entities in the DATA_TRANSFER_READY state.

The LC Non-TM Entities, i.e. either the LC-AM 1013T or the LC-UM 1013N can be in one of the three following states: (1) The NULL state, in which the specified LC entity does not exist; (2) the DATA_TRANSFER_READY state, in which Non-TM data exchange enabled between the specified peer LC Non-TM Entities; and (3) The LOCAL_SUSPEND state in which the specified LC entity does not send PDUs.

At the NULL state and upon reception of the CRLC-CONFIG-Req primitive from the UPLRs 1019R indicating establishment (E/R=Establish), the specified LC Entity is created and enters the DATA_TRANSFER_READY state.

At the DATA_TRANSFER_READY state and upon reception of the CRLC-SUSPEND-Req primitive from the UPLRs 1019R, the specified LC entity returns the CRLC-SUSPEND-Req message and enters the LOCAL_SUSPEND state.

At the LOCAL_SUSPEND state and upon reception of the CRLC-RESUME-Req primitive from the UPLRs 1019R, the specified LC entity enters the DATA_TRANSFER_READY state and resumes the data transmission.

At either the DATA_TRANSFER_READY state or the LOCAL_SUSPEND state and upon reception of the CRLC-CONFIG-Req primitive from the UPLRs 1019R indicating release (E/R=Establish), the specified LC entity remains in the current state.

At either the DATA_TRANSFER_READY state or the LOCAL_SUSPEND state and upon reception of the CRLC-CONFIG-Req primitive from the UPLRs 1019R indicating release (E/R=Release), the specified LC entity is terminated and enters the NULL state.

The Non-TM data transfer procedure is used for transferring data between the peer entities of the LC-AM, or the peer entities of the LC-UM. This procedure is applied to the LC Entities in the DATA_TRANSFER_READY state as follows: (1) Upon request of the Non-TM data transfer, i.e. the RLC-UM-DATA-req primitive or the RLC-AM-DATA-req primitive, from the UPLRs 1019R via the corresponding SAP, the specified LC entity: (a) Submits the received LC SDU, i.e. the Data parameter of the corresponding primitive, to the TrL 1011 as the corresponding Unacknowledged Mode Data (UMD) PDU or the Acknowledged Mode Data (AMD) PDU, via the corresponding LCH; and (b) in the case of the AM data transfer and if it was requested by the UPLRs 1019R by setting the CNF parameter, submits the RLC-AM-DATA-Cnf primitive to the UPLRs 1019R as a transmission acknowledgement; and (2) Upon reception of the corresponding UMD PDU or AMD PDU from the TrL 1011, the specified LC entity: (a) Considers the data part in this PDU as one complete LC SDU; and (2) submits the LC SDU to the UPLRs 1019R via the corresponding SAP, as the Data parameter of the corresponding RLC-UM-DATA-ind primitive or the RLC-AM-DATA-ind primitive.

FIG. 10B illustrates the table of primitives between the LC Layer and the Upper Layers (UPLRs).

Table-1 shows the primitives between the LC Layer 1013 and the UPLRs 1019R as described with reference to FIG. 10A.

Figure 11:
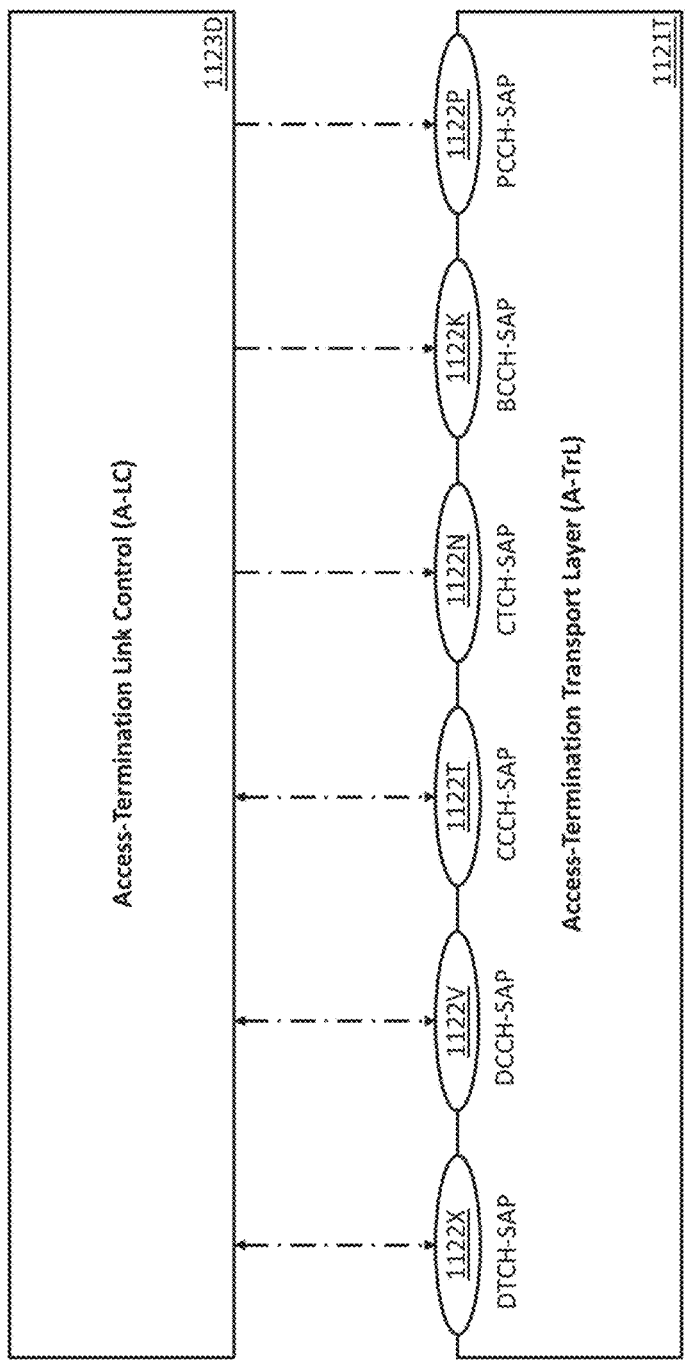
FIG. 11 illustrates the Transport Layer (TrL) relationships with the LC Layer.

FIG. 11 illustrates the Transport Layer (TrL) relationships with the LC Layer.

The figure includes the following Lower Layers of the CA AT: (1) The A-LC Layer 1123D; and (2) the A-TrL 1121T. The figure is simplified for illustration purposes by showing the CA AT Layers, however not showing the peer CA TE Layers. It should be apparent to any person skilled in the art that the peer T-LC Layer (not shown) and the peer T-TrL (not shown) use the same set of SAPs as the A-LC Layer 1123D and the A-TrL 1121T respectively however the directions of the data flows represented by the arrows are reversed.

In the preferred embodiments, the TrL is implemented by an IPC method. In some embodiments, the TrL is implemented as a three entity configuration, supporting for example the Shared Memory IPC method, as described with reference to FIG. 15. In other embodiments the TrL is implemented as a single entity configuration, supporting for example the Pipe IPC method, as described with reference to FIG. 12 and FIG. 13.

The TrL comprises: (1) Plurality of the Unidirectional LCHs 1212H, in both directions, as described with reference to FIG. 12; and (2) plurality of the Bidirectional LCHs 1312Q, as described with reference to FIG. 13.

The function of the TrL is to transfer the LC PDUs between the peer LC entities. The A-TrL 1121T gives its services to the A-LC Layer 1123D via the following LCH SAPs: (1) The Broadcast Control CHannel SAP (BCCH-SAP) 1122K; (2) the Paging Control CHannel SAP (PCCH-SAP) 1122P; (3) the Common Control CHannel SAP (CCCH-SAP) 1122T; (4) the Dedicated Control CHannel SAP (DCCH-SAP) 1122V; (5) the Dedicated Traffic CHannel SAP (DTCH-SAP) 1122X and (6) the Common Traffic CHannel SAP (CTCH-SAP) 1122N.

Figure 12:
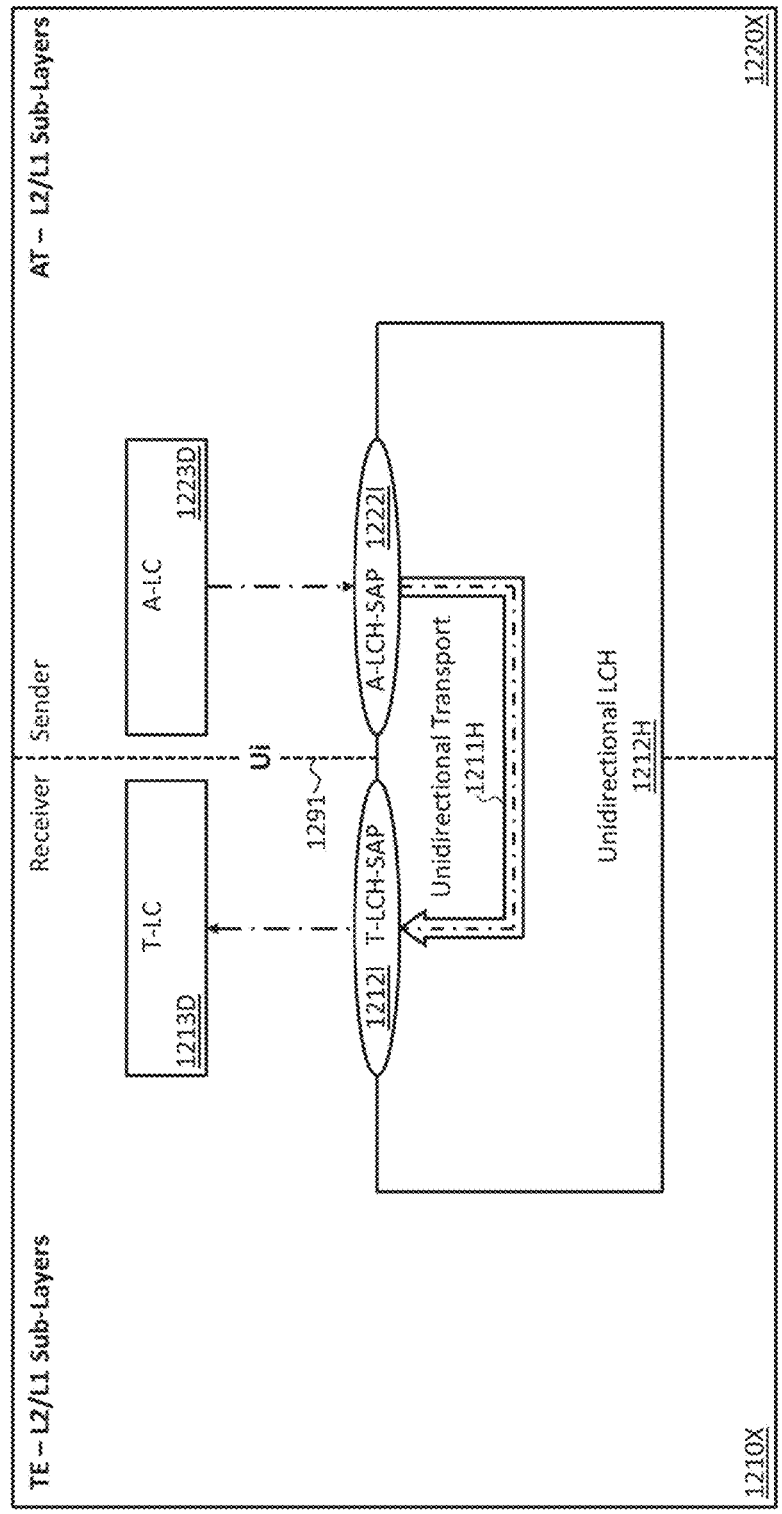
FIG. 12 illustrates the unidirectional Logical CHannel (LCH) model in some embodiments.

FIG. 12 illustrates the unidirectional Logical CHannel (LCH) model in some embodiments.

The figure includes: (1) The CA AT-L2/L1 Sub-Layers 1220X of the CA AT representing in some embodiments a Sender side, comprising the A-LC Layer 1223D; (2) the CA TE-L2/L1 Sub-Layers 1210X of the CA TE representing in some embodiments a Receiver side, comprising the T-LC Layer 1213D; (3) the Ui Interface 1291 between the Sender and the Receiver; and (4) the Unidirectional LCH 1212H that serves both sides, comprising of: (a) An Access-termination LCH SAP (A-LCH-SAP), the A-LCH-SAP 1222I; (b) A Terminal-equipment LCH SAP (T-LCH-SAP), the T-LCH-SAP 1212I; and (c) the Unidirectional Transport 1211H which transports messages/data from the A-LCH-SAP 1222I to the T-LCH-SAP 1212I. It should be apparent to any person skilled in the art that in some embodiments the direction of Unidirectional LCH 1212H can be reversed, i.e. the T-LC Layer 1213D plays the role of the Sender and the A-LC Layer 1223D plays the role of the Receiver.

The Unidirectional LCH 1212H comprises one of the CTCH, BCCH or PCCH, as described with reference to FIG. 11, and gives its services to the A-LC Layer 1223D and the T-LC Layer 1213D via the A-LCH-SAP 1222I and T-LCH-SAP 1212I respectively. Hence, the Sender A-LC Layer 1223D sends the messages/data towards the A-LCH-SAP 1222I and the Receiver T-LC Layer 1213D receives the messages/data from the T-LCH-SAP 1212I. The Unidirectional Transport 1211H, which belongs to the hosting OS, gives transport services to both the A-LC Layer 1223D and the T-LC Layer 1213D entities via the A-LCH-SAP 1222I and T-LCH-SAP 1212I respectively.

The Unidirectional Transport 1211H is implemented by an IPC method. The IPC methods comprise one of the following methods, or combinations thereof: (1) Socket; (2) Message Queue (MQ); (3) Pipe; (4) Shared Memory controlled by Semaphore(s); and (5) Message Passing. It should be apparent to any person skilled in the art that other IPC methods, or combinations thereof, can be used depending on the following: (1) The data stream type; (2) the capabilities of the Operating System (OS); and (3) the physical architecture of the CD as described with reference to FIG. 16, FIG. 17, FIG. 18 and FIG. 19.

In some embodiments, as shown in the figure, the Unidirectional Transport 1211H is based on the Pipe IPC method and represents some pre-allocated portion of the physical memory, controlled by the OS, which is designated specifically for inter-communication between peer entities. In other embodiments, other IPC methods are used as described with reference to FIG. 15.

Figure 13:
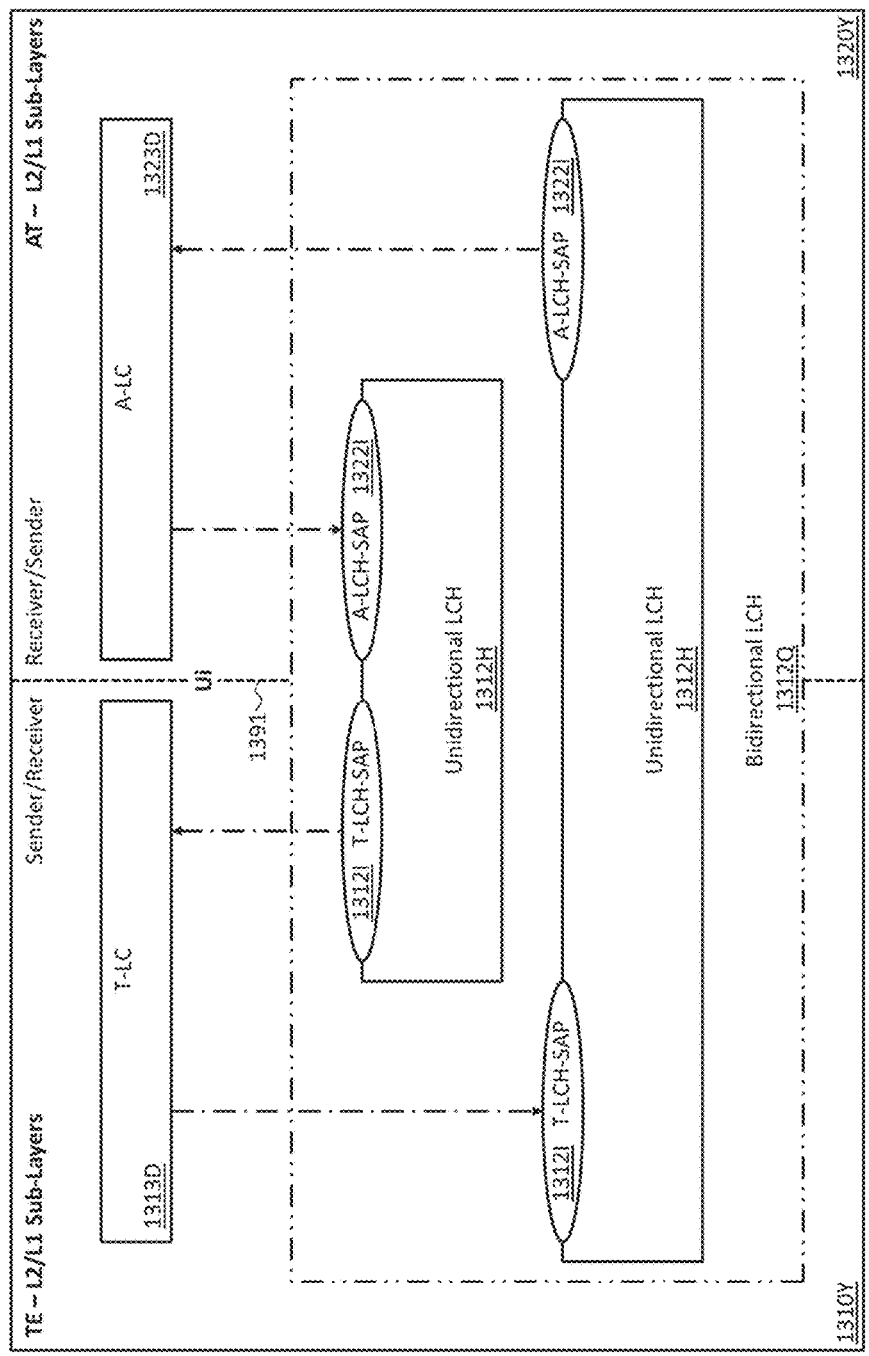
FIG. 13 illustrates the bidirectional logical channel model in some embodiments.

FIG. 13 illustrates the bidirectional logical channel model in some embodiments.

The figure includes: (1) the AT-L2/L1 Sub-Layers 1320Y with shown A-LC Layer 1323D; (2) the TE-L2/L1 Sub-Layers 1310Y with shown T-LC Layer 1313D; and (3) the Bidirectional LCH 1312Q.

The bidirectional LCH 1312Q is created from two separate unidirectional LCHs 1312H that are working in opposite directions, comprises one of the DTCH, DCCH or CCCH, as described with reference to FIG. 11. Both Unidirectional LCHs 1312H give their services to both sides, i.e. the A-LC Layer 1323D and the T-LC Layer 1313D entities via the A-LCH-SAP 1322I and T-LCH-SAP 1312I respectively. The Bidirectional LCH 1312Q utilizes the Ui Interface 1391 to transfer messages/data between the peer LC entities in both directions.

In some embodiments, e.g. using the CA 1570M as described with reference to FIG. 15, the TrL is created just after power up, or hard reset of the CA with the initial collection of LCHs e.g. CCCH, BCCH, and PCCH. It is the responsibility of the RC entity to trigger a creation of additional LCHs, e.g. DCCH and DTCH, when needed and bind the specific LC entities to the corresponding LCH. In the case that multiple LC entities are bound to a single LCH, the TrL is responsible to route the data to the corresponding LC entities using LCH-ID parameter. In other embodiments, e.g. using the CA 1570R as described with reference to FIG. 15, the TrL is not created. In these embodiments, a TE and AT (TE-AT) emulator, the TE-AT Emulator 1529A and the CA NT 1521R communicate directly.

Figure 14:
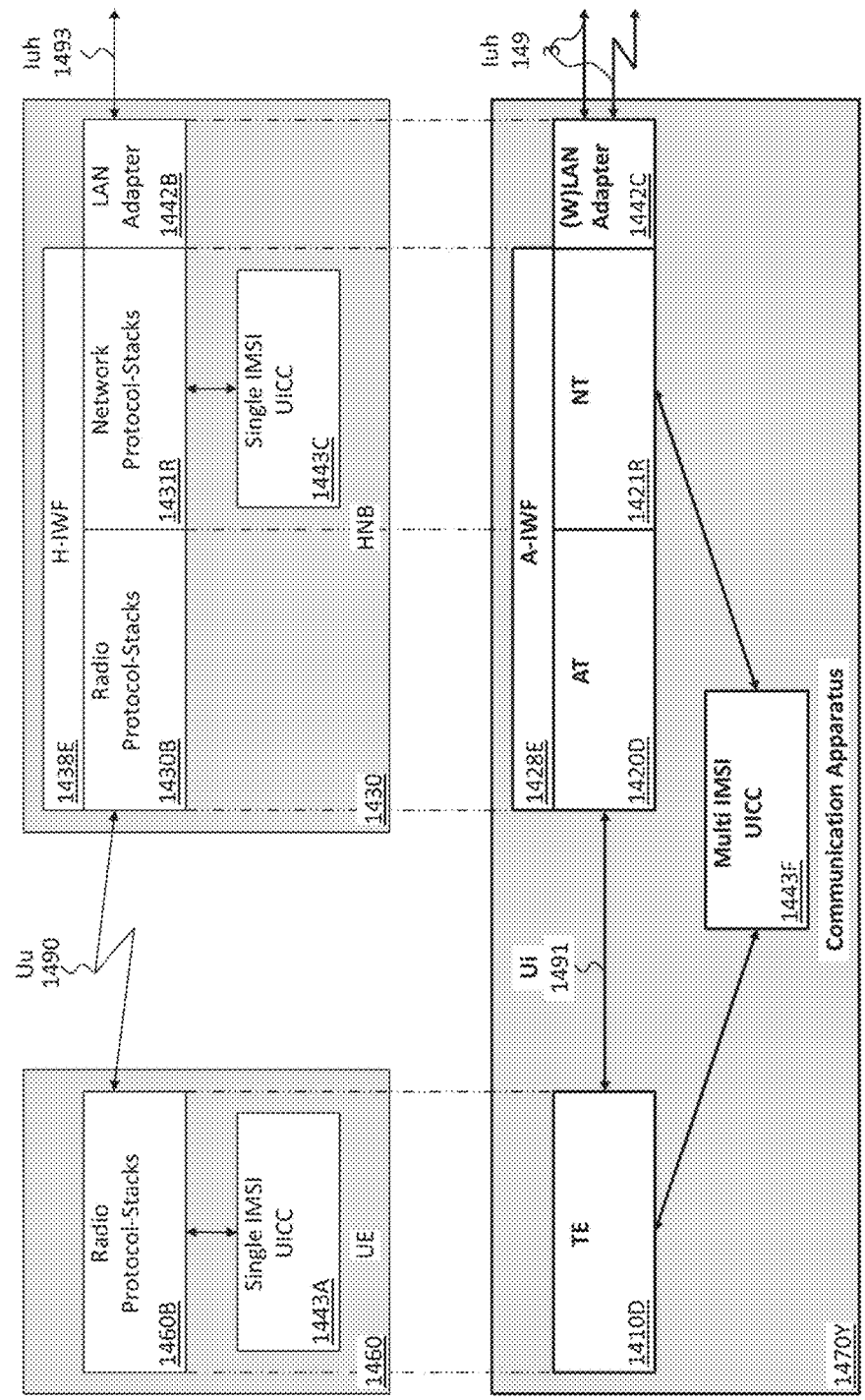
FIG. 14 illustrates the CA reference architecture and its derivation from the prior art.

FIG. 14 illustrates the CA reference architecture and its derivation from the prior art.

The figure includes: (1) The UE 1460 and the HNB 1430, communicating over the Uu Air Interface 1490; and (2) the CA 1470Y.

The UE 1460 comprises: (1) The Radio Protocol Stacks 1460B; (2) the Single IMSI UICC 1443A; and (3) the UE Physical Radio entity 1460A.

The HNB 1430 comprises: (1) The Radio Protocol Stacks 1430B; (2) the Network Protocol Stacks 1431R that provide means for communication of the HNB 1430 with the CN (not shown) via the HNB-GW (not shown); (3) the H-IWF entity 1438E characterized by the following: (a) Performing protocol conversion between the Radio Protocol Stacks 1430B and the Network Protocol Stacks 1431R; and (b) relay messages and data between the two protocols; (4) the Single IMSI UICC 1443C hosting the USIM application; (5) the LAN Adapter 1442B providing wired communication between the HNB 1430 and the CN (not shown) over the Iuh Interface 1493; and (6) the HNB Physical Radio entity 1430A. It should be apparent to any person skilled in the art that the Uu Air Interface 1490, between the UE 1460 and the HNB 1430, is a physical wireless interface supported by physical radios on both sides, wherein the UE Physical Radio entity 1460A and the HNB Physical Radio entity 1430A are driven by the U-Phy Layer 761B and the H-Phy Layer 731B, respectively, as shown in FIG. 7.

The CA 1470Y comprises: (1) the CA TE 1410D that provides the Radio Protocol Stacks 1460B functionality of the UE 1460; (2) the CA NT 1421R that provides the Network Protocol Stacks 1431R functionality of the HNB 1430 and is responsible for communication with the HNB-GW (not shown); (3) the CA AT 1420D that provides the Radio Protocol Stack 1430B functionality of the HNB 1430 and is responsible for communication between the CA TE 1410D and the CA NT 1421R; (4) the A-IWF entity 1428E characterized by the following: (a) Performing protocol conversion between the CA AT 1420D and the CA NT 1421R; and (b) relay messages and data between the two protocols; (5) Multi IMSI UICC 1443F; (6) the (W)LAN Adapter 1442C providing wired/wireless communication between the CA 1470Y and the CN (not shown) over the Iuh Interface 1493; and (7) the peer Physical Radio entities which are void, the TE Physical Radio Void entity 1410A and the AT Physical Radio Void entity 1420A. The communication link between the CA TE 1410D and the CA AT 1420D is based on the Ui Interface 1491, which as described with reference to FIG. 8 is based on an IPC method supported by the device's OS. It should be apparent to any person skilled in the art, that the Ui Interface 1491 is a Non-Wireless Interface, which does not require Physical Radio entities for transport, therefore as shown in the figure, when combining the functionalities of the two entities, the UE 1460 and the HNB 1430, into one entity, the CA 1470Y, the peer Physical Radio entities are void: (a) The TE Physical Radio Void entity 1410A; and (b) the AT Physical Radio Void entity 1420A.

The figure shows the CA 1470Y architecture based on the CA 1570M as described with reference to FIG. 15. The Multi IMSI USIM applications (not shown) are hosted by the Multi IMSI UICC 1443F. The Multi IMSI USIM applications (not shown) perform security procedures and securely store the IMSI, authentication and ciphering information for the following entities running on the CA 1470Y and connecting to the CN: (1) the CA TE 1410D; and (2) the CA NT 1421R, both connecting to the CN in the I-Mode over the Iuh Interface 1493. With reference to the alternate embodiment of FIG. 15, the CA 1570R uses multi IMSI USIM applications services (not shown) while connecting to the CN with its CA NT 1521R. Credentials for all entities comprising the CA 1470Y, and using the CN services, are dependent on the MNO policy. In the prior art there is a mechanism in the USIM application which enables the MNO to distinguish between the UE 1460 and the HNB 1430. In the present system the same mechanism is used to distinguish among the UE 1460, the HNB 1430 and the CA 1470Y. As described with reference to FIG. 5, this mechanism allows the MNO to activate the policy in which location requirement is nullified.

Figure 15:
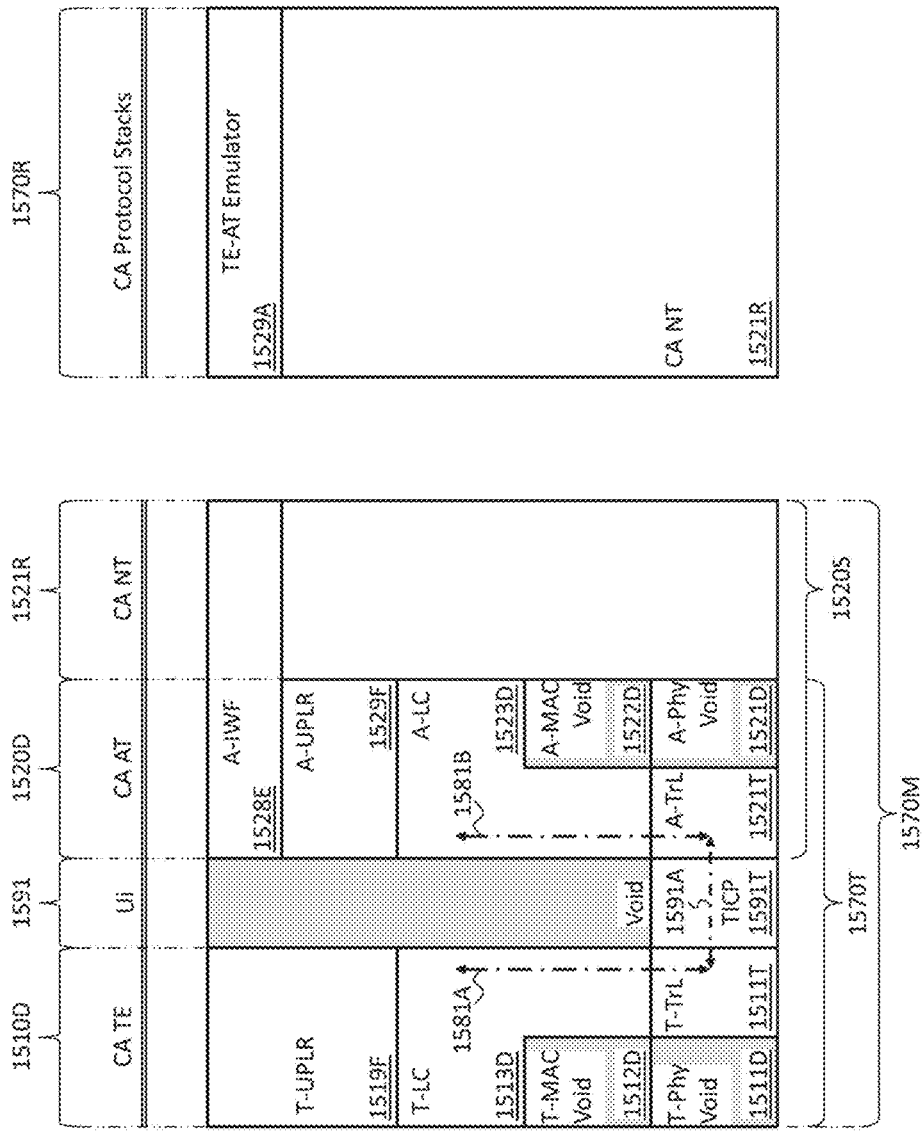
FIG. 15 illustrates the preferred and alternate CA protocol architecture embodiments.

FIG. 15 illustrates the preferred and alternate CA protocol architecture embodiments.

The figure illustrates the preferred embodiment for the CA architecture, the CA 1570M and an alternate embodiment for the CA architecture, the CA 1570R. The CA 1570M comprises: (1) the CA TE 1510D; and (2) the CA AT/NT 1520S, comprising: (a) the CA AT 1520D; and (b) the CA NT 1521R. The relations between the prior art protocol stacks and the corresponding present system protocol stacks are described with reference to FIG. 14.

The communication link between the CA TE 1510D and the CA AT 1520D is based on the Ui Interface 1591. The A-IWF entity 1528E characterized by the following: (a) Performing protocol conversion between the CA AT 1520D and the CA NT 1521R; and (b) relay messages and data between the two protocols.

The CA TE 1510D comprises: (1) A Terminal-equipment UPLR (T-UPLR), the T-UPLR 1519F comprising Layer 3 and above, e.g. the NAS and the RC Layers for the C-Plane domain, or the Adaptive Multi-Rate (AMR) and the Packet Data Convergence Protocol (PDCP) Layers for the U-Plane domain; (2) the Link Control T-LC Layer 1513D; and (3) a Transport Layer, the T-TrL 1511T. The CA AT 1520D comprises the corresponding peers of the CA TE 1510D: (1) An Access-termination UPLR (A-UPLR), the A-UPLR 1529F; (2) the A-LC Layer 1523D; and (3) the A-TrL 1521T. As shown on the figure, the following prior art layers are void: (1) The T-MAC-Void Layer 1512D and the T-Phy-Void Layer 1511D of the CA TE 1510D; and (2) the A-MAC-Void Layer 1522D and the A-Phy-Void Layer 1521D of the CA AT 1520D.

The figure also illustrates a hop-by-hop a bi-directional data pass between two peer entities, the T-LC Layer 1513D and the A-LC Layer 1523D comprising the following hops: (1) The Data Hop 1581A between the T-LC Layer 1513D and the T-TrL 1511T; (2) the Data Hop 1591A, of the Ui Interface 1591, between the T-TrL 1511T and the A-TrL 1521T; and (3) the Data Hop 1581B, between the A-LC Layer 1523D and the A-TrL 1521T. The TICP 1591T, an intermediation entity which belongs to the hosting OS, gives transport services to both the T-TrL 1511T and the A-TrL 1521T in terms of the Data Hop 1591A.

In some embodiments, as shown on the figure, the Data Hop 1591A is based on the Shared Memory IPC method. The TICP 1591T represents some pre-allocated portion of the physical memory, controlled by the OS, which is designated specifically for inter-communication between peer entities. In other embodiments, other IPC methods are used, as described with reference to FIG. 12.

The CA 1570R comprises: (1) the CA NT 1521R and (2) the CA TE-AT Emulator 1529A emulating the functionality of the CA TE-AT 1570T.

The CA is embedded, without limitation, in one of the following CD basic architecture configurations: (1) The CD-A 1670A; (2) the CD-B 1770B; (3) the CD-C 1870C; or (4) the CD-D 1970D, as described with reference to FIG. 16, FIG. 17, FIG. 18 and FIG. 19 respectively.

Figure 16:
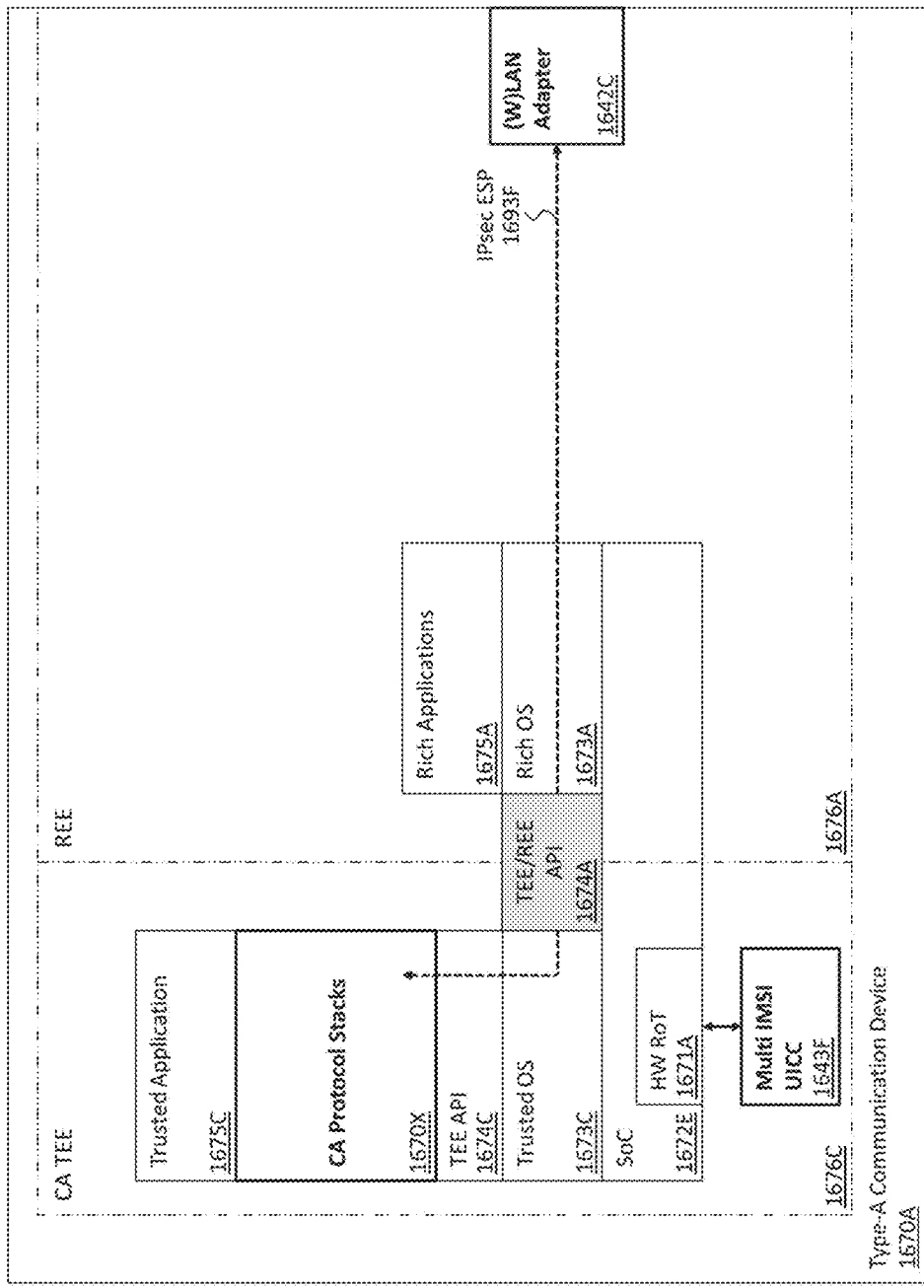
FIG. 16 illustrates the Type-A CD architecture in some embodiments.

FIG. 16 illustrates the Type-A CD architecture in some embodiments.

The figure shows a single System on Chip (SoC), I-Mode, CD Type-A configuration, referred to as the CD-A 1670A. The CD-A 1670A comprises: (1) The CA TEE 1676C supporting the CD's CA Protocol Stacks 1670X; (2) a Rich Execution Environment (REE), the REE 1676A supporting the CD's Rich Applications (RAs) 1675A; and (3) an Application Programming Interface (API), the TEE/REE API 1674A providing communication means between the CA TEE 1676C and the REE 1676A, based on an IPC method.

The following entities are built on the SoC 1672E: (1) The CA TEE 1676C; and (2) the REE 1676A.

It should be apparent to any person skilled in the art, that typical implementation examples for the CD-A 1670A are: (1) A Machine to Machine (M2M) using the evolved UICC (eUICC); and (2) a Connected Consumer Electronics (CCE), e.g. Game Console, using UICC.

The CA TEE 1676C comprises the following: (1) the I-Mode Trusted Application (I-TA) 1675C; (2) the CA Protocol Stacks 1670X; (3) the TEE API 1674C; (4) a Trusted Operating System (TOS), the TOS 1673C; (5) The SoC 1672E; (6) a HW Root of Trust (HW RoT), the HW RoT 1671A; and (7) the Multi IMSI UICC 1643F.

It should be apparent to any person skilled in the art that the CA Protocol Stacks 1670X represents the architecture of either the CA 1570M or the CA 1570R as described with reference to FIG. 15.

As described in the GlobalPlatform GPD_SPE_009 standard, the TEE is an execution environment that runs alongside but isolated from the REE. The TEE has security capabilities and meets certain security-related requirements, for supporting a single or multiple trusted applications: (1) It protects TEE assets from general software attacks; (2) defines rigid safeguards as to data and functions that a trusted application can access; and (3) resists a set of described threats. The isolation of the TEE from the REE can be achieved by either HW or SW means, or a combination thereof, however this aspect is out of the scope of the current invention. The CA 570Y is using the same security mechanisms, therefore meets the same security requirements as the HNB 430, as described with reference to FIG. 5 and FIG. 4 respectively. These security requirements are described in the 3GPP TS 33.320 and comprise of a TEE and a HW RoT. It should be apparent to any person skilled in the art, that there are multiple security technologies created by different standard bodies that can be used to implement the CA TEE 1676C and/or the HW RoT 1671A, e.g. the following non-exhaustive examples: (1) The ISO-11889 standards by the International Organization for Standardization/International Electrotechnical Commission (ISO/IEC) in cooperation with the Trusted Computing Group (TCG), regarding the Trusted Platform Module (TPM); and (2) an Open Mobile Terminal Platform (OMTP) standard, the OMTP TR1, regarding the TEE.

The HW RoT 1671A is a component that enables trust in computing platforms. The HW RoT 1671A comprises the following: (1) Authentication keys storage for one or more entities, e.g. the CA Protocol Stacks 1670X, wherein the authentication keys are used for platform authentication; and (2) a cryptographic engine for the TEE comprising a Random Number Generator (RNG) and a HW accelerator for ciphering/de-ciphering computations. It should be apparent to any person skilled in the art that if more than one entity is using the services provided by the HW RoT 1671A, then due to security requirements, these entities are isolated from each other. In some embodiments, the HW RoT 1671A is implemented as a stand-alone HW component, e.g. the TPM specified by the TCG. In other embodiments, the HW RoT 1671A is implemented as an integral component of the SoC on which the TEE is built, e.g. TrustZone® System Security by ARM®.

The TOS 1673C, in conjunction with the HW RoT 1671A, provide unique functionalities which are not provided by a Rich Operating System (ROS). The TOS 1673C functionalities comprise: (1) Maintaining the integrity of the CA TEE 1676C by managing the data in such a manner that it can be altered or moved only by entities having appropriate and authorized access rights; and (2) Maintaining the security of the CA TEE 1676C that it can be viewed only by entities having appropriate and authorized access rights.

The TEE API 1674C is used by the CA Protocol Stacks 1670X for communicating with the TOS 1673C. The TEE API 1674C also provides a number of different sub-sets of functionalities to the CA Protocol Stacks 1670X and to the I-TA 1675C e.g.: (1) integration, scheduling, communication, memory management, and system information retrieval interfaces; (2) trusted storage for keys and general data; and (3) cryptographic capabilities, as described in the GPD_SPE_009 standard.

The Multi IMSI UICC 1643F is described with reference to the Multi IMSI UICC 1443F in FIG. 14.

The REE 1676A comprises the following: (1) A plurality of Rich Applications (RAs), the RAs 1675A; (2) the ROS 1673A; (3) the SoC 1672E; and (4) the (W)LAN Adapter 1642C. It should be apparent to any person skilled in the art, that this component can be implemented as either an integral component of the SoC 1672E or as a separate element dependent on the SoC 1672E design. The figure does not show the HW components of the (W)LAN Adapter 1642C used for communication with the (W)LAN (not shown), however it should be apparent to any person skilled in the art that those components are integral part of the CD-A 1670A.

The CD-A 1670A execution environment is divided between two mutually exclusive execution environments, each with its own resources: (1) The CA TEE 1676C; and (2) the REE 1676A. The REE 1676A has access to the untrusted resources but cannot access the trusted resources resided in the CA TEE 1676C. The REE 1676A and the RAs 1675A running on it are considered un-trusted. In some embodiments, this access control is enforced and implemented by physical isolation of the trusted resources from the un-trusted resources, by HW and/or SW means or a combination thereof. The only way for the REE 1676A to get access to the trusted resources of the CA TEE 1676C is over the TEE/REE API 1674A, e.g. the TEE Client API as described in the GPD_SPE_009 standard. This does not exclude the capability of the REE 1676A to pass data buffers to the CA TEE 1676C in a controlled and protected manner and vice versa. In this context the REE 1676A can function as the communication agent between the I-TA 1675C then the CA Protocol Stacks 1670X, and the IP broadband network (not shown) via the (W)LAN Adapter 1642C.

The REE 1676A is governed by the ROS 1673A, potentially in conjunction with other supporting operating systems and hypervisors. The ROS 1673A is an operating system with a rich capability set that allows consumers to install and run the RAs 1675A. The following list comprises non-exhaustive examples for the ROS 1673A: Android™, Linux®, Symbian OS™, and Microsoft® Windows® Phone 7.

In the preferred embodiment, the CA Protocol Stacks 1670X operating in the I-Mode, communicate with the MNO network (not shown) via the IPsec ESP Secured Tunnel 1693F over the Broadband IP Network (not shown). In other embodiments another security protocol can be used.

The (W)LAN Adapter 1642C is described with reference to the (W)LAN Adapter 1442C in FIG. 14.

Figure 17:
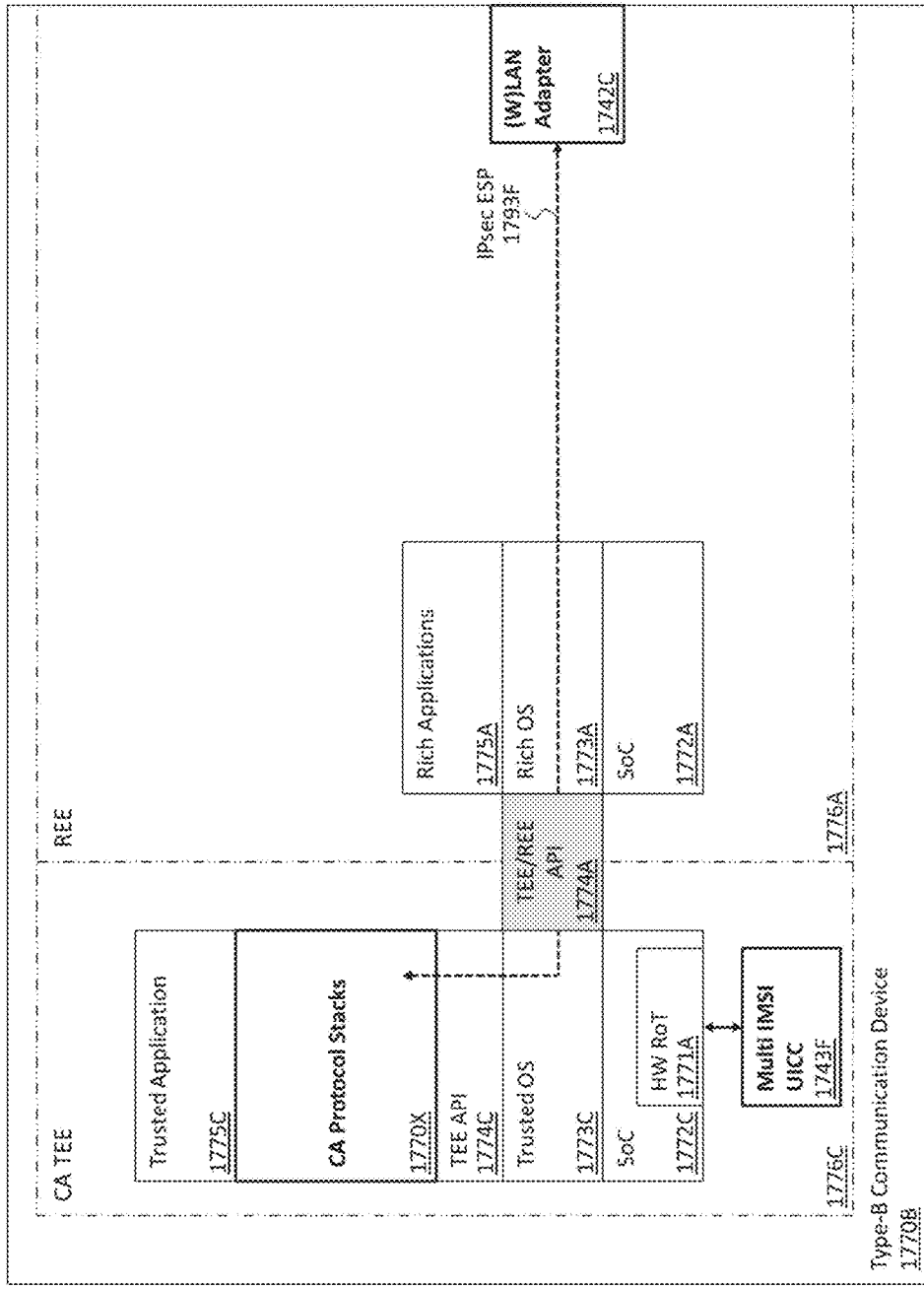
FIG. 17 illustrates the Type-B CD architecture in some embodiments.

FIG. 17 illustrates the Type-B CD architecture in some embodiments.

The figure shows a dual SoC, I-Mode, CD Type-B configuration, referred as the CD-B 1770B. The CD-B 1770B comprises: (1) The CA TEE 1776C supporting the CD's CA Protocol Stacks 1770X, as described with reference to the CA TEE 1676C in FIG. 16; (2) the REE 1776A supporting the RAs 1775A of the CD's, as described with reference to the REE 1676A in FIG. 16; and (3) the TEE/REE API 1774A providing communication means between the CA TEE 1776C and the REE 1776A, based on an IPC method, wherein the TEE/REE API 1774A utilizes a physical transport between the two separate SoCs.

The CA TEE 1776C is built on a 1st SoC, the SoC 1772C. The REE 1776A is built on a 2nd SoC, the SoC 1772A. It should be apparent to any person skilled in the art that the SoC 1772C and the SoC 1772A can be of the same or different models.

It should be apparent to any person skilled in the art, that a typical implementation example for the CD-B 1770B is a laptop computer hosting the REE 1776A and a USB-Dongle hosting the CA TEE 1776C.

The CA TEE 1776C comprises the following: (1) the I-TA 1775C; (2) the CA Protocol Stacks 1770X; (3) the TEE API 1774C, as described with reference to the TEE API 1674C in FIG. 16; (4) the TOS 1773C, as described with reference to the TOS 1673C in FIG. 16; (5) the SoC 1772C; (6) the HW RoT 1771A, as described with reference to the HW RoT 1671A in FIG. 16; and (7) the Multi IMSI UICC 1743F.

It should be apparent to any person skilled in the art that the CA Protocol Stacks 1770X represents the architecture of either the CA 1570M or the CA 1570R as described with reference to FIG. 15.

The Multi IMSI UICC 1743F is described with reference to the Multi IMSI UICC 1443F in FIG. 14.

The REE 1776A comprises the following: (1) The RAs 1775A; (2) the ROS 1773A, as described with reference to the ROS 1673A in FIG. 16; (3) the SoC 1772A; and (4) the (W)LAN Adapter 1742C. It should be apparent to any person skilled in the art, that this component can be implemented as either an integral component of the SoC 1772A or as a separate element dependent on the SoC 1772A design. The figure does not show the HW components of the (W)LAN Adapter 1742C used for communication with the (W)LAN (not shown), however it should be apparent to any person skilled in the art that those components are integral part of the CD-B 1770B.

In the preferred embodiment, the CA Protocol Stacks 1770X operating in the I-Mode, communicate with the MNO network (not shown) via the IPsec ESP Secured Tunnel 1793F over the Broadband IP Network (not shown). In other embodiments another security protocol can be used.

The (W)LAN Adapter 1742C is described with reference to the (W)LAN Adapter 1442C in FIG. 14.

Figure 18:
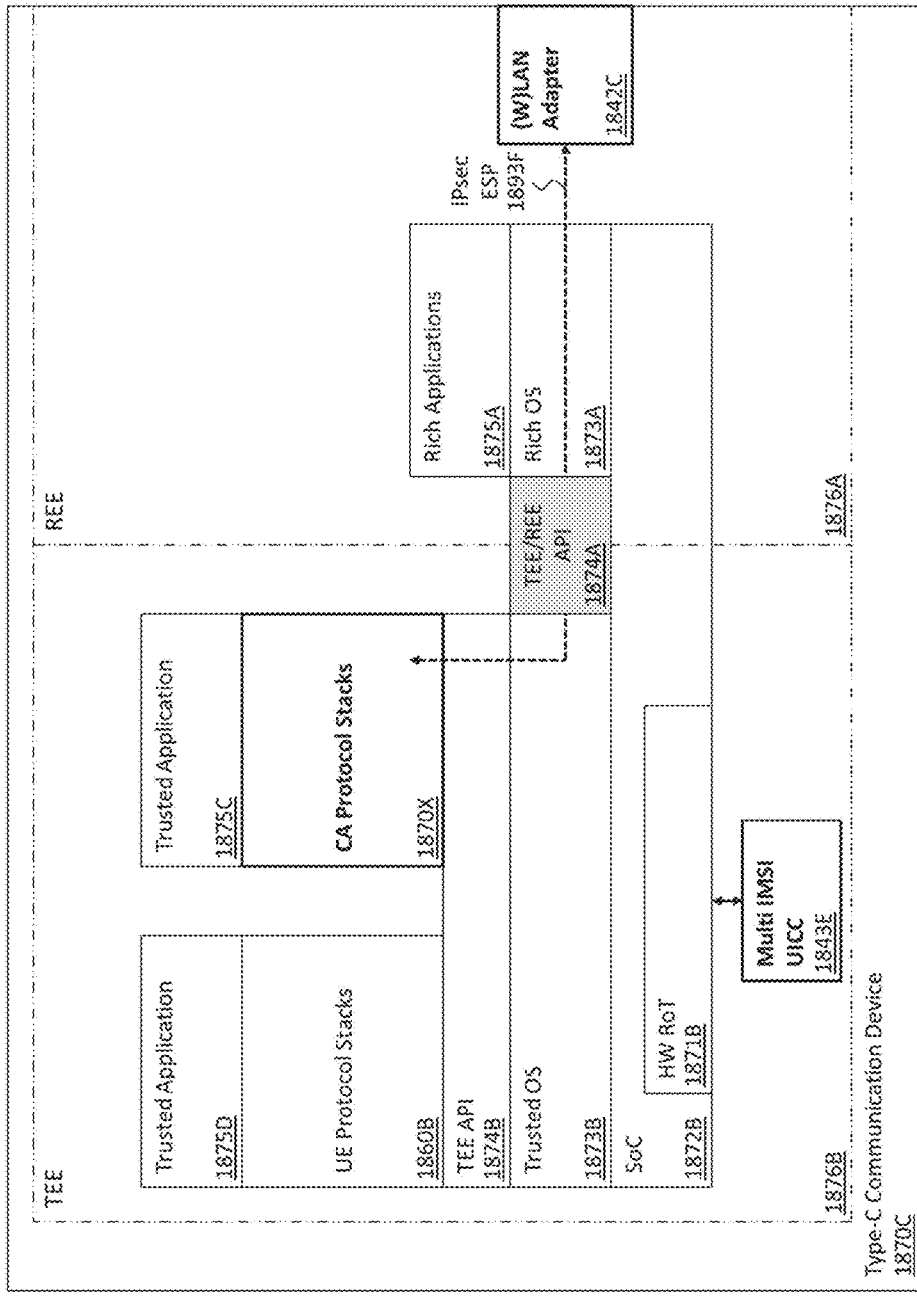
FIG. 18 illustrates the Type-C CD architecture in some embodiments.

FIG. 18 illustrates the Type-C CD architecture in some embodiments.

Void.

The figure shows a single SoC, dual I/U-Mode, CD Type-C configuration, referred as the CD-C 1870C. The CD-C 1870C comprises: (1) The TEE 1876B supporting both the CD's UE Protocol Stacks 1860B and the CD's CA Protocol Stacks 1870X, as described with reference to the CA TEE 1676C in FIG. 16; (2) the REE 1876A supporting the RAs 1875A of the CD's, as described with reference to the REE 1676A in FIG. 16; and (3) the TEE/REE API 1874A providing communication means between the TEE 1876B and the REE 1876A, based on an IPC method.

The following entities are built on the SoC 1872B: (1) The TEE 1876B; and (2) the REE 1876A.

It should be apparent to any person skilled in the art, that a typical implementation example for the CD-C 1870C is a Low-Tier Smartphone, wherein both the Base-Band Processor and the Application Processor are sharing the SoC 1872B.

The TEE 1876B comprises the following: (1) The U-Mode Trusted Application (U-TA) 1875D; (2) the I-TA 1875C; (3) the UE Protocol Stacks 1860B; (4) the CA Protocol Stacks 1870X; (5) the TEE API 1874B; (6) the TOS 1873B, supporting both the UE Protocol Stacks 1860B and the CA Protocol Stacks 1870X, as described with reference to the TOS 1673C in FIG. 16; (7) the SoC 1872B; (8) the HW RoT 1871B for supporting both the UE Protocol Stacks 1860B and the CA Protocol Stacks 1870X, as described with reference to the HW RoT 1671A in FIG. 16; and (9) the Multi IMSI UICC 1843E.

It should be apparent to any person skilled in the art that the CA Protocol Stacks 1870X represents the architecture of either the CA 1570M or the CA 1570R as described with reference to FIG. 15.

Both the CA Protocol Stacks 1870X and the UE Protocol Stacks 1860B, communicate with the TOS 1873B over the TEE API 1874B. The TEE API 1874B is used by the CA Protocol Stacks 1870X and the UE Protocol Stacks 1860B, for utilizing the TEE 1876B capabilities, as described with reference to the TEE API 1674C in FIG. 16.

The basic functionality of the Multi IMSI UICC 1843E is described with reference to the Multi IMSI UICC 1443F in FIG. 14. The Multi IMSI UICC 1843E comprises an IMSI and a USIM application (not shown) for supporting the U-TA 1875D and the UE Protocol Stacks 1860B. The Multi IMSI UICC 1843E also comprises the IMSIs and the USIM applications supporting the I-TA 1875C and the CA Protocol Stacks 1870X.

The REE 1876A comprises the following: (1) the RAs 1875A; (2) the ROS 1873A, as described with reference to the ROS 1673A in FIG. 16; (3) the SoC 1872B; and (4) the (W)LAN Adapter 1842C. It should be apparent to any person skilled in the art, that this component can be implemented as either an integral component of the SoC 1872B or as a separate element dependent on the SoC 1872B design. The figure does not show the HW components of the (W)LAN Adapter 1842C used for communication with the (W)LAN (not shown), however it should be apparent to any person skilled in the art that those components are integral part of the CD-C 1870C.

In the preferred embodiment, the CA Protocol Stacks 1870X operating in the I-Mode, communicate with the MNO network (not shown) via the IPsec ESP Secured Tunnel 1893F over the Broadband IP Network (not shown). In other embodiments another security protocol can be used.

The (W)LAN Adapter 1842C is described with reference to the (W)LAN Adapter 1442C in FIG. 14.

In some embodiments, the U-TA 1875D together with the UE Protocol Stacks 1860B represent prior art UE SW e.g. a Smartphone SW. The figure does not show the HW components associated with the UE Protocol Stacks 1860B, however it should be apparent to any person skilled in the art that those components are integral part of the CD-C 1870C. In the I-Mode of operation, the CA Protocol Stacks 1870X are connected to the MNO network over the Iuh Interface 593, as described with reference to FIG. 5. In the U-Mode of operation, the UE Protocol Stacks 1860B are connected to the MNO network over the Uu Air Interface 490, as described with reference to FIG. 4. The RAs 1875A is responsible to control the CD-C 1870C mode of operation, either the I-Mode, or the U-Mode according to user commands in accordance with the requirements. Upon user decision, and depending on the IMSIs hosted by the Multi IMSI UICC 1843E, the I-Mode and the U-Mode can run with either a single MNO or with different MNOs. It should be apparent to any person skilled in the art that when both the I-Mode and the U-Mode are running with a single MNO, a transition between the UE and the CA is possible, depending on network policy.

Figure 19:
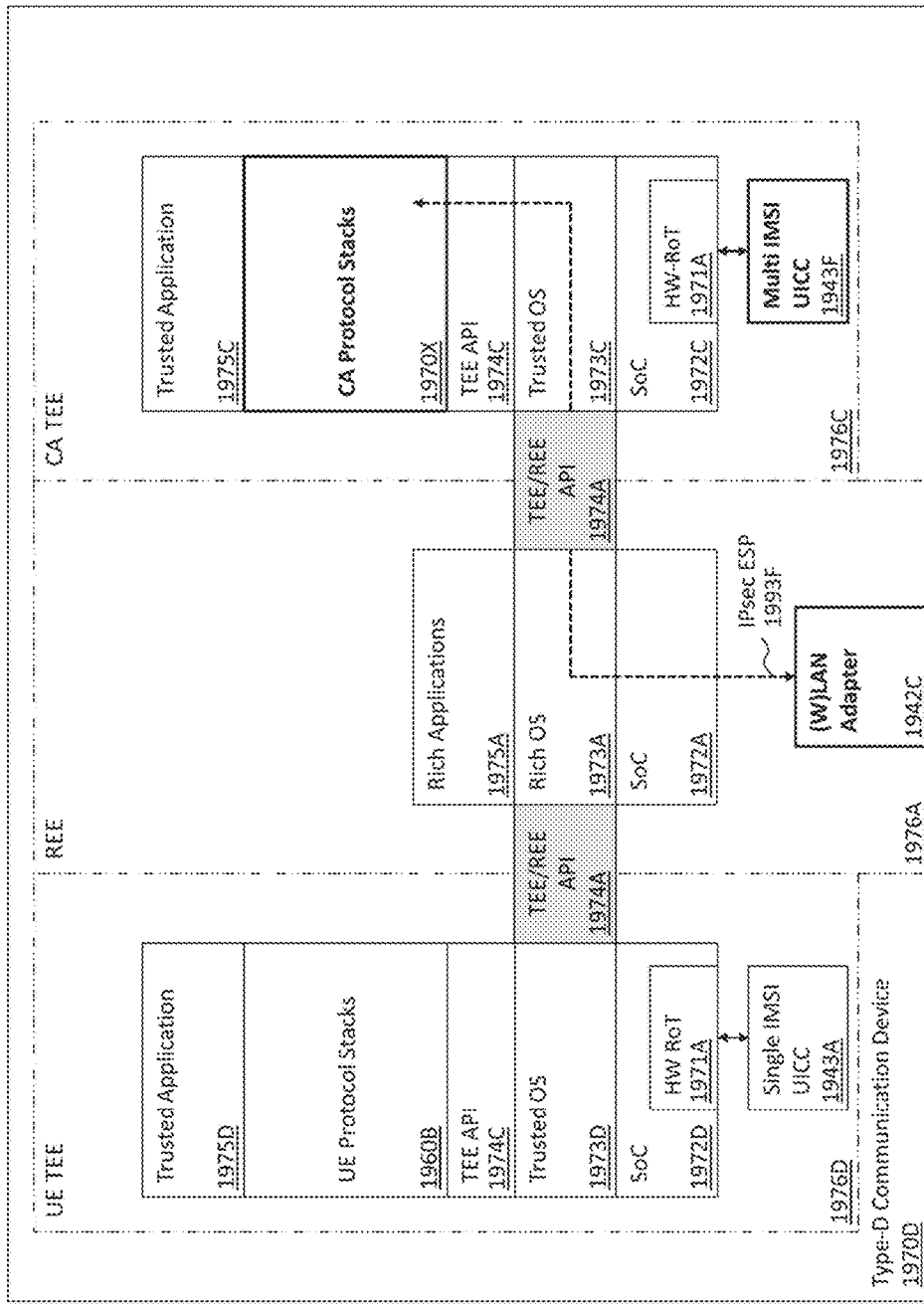
FIG. 19 illustrates the Type-D CD architecture in some embodiments.

FIG. 19 illustrates the Type-D CD architecture in some embodiments.

Void.

The figure shows a multiple SoC, dual I/U-Mode, CD Type-D configuration, referred as the CD-D 1970D. The CD-D 1970D comprises: (1) The UE TEE 1976D supporting the CD's UE Protocol Stacks 1960B, as described with reference to the CA TEE 1676C in FIG. 16, wherein the UE Protocol Stacks 1960B replacing the CA Protocol Stacks 1670X; (2) the CA TEE 1976C supporting the CD's CA Protocol Stacks 1970X, as described with reference to the CA TEE 1676C in FIG. 16; (3) the REE 1976A supporting the RAs 1975A of the CD's; (4) the TEE/REE API 1974A providing communication means between the UE TEE 1976D and the REE 1976A, based on an IPC method, wherein the TEE/REE API 1974A utilizes a physical transport between the two separate SoCs; and (5) the TEE/REE API 1974A providing communication means between the CA TEE 1976C and the REE 1976A, based on an IPC method, wherein the TEE/REE API 1974A utilizes a physical transport between the two separate SoCs.

The UE TEE 1976D is built on a 1st SoC, the SoC 1972D. The CA TEE 1976C is built on a 2nd SoC, the SoC 1972C. The REE 1976A is built on a 3rd SoC, the SoC 1972A. It should be apparent to any person skilled in the art that the SoC 1972C, the SoC 1972D and the SoC 1972A can be of the same or different models.

It should be apparent to any person skilled in the art, that a typical implementation example for the CD-D 1970D is a High-Tier Smartphone, wherein the Base-Band Processor having a dedicated SoC, the SoC 1972D for the UE TEE 1976D, the Application Processor having a dedicated SoC, the SoC 1972A for the REE 1976A and a dedicated SoC, the SoC 1972C is reserved for the CA TEE 1976C.

The UE TEE 1976D comprises the following: (1) The U-TA 1975D; (2) the 3GPP UE Protocol Stacks 1960B; (3) the TEE API 1974C; (4) the TOS 1973D, as described with reference to the TOS 1673C in FIG. 16; (5) the SoC 1972D; (6) the HW RoT 1971A, as described with reference to the HW RoT 1671A in FIG. 16; and (7) the Single IMSI UICC 1943A.

The TEE API 1974C is used by the UE Protocol Stacks 1960B for utilizing the UE TEE 1976D capabilities and communicating with the TOS 1973D, as described with reference to the TEE API 1674C in FIG. 16.

The Single IMSI UICC 1943A is described with reference to the Single IMSI UICC 1443A in FIG. 14. In the preferred embodiment, the U-TA 1975D and the UE Protocol Stacks 1960B use the dedicated Single IMSI UICC 1943A. In another embodiment (not shown), the U-TA 1975D and the UE Protocol Stacks 1960B use the Multi IMSI UICC 1943F, in a Multi IMSI UE/CA UICC configuration, as described with reference to the Multi IMSI UICC 1843E in FIG. 18.

The CA TEE 1976C comprises the following: (1) the I-TA 1975C; (2) the CA Protocol Stacks 1970X; (3) the TEE API 1974C; (4) the TOS 1973C, as described with reference to the TOS 1673C in FIG. 16; (5) the SoC 1972C; (6) the HW RoT 1971A, as described with reference to the HW RoT 1671A in FIG. 16; and (7) the Multi IMSI UICC 1943F.

It should be apparent to any person skilled in the art that the CA Protocol Stacks 1970X represents the architecture of either the CA 1570M or the CA 1570R as described with reference to FIG. 15.

It should be apparent to any person skilled in the art that the CD-D 1970D can be comprised of multiple of the CA TEE 1976C so that all of them are controlled by the RAs 1975A. Each of the CA TEE 1976C entities can create an independent connection to the HPLMN.

The TEE API 1974C is used by the CA Protocol Stacks 1970X for utilizing the CA TEE 1976C capabilities and communicating with the TOS 1973C, as described with reference to the TEE API 1674C in FIG. 16.

The Multi IMSI UICC 1943F is described with reference to the Multi IMSI UICC 1443F in FIG. 14.

The REE 1976A comprises the following: (1) the RAs 1975A; (2) the ROS 1973A, as described with reference to the ROS 1673A in FIG. 16; (3) the SoC 1972A; and (4) the (W)LAN Adapter 1942C. It should be apparent to any person skilled in the art, that this component can be implemented as either an integral component of the SoC 1972A or as a separate element dependent on the SoC 1972A design. The figure does not show the HW components of the (W)LAN Adapter 1942C used for communication with the (W)LAN (not shown), however it should be apparent to any person skilled in the art that those components are integral part of the CD-D 1970D.

The RAs 1975A, running in the ROS 1973A environment, governs both the I-TA 1975C and the U-TA 1975D according to the user inputs or preset policy. The RAs 1975A, within the REE 1976A, controls the I-TA 1975C and the U-TA 1975D over the TEE/REE API 1974A. The REE 1976A is further described with reference to the REE 1676A in FIG. 16.

In the preferred embodiment, the CA Protocol Stacks 1970X operating in the I-Mode, communicate with the MNO network (not shown) via the IPsec ESP Secured Tunnel 1993F over the Broadband IP Network (not shown). In other embodiments another security protocol can be used.

The (W)LAN Adapter 1942C is described with reference to the (W)LAN Adapter 1442C in FIG. 14.

In some embodiments, the U-TA 1975D together with the UE Protocol Stacks 1960B represent prior art UE SW e.g. a Smartphone SW. The figure does not show the HW components associated with the UE Protocol Stacks 1960B; however it should be apparent to any person skilled in the art that those components are integral part of the CD-D 1970D. In the I-Mode of operation, the CA Protocol Stacks 1970X are connected to the MNO network over the Iuh Interface 1993, as described with reference to FIG. 5. In the U-Mode of operation, the UE Protocol Stacks 1960B are connected to the MNO network over the Uu Air Interface 490, as described with reference to FIG. 4. The RAs 1975A is responsible to control the CD-D 1970D mode of operation, either the I-Mode, or the U-Mode, or both according to user commands or other policy as required. Upon user decision, and depending on the IMSIs hosted by the Multi IMSI UICC 1943F and the Single IMSI UICC 1943A, both the I-Mode and the U-Mode can run simultaneously with either a single MNO or with different MNOs. It should be apparent to any person skilled in the art that when both the I-Mode and the U-Mode are running with a single MNO, a transition between the U-Mode and the I-Mode is possible, depending on network policy.

FIG. 16, FIG. 17, FIG. 18 and FIG. 19 illustrate the CD basic architecture configurations of the CD-A 1670A, CD-B 1770B, CD-C 1870C, and CD-D 1970D respectively. It should be apparent to any person skilled in the art that other embodiment types of CD are based on combinations of the basic types described in these figures.

FIG. 20 is a Finite State Machine (FSM) table for the CD Type-B in some embodiments.

The figure shows a Finite State Machine (FSM) applicable for the CA 1570M as described with reference to FIG. 15, embedded in CD-B 1770B, as described with reference to FIG. 17, in the form of a state transitions matrix. Each row R of matrix represents a current state of the CA while each column C represents the next state to which the CA transits when a certain event arrives. Each cell contains zero or more possible EVent/OPeration pair (EV/OP), wherein the event is given by its EV name and the operation is given by its OP reference. Each pair in the cell of row R and column C having event-operation pair in it should be understood as the following: "While FSM in the current state R and upon arrival of EV, the CA transits from the current state R to the next state C and performs the operation OP". If some EV is not bound to an OP, this means that the transition from the current state to the next state is done without operation. The events which are not included in the cell are ignored by the FSM and no operations and transitions are performed.

The CA FSM has the following states: (1) OFF_ST—the CA is turned off; (2) NO_LINE_ST—the CA is turned on but has no open IP connection the ISP; (3) NO_SECURED_CONNECTION_ST—the CA connected to the Broadband IP Network but the IPsec ESP Secured Tunnel between the CA and the HNB-GW/SeGW is not established yet; (4) SECURED_CONNECTION_ST—the CA has established secure connection with the HNB-GW/SeGW via the IPsec ESP Secured Tunnel and is fully operational; and (5) EMERGENCY_ST—the same as "SECURED CONNECTION" state but the USIM is not inserted/validated. It should be apparent to any person skilled in the art, that the emergency state only allows for calls to be established with an emergency entity, however accurate automatic location cannot be provided, as the CD is communicating over the IP Broadband Network which allows only for an approximate location determination. The user is warned that he/she should provide location to the emergency entity called, either verbally or by text, similarly to other IP based services, e.g. Skype®.

The events comprise the following: (1) CD_Plugged_In_EV—User plug in the CA into a hosting device, for example, a personal computer; (2) CD_Unplugged_EV—User unplugged the CA; (3) Secure_Boot_Success_EV—the secure boot process was successfully done; (4) Secure_Boot_Failure_EV—one of the secure boot steps has failed; (5) User_Init_Shutdown_EV—User initiates the CA shutdown; (6) HNB_GW_Con_Available_EV—the IP connection to the HNB-GW/SeGW exists; (7) HNB_GWCon_Unavailable_EV the connection to the MNO is broken; (8) USIM_Pres_EV—the USIM is present, i.e. inserted and available for read; (9) NT_TE_USIMNotPres_EV—the multi IMSI USIM, hosting the NT Entity and the TE Entity credentials, is not present, i.e. the NT Entity and the TE Entity credentials are not available; (10) TE_USIM_Not_Pres_EV—wherein the NT Entity USIM is optional and the TE Entity USIM is not present, i.e. the TE Entity credentials are not available; (11) Iuh_Success_EV—the secure connection to the HNB-GW/SeGW was successfully established; (12) Iuh_Failure_EV—the secure connection to HNB-GW/SeGW failed to establish; (13) Broken_Line_EV—the IP connection to the HNB-GW/SeGW is broken; (14) User_Init_Secured_Con_EV—user requested to re-establish secure connection to the HNB-GW/SeGW; (15) User_Init_Disconnect_EV—user requested to disconnect from the HPLMN; (16) Signal_Enters_Red_EV—the WLAN signal enters the Red zone, i.e. below the minimum permitting communication, according to the requirements; (17) Signal_Enters_Yellow_EV—the WLAN signal enters the Yellow zone, i.e. approaching the minimum permitting communication, according to the requirements; and (18) CN_Init_Disconnect_EV—the CN requested the CA to disconnect.

The operations comprise the following: (1) OP01, the CA performs secure boot to ensure that the device is secured and tamper-proof and running approved software. If secure boot has been performed successfully, the CA generates the Secure_Boot_Success_EV event, otherwise the CA generates the Secure_Boot_Failure_EV event; (2) OP04, periodically in intervals according to the requirements, the CA checks the USIM availability and validity. After each check procedure, the CA generates one of the following events: (a) NT_TE_USIM_Pres_EV—If USIM is present and credentials for both the TE Entity and the NT Entity are available; (b) NT_TE_USIM_Not_Pres_EV—If USIM is not present; or (c) TE_USIM_Not_Pres_EV—If USIM is present however the mandatory TE Entity credentials are not available; (3) OP05, the CA tests the availability of IP connection via (W)LAN with given recurrence. If IP connection is available the HNB_GW_Con_Available_EV event is generated, otherwise—the HNB_GWCon_Unavailable_EV event is generated; (4) OP06, the CA establishes connection to the HNB-GW and registers the NT Entity with the HNB-GW. If both establishment and registration procedures were successful, the CA generates event Iuh_Success_EV, otherwise—Iuh_Failure_EV; (5) OP08, the CA registers the TE Entity with the CN, invokes GPRS attachment procedure and informs a user that CA is fully operational; (6) OP10, the CA releases the Iuh connection; (7) OP14, the CA de-registers the TE Entity from the CN, detaches GPRS and informs user regarding the emergency only mode of operation; (8) OP15, the CA informs the user regarding an arrived event; (9) OP19, the CA logs the unplugging event in the non-volatile memory. Such a logging is possible when the CA is equipped with a backup battery; and (10) OP21, the CA logs a shutdown cause in the non-volatile memory, shutdown itself, and generates no events. It should be apparent to any person skilled in the art that due to the fact that these operations are invoked from different events and states, the internal sequences might be different.

The FSM, its states, events, and operations described above are for illustration of CA behavior only. It should be apparent to any person skilled in the art that in other embodiments, the FSM and its states, events and operations are different according to: (1) The architecture of the CA 1570M or the CA 1570R as described with reference to FIG. 15; and (2) the CD basic configurations the CD-A 1670A, the CD-B 1770B, the CD-C 1870C, or the CD-D 1970D, as described with reference to FIG. 16, FIG. 17, FIG. 18 and FIG. 19 respectively.

Figure 21A:
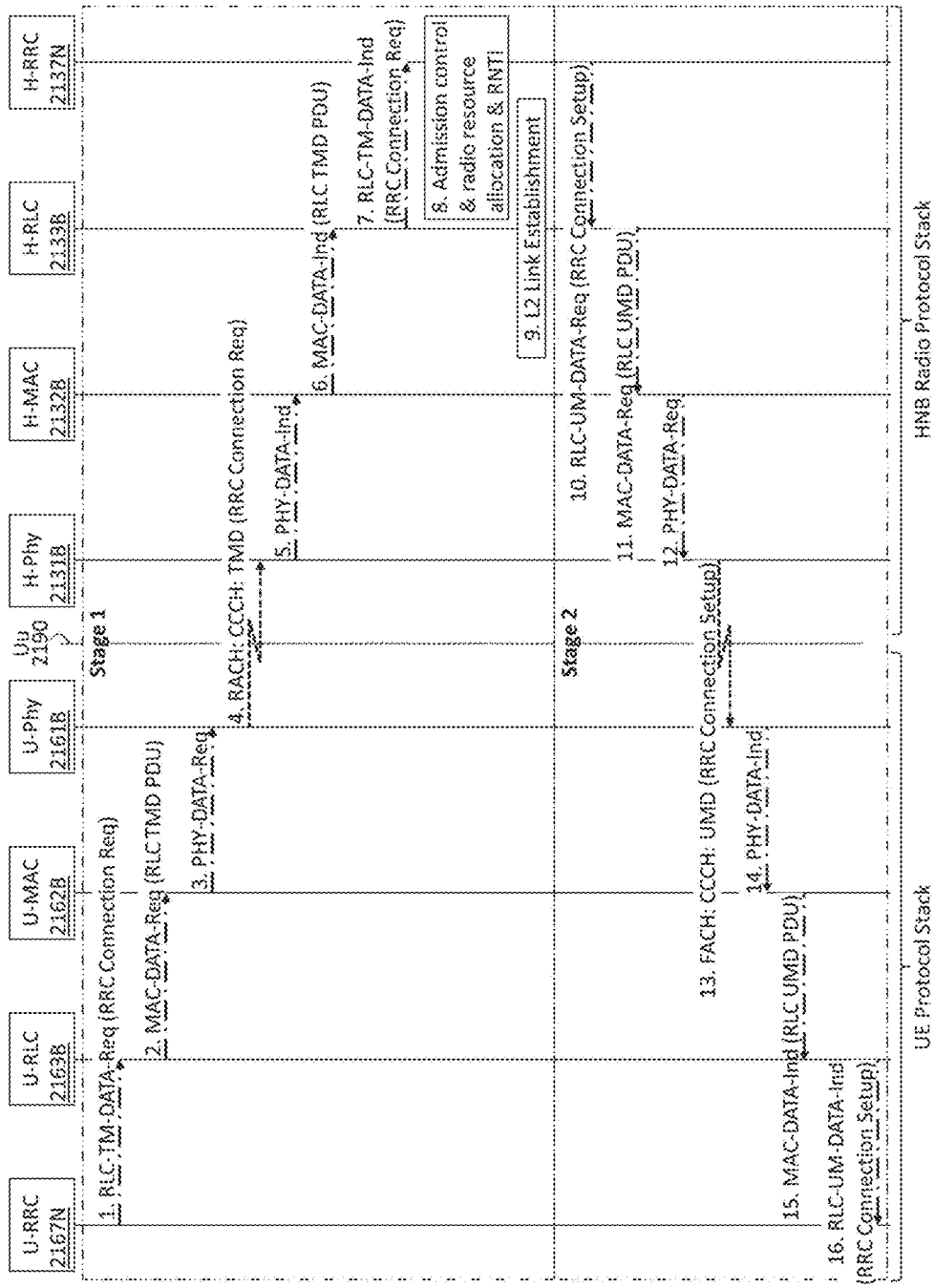
FIG. 21A illustrates the prior art Radio Resource Control (RRC) Connection establishment MSC in some embodiments.

FIG. 21A illustrates the prior art Radio Resource Control (RRC) Connection establishment MSC in some embodiments.

The figure illustrates a sample MSC of the RRC connection establishment procedure of the prior art. The MSC is based on the RRC connection procedure as described in the 3GPP TS 25.303. The figure includes the UE and the HNB Radio Protocol Stack entities, participating in the RRC connection establishment procedure, which communicate over the Uu Air Interface 2190. The UE Protocol Stack comprises: (1) The Radio Resource Control U-RRC Entity 2167N; (2) the Radio Link Control U-RLC Entity 2163B; (3) the Medium Access Control U-MAC Entity 2162B; and (4) the Physical Layer U-Phy Entity 2161B of the Uu Air Interface 2190. The HNB Radio Protocol Stack comprises: (1) The Radio Resource Control H-RRC Entity 2137N; (2) the Radio Link Control H-RLC Entity 2133B; (3) the Medium Access Control H-MAC Entity 2132B; and (4) the Physical Layer H-Phy Entity 2131B of the Uu Air Interface 2190.

Figure 21B:
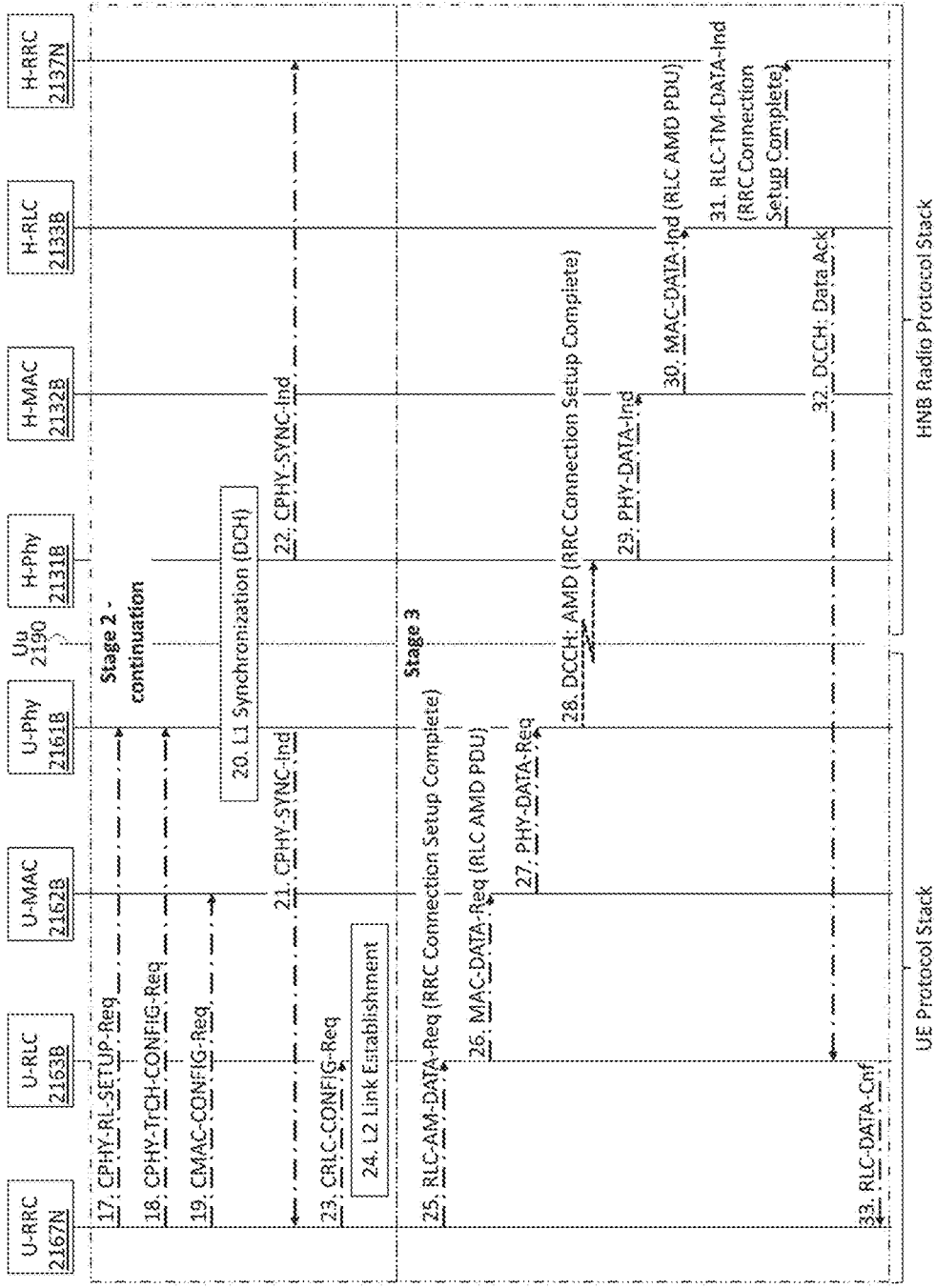
FIG. 21B is the continuation of FIG. 21A.
Figure 22A:
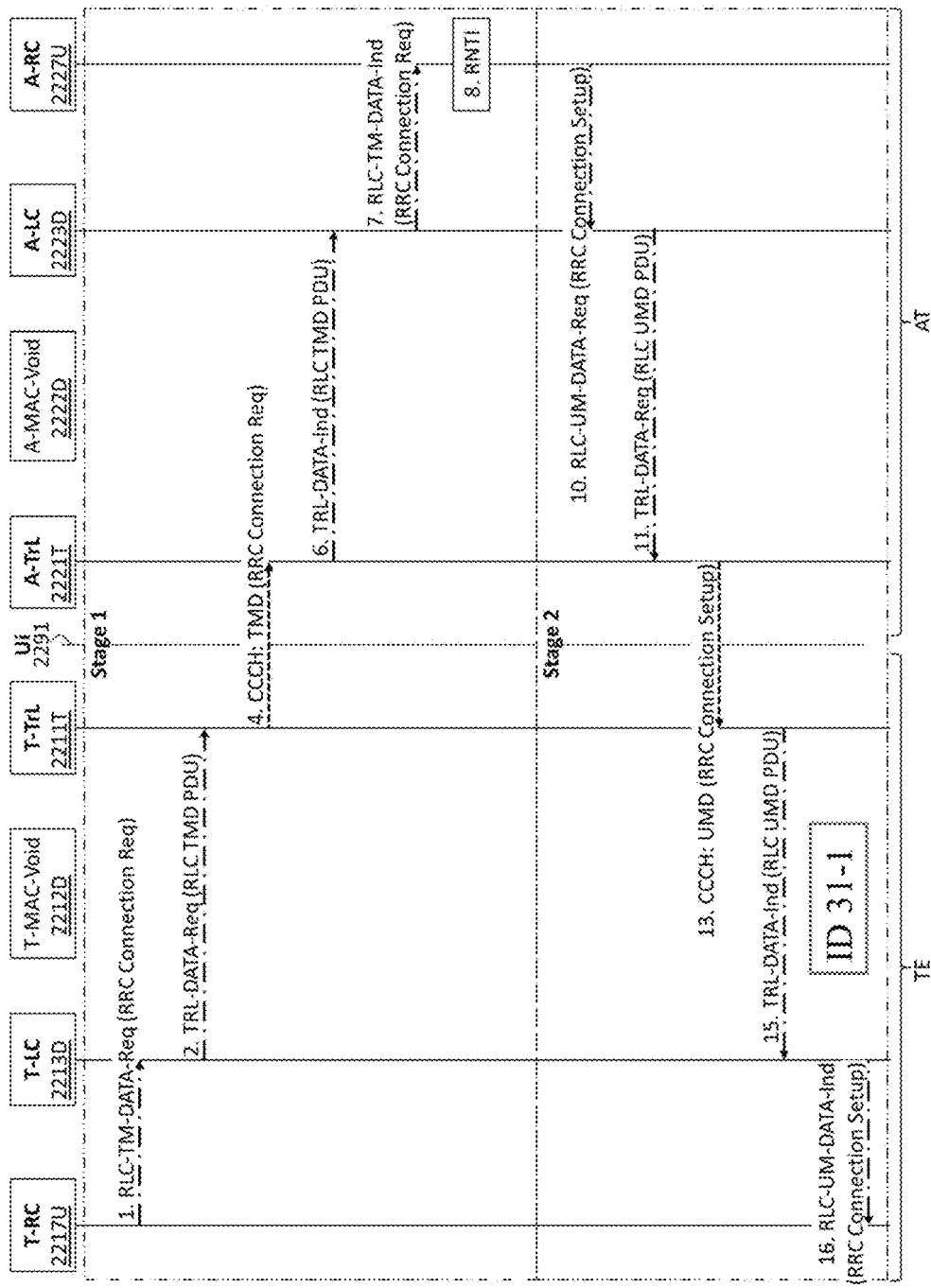
FIG. 22A illustrates the RRC Connection establishment MSC applicable to the CA in some embodiments.
Figure 22B:
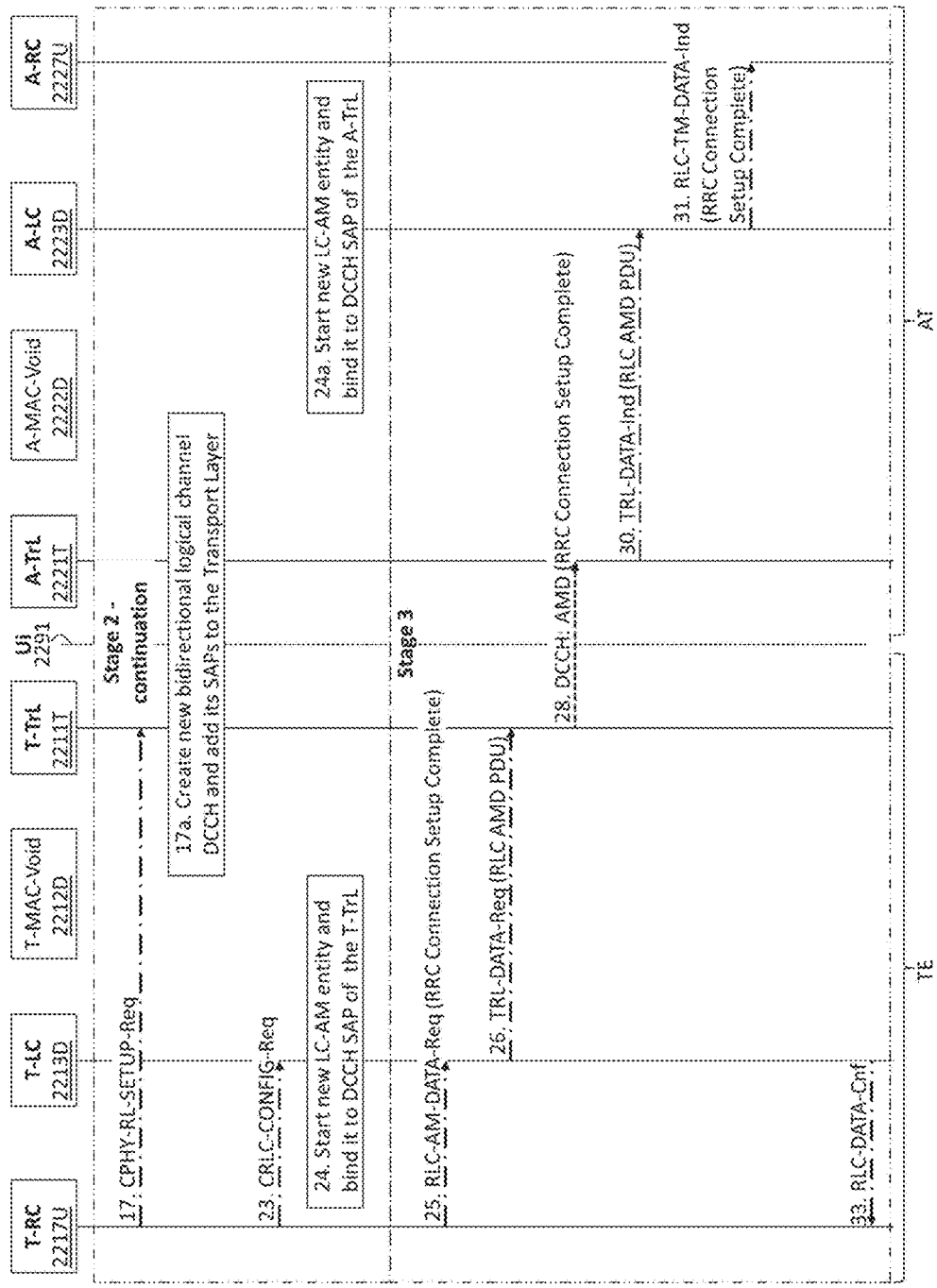
FIG. 22B is the continuation of FIG. 22A.

FIG. 21A and FIG. 21B illustrate the sample MSC for the RRC connection establishment of the prior art, while FIG. 22A and FIG. 22B illustrate the same for the present system. For easier understanding of the differences between the prior art MSC on FIG. 21A and FIG. 21B and the present system MSC on FIG. 22A and FIG. 22B both MSCs are drawn using the same template. It means that the MSC steps are kept the same but some of the steps can be void. The MSCs contain three stages. The generic data procedure can be applied for each stage separately. The stages are: (1) Stage 1, Submission in uplink of the RRC Connection Request message on CCCH in TM, wherein the SENDER is either the U-RRC Entity 2167N or the T-RC Entity 2217U, and the RECEIVER is either the H-RRC Entity 2137N or the A-RC Entity 2227U respectively; (2) Stage 2, Sending on downlink the RRC Connection Setup message on CCCH in UM, wherein the SENDER is either the H-RRC Entity 2137N or the A-RC Entity 2227U, and the RECEIVER is either The U-RRC Entity 2167N or the T-RC Entity 2217U respectively; and (3) Stage 3, Response in uplink with RRC Connection Setup Complete on DCCH in AM, wherein the SENDER is either the U-RRC Entity 2167N or the T-RC Entity 2217U, and the RECEIVER is either the H-RRC Entity 2137N or the A-RC Entity 2227U respectively.

The Iuh signaling between the HNB and the CN is not shown. The procedure can be initiated by the UPLR NAS Entity (not shown) while the UE, or the TE shown in FIG. 22A, is in idle mode. The signaling Radio Bearer #0 (RB0), i.e. the CCCH, was established by the UE during camping on the serving cell or, in case of the TE shown in FIG. 22A, during power up or hard reset procedures.

Following is the MSC description by steps:

Stage 1:

Step 1: The U-RRC Entity 2167N constructs the RRC Connection Request message to establish the RRC connection. The message comprises among others things the initial UE Identity, CN domain (PS or CS), and Establishment Cause information elements. The U-RRC Entity 2167N submits the RRC Connection Request message, contained in the RLC-TM-DATA-Req primitive, to the U-RLC Entity 2163B that is bound on the CCCH LCH.

Step 2: Upon reception of the RLC-TM-DATA-Req primitive, the U-RLC Entity 2163B creates the Transparent Mode Data (TMD) PDU and submits it to the U-MAC Entity 2162B as an information element of the MAC-DATA-Req [RLC TMD PDU] primitive.

Step 3: The U-MAC Entity 2162B prepares the PHY-DATA-Req primitive containing the received RLC TMD PDU and sends it to the U-Phy Entity 2161B for scheduling and transmission over the Uu Air Interface 2190.

Step 4: The U-Phy Entity 2161B schedules submission of the message and transmits it on the CCCH, mapped onto the Random Access CHannel (RACH) in uplink, towards the peer H-Phy Entity 2131B.

Step 5: Upon successful reception of the message on the RACH, the H-Phy Entity 2131B indicates with the PHY-DATA-Ind primitive to the H-MAC Entity 2132B.

Step 6: The H-MAC Entity 2132B submits the MAC-DATA-Ind primitive with the RLC TMD PDU to the H-RLC Entity 2133B.

Step 7: Upon reception the RLC TMD PDU, the H-RLC Entity 2133B sends the RRC Connection Request message, contained in the RLC-TM-DATA-Ind primitive, to the H-RRC Entity 2137N.

Step 8: Upon reception the RRC Connection Request message from the UE, the H-RRC Entity 2137N on the network side performs admission control and if the UE is allowed to connect to the specific core network domain (CS or PS), assigns the Radio Network Temporary Identifier (RNTI) for RRC connection and selects the radio resource parameters, such as transport channel type, transport format sets etc.

Step 9: If a DCH is to be established, the CPHY-RL-SETUP and the CPHY-TrCH-Cnf primitives, transmitted as one RADIO LINK SETUP PDU, are sent to all Node-Bs that would be involved in the channel establishment (not shown). The Physical Layer operation is started and confirmation primitives are returned from each Node-B. The H-RRC Entity 2137N configures parameters on Layer 2 to establish the DCCH LCH locally.

Stage 2:

Step 10: The H-RRC Entity 2137N requests the H-RLC Entity 2133B, to transmit the selected parameters including the RNTI in the RRC Connection Setup message using the UM on the downlink CCCH, using the RLC-UM-DATA-Req [RRC Connection Setup] primitive.

Step 11: The H-RLC Entity 2133B forwards the message to the H-MAC Entity 2132B as a MAC-DATA-Req [RLC UMD PDU] primitive.

Step 12: The H-MAC Entity 2132B prepares the PHY-DATA-Req primitive including the information of the received RLC UMD PDU and sends it to the H-Phy Entity 2131B for scheduling and transmission over the Uu Air Interface 2190.

Step 13: The H-Phy Entity 2131B schedules submission of the message and transmits it on the CCCH, mapped onto the Forward Access CHannel (FACH) in downlink towards the peer U-Phy Entity 2161B.

Step 14: Upon successful reception of the message on the FACH the U-Phy Entity 2161B prepares and sends the PHY-DATA-Ind primitive with the received data to the U-MAC Entity 2162B.

Step 15: The U-MAC Entity 2162B submits the MAC-DATA-Ind primitive with the RLC UMD PDU to the U-RLC Entity 2163B.

Step 16: Upon successful reception of the RLC UMD PDU, the U-RLC Entity 2163B sends the RRC Connection Setup message, contained in the RLC-UM-DATA-Ind primitive, to the U-RRC Entity 2167N.

Stage 2 continues on FIG. 21B.

FIG. 21B is the continuation of FIG. 21A.

Stage 2 continuation:

Step 17: Upon reception of the RRC Connection Setup message, the U-RRC Entity 2167N configures the U-Phy Entity 2161B in accordance with the parameters of the radio link received in the RRC Connection Setup message. This is done by sending the CPHY-RL-SETUP-Req primitive to the U-Phy Entity 2161B.

Step 18: The U-RRC Entity 2167N sets up the U-Phy Entity 2161B in accordance with the transport channel parameters received in the RRC Connection Setup message. This is done by sending the CPHY-TrCH-CONFIG-Req primitive to the U-Phy Entity 2161B.

Step 19: The U-RRC Entity 2167N configures the U-MAC Entity 2162B in accordance with the parameters received in the RRC Connection Setup message. This is done by sending the CMAC-CONFIG-Req primitive to the U-MAC Entity 2162B.

Step 20: The U-Phy Entity 2161B and the H-Phy Entity 2131B synchronize the physical and transport channels for the DCH.

Step 21: The U-Phy Entity 2161B indicates the U-RRC Entity 2167N that it has reached synchronization by submission of the CPHY-SYNC-Ind primitive.

Step 22: The U-Phy Entity 2161B indicates the U-RRC Entity 2167N that it has reached synchronization by submission of the CPHY-SYNC-Ind primitive.

Step 23: The U-RRC Entity 2167N configures parameters on Layer 2 by sending the CRLC-CONFIG-Req primitive to the U-RLC Entity 2163B to establish the DCCH locally.

Step 24: The UE Radio Link has been established.

Stage 3:

Step 25: The RRC Connection Setup Complete message should be sent on the DCCH in AM. Integrity and Ciphering related parameters and the UE capability information are sent back to the HNB. The U-RRC Entity 2167N sends the RRC Connection Setup Complete message, contained in the RLC-AM-DATA-Req primitive, to the U-RLC Entity 2163B. The RLC-AM-DATA-Req primitive contains request from the U-RLC Entity 2163B to confirm the reception of the message by the peer H-RLC Entity 2133B.

Step 26: Upon reception the RLC-AM-DATA-Req primitive, the U-RLC Entity 2163B creates the RLC Acknowledged Mode Data (AMD) Protocol Data Unit (PDU) and sends it to the U-MAC Entity 2162B as an information element of the MAC-DATA-Req [RLC AMD PDU] primitive.

Step 27: The U-MAC Entity 2162B prepares the PHY-DATA-Req primitive, including the received RLC AMD PDU, and sends it to the U-Phy Entity 2161B for scheduling and transmission over the Uu Air Interface 2190.

Step 28: The U-Phy Entity 2161B schedules submission of the message and transmits it on the Dedicated Control Channel (DCCH) in uplink direction towards the peer H-Phy Entity 2131B.

Step 29: Upon successful reception of the message on the DCCH, the H-Phy Entity 2131B indicates it with the PHY-DATA-Ind primitive to the H-MAC Entity 2132B.

Step 30: The H-MAC Entity 2132B submits the MAC-DATA-Ind [RLC AMD PDU] primitive to the H-RLC Entity 2133B.

Step 31: Upon successful reception the RLC AMD PDU, the H-RLC Entity 2133B sends the RRC Connection Setup Complete message, contained in the RLC-TMD-DATA-Ind primitive, to the H-RRC Entity 2137N.

Step 32: Upon reception the RLC AMD PDU with request for acknowledges, the H-RLC Entity 2133B sends acknowledge to the peer U-RLC Entity 2163B.

Step 33: Upon reception of acknowledge from the peer H-RLC Entity 2133B, the U-RLC Entity 2163B confirms successful reception of the RRC Connection Setup Complete message to the U-RRC Entity 2167N.

FIG. 22A illustrates the RRC Connection establishment MSC applicable to the CA in some embodiments.

The figure includes the CA TE and the CA AT. The CA TE comprises: (1) The T-RC Entity 2217U; (2) the T-LC Entity 2213D; (3) the T-MAC-Void Entity 2212D is void; and (4) the Transport Layer T-TrL Entity 2211T. The CA AT comprises: (1) the A-RC Entity 2227U; (2) the A-LC Entity 2223D; (3) the A-MAC-Void Entity 2222D is void; and (4) the A-TrL Entity 2221T. The CA TE and the CA AT communicate over the Ui Interface 2291. It should be apparent to any person skilled in the art that the Ui Interface 2291 is an error free interface, as it is physically residing inside a single SoC and is implemented by an IPC method supported by a single OS. Therefore the send-receive operations are always considered successful and the related acknowledgements are redundant, therefore nullified. The MSC in this figure, as well as in FIG. 22B comprises a sequence of steps for the present system CA. It should be apparent to any person skilled in the art, that when comparing these steps to the prior art UE & HNB MSC some steps are identical, and some are unique or redundant in the present system. In order to preserve consistent naming conventions with the prior art MSCs, the names for identical stages, steps & messages are given according to the prior art convention as shown in FIG. 21A and FIG. 21B. In order to preserve consistent numbering conventions with the prior art MSC, the numbers for the redundant prior art steps are void in the present system and the numbers for identical steps are given according to the prior art convention.

Following is the MSC description by steps:

Stage 1:

Step 1: the T-RC Entity 2217U leaves the idle mode and constructs the RRC Connection Request message to establish the RRC connection. The message comprises among others things the Initial UE Identity, CN Domain (PS or CS), and Establishment Cause information elements. The T-RC Entity 2217U submits the RRC Connection Request message, contained in the RLC-TM-DATA-Req primitive, to the T-LC Entity 2213D that is bound on the CCCH LCH via the TM SAP.

Step 2: Upon reception of the RLC-TM-DATA-Req primitive, the T-LC Entity 2213D creates the LC TMD PDU and sends it to the T-TrL Entity 2211T as an information element of the TRL-DATA-Req [RLC TMD PDU] primitive.

Step 3: Void.

Step 4: The T-TrL Entity 2211T sends the message on the CCCH to the peer A-TrL Entity 2221T.

Step 5: Void

Step 6: Upon reception of the message on the CCCH, the A-TrL Entity 2221T indicates the TRL-DATA-Ind primitive with the RLC TMD PDU to the A-LC Entity 2223D.

Step 7: Upon reception the RLC TMD PDU, the A-LC Entity 2223D sends the RRC Connection Request message, contained in the RLC-TM-DATA-Ind primitive, to the A-RC Entity 2227U.

Step 8: Upon reception the RRC Connection Request message from the TE, the A-RC Entity 2227U on the NT assigns a RNTI for RRC connection.

Step 9: Void.

Stage 2:

Step 10: The A-RC Entity 2227U requests the A-LC Entity 2223D, to transmit the selected parameters including the RNTI in an RRC Connection Setup message using the UM on the CCCH using the RLC-UM-DATA-Req [RRC Connection Setup] primitive.

Step 11: The A-LC Entity 2223D forwards the message to the A-TrL Entity 2221T as a TRL-DATA-Req [RLC UMD PDU] primitive.

Step 12: Void.

Step 13: The A-TrL Entity 2221T sends the message on the CCCH to the peer T-TrL Entity 2211T.

Step 14: Void.

Step 15: Upon reception of the message on the CCCH, the T-TrL Entity 2211T prepares and sends the TRL-DATA-Ind primitive with the RLC UMD PDU to the T-LC Entity 2213D.

Step 16: Upon reception of the RLC UMD PDU, the T-LC Entity 2213D sends the RRC Connection Setup message, contained in the RLC-UM-DATA-Ind primitive, to the A-RC Entity 2227U.

Stage 2 continues on FIG. 22B.

FIG. 22B is the continuation of FIG. 22A.

Stage 2 continuation:

Step 17: Upon reception of the RRC Connection Setup message, the T-RC Entity 2217U sends the CPHY-RL-SETUP-Req [LCH=DCCH] primitive to the T-TrL Entity 2211T. This primitive contains command to create DCCH channel.

Step 17a: Upon receiving the CPHY-RL-SETUP-Req primitive, the T-TrL Entity 2211T creates new bidirectional logical channel DCCH and add its SAPs to the Transport Layer.

Step 18 through Step 22: Void.

Step 23: The T-RC Entity 2217U sends configuration request by the CRLC-CONFIG-Req primitive. The T-RC Entity 2217U establishes the LC-AM and binds it to the DCCH LCH by sending the CRLC-CONFIG-Req [mode=Acknowledged] primitive to the T-LC Entity 2213D. The T-LC Entity 2213D triggers (on Step 24a) an establishment of the LC-AM on the NT.

Step 24: Upon reception of the CRLC-CONFIG-Req primitive, the T-LC Entity 2213D establishes a new LC-AM and binds it to the DCCH channel.

Step 24a: On the NT, the peer A-LC Entity 2223D establishes the peer LC-AM and binds it to the DCCH channel.

Stage 3:

Step 25: The T-RC Entity 2217U sends the RRC Connection Setup Complete message, contained in the RLC-AM-DATA-Req primitive, to the T-LC Entity 2213D. The RLC-AM-DATA-Req primitive contains request from the T-LC Entity 2213D to confirm the reception of the message by the peer A-LC Entity 2223D.

Step 26: Upon reception the RLC-AM-DATA-Req primitive, the T-LC Entity 2213D creates the LC AMD PDU and sends it to the T-TrL Entity 2211T as an information element of the TRL-DATA-Req [LC AMD PDU] primitive.

Step 27: Void.

Step 28: The T-TrL Entity 2211T submits the message on the DCCH to the peer A-TrL Entity 2221T.

Step 29: Void.

Step 30: Upon reception of the message on the DCCH, the A-TrL Entity 2221T indicates it with the TRL-DATA-Ind primitive to the A-LC Entity 2223D.

Step 31: Upon reception the LC AMD PDU, the A-LC Entity 2223D sends the RRC Connection Setup Complete message, contained in the RLC-TMD-DATA-Ind primitive, to the A-RC Entity 2227U.

Step 32: Void.

Step 33: Immediately after sending the RRC Connection Setup Complete message to the A-RC Entity 2227U, the T-LC Entity 2213D confirms transmission to the T-RC Entity 2217U.

FIG. 23 illustrates the communication interface legend used in the present patent application.

The figure illustrates the legend of the message flow communication InterFace (I/F) types, which is used throughout the drawings of the present system.

Each I/F is drawn as double/single arrowhead line. It should be apparent to any person skilled in the art that the double arrowhead denotes a bidirectional I/F and/or a bidirectional communication, as applicable. It should be also apparent to any person skilled in the art that the single arrowhead denotes a unidirectional I/F and/or the direction of a unidirectional communication, as applicable.

These I/Fs are grouped into 2 main sub-groups: (1) The Physical group I/Fs 2399A; and (2) the Logical group I/Fs 2399B.

The Physical group has two members, further drawn as solid-line, as follows: (1) The wireless I/F 2399C, e.g. the Uu L1 peer-to-peer I/F, wherein the I/F is further drawn as a "lightning symbol"; and (2) the wired I/F 2399D, e.g. the Iuh L1 peer-to-peer I/F, wherein the I/F is further drawn as a straight line.

The Logical group has 4 members further drawn as various non-solid line types, as follows: (1) The wireless I/F 2399E, e.g. the Uu L2/L3 peer-to-peer I/F, wherein the I/F is further drawn as a "Square-Dot" "lightning symbol" line; (2) the wired I/F 2399F, e.g. the Iuh L2/L3 peer-to-peer I/F, wherein the I/F is further drawn as a "Square-Dot" straight line; (3) the inter-layer protocol I/F 2399G, e.g. the U-RLC to U-MAC I/F, wherein the I/F is further drawn as a "Long-Dash-Dot" straight line; and (4) the IPC method I/F 2399H, e.g. the present system Ui T-TrL to A-TrL peer-to-peer I/F, wherein the I/F is further drawn as a "Dash-Dot" straight line.

FIG. 24A shows a table of abbreviations and terms used in the present patent application.

The table contains a glossary of the non-standard abbreviations and terms encountered in the present patent application. The standard abbreviations and terms appear in the 3GPP TR 21.905 titled: "Vocabulary for 3GPP Specifications".

FIG. 24B is the continuation of FIG. 24A.

The figure includes the continuation of the glossary table.

Various modifications and alterations of the invention will become apparent to those skilled in the art without departing from the spirit and scope of the sysem.

While various embodiments of the present system have been described above, it should be understood that they have been presented by way of example only, and not of limitation.

Although the invention is described above in terms of various exemplary embodiments and implementations, it should be understood that the various features, aspects and functionality described in one or more of the individual embodiments are not limited in their applicability to the particular embodiment.

Terms and phrases used in this document, and variations thereof, unless otherwise expressly stated, should be construed as open ended as opposed to limiting.

A group of items linked with the conjunction "and" should not be read as requiring that each and every one of those items be present in the grouping, but rather should be read as "and/or" unless expressly stated otherwise.

The presence of broadening words and phrases such as "one or more," "at least," "but not limited to" or other such as phrases in some instances shall not be read to mean that the narrower case is intended or required in instances where such broadening phrases may be absent.

Additionally, the various embodiments set forth herein are described in terms of exemplary block diagrams, flow charts and other illustrations.

The previous description of the disclosed embodiments is provided to enable any person skilled in the art to make or use the present system.

Details of U.S. Provisional Patent Application 61/768,239 filed on 22 Feb. 2013 is incorporated herein by reference.

In accordance with the purposes of the present system, as embodied and broadly described herein, the present system comprises a Communication Device (CD), with integrated functionalities of: (1) A 3rd Generation Partnership Project (3GPP) User Equipment (UE); (2) a Communication Apparatus (CA) as described in Provisional Patent Application 61/768,239 filed on 22 Feb. 2013; and (3) an Access Manager Entity (AME).

The CA, as described in Provisional Patent Application 61/768,239 filed on 22 Feb. 2013, comprises multi-layered protocol stacks for implementing control plane functionality, user plane functionality, management functionality and User-to-user (Uu) Air Interface functionality: (1) A Terminal Equipment Protocol Stacks (TE) entity provides UE functionality; (2) an Access Termination protocol stacks (AT) entity provides Home Node-B (HNB) radio functionality; and (3) a Network Termination protocol stacks (NT) entity provides HNB network functionality. A Transport Layer (TrL) entity provides the interconnection functionality between the TE and the AT. The TrL between the TE and the AT entities of the CA, provides similar functionalities to the Uu Air Interface between the prior art UE and HNB as described in Provisional Patent Application 61/768,239 filed on 22 Feb. 2013, wherein the TrL is implemented by one of the suitable Inter-Process Communication (IPC) methods. The CA as described also comprises an Inter-Working Function (IWF) layer, for providing the relay and conversion functionalities between the AT and the NT. In another embodiment the TE and the AT functionalities are integrated into a TE-AT emulator application, which connects directly to the NT.

The UE further comprises the UE Lower Layers (UE-LL) residing below the AME and the Common Layers residing above the AME. The TE further comprises the TE Lower Layers (TE-LL) residing below the AME and the Common Layers residing above the AME.

The interconnection between the UE and a 3GPP Core Network (CN) comprised of the following: (1) An interconnection between the UE and a Node-B through a Uu interface according to the 3GPP specifications; (2) an interconnection between the Node-B and a Radio Network Controller (RNC) over an Iub interface according to the 3GPP specifications; and (3) an interconnection between the RNC and the CN over an Iu interface according to the 3GPP specifications.

The interconnection between the CA and a 3GPP CN comprised of the following: (1) An interconnection between the CA and a 3GPP Home Node-B Gateway (HNB-GW) through a Broadband Internet Protocol Network (IP Network), also known as the Internet, over an Iuh Interface according to the 3GPP specifications, wherein the Iuh can be transported through wired media e.g. over the Ethernet protocol, or can be transported through wireless media e.g. over the Wi-Fi protocols; and (2) an interconnection between the HNB-GW and the CN over an Iu Interface according to the 3GPP specifications. It should be apparent to any person skilled in the art that other wired and wireless protocols can be used.

The AME routes control messages, measurements information and data packets between the UE/TE common layers and the UE-LL, wherein the common layers comprising the Common Radio Resource Control (RRC), Common Packet Data Convergence Protocol (PDCP) and Common Application Layers. The AME also routes control messages, measurements information and data packets between the UE/TE common layers and the TE-LL. The AME comprises a Quality of Service/Quality of Experience (QoS/QoE) measuring entity, which measures TE to CN end-to-end QoS/QoE parameters, then performs conversion between QoS/QoE measured parameters and 3GPP standard Uu parameters, so that the common RRC can treat them according to the 3GPP specifications. In the Handover (HO) process the AME is controlling the flow of messages and Data between the UE-LL, the TE-LL and the common layers, thus assuring a Seamless Session Transfer (SST) between the UE-LL and the TE-LL.

The AME operates in a way which makes the UE and the TE to appear as a mirror image entity of each other. This mirror image entity is reflected to both the Common Layers and the CN. Therefore communication between the Common Layers and the CN are done either via the UE or via the TE, executing the same procedures and operating according to the same processes, as described in the 3GPP specifications, without either the CN or the Common Layer realizing that 2 physical entities are involved. In this way, SST can be maintained. The AME methods of operation are further described in other sections of the present patent application.

It should be apparent to any person skilled in the art that the UE and the CA as described are operating according to the 3GPP Universal Mobile Telecommunications System (UMTS) network standards, also known as 3rd Generation (3G) network standards. However with the appropriate changes as described in 3GPP Technical Report (TR), the TR 23.830 and further described in 3GPP Technical Specifications (TS), the TS 36.300 and the TS 37.803, the UE and the CA can operate according to the 3GPP Long Term Evolution (LTE) network standards, also known as 4th Generation (4G) network standards.

The UE and the CA as described operate in a single mode supporting one cellular standard, either the 3G standard or the 4G standard, however in another embodiment they can operate in a multi-mode, supporting both standards.

The described interconnection with a CN, through a Broadband IP Network, enables the CD to offload traffic from a Radio Access Network (RAN), thus enabling better QoS in the RAN service area. Integration of UE functionality and HNB functionality into one CD, enables preservation of UE mobility, as well as using the HNB functionality for interconnection with the CN, regardless of prior-art RAN availability.

The use of the term CD in the present patent application embodiments is broadly describing devices which are capable to connect to a Broadband IP Network, either by wire or by wireless. These devices comprise an embedded UE and an embedded CA. These devices include, but not limited to, a Mobile Internet Devices (MID), Ultra Mobile Personal Computers (UMPC), Notebooks, Netbooks, e-Readers, e-Cameras, Desktop Personal Computers (PC), Smartphones, Tablets, Gaming Consoles and Machine to Machine (M2M) devices.

As described in Provisional Patent Application 61/768,239 filed on 22 Feb. 2013, some embodiments describe a CA, which has an embedded Wireless Local Area Network (WLAN) radio. The interconnection between the CA and a 3GPP CN comprised of the following: (1) An interconnection between the CA and a Broadband Internet Protocol Access Point (IP AP), through the WLAN radio; (2) an interconnection between the Broadband IP AP and a HNB-GW through a Broadband IP Network; and (3) an interconnection between the HNB-GW and the CN. Described WLAN radio can belong to one, or a combination thereof, but not limited, to any short range wireless standards, e.g. a WiFi radio according to the International Electrical and Electronics Engineers (IEEE) 802.11 family of standards, or a Bluetooth radio according to the Bluetooth standard.

As described in Provisional Patent Application 61/768,239 filed on 22 Feb. 2013, some embodiments describe a CA, which has an embedded Local Area Network (LAN) adapter. The interconnection between the CA and a 3GPP CN comprised of the following: (1) An interconnection between the CA and a Broadband IP AP through the LAN cable; (2) an interconnection between the Broadband IP AP and a HNB-GW through a Broadband IP Network; and (3) an interconnection between the HNB-GW and the CN. Described LAN adapter can belong to one, or a combination thereof, but not limited, to any wired standards, e.g. an Ethernet type according to the IEEE 802.3 family of standards, or a FireWire type according to the IEEE 1394 standard, or a Universal Serial Bus (USB) type according to the USB 2.0/3.0 standards.

As described in Provisional Patent Application 61/768,239 filed on 22 Feb. 2013, some embodiments describe an interconnection between a CA and a Broadband IP Network using a Broadband IP AP. The Broadband IP AP has an embedded LAN module and an embedded Wide Area Network (WAN) adapter. A LAN module can be a Wireless-LAN radio, or can be a Wired-LAN adapter, or a combination thereof. A WAN adapter can belong to one, or a combination thereof, but not limited, to any long range backhaul standards, e.g. a Coaxial Cable type according to the Data Over Cable Service Interface Specifications (DOCSIS) standard, or a Twisted-Wire Pair type, according to the Digital Subscriber Line (DSL) family of standards, or an Optic Fiber type according to the Fiber To The x (FTTx) family of standards, or a Line Of Sight (LOS) radio link, or a Non Line Of Sight (NLOS) radio link.

As described in Provisional Patent Application 61/768,239 filed on 22 Feb. 2013, some embodiments describe a CD comprising both the CA and an embedded UE. The interconnection between the UE and a CN comprised of the following two alternate routes: (1) First route comprising: (a) An interconnection between the UE and a Node-B; (b) an interconnection between the Node-B and a RNC; and (c) an interconnection between the RNC and the CN; and (2) Second route comprising: (a) An interconnection between the UE and an external HNB; (b) an interconnection between the external HNB and a Broadband IP AP; (c) an interconnection between the Broadband IP AP and a HNB-GW through a Broadband IP Network; and (d) an interconnection between the HNB-GW and the CN. Described UE can be operating according to the 3G or to the 4G standards, or according to a combination thereof.

As described in Provisional Patent Application 61/768,239 filed on 22 Feb. 2013, some embodiments describe a LAN interconnection between the CA and a Broadband IP AP, wherein interface radios and/or adapters on the CA and the Broadband IP AP operate in accordance with different standards.

Figure 25:
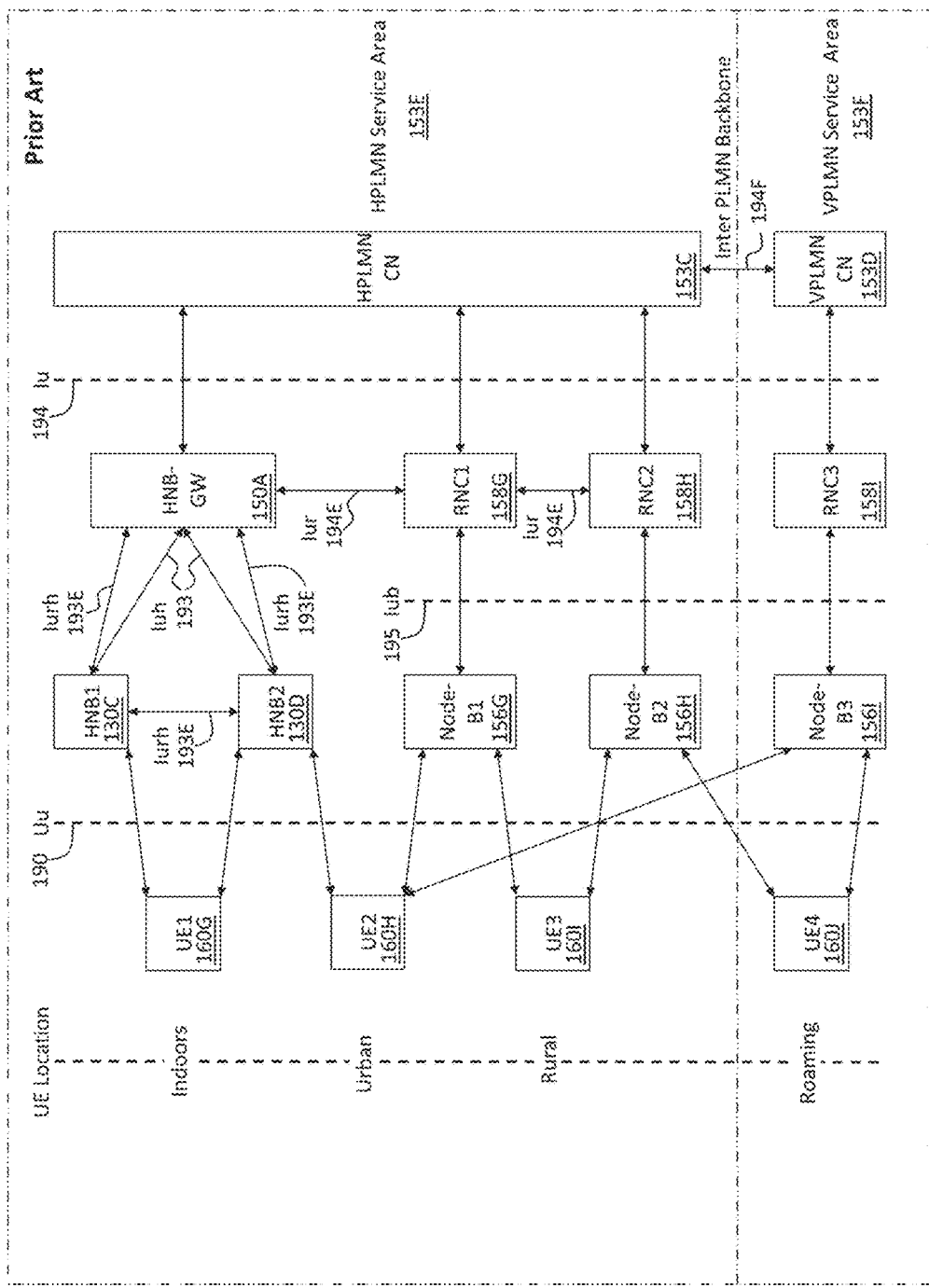
FIG. 25 illustrates a 3rd Generation (3G) Universal Mobile Telecommunications System (UMTS) network logical architecture, according to the prior art.
Figure 26:
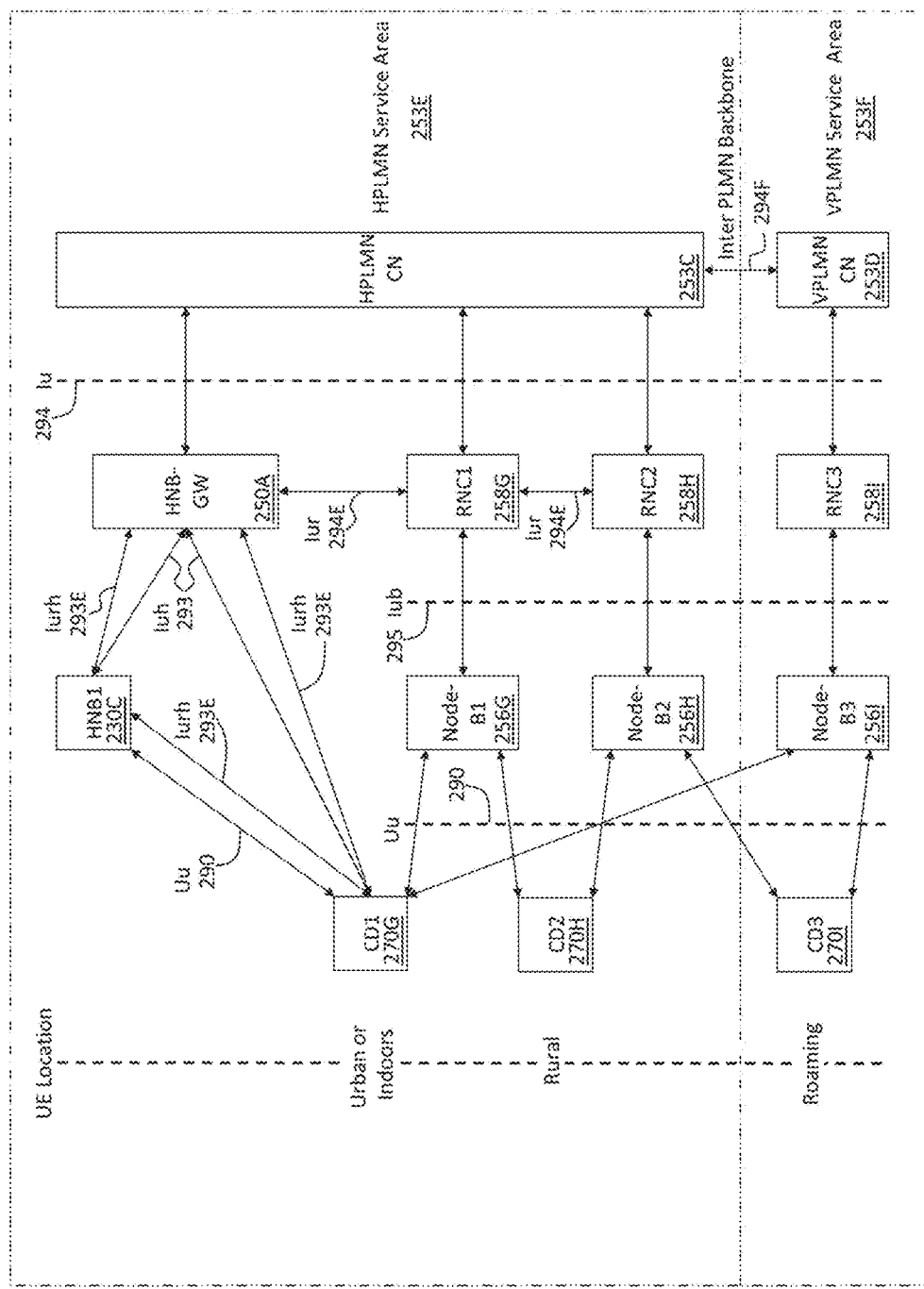
FIG. 26 illustrates a 3G UMTS network logical architecture for Communication Device (CD) deployments in some embodiments.
Figure 27:
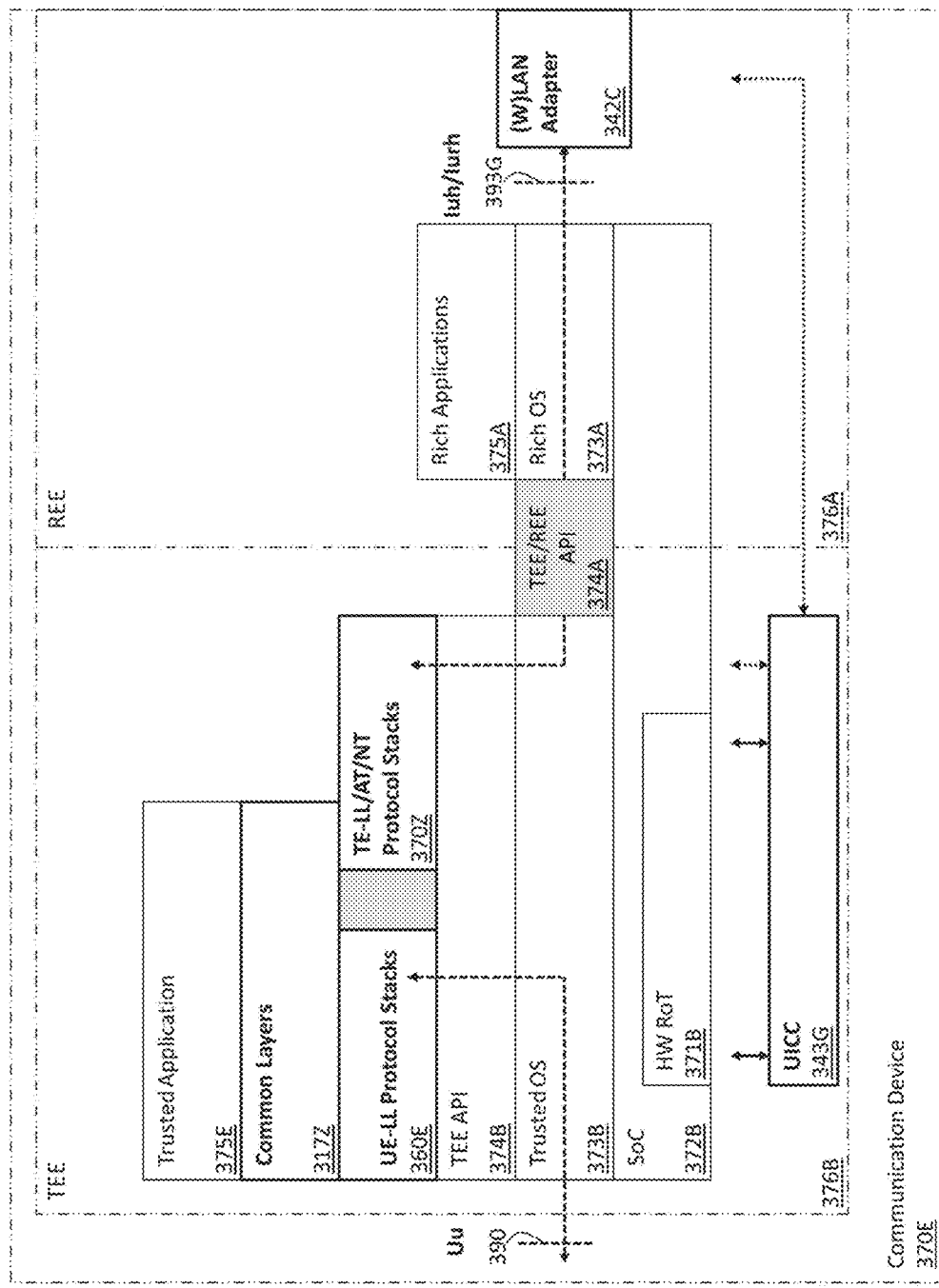
FIG. 27 illustrates the trusted environment CD architecture in some embodiments.
Figure 28:
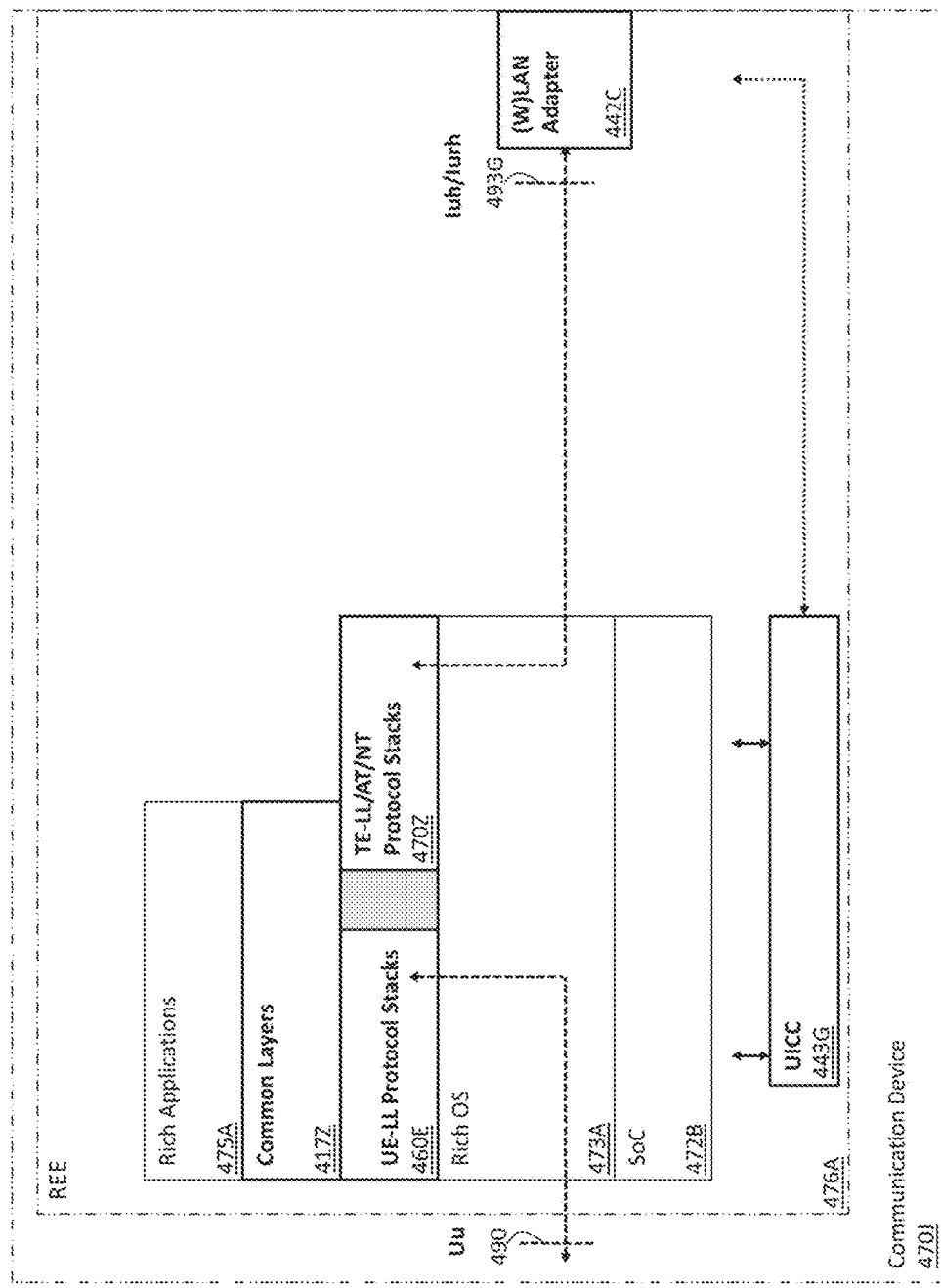
FIG. 28 illustrates the untrusted environment CD architecture in some embodiments.
Figure 29:
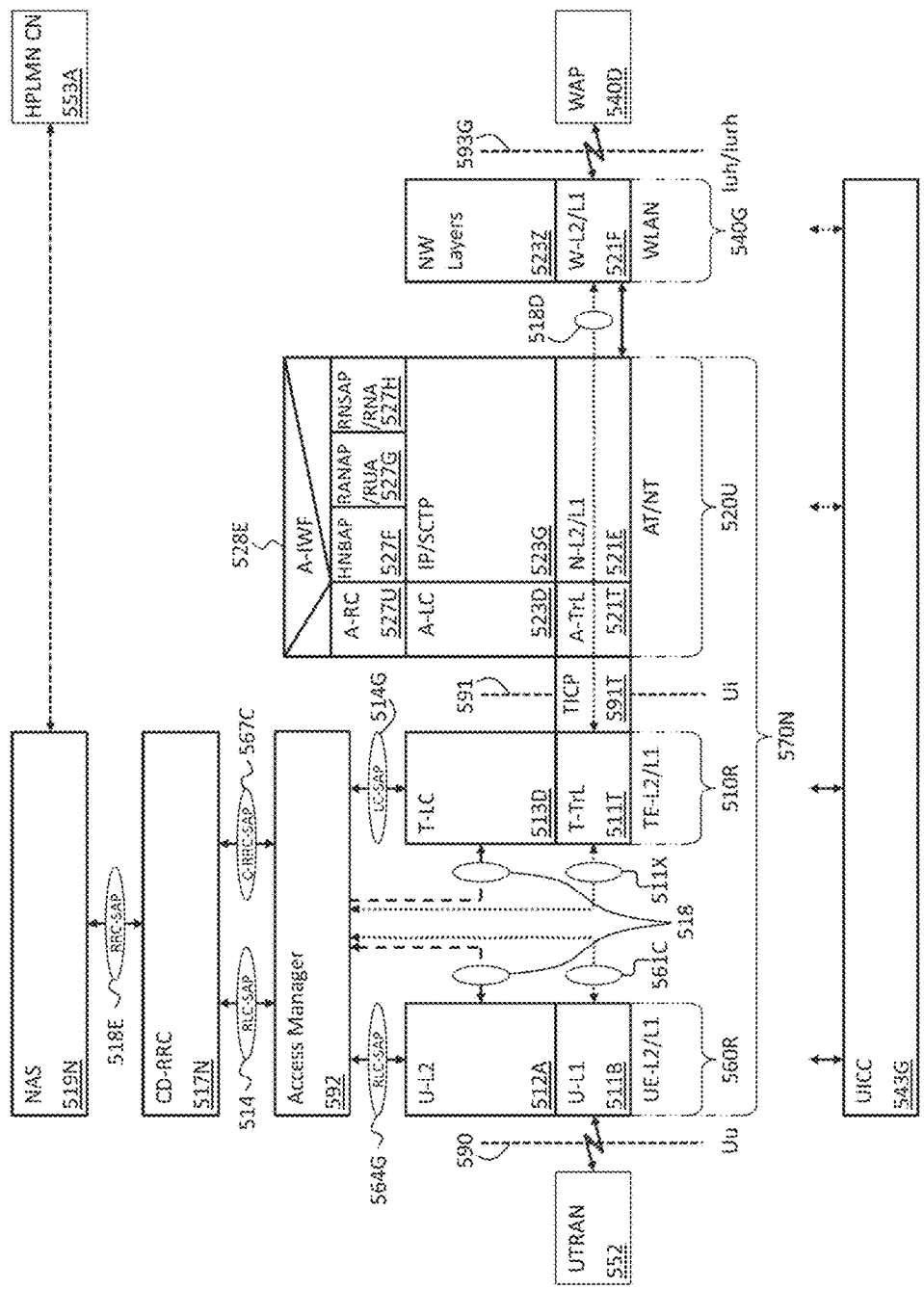
FIG. 29 illustrates the CD Control Plane (C-Plane) protocol architecture in some embodiments.
Figure 30:
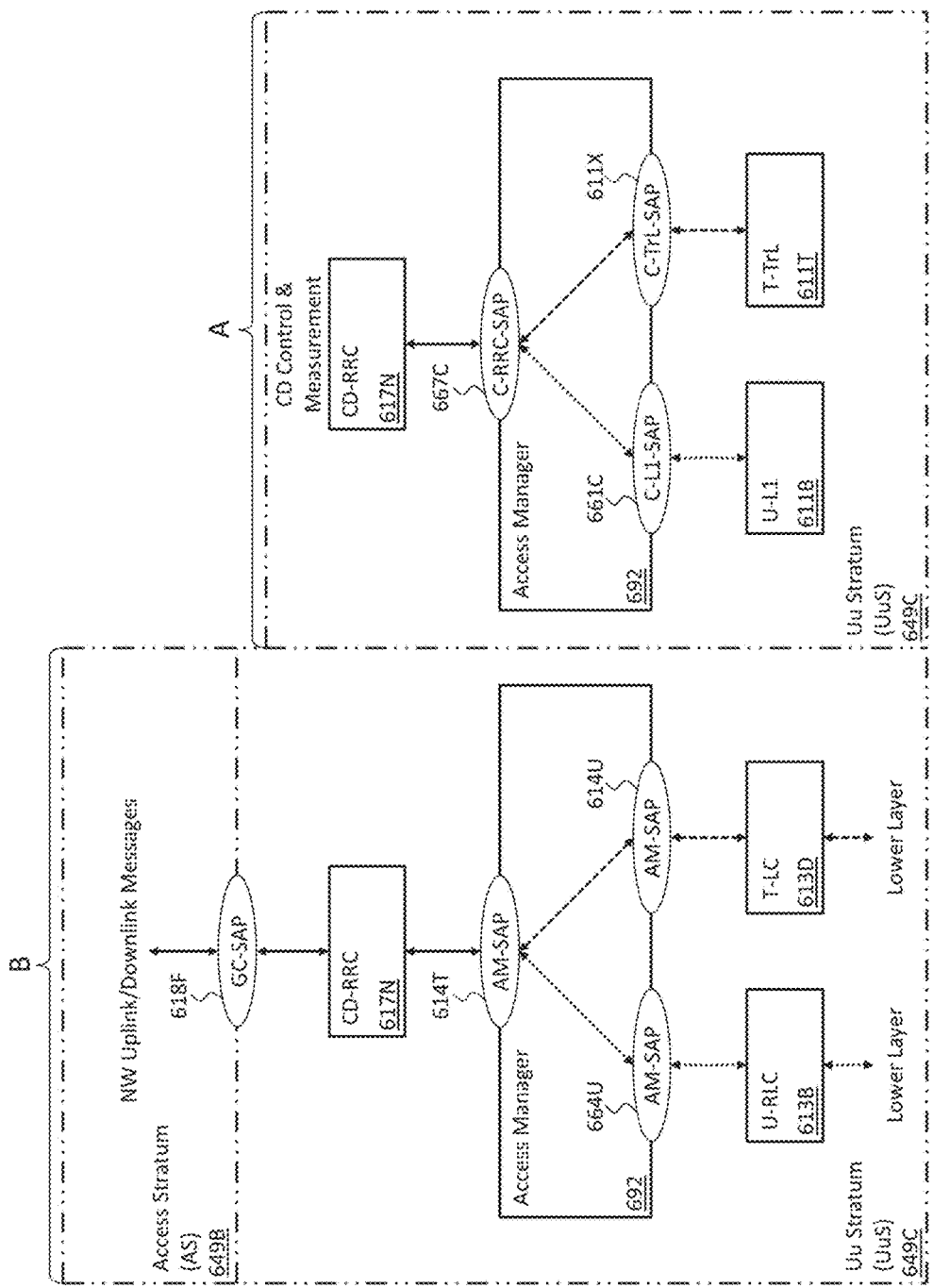
FIG. 30 illustrates the C-Plane Access Manager Entity (AME) architecture & methods in some embodiments.
Figure 31:
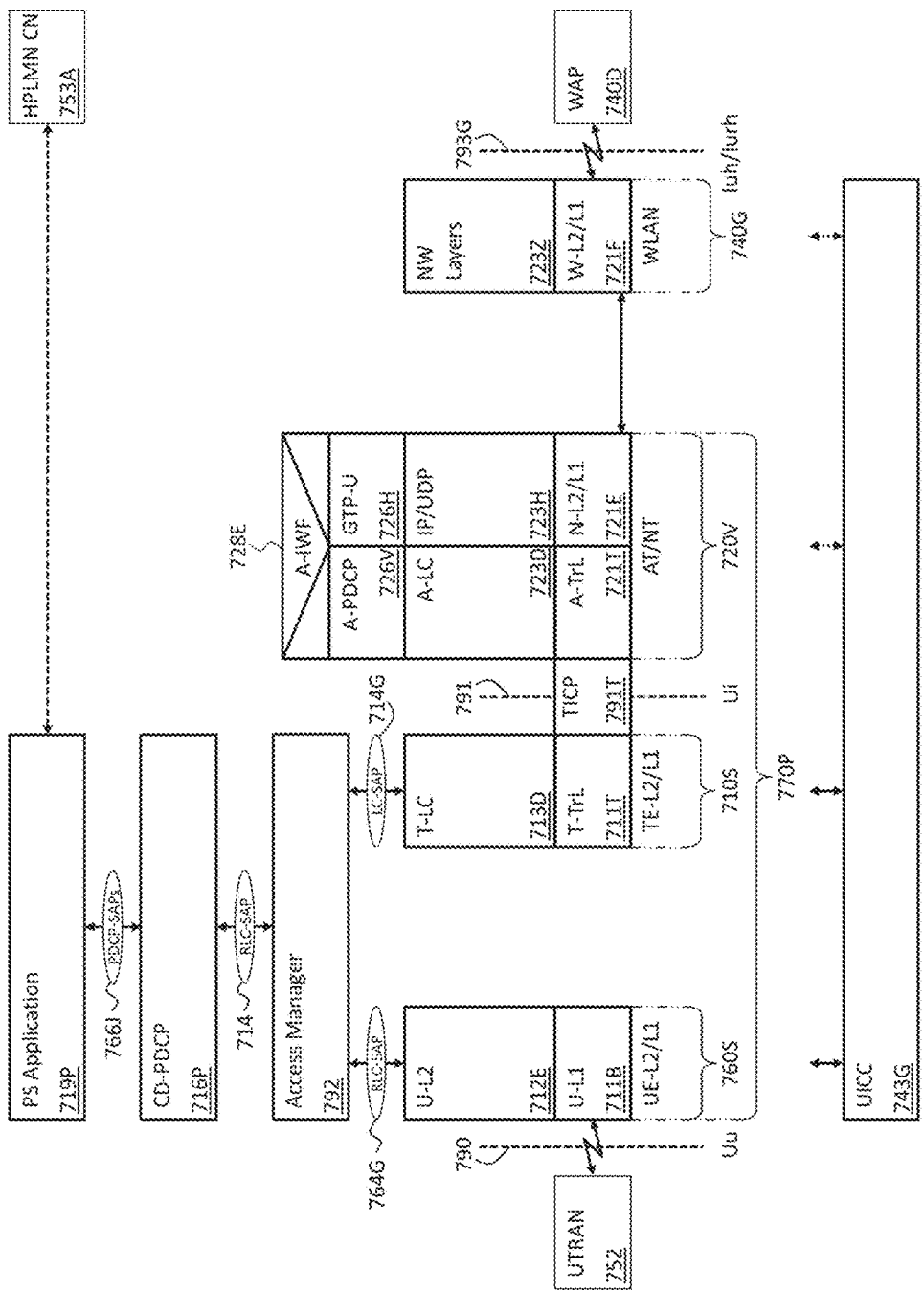
FIG. 31 illustrates the CD User Plane (U-Plane) Packet Switched (PS) protocol architecture in some embodiments.
Figure 32:
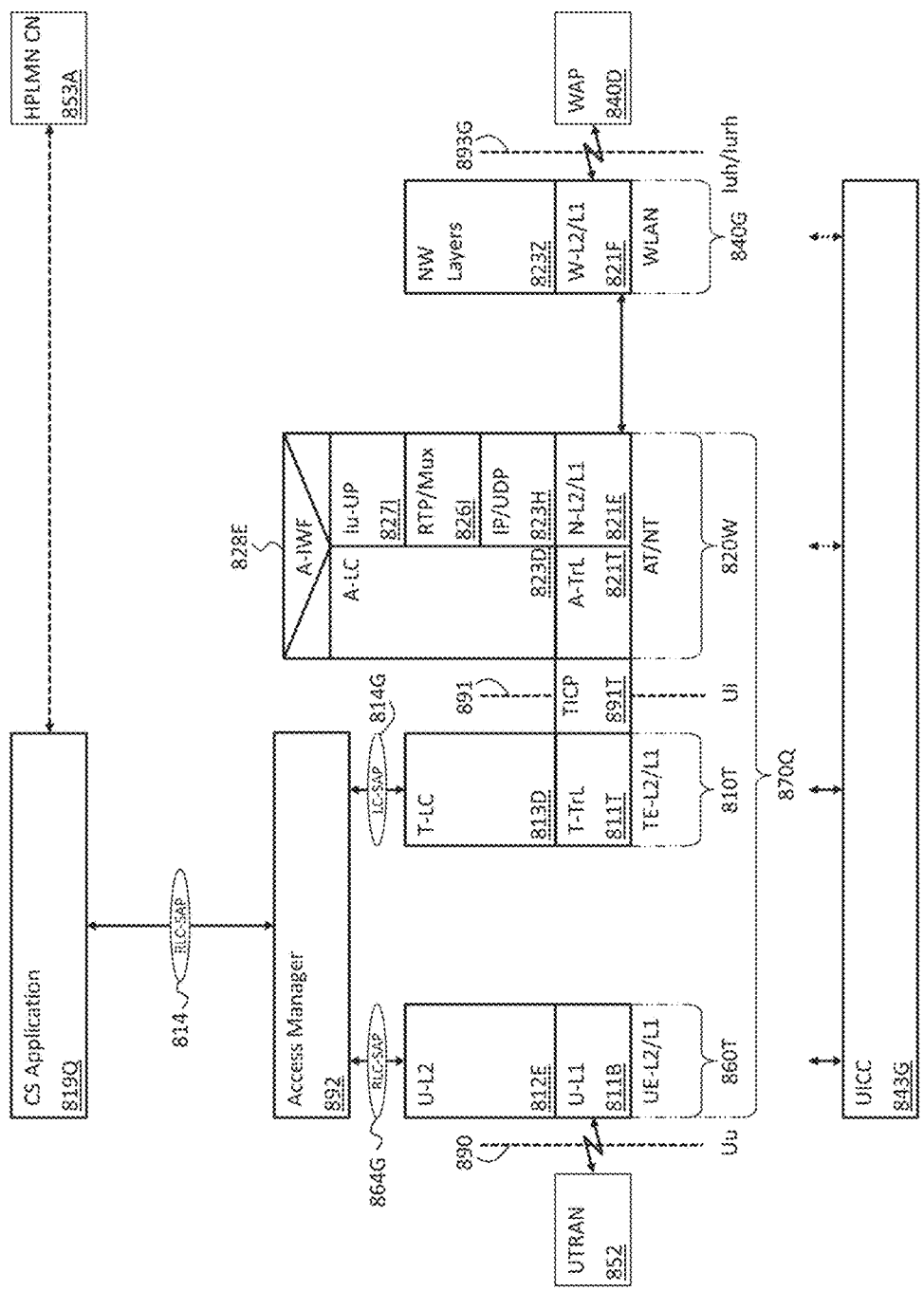
FIG. 32 illustrates the CD User Plane (U-Plane) Circuit Switched (CS) protocol architecture in some embodiments.
Figure 33:
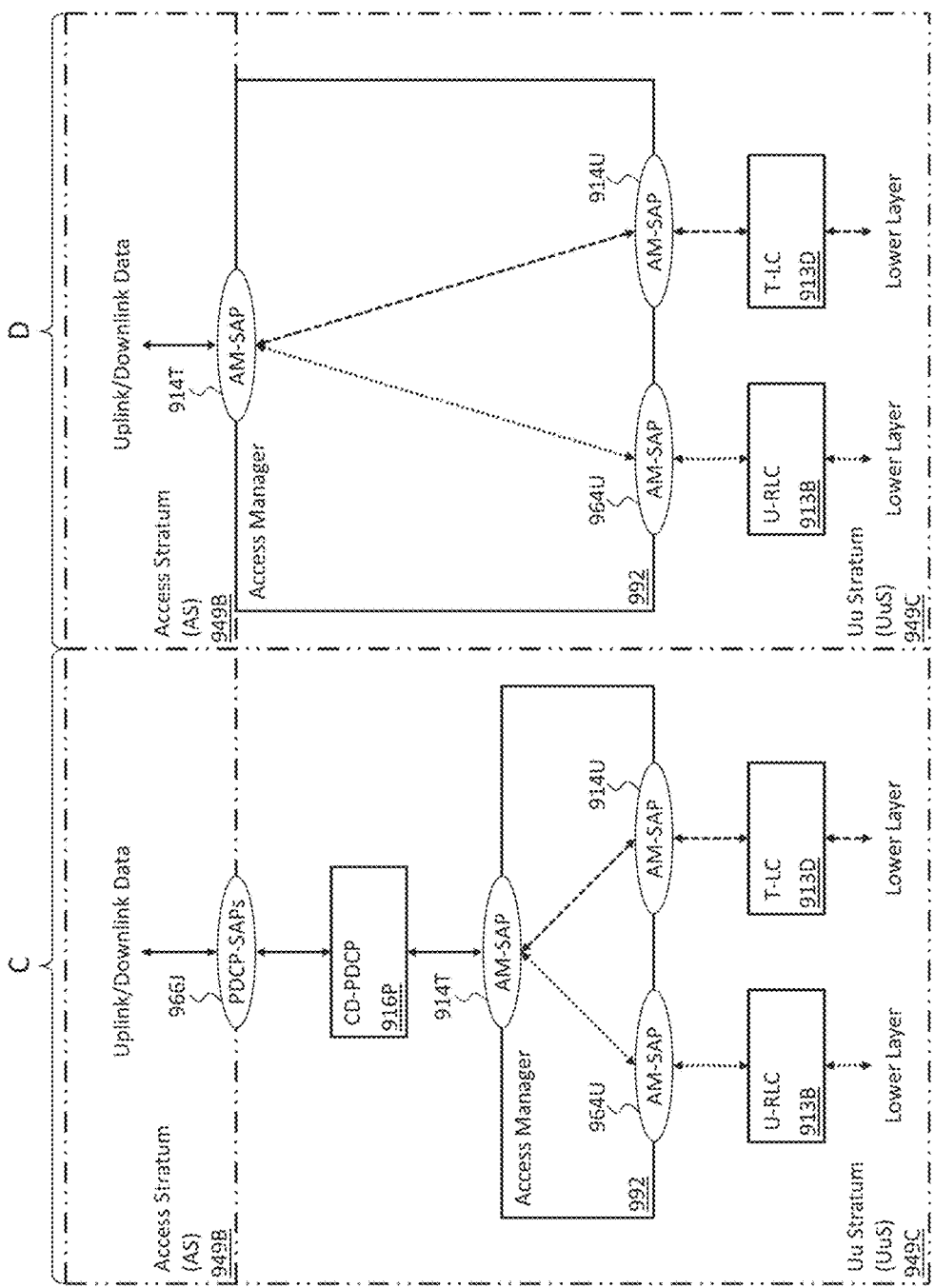
FIG. 33 illustrates the U-Plane AME architecture & methods in some embodiments.
Figure 34A:
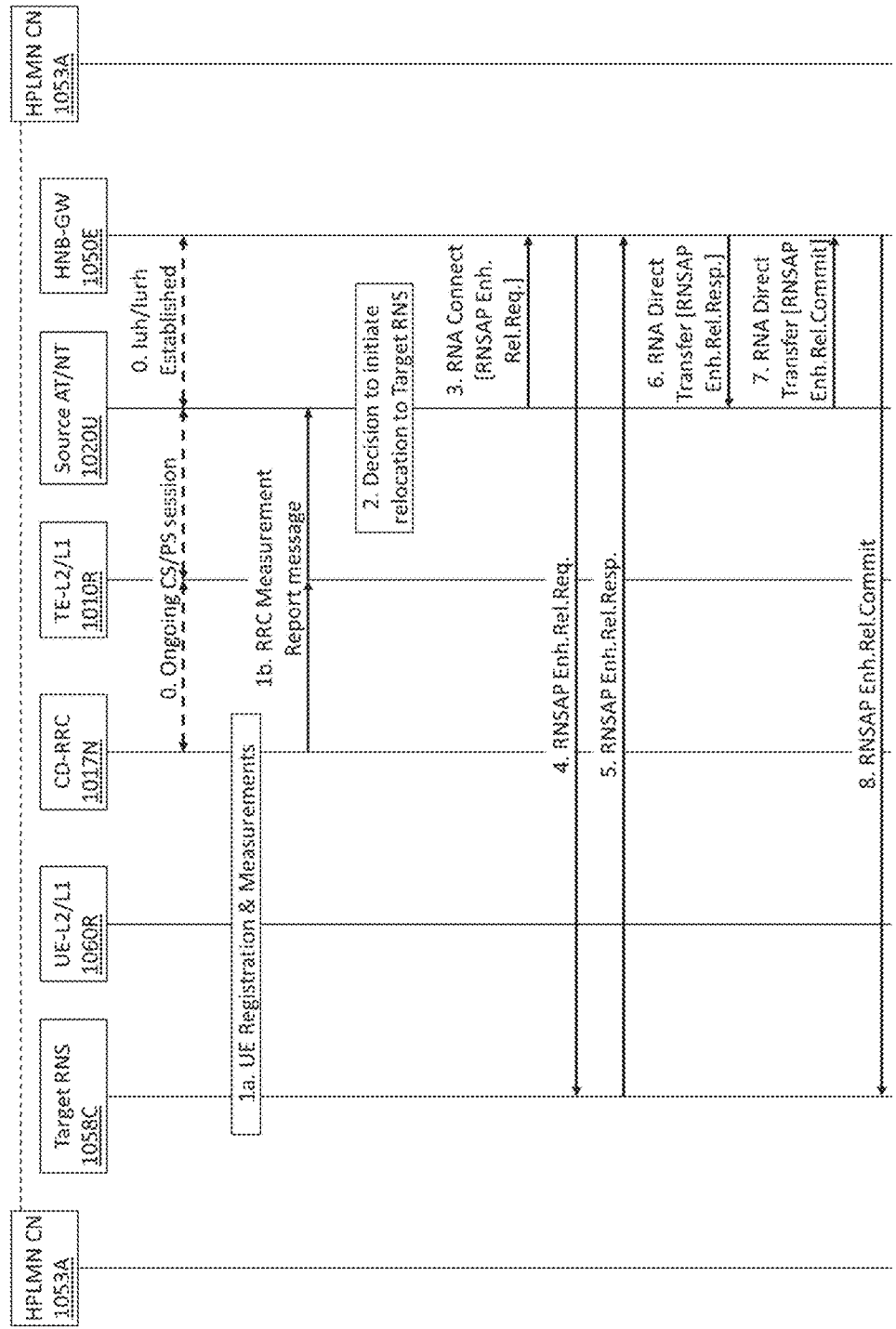
FIG. 34A illustrates the CD C-Plane Message Sequence Chart for Outbound Hard Hand-Over (HHO) with Enhanced Serving Radio Network Subsystem (SRNS) Relocation, in some embodiments.
Figure 34B:
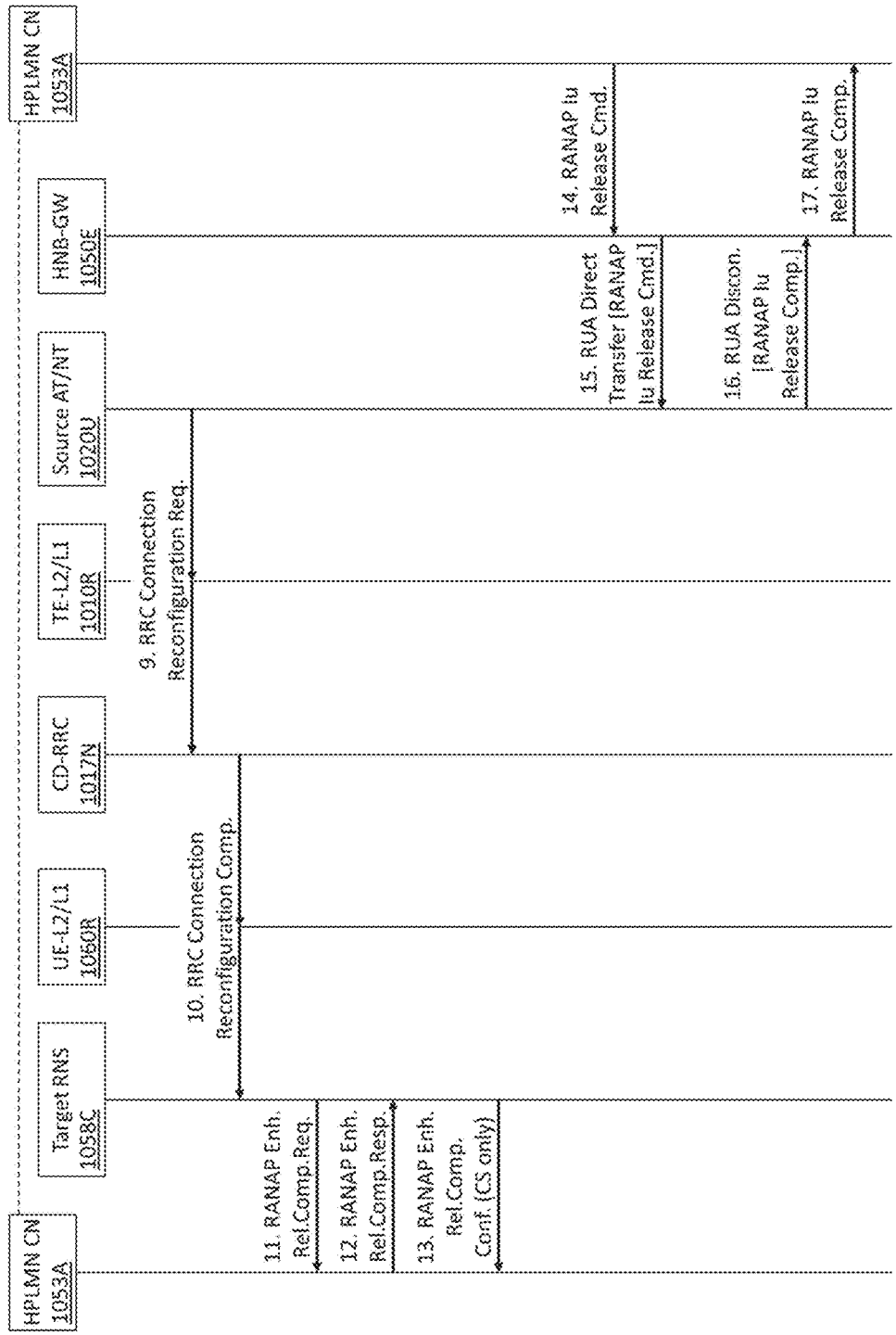
FIG. 34B is the continuation of FIG. 34A.
Figure 35A:
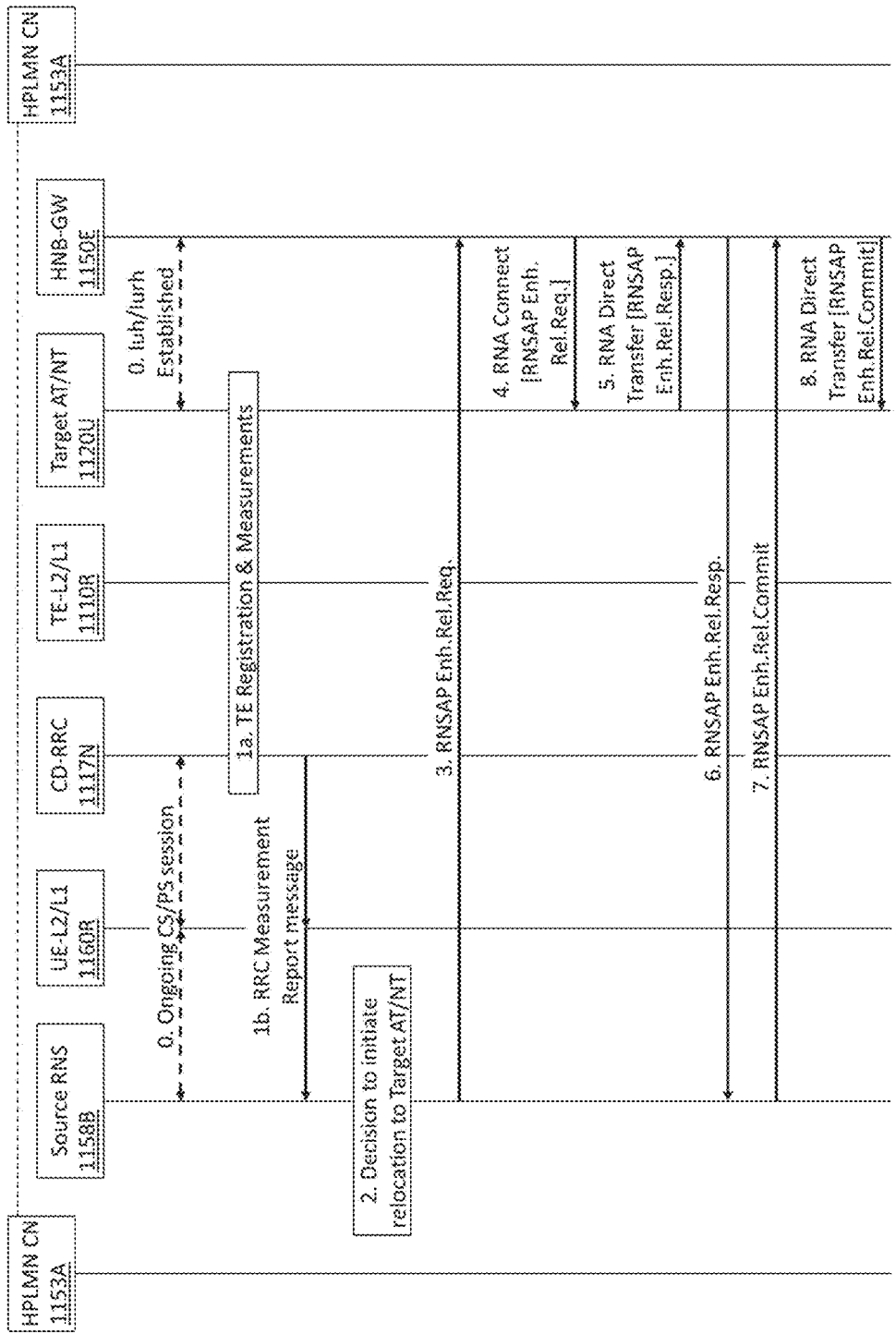
FIG. 35A illustrates the CD C-Plane Message Sequence Chart for Inbound HHO with Enhanced SRNS Relocation, in some embodiments.
Figure 35B:
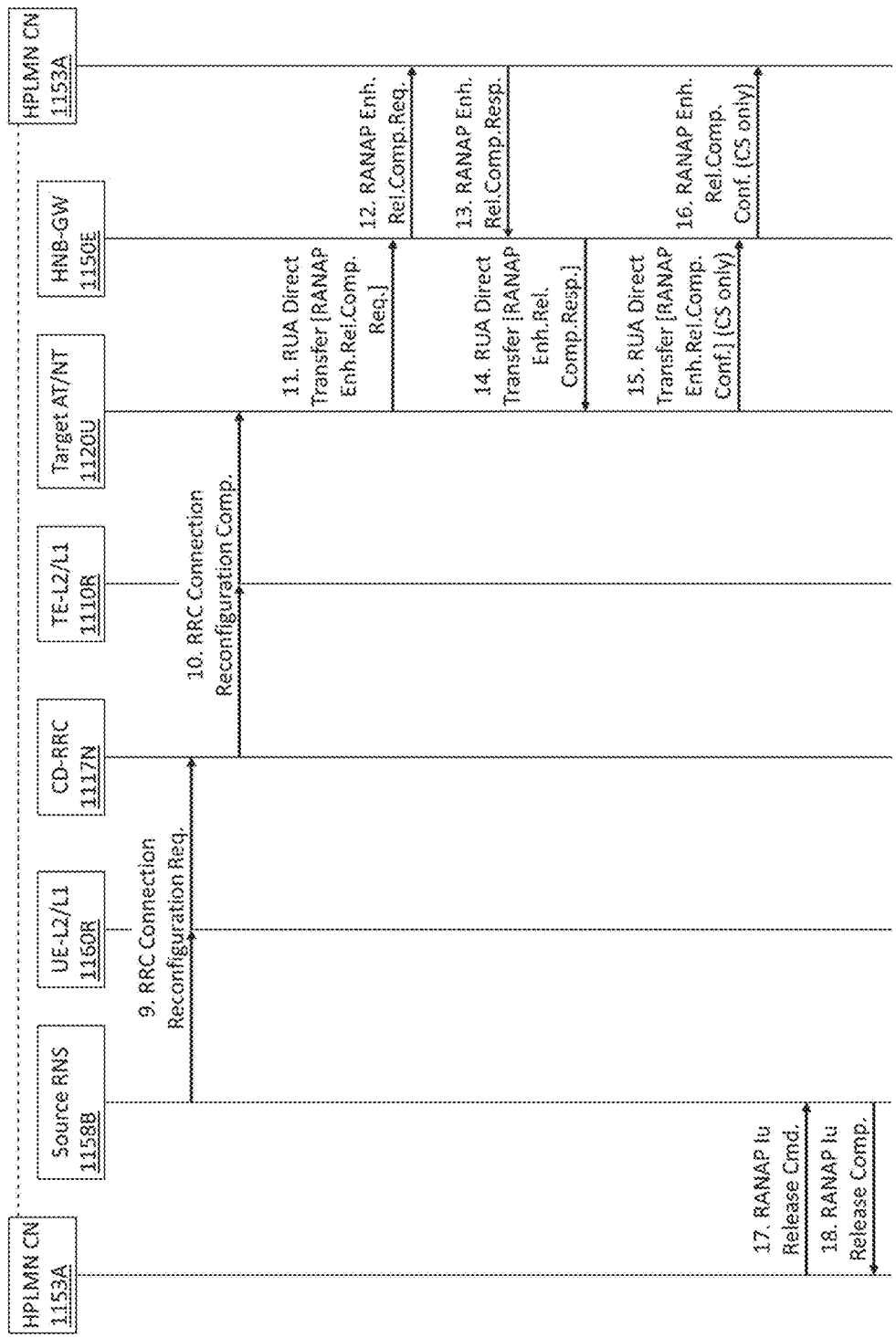
FIG. 35B is the continuation of FIG. 35A.
Figure 36A:
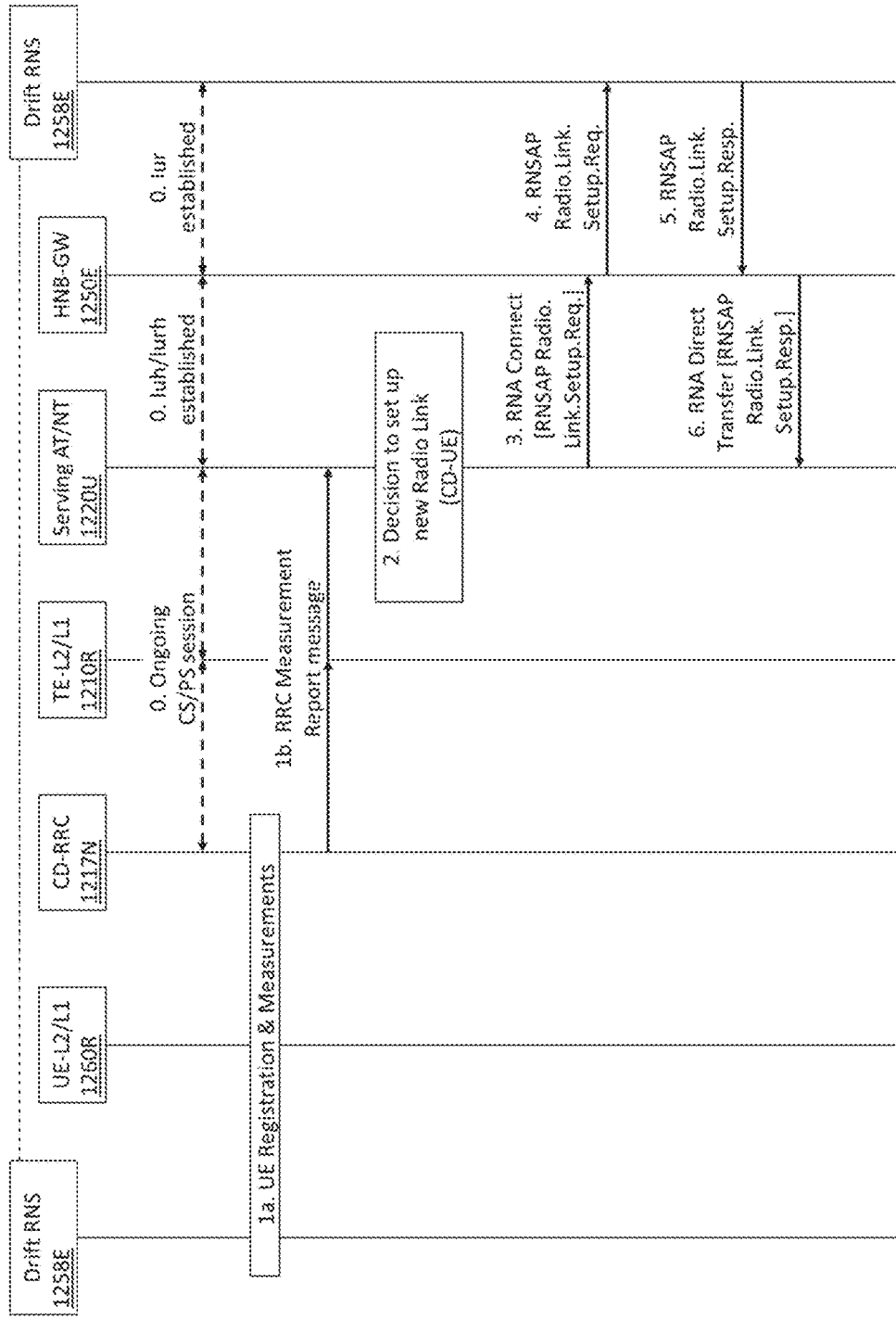
FIG. 36A illustrates the CD C-Plane Message Sequence Chart for Outbound Soft Hand-Over (SHO), in some embodiments.
Figure 36B:
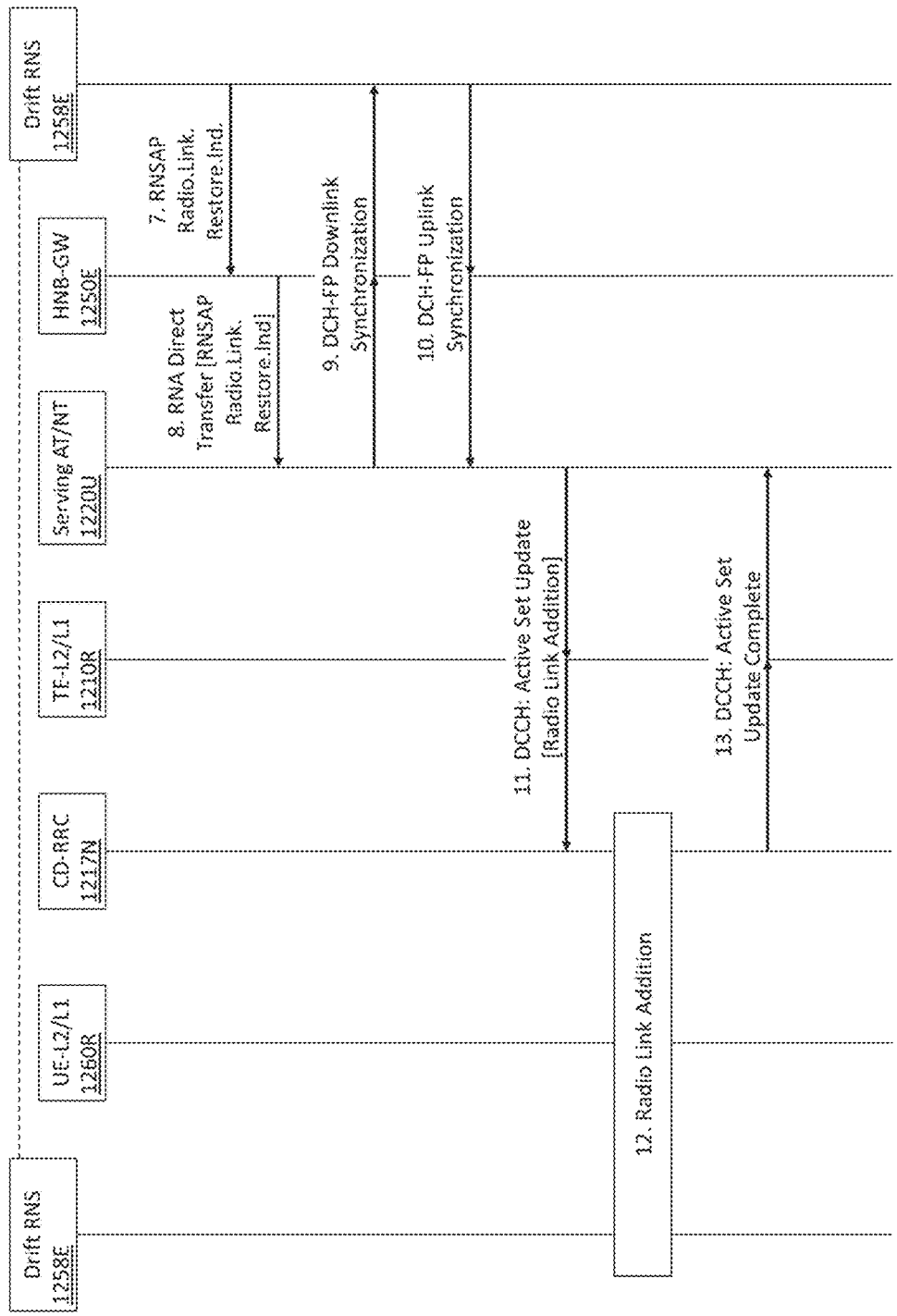
FIG. 36B is the continuation of FIG. 36A.
Figure 37A:
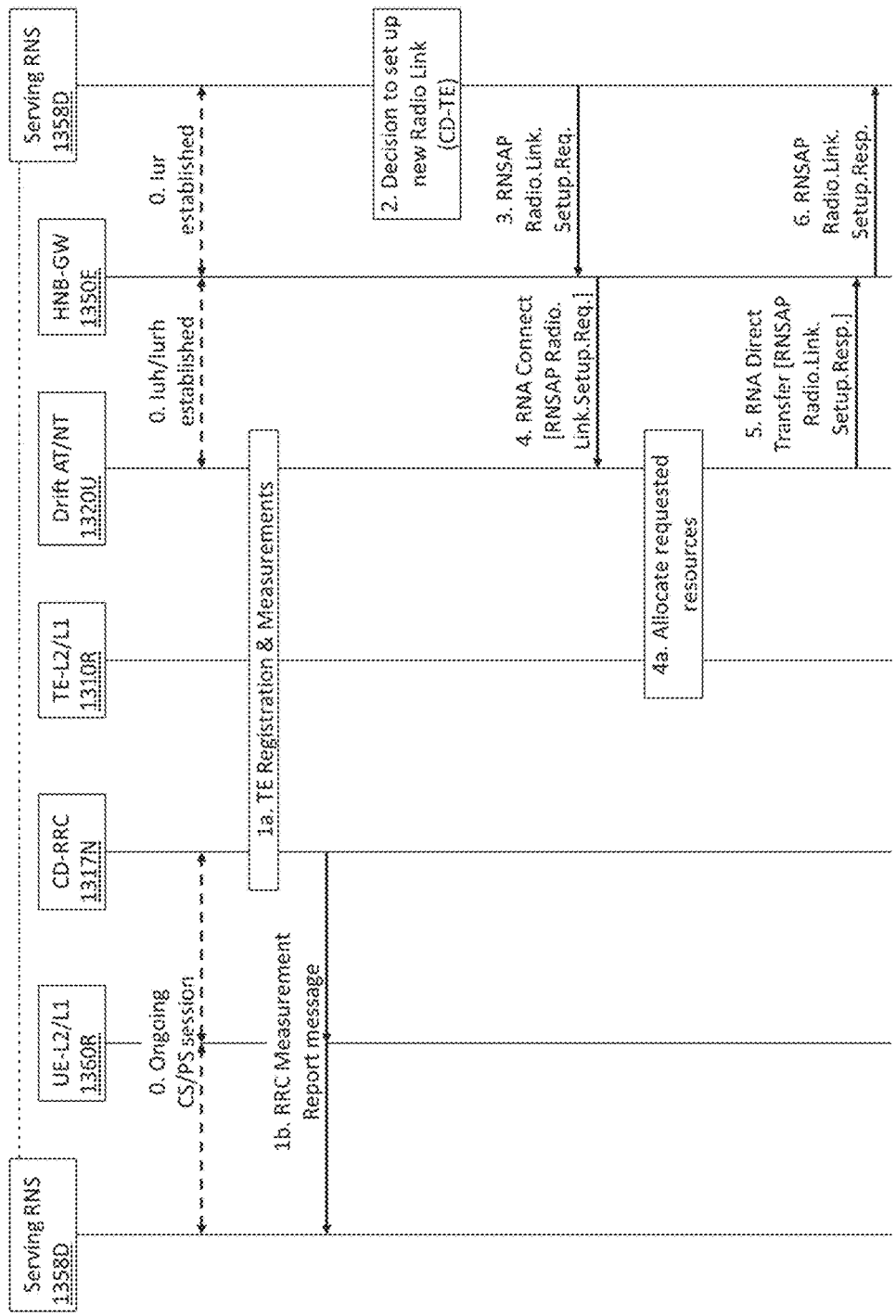
FIG. 37A illustrates the CD C-Plane Message Sequence Chart for Inbound SHO, in some embodiments.
Figure 37B:
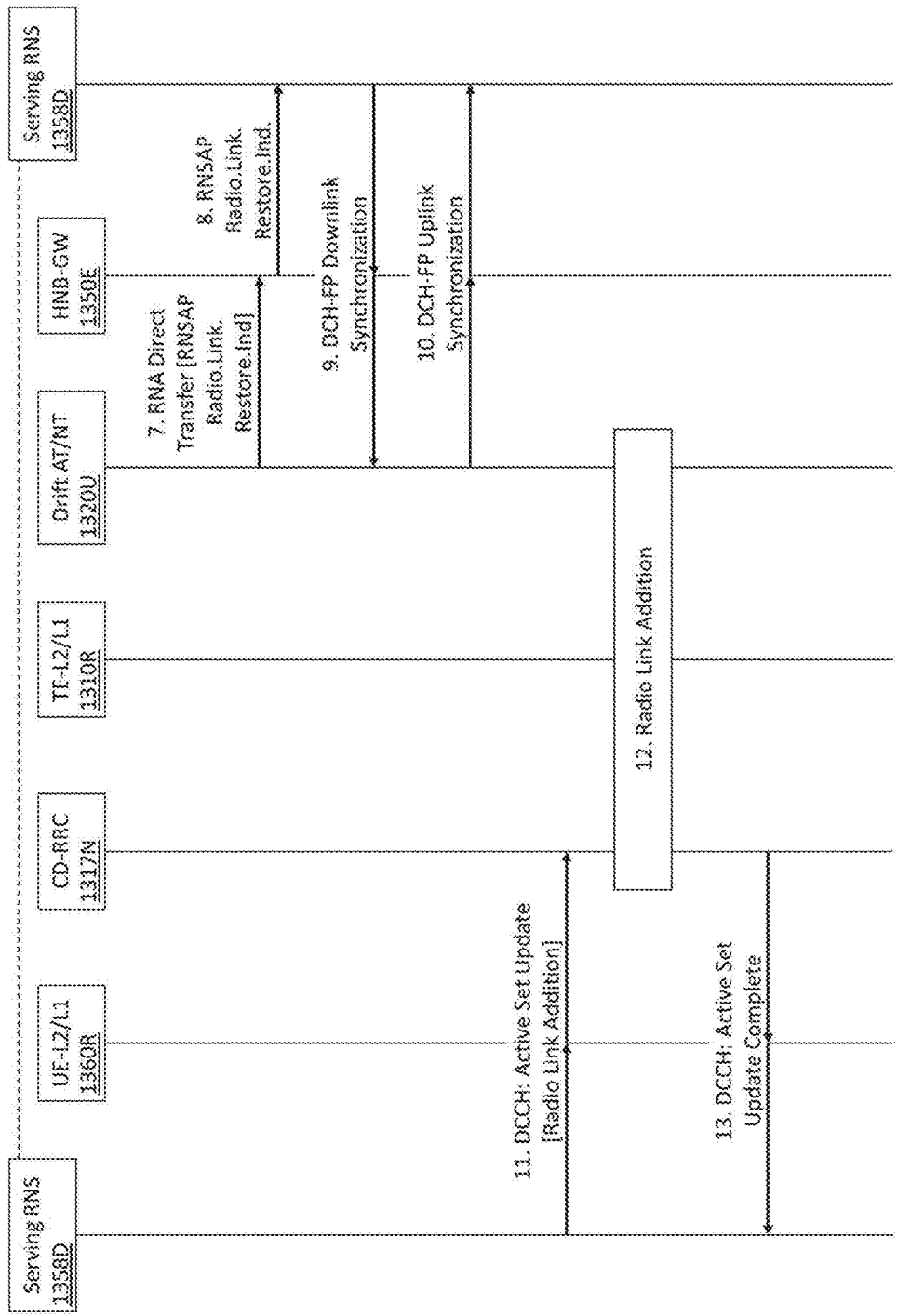
FIG. 37B is the continuation of FIG. 37A.

FIG. 25 illustrates a 3rd Generation (3G) Universal Mobile Telecommunications System (UMTS) network logical architecture, according to the prior art; FIG. 26 illustrates a 3G UMTS network logical architecture for Communication Device (CD) deployments in some embodiments; FIG. 28 illustrates the trusted environment CD architecture in some embodiments; FIG. 28 illustrates the untrusted environment CD architecture in some embodiments; FIG. 29 illustrates the CD Control Plane (C-Plane) protocol architecture in some embodiments; FIG. 30 illustrates the C-Plane Access Manager Entity (AME) architecture & methods in some embodiments; FIG. 31 illustrates the CD User Plane (U-Plane) Packet Switched (PS) protocol architecture in some embodiments; FIG. 32 illustrates the CD User Plane (U-Plane) Circuit Switched (CS) protocol architecture in some embodiments; FIG. 33 illustrates the U-Plane AME architecture & methods in some embodiments; FIG. 34A illustrates the CD C-Plane Message Sequence Chart for Outbound Hard Hand-Over (HHO) with Enhanced Serving Radio Network Subsystem (SRNS) Relocation, in some embodiments; FIG. 34B is the continuation of FIG. 34A; FIG. 35A illustrates the CD C-Plane Message Sequence Chart for Inbound HHO with Enhanced SRNS Relocation, in some embodiments; FIG. 35B is the continuation of FIG. 35A; FIG. 36A illustrates the CD C-Plane Message Sequence Chart for Outbound Soft Hand-Over (SHO), in some embodiments; FIG. 36B is the continuation of FIG. 36A; FIG. 37A illustrates the CD C-Plane Message Sequence Chart for Inbound SHO, in some embodiments; FIG. 37B is the continuation of FIG. 37A; FIG. 38A shows a table of abbreviations and terms used in the present patent application; FIG. 38B is the continuation of FIG. 38A.

In the following paragraphs, the present system will be described in detail by way of example with reference to the attached drawings. Throughout this description, the preferred embodiment and examples shown should be considered as exemplars, rather than as limitations on the present system. As used herein, the "present system" refers to any one of the embodiments of the invention described herein, and any equivalents. Furthermore, reference to various feature(s) of the "present system" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 illustrates a 3rd Generation (3G) Universal Mobile Telecommunications System (UMTS) network logical architecture, according to the prior art.

In order to avoid over complicating the description, the meaning and/or definition of each term or abbreviation is given only for the 1st encounter in the Detailed-Description section of the present patent application. As a convenience to the reader, a glossary table of the non-standard abbreviations and terms is provided in FIG. 38A and FIG. 38B and the reader can usefully refer to this glossary.

The present patent application refers to several 3rd Generation Partnership Project (3GPP) Specifications. Unless otherwise specified all references refer to 3GPP Release 11 (Rel-11) Specifications.

The figure includes several 3GPP User Equipment (UE) located in various environments according to the UE Location scale: (1) The UE1 160G, typically located indoors, which can handover between two Home Node-B (HNB), the HNB1 130C and the HNB2 130D; (2) the UE2 160H, typically located in an urban area, which can handover between a HNB and a Node-B, the HNB2 130D and the Node-B1 156G respectively; (3) the UE3 160I, typically located in a rural area, which can handover between two Node-Bs, the Node-B1 156G and the Node-B2 156H; and (4) the UE4 160J, typically roaming between Public Land Mobile Networks (PLMNs), which can handover between two Node-Bs, the Node-B2 156H and the Node-B3 156I.

The figure also includes several 3GPP entities used for interconnection between the various UEs and the appropriate 3GPP Core Networks (CNs); (1) A Home Node-B Gateway (HNB-GW), the HNB-GW 150A, interconnecting the HNB1 130C and the HNB2 130D with a Home PLMN CN (HPLMN CN), the HPLMN CN 153C; (2) a Radio Network Controller (RNC), the RNC1 158G, interconnecting the Node-B1 156G with the HPLMN CN 153C; (3) the RNC2 158H, interconnecting the Node-B2 156H with the HPLMN CN 153C; and (4) the RNC3 158I, interconnecting the Node-B3 156I with a Visited PLMN CN (VPLMN CN), the VPLMN CN 153D. It should be apparent to any person skilled in the art that in order to improve the readability of the figure, the following entities are not shown: (1) The Local Gateway (L-GW); (2) the Security Gateway (SeGW); and (3) the HNB Management System (HMS). It should be apparent to any person skilled in the art that Inter HNB-GW mobility is not supported in the 3GPP Rel-11 specifications, therefore only a single HNB-GW, the HNB-GW 150A, is shown in the figure, however the apparatus and methods described in the present patent application are applicable to inter HNB-GW mobility when such mobility will be defined in future 3GPP specifications.

The HPLMN CN 153C and its associated entities provide services for the HPLMN Service Area 153E. The VPLMN CN 153D and its associated entities provide services for the VPLMN Service Area 153F. It should be apparent to any person skilled in the art that the VPLMN Service Area 153F can comprise the same entities as the HPLMN Service Area 153E, however in order to simplify the drawing, only a single Node-B and a single RNC are shown.

The roaming scenarios comprise of the following: (1) The non-overlapping case, shown in the figure, wherein the HPLMN Service Area 153E and the VPLMN Service Area 153F are non-overlapping, e.g. International Roaming; and (2) The overlapping case (Not shown) wherein the HPLMN Service Area 153E and the VPLMN Service Area 153F are either partially or fully overlapping, e.g. National Roaming.

The handover services between described PLMNs are dependent upon the following: (1) A mutual agreement between the operators involved; and (2) the ability of a roaming UE, the UE4 160J, to simultaneously establish a User-to-user (Vu), the Uu Air Interface 190, with both the Node-B2 156H in the HPLMN Service Area 153E, and the Node-B3 156I in the VPLMN Service Area 153F.

The figure also includes interfaces as described in the 3GPP Specifications: (1) The Uu Air Interface 190 between each HNB and plurality of UEs; (2) the Uu Air Interface 190 between each Node-B and plurality of UEs; (3) the Iurh Interface 193E among the plurality of HNBs belonging to the same HNB-GW; (4) the Iurh Interface 193E between the HNB-GW 150A and plurality of HNBs; (5) the Iuh Interface 193 between the HNB-GW 150A and plurality of HNBs; (6) the Iub Interface 195 between each RNC and plurality of Node-Bs; (7) the Iur Interface 194E among the plurality of RNCs belonging to the HPLMN CN 153C; (8) the Iu Interface 194 between the HPLMN CN 153C and plurality of HNB-GWs; (9) the Iu Interface 194 between the HPLMN CN 153C and plurality of RNCs; (10) the Iu Interface 194 between the VPLMN CN 153D and plurality of RNCs; and (11) the Inter PLMN Backbone 194F between the HPLMN CN 153C and the VPLMN CN 153D.

It should be apparent to any person skilled in the art that in order to simplify this figure and its description, each entity having plurality of members is represented by the members needed for the explanation of the following mobility scenarios.

Mobility scenarios. It should be apparent to any person skilled in the art that Hard Hand-Over (HHO) and Relocation/Enhanced-Relocation procedures can be either separated or combined, and the appropriate procedure is described in the 3GPP specifications.

A: Intra HNB-GW mobility.

The case in which the Iurh Interface 193E is available. The UE1 160G mobility between the HNB1 130C and the HNB2 130D, as described in the 3GPP specifications, comprised of the following procedures: (1) Soft Hand-Over (SHO); (2) HHO; (3) Relocation; and (4) Enhanced Relocation. Mobility routing comprised of the following logical/physical links: (1) The UE1 160G to/from the HNB1 130C through the Uu Air Interface 190; (2) the HNB1 130C to/from the HNB-GW 150A over the Iurh Interface 193E; (3) the HNB-GW 150A to/from the HNB2 130D over the Iurh Interface 193E; and (4) the HNB2 130D to/from the UE1 160G through the Uu Air Interface 190. As shown in the figure, links 2 & 3 can be replaced with a single link, wherein the HNB1 130C and the HNB2 130D are connected directly over the Iurh Interface 193E.

The case in which the Iurh Interface 193E is unavailable. The UE1 160G mobility between the HNB1 130C and the HNB2 130D, as described in the 3GPP specifications, comprised of the following procedures: (1) HHO; and (2) Relocation. Mobility routing comprised of the following logical/physical links: (1) The UE1 160G to/from the HNB1 130C through the Uu Air Interface 190; (2) the HNB1 130C to/from the HNB-GW 150A over the Iuh Interface 193; (3) the HNB-GW 150A to/from the HNB2 130D over the Iuh Interface 193; and (4) the HNB2 130D to/from the UE1 160G through the Uu Air Interface 190.

B: Inter Radio Network Subsystem (RNS) mobility, wherein RNS comprised of a HNB and a HNB-GW, or wherein RNS comprised of a Node-B and a RNC. It should be apparent to any person skilled in the art that RNS comprised of a HNB and a HNB-GW, is also known as HNB Subsystem (HNS).

The case in which the Iurh Interface 193E and the Iur Interface 194E are available. The UE2 160H mobility between the HNB2 130D and the Node-B1 156G, as described in the 3GPP specifications, comprised of the following procedures: (1) SHO; (2) HHO; (3) Relocation; and (4) Enhanced Relocation. Mobility routing comprised of the following logical/physical links: (1) The UE2 160H to/from the HNB2 130D through the Uu Air Interface 190; (2) the HNB2 130D to/from the HNB-GW 150A over the Iurh Interface 193E; (3) the HNB-GW 150A to/from the RNC1 158G over the Iur Interface 194E; (4) the RNC1 158G to/from the Node-B1 156G over the Iub Interface 195; and (5) the Node-B1 156G to/from the UE2 160H through the Uu Air Interface 190.

The case in which the Iur Interface 194E is available. The UE3 160I mobility between the Node-B1 156G and the Node-B2 156H, as described in the 3GPP specifications, comprised of the following procedures: (1) SHO; (2) HHO; (3) Relocation; and (4) Enhanced Relocation. Mobility routing comprised of the following logical/physical links: (1) The UE3 160I to/from the Node-B1 156G through the Uu Air Interface 190; (2) the Node-B1 156G to/from the RNC1 158G over the Iub Interface 195; (3) the RNC1 158G to/from the RNC2 158H over the Iur Interface 194E; (4) the RNC2 158H to/from the Node-B2 156H over the Iub Interface 195; and (5) the Node-B2 156H to/from the UE3 160I through the Uu Air Interface 190.

C: Intra HPLMN CN Mobility.

The case in which the Iurh Interface 193E or the Iur Interface 194E are unavailable. The UE2 160H mobility between the HNB2 130D and the Node-B1 156G, as described in the 3GPP specifications, comprised of the following procedures: (1) HHO; and (2) Relocation. Mobility routing comprised of the following logical/physical links: (1) The UE2 160H to/from the HNB2 130D through the Uu Air Interface 190; (2) the HNB2 130D to/from the HNB-GW 150A over the Iuh Interface 193; (3) the HNB-GW 150A to/from the HPLMN CN 153C over the Iu Interface 194; (4) The HPLMN CN 153C to/from the RNC1 158G over the Iu Interface 194; (5) the RNC1 158G to/from the Node-B1 156G over the Iub Interface 195; and (6) the Node-B1 156G to/from the UE2 160H through the Uu Air Interface 190.

The case in which the Iur Interface 194E is unavailable. The UE3 160I mobility between the Node-B1 156G and the Node-B2 156H, as described in the 3GPP specifications, comprised of the following procedures: (1) HHO; and (2) Relocation. Mobility routing comprised of the following logical/physical links: (1) The UE3 160I to/from the Node-B1 156G through the Uu Air Interface 190; (2) the Node-B1 156G to/from the RNC1 158G over the Iub Interface 195; (3) the RNC1 158G to/from the HPLMN CN 153C over the Iu Interface 194; (4) the HPLMN CN 153C to/from the RNC2 158H over the Iu Interface 194; (5) the RNC2 158H to/from the Node-B2 156H over the Iub Interface 195; and (6) the Node-B2 156H to/from the UE3 160I through the Uu Air Interface 190.

D: Inter PLMN mobility, wherein the entities within the PLMN CN are not shown in the figure for the clarity of the drawing. It should be apparent to any person skilled in the art that an Iur interface is unavailable between two entities belonging to different PLMNs, therefore SHO & Enhanced Relocation are not supported between two PLMNs. Only HHO & Relocation are supported.

The UE2 160H mobility between the HNB2 130D and the Node-B3 156I, as described in the 3GPP specifications, comprised of the following procedures: (1) HHO; and (2) Relocation. Mobility routing comprised of the following logical/physical links: (1) The UE2 160H to/from the HNB2 130D through the Uu Air Interface 190; (2) the HNB2 130D to/from the HNB-GW 150A over the Iuh Interface 193; (3) the HNB-GW 150A to/from the HPLMN CN 153C over the Iu Interface 194; (4) the HPLMN CN 153C to/from the VPLMN CN 153D through the Inter PLMN Backbone 194F; (5) the VPLMN CN 153D to/from the RNC3 158I over the Iu Interface 194; (6) the RNC3 158I to/from the Node-B3 156I over the Iub Interface 195; and (7) the Node-B3 156I to/from the UE2 160H through the Uu Air Interface 190. It should be apparent to any person skilled in the art that the PLMN CNs comprised of Packet Switched and/or Circuit Switched (PS/CS) domain elements which participate in the routing, however not shown in the figure.

The UE4 160J mobility between the Node-B2 156H and the Node-B3 156I, as described in the 3GPP specifications, comprised of the following procedures: (1) HHO; and (2) Relocation. Mobility routing comprised of the following logical/physical links: (1) The UE4 160J to/from the Node-B2 156H through the Uu Air Interface 190; (2) the Node-B2 156H to/from the RNC2 158H over the Iub Interface 195; (3) the RNC2 158H to/from the HPLMN CN 153C over the Iu Interface 194; (4) the HPLMN CN 153C to/from the VPLMN CN 153D through the Inter PLMN Backbone 194F; (5) the VPLMN CN 153D to/from the RNC3 158I over the Iu Interface 194; (6) the RNC3 158I to/from the Node-B3 156I over the Iub Interface 195; and (7) the Node-B3 156I to/from the UE4 160J through the Uu Air Interface 190. It should be apparent to any person skilled in the art that the PLMN CNs comprised of PS/CS domain elements which participate in the routing, however not shown in the figure.

It should be apparent to any person skilled in the art that the telecommunication system, as described in the present patent application, is operating according to the 3GPP UMTS Network Specifications, also known as the 3G network standards, comprising a UMTS Terrestrial Radio Access Network (UTRAN) and a 3G CN. However with the appropriate changes as described in 3GPP Technical Report (TR), the TR 23.830 and further described in 3GPP Technical Specifications (TS), the TS 36.300 and the TS 37.803, the telecommunication system operates according to the 3GPP Long Term Evolution (LTE) Network Specifications, also known as the 4th Generation (4G) network standards, comprising an Evolved UTRAN (E-UTRAN) and a 4G CN.

Network Elements.

A: UE

The UE is a 3GPP device communicating with the UTRAN using licensed spectrum of a Mobile Network Operator (MNO). The UE is used to access services of the MNO via the Node-B or the HNB of the UTRAN utilizing the Uu Air Interface 190. The handovers of each of the UEs are done in accordance with the 3GPP Specifications. The UEs as described operate in a single mode supporting one cellular standard, either the 3G standard or the 4G standard, however in another embodiment they operate in a multimode, supporting both standards. It should be apparent to any person skilled in the art that the UEs as described have the same functionalities and can exchange their places. Depending on the current geographical location of the UE4 160J, the connection can be established to either the HPLMN CN 153C in the HPLMN Service Area 153E or to the VPLMN CN 153D in the VPLMN Service Area 153F during roaming.

B: Node-B

The Node-B is an UTRAN Access Point (AP) providing the Uu Air Interface 190 long range connectivity for plurality of UEs. The Node-B is managed and operated by the MNO. The Node-B has to provide service to a large number of UEs and must do so without losing connectivity over large service coverage regions. Accordingly, the MNO deploys the Node-Bs with overlapping service coverage regions, in order to create an uninterrupted service coverage region, wherein the overlapping service coverage regions are used to trigger the handover procedures. The functions of the Node-B comprise: (1) Air Interface transmission/reception; (2) modulation/demodulation; (3) physical channel coding; (4) micro diversity; (5) error handing; and (6) closed loop power control. In general a detailed description of the Node-B is outside the scope of the present patent application, however specific details are given where applicable.

C: RNC

The RNC is a controlling element in the UTRAN and is responsible for controlling plurality of the Node-Bs that are connected to the RNC over the Iub Interface 195. The RNC is connected to the CN over the Iu Interface 194 as described in the 3GPP Specifications, which comprises sub-interfaces: (1) An Iu-CS Interface (not shown) connecting the RNC to the CS domain of the CN via the Mobile Switching Center (MSC) and the Media Gateway (MGW); and (2) an Iu-P S Interface (not shown) connecting the RNC to the PS domain of the CN via the Serving GPRS Support Node (SGSN). The functions of RNC comprise: (1) Radio Resource Control (RRC) management; (2) admission control; (3) channel allocation; (4) power control settings; (5) handover control; (6) macro diversity; (7) ciphering; (8) segmentation or reassembly; (9) broadcast signaling; and (10) open loop power control. In general a detailed description of the RNC is outside the scope of the present patent application, however specific details are given where applicable.

As described above, the RNS entity is comprised of a Node-B and a RNC. The RNS functionalities are comprised of the following: (1) a Target RNS as described in the 3GPP specifications, the Target RNS 1058C, as described with reference to FIG. 34A & FIG. 34B; (2) a Source RNS as described in the 3GPP specifications, the Source RNS 1158B, as described with reference to FIG. 35A & FIG. 35B; (3) a Drift Radio Network Subsystem (DRNS) as described in the 3GPP specifications, the DRNS 1258E, as described with reference to FIG. 36A & FIG. 36B; and (4) a Serving Radio Network Subsystem (SRNS) as described in the 3GPP specifications, the SRNS 1358D, as described with reference to FIG. 37A & FIG. 37B.

D: CN

As described in the 3GPP TR 21.905, the CN is an architectural term relating to the part of 3GPP System which is independent of the access technology of the UEs. The functions of the CN comprise: (1) Aggregation of calls; (2) authentication of UEs and CDs; (3) call control and switching; (4) charging; (5) service invocation; (6) gateways to other service providers; (7) Operation and Maintenance (O&M); and (8) subscriber database. In general a detailed description of the CN is outside the scope of the present patent application, however specific details are given where applicable.

E: HNB

The HNB is an UTRAN AP providing the Uu Air Interface 190 short range connectivity for plurality of UEs. The HNB is managed and operated by the MNO. The HNB differs from the Node-B in the following aspects: (1) the HNB is a low power short range device, servicing few UEs in a small service coverage region, as opposed to the Node-B which is a high power long range device, servicing many UEs in a large service coverage region; (2) the service coverage region established by the HNB does not need to be adjacent to any other HNB service coverage region, as opposed to the requirements for the Node-Bs; (3) the HNB can be deployed on an ad hoc basis based on user's needs, wherein the operating parameters are configured automatically by a Self-Organized Network (SON) system, as opposed to the deployment of the Node-Bs which requires pre-planning and manual configuration by the MNO; (4) the HNB is using the Broadband Internet Protocol Network (IP Network), as the backhaul means towards the CN, as opposed to the Node-B which is using a dedicated backhaul means towards the CN; and (5) the HNB functions comprise the Node-B functions and part of the RNC functions. In some embodiments, the HNB is equipped with a Universal Subscriber Identity Module (USIM) hosted by a Universal Integrated Circuit Card (UICC), which is used for Hosting Party (HP) authentication as described in the 3GPP TS 33.320.

F: HNB-GW

The HNB-GW and the SeGW are two logical entities of the MNO's network. It should be apparent to any person skilled in the art that these entities can be implemented and deployed as one physical device as in this figure, or as separate physical devices. The functions of the HNB-GW comprise: (1) Establishing secured communication channels with the UEs; (2) protecting CN entities against threats coming from the untrusted Broadband IP Network; (3) supporting the HNB registration and the UEs registration; (4) aggregation of UEs and HNBs; and (5) error handling. It should be apparent to any person skilled in the art that the HNB-GW functions also comprise part of the RNC functions. The HNB-GW and the CN are communicating over the Iu Interface 194.

FIG. 25 illustrates a 3G UMTS network logical architecture for Communication Device (CD) deployments in some embodiments.

The figure includes several CDs located in various environments according to the CD Location scale: (1) The CD1 270G, typically located either indoors or in an Urban environment, which can handover between a HNB and a Node-B, the HNB1 230C and the Node-B1 256G respectively; (2) the CD2 270H, typically located in a rural area, which can handover between two Node-Bs, the Node-B1 256G and the Node-B2 256H; and (3) the CD3 270I, typically roaming between PLMNs, which can handover between two Node-Bs, the Node-B2 256H and the Node-B3 256I.

In addition to handovers between two 3GPP APs as described with reference to FIG. 25, each of the described CDs can also handover between a 3GPP AP and a Non-3GPP AP as described later in this figure and with reference to other figures in the present patent application.

The figure also includes several 3GPP entities used to interconnect the various CDs with the appropriate 3GPP CNs: (1) A HNB-GW, the HNB-GW 250A, interconnecting the HNB1 230C and the CD1 270G with a HPLMN CN, the HPLMN CN 253C; (2) a RNC, the RNC1 258G, interconnecting the Node-B1 256G with the HPLMN CN 253C; (3) the RNC2 258H, interconnecting the Node-B2 256H with the HPLMN CN 253C; and (4) the RNC3 258I, interconnecting the Node-B3 256I with a VPLMN CN, the VPLMN CN 253D. It should be apparent to any person skilled in the art that in order to improve the readability of the figure, the following entities are not shown: (1) The L-GW; (2) the SeGW; and (3) the HMS. It should be apparent to any person skilled in the art that Inter HNB-GW mobility is not supported in the 3GPP Rel-11 specifications, therefore only a single HNB-GW, the HNB-GW 250A, is shown in the figure, however the apparatus and methods described in the present patent application are applicable to inter HNB-GW mobility when such mobility will be defined in future 3GPP specifications.

The HPLMN CN 253C and its associated entities provide services for the HPLMN Service Area 253E. The VPLMN CN 253D and its associated entities provide services for the VPLMN Service Area 253F. It should be apparent to any person skilled in the art that the VPLMN Service Area 253F can comprise the same entities as the HPLMN Service Area 253E, however in order to simplify the drawing, only a single Node-B and a single RNC are shown.

The roaming scenarios comprise of the following: (1) The non-overlapping case, shown in the figure, wherein the HPLMN Service Area 253E and the VPLMN Service Area 253F are non-overlapping, e.g. International Roaming; and (2) The overlapping case (Not shown) wherein the HPLMN Service Area 253E and the VPLMN Service Area 253F are either partially or fully overlapping, e.g. National Roaming.

The handover services between described PLMNs are dependent upon the following: (1) A mutual agreement between the operators involved; and (2) the ability of the roaming CD, the CD3 270I, to simultaneously establish the Uu Air Interface 290 with both the Node-B2 256H in the HPLMN Service Area 253E, and the Node-B3 256I in the VPLMN Service Area 253F.

The figure also includes interfaces as described in the 3GPP Specifications: (1) The Uu Air Interface 290 between the HNB1 230C and plurality of CDs; (2) the Uu Air Interface 290 between each Node-B and plurality of CDs; (3) the Iurh Interface 293E among plurality of HNBs, and plurality of CDs, belonging to the same HNB-GW; (4) the Iurh Interface 293E between the HNB-GW 250A, plurality of HNBs, and plurality of CDs; (5) the Iuh Interface 293 between the HNB-GW 250A, plurality of HNBs, and plurality of CDs; (6) the Iub Interface 295 between each RNC and plurality of Node-Bs; (7) the Iur Interface 294E among the plurality of RNCs belonging to the HPLMN CN 253C; (8) the Iu Interface 294 between the HPLMN CN 253C and plurality of HNB-GWs; (9) the Iu Interface 294 between the HPLMN CN 253C and plurality of RNCs; (10) the Iu Interface 294 between the VPLMN CN 253D and plurality of RNCs; and (11) the Inter PLMN Backbone 294F between the HPLMN CN 253C and the VPLMN CN 253D.

It should be apparent to any person skilled in the art that in order to simplify this figure and its description, each entity having plurality of members is represented by the members needed for the explanation of the following mobility scenarios.

Mobility Scenarios.

In the following mobility scenarios, the Uu Air Interface 290 is used in a mode of operation hereinafter called the U-Mode. While the CD1 270G is operating in the U-Mode, a common CD Radio Resource Control Layer/Entity (CD-RRC), the Common CD-RRC Layer 517N and a UE Lower Layers (UE-LL), the UE-L2/L1 Entity 560R as described with reference to FIG. 29, which are part of the CD1 270G, performing the functionality of the UE1 160G as described with reference to FIG. 25. It should be apparent to any person skilled in the art that while the CD1 270G is operating in the U-Mode, mobility scenarios for the CD1 270G are the same as the mobility scenarios as described for the UE1 160G with reference to FIG. 25, wherein the CD1 270G is using the Uu Air Interface 290 for mobility between two AP entities which are both external, comprising the following pairs: (1) Node-b/Node-B; (2) HNB/HNB; or (3) Node-B/HNB.

In the following mobility scenarios, either the Iuh Interface 293 or the Iurh Interface 293E are used in a mode of operation hereinafter called the I-Mode. While the CD1 270G is operating in the I-Mode an Access Termination/Network Termination (AT/NT) Protocol Stacks entity, the AT/NT Entity 520U, as described with reference to FIG. 29, which is part of the CD1 270G, performing the functionality of the HNB2 130D as described with reference to FIG. 25. While the CD1 270G is operating in the I-Mode the Common CD-RRC Layer 517N and a Terminal Equipment Protocol Stacks (TE) entity, the TE-L2/L1 Entity 510R as described with reference to FIG. 29, which are part of the CD1 270G, performing the functionality of the UE1 160G, as described with reference to FIG. 25. While the CD1 270G is operating in the I-Mode, the Ui Interface 591 as described with reference to FIG. 29, which is part of the CD1 270G, performing the functionality of the Uu Air Interface 190, as described with reference to FIG. 25. The Ui Interface 591 is further described in Provisional Patent Application 61/768, 239 filed on 22 Feb. 2013.

As described with reference to FIG. 29, the Ui Interface 591 is a Point to Point (PTP) interface, therefore there are no mobility scenarios which involves the operation of the I-Mode only. Mobility scenarios involving operation of the I-Mode also involve operation of the U-Mode, wherein the mobility is done between the CD's internal AP i.e. the AT/NT Entity 520U, and an external AP i.e. a Node-B or a HNB.

It should be apparent to any person skilled in the art that in the following mobility scenarios, the HHO and Relocation/Enhanced-Relocation procedures can be either separated or combined, and the appropriate procedure is described in the 3GPP specifications.

A: Intra HNB-GW Mobility.

The case in which the Iurh Interface 293E is available. The mobility between the HNB1 230C and the internal AT/NT Protocol Stacks of the CD1 270G, as described in the 3GPP specifications, comprised of the following procedures: (1) SHO; (2) HHO; (3) Relocation; and (4) Enhanced Relocation. Mobility routing comprised of the following logical/physical links: (1) The internal UE Protocol Stacks of the CD1 270G to/from the HNB1 230C through the Uu Air Interface 290; (2) the HNB1 230C to/from the HNB-GW 250A over the Iurh Interface 293E; (3) the HNB-GW 250A to/from the internal AT/NT Protocol Stacks of the CD1 270G over the Iurh Interface 293E; and (4) the internal AT/NT Protocol Stacks of the CD1 270G to/from the internal UE Protocol Stacks of the CD1 270G using the CD's internal mechanism as described with reference to FIG. 29 & FIG. 28. As shown in the figure, links 2 & 3 can be replaced with a single link, wherein the HNB1 230C and the internal AT/NT Protocol Stacks of the CD1 270G are connected directly over the Iurh Interface 293E.

The case in which the Iurh Interface 293E is unavailable. The mobility between the HNB1 230C and the internal AT/NT Protocol Stacks of the CD1 270G, as described in the 3GPP specifications, comprised of the following procedures: (1) HHO; and (2) Relocation. Mobility routing comprised of the following logical/physical links: (1) The internal UE Protocol Stacks of the CD1 270G to/from the HNB1 230C through the Uu Air Interface 290; (2) the HNB1 230C to/from the HNB-GW 250A over the Iuh Interface 293; (3) the HNB-GW 250A to/from the internal AT/NT Protocol Stacks of the CD1 270G over the Iuh Interface 293; and (4) the internal AT/NT Protocol Stacks of the CD1 270G to/from the internal UE Protocol Stacks of the CD1 270G using the CD's internal mechanism as described with reference to FIG. 29 & FIG. 28.

B: Inter RNS mobility, wherein RNS comprised of a HNS, or wherein RNS comprised of a Node-B and a RNC.

The Iurh Interface 293E and the Iur Interface 294E are available. The mobility between the internal AT/NT Protocol Stacks of the CD1 270G and the Node-B1 256G, as described in the 3GPP specifications, comprised of the following procedures: (1) SHO; (2) HHO; (3) Relocation; and (4) Enhanced Relocation. Mobility routing comprised of the following logical/physical links: (1) The internal UE Protocol Stacks of the CD1 270G to/from the internal AT/NT Protocol Stacks of the CD1 270G using the CD's internal mechanism as described with reference to FIG. 29 & FIG. 28; (2) the internal AT/NT Protocol Stacks of the CD1 270G to/from the HNB-GW 250A over the Iurh Interface 293E; (3) the HNB-GW 250A to/from the RNC1 258G over the Iur Interface 294E; (4) the RNC1 258G to/from the Node-B1 256G over the Iub Interface 295; and (5) the Node-B1 256G to/from the internal UE Protocol Stacks of the CD1 270G through the Uu Air Interface 290.

The case in which the Iurh Interface 293E and the Iur Interface 294E are available. The mobility between the HNB1 230C and the Node-B1 256G, as described in the 3GPP specifications, comprised of the following procedures: (1) SHO; (2) HHO; (3) Relocation; and (4) Enhanced Relocation. Mobility routing comprised of the following logical/physical links: (1) The internal UE Protocol Stacks of the CD1 270G to/from the HNB1 230C through the Uu Air Interface 290; (2) the HNB1 230C to/from the HNB-GW 250A over the Iurh Interface 293E; (3) the HNB-GW 250A to/from the RNC1 258G over the Iur Interface 294E; (4) the RNC1 258G to/from the Node-B1 256G over the Iub Interface 295; and (5) the Node-B1 256G to/from the internal UE Protocol Stacks of the CD1 270G through the Uu Air Interface 290. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the Access Manager Entity (AME) 592 which operates in a transparent mode, thus degenerating the present system CD into the prior art UE.

The case in which the Iur Interface 294E is available. The mobility between the Node-B1 256G and the Node-B2 256H, as described in the 3GPP specifications, comprised of the following procedures: (1) SHO; (2) HHO; (3) Relocation; and (4) Enhanced Relocation. Mobility routing comprised of the following logical/physical links: (1) The internal UE Protocol Stacks of the CD2 270H to/from the Node-B1 256G through the Uu Air Interface 290; (2) the Node-B1 256G to/from the RNC1 258G over the Iub Interface 295; (3) the RNC1 258G to/from the RNC2 258H over the Iur Interface 294E; (4) the RNC2 258H to/from the Node-B2 256H over the Iub Interface 295; and (5) the Node-B2 256H to/from the internal UE Protocol Stacks of the CD2 270H through the Uu Air Interface 290. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the AME 592 which operates in a transparent mode, thus degenerating the present system CD into the prior art UE.

C: Intra HPLMN CN Mobility.

The case in which the Iurh Interface 293E or the Iur Interface 294E are unavailable. The mobility between the internal AT/NT Protocol Stacks of the CD1 270G and the Node-B1 256G, as described in the 3GPP specifications, comprised of the following procedures: (1) HHO; and (2) Relocation. Mobility routing comprised of the following logical/physical links: (1) The internal UE Protocol Stacks of the CD1 270G to/from the internal AT/NT Protocol Stacks of the CD1 270G using the CD's internal mechanism as described with reference to FIG. 29 & FIG. 28; (2) the internal AT/NT Protocol Stacks of the CD1 270G to/from the HNB-GW 250A over the Iuh Interface 293; (3) the HNB-GW 250A to/from the HPLMN CN 253C over the Iu Interface 294; (4) The HPLMN CN 253C to/from the RNC1 258G over the Iu Interface 294; (5) the RNC1 258G to/from the Node-B1 256G over the Iub Interface 295; and (6) the Node-B1 256G to/from the internal UE Protocol Stacks of the CD1 270G through the Uu Air Interface 290.

The case in which the Iurh Interface 293E or the Iur Interface 294E are unavailable. The mobility between the HNB1 230C and the Node-B1 256G, as described in the 3GPP specifications, comprised of the following procedures: (1) HHO; and (2) Relocation. Mobility routing comprised of the following logical/physical links: (1) The internal UE Protocol Stacks of the CD1 270G to/from the HNB1 230C through the Uu Air Interface 290; (2) the HNB1 230C to/from the HNB-GW 250A over the Iuh Interface 293; (3) the HNB-GW 250A to/from the HPLMN CN 253C over the Iu Interface 294; (4) The HPLMN CN 253C to/from the RNC1 258G over the Iu Interface 294; (5) the RNC1 258G to/from the Node-B1 256G over the Iub Interface 295; and (6) the Node-B1 256G to/from the internal UE Protocol Stacks of the CD1 270G through the Uu Air Interface 290. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the AME 592 which operates in a transparent mode, thus degenerating the present system CD into the prior art UE.

The case in which the Iur Interface 294E is unavailable. The mobility between the Node-B1 256G and the Node-B2 256H, as described in the 3GPP specifications, comprised of the following procedures: (1) HHO; and (2) Relocation. Mobility routing comprised of the following logical/physical links: (1) The internal UE Protocol Stacks of the CD2 270H to/from the Node-B1 256G through the Uu Air Interface 290; (2) the Node-B1 256G to/from the RNC1 258G over the Iub Interface 295; (3) the RNC1 258G to/from the HPLMN CN 253C over the Iu Interface 294; (4) the HPLMN CN 253C to/from the RNC2 258H over the Iu Interface 294; (5) the RNC2 258H to/from the Node-B2 256H over the Iub Interface 295; and (6) the Node-B2 256H to/from the internal UE Protocol Stacks of the CD2 270H through the Uu Air Interface 290. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the AME 592 which operates in a transparent mode, thus degenerating the present system CD into the prior art UE.

D: Inter PLMN mobility, wherein the entities within the PLMN CN are not shown in the figure for the clarity of the drawing. It should be apparent to any person skilled in the art that an Iur interface is unavailable between two entities belonging to different PLMNs, therefore SHO & Enhanced Relocation are not supported between two PLMNs. Only HHO & Relocation are supported.

The mobility between the internal AT/NT Protocol Stacks of the CD1 270G and the Node-B3 256I, as described in the 3GPP specifications, comprised of the following procedures: (1) HHO; and (2) Relocation. Mobility routing comprised of the following logical/physical links: (1) The internal UE Protocol Stacks of the CD1 270G to/from the internal AT/NT Protocol Stacks of the CD1 270G using the CD's internal mechanism as described with reference to FIG. 29 & FIG. 28; (2) the internal AT/NT Protocol Stacks of the CD1 270G to/from the HNB-GW 250A over the Iuh Interface 293; (3) the HNB-GW 250A to/from the HPLMN CN 253C over the Iu Interface 294; (4) the HPLMN CN 253C to/from the VPLMN CN 253D through the Inter PLMN Backbone 294F; (5) the VPLMN CN 253D to/from the RNC3 258I over the Iu Interface 294; (6) the RNC3 258I to/from the Node-B3 256I over the Iub Interface 295; and (7) the Node-B3 256I to/from the internal UE Protocol Stacks of the CD1 270G through the Uu Air Interface 290. It should be apparent to any person skilled in the art that the PLMN CNs comprised of PS/CS domain elements which participate in the routing, however not shown in the figure.

The mobility between the HNB1 230C and the Node-B3 256I, as described in the 3GPP specifications, comprised of the following procedures: (1) HHO; and (2) Relocation. Mobility routing comprised of the following logical/physical links: (1) the internal UE Protocol Stacks of the CD1 270G to/from the HNB1 230C through the Uu Air Interface 290; (2) the HNB1 230C to/from the HNB-GW 250A over the Iuh Interface 293; (3) the HNB-GW 250A to/from the HPLMN CN 253C over the Iu Interface 294; (4) the HPLMN CN 253C to/from the VPLMN CN 253D through the Inter PLMN Backbone 294F; (5) the VPLMN CN 253D to/from the RNC3 258I over the Iu Interface 294; (6) the RNC3 258I to/from the Node-B3 256I over the Iub Interface 295; and (7) the Node-B3 256I to/from the internal UE Protocol Stacks of the CD1 270G through the Uu Air Interface 290. It should be apparent to any person skilled in the art that the PLMN CNs comprised of PS/CS domain elements which participate in the routing, however not shown in the figure. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the AME 592 which operates in a transparent mode, thus degenerating the present system CD into the prior art UE.

The mobility between the Node-B2 256H and the Node-B3 256I as described in the 3GPP specifications, comprised of the following procedures: (1) HHO; and (2) Relocation. Mobility routing comprised of the following logical/physical links: (1) The internal UE Protocol Stacks of the CD3 270I to/from the Node-B2 256H through the Uu Air Interface 290; (2) the Node-B2 256H to/from the RNC2 258H over the Iub Interface 295; (3) the RNC2 258H to/from the HPLMN CN 253C over the Iu Interface 294; (4) the HPLMN CN 253C to/from the VPLMN CN 253D through the Inter PLMN Backbone 294F; (5) the VPLMN CN 253D to/from the RNC3 258I over the Iu Interface 294; (6) the RNC3 258I to/from the Node-B3 256I over the Iub Interface 295; and (7) the Node-B3 256I to/from the internal UE Protocol Stacks of the CD3 270I through the Uu Air Interface 290. It should be apparent to any person skilled in the art that the PLMN CNs comprised of PS/CS domain elements which participate in the routing, however not shown in the figure. With reference to FIG. 29 it can be seen that in this mobility procedure, only the UE-L2/L1 Entity 560R is involved, wherein the TE-L2/L1 Entity 510R, the AT/NT Entity 520U and the Ui Interface 591 are not involved. Therefore it should be apparent to any person skilled in the art that this mobility procedure is the same as the equivalent mobility procedure of the prior art, wherein the difference is the AME 592 which operates in a transparent mode, thus degenerating the present system CD into the prior art UE.

It should be apparent to any person skilled in the art that the telecommunication system, as described in the present patent application, is operating according to the 3GPP UMTS Network Specifications, also known as the 3G network standards, comprising an UTRAN and a 3G CN. However with the appropriate changes as described in the 3GPP TR 23.830 and further described in the 3GPP TS 36.300 and the 3GPP TS 37.803, the telecommunication system operates according to the 3GPP LTE Network Specifications, also known as the 4G network standards, comprising an E-UTRAN and a 4G CN.

Network Elements.

A: CD

The following entities, as described with reference to FIG. 29, which are part of each CD, comprise the functionality of the UE network element, as described with reference to FIG. 1: (1) The Common CD-RRC Layer 517N; (2) the AME 592; (3) the UE-L2/L1 Entity 560R; and (4) the TE-L2/L1 Entity 510R.

The AT/NT Entity 520U, as described with reference to FIG. 29, which is part of each CD, comprises the functionality of the HNB network element, as described with reference to FIG. 25.

The rest of the network elements in this figure are described with reference to FIG. 25.

FIG. 28 illustrates the trusted environment CD architecture in some embodiments.

The figure illustrates a single System on Chip (SoC), I/U-Mode, CD configuration, comprising both a Trusted Execution Environment (TEE) and a Rich Execution Environment (REE), referred to as the CD 370E.

The CD 370E is comprised of the following: (1) The TEE 376B supporting the Common Layers 317Z, the UE-LL Protocol Stacks 360E, and the TE-LL/AT/NT Protocol Stacks 370Z, wherein the TE-LL are the TE Lower Layers; (2) The REE 376A supporting CD's Rich Applications (RAs), the RAs 375A; and (3) an Application Programming Interface (API), the TEE/REE API 374A providing communication means between the TEE 376B and the REE 376A, based on one of the suitable Inter-Process Communication (IPC) methods.

The CD 370E execution environment is divided between two mutually exclusive execution environments, each with its own resources: (1) The TEE 376B; and (2) The REE 376A. The REE 376A has access to the un-trusted resources but cannot access the trusted resources resided in the TEE 376B. The REE 376A and the RAs 375A running on it are considered un-trusted. In some embodiments, this access control is enforced and implemented by physical isolation of the trusted resources from the un-trusted resources, by HW and/or SW means or a combination thereof. The only way for the REE 376A to get access to the trusted resources of the TEE 376B is via the TEE/REE API 374A, e.g. the TEE Client API as described in the GPD_SPE_009 standard. This does not exclude the capability of the REE 376A to pass data buffers to the TEE 376B in a controlled and protected manner and vice versa. In this context, the REE 376A can function as the communication agent between a Trusted Application (TA), the TA 375E, then the TE-LL/AT/NT Protocol Stacks 370Z and the Broadband IP Network (not shown) via the LAN/WLAN ((W)LAN) Adapter 342C.

The structure and implementation of the TE-LL/AT/NT Protocol Stacks 370Z are described in Provisional Patent Application 61/768,239 filed on 22 Feb. 2013.

It should be apparent to any person skilled in the art, that a typical implementation example for the CD 370E is a Smartphone, wherein both the Base-Band Processor and the Application Processor are sharing the SoC 372B.

The figure also includes interfaces as described in the 3GPP Specifications: (1) The Uu Air Interface 390, used in the operation of the U-Mode, between the UE-LL Protocol Stacks 360E and the RNS as described with reference to 290 in FIG. 26; and (2) the Iuh/Iurh Interfaces 393G, used in the operation of the I-Mode, between the NT Protocol Stack and the HNS as described with reference to 293G in FIG. 26, wherein the NT Protocol Stack is part of the TE-LL/AT/NT Protocol Stacks 370Z and communicates with the HNB-GW (not shown) via the (W)LAN Adapter 342C.

The following entities are built on the SoC 372B: (1) The TEE 376B; and (2) the REE 376A.

The TEE 376B is comprised of the following: (1) The TA 375E; (2) the Common Layers 317Z; (3) the UE-LL Protocol Stacks 360E; (4) the TE-LL/AT/NT Protocol Stacks 370Z; (5) the TEE API 374B; (6) a Trusted Operating System (TOS), the TOS 373B, supporting both the UE-LL Protocol Stacks 360E and the TE-LL/AT/NT Protocol Stacks 370Z; (7) the SoC 372B; (8) a HW Root of Trust (HW RoT), the HW RoT 371B for supporting both the UE-LL Protocol Stacks 360E and the TE-LL/AT/NT Protocol Stacks 370Z; and (9) a UICC hosting an International Mobile Subscriber Identity (IMSI), the UICC 343G.

The REE 376A is comprised of the following: (1) The plurality of the RAs 375A; (2) a Rich Operating System (ROS), the ROS 373A; (3) the SoC 372B; and (4) the (W)LAN Adapter 342C. It should be apparent to any person skilled in the art, that this component can be implemented as either an integral component of the SoC 372B or as a separate element dependent on the SoC 372B design. The figure does not show the HW components of the (W)LAN Adapter 342C used for communication with the (W)LAN (not shown), however it should be apparent to any person skilled in the art that those components are integral part of the CD 370E.

The Common Layers 317Z are comprised of the following: (1) A Non Access Stratum (NAS), the NAS Layer 519N, the Common CD-RRC Layer 517N and the AME 592 as described with reference to FIG. 29; (2) the PS Application Layer 719P e.g. a browser, and a Packet Data Convergence Protocol (PDCP), the Common CD-PDCP Layer 716P as described with reference to FIG. 31; and (3) the CS Application Layer 819Q e.g. Phone/Fax applications and e.g. an Adaptive Multi-Rate (AMR) audio codec, as described with reference to FIG. 32.

The UE-LL Protocol Stacks 360E are comprised of the following: (1) A Control Plane (C-Plane) Lower Layers Protocol Stack, the UE-L2/L1 Entity 560R, as described with reference to FIG. 29; (2) a User Plane (U-Plane) PS Lower Layers Protocol Stack, the UE-L2/L1 Entity 760S, as described with reference to FIG. 31; and (3) a U-Plane CS Lower Layers Protocol Stack, the UE-L2/L1 Entity 860T, as described with reference to FIG. 32.

The TE-LL/AT/NT Protocol Stacks 370Z are comprised of the following: (1) C-Plane entities as described with reference to FIG. 29: (a) The TE-L2/L1 Entity 510R; and (b) the AT/NT Entity 520U; (2) U-Plane PS entities as described with reference to FIG. 31: (a) The TE-L2/L1 Entity 710S; and (b) the AT/NT Entity 720V; and (3) U-Plane PS entities as described with reference to FIG. 32: (a) The TE-L2/L1 Entity 810T; and (b) the AT/NT Entity 820W.

As described in the GlobalPlatform GPD_SPE_009 standard, the TEE is an execution environment that runs alongside but isolated from the REE. The TEE has security capabilities and meets certain security-related requirements, for supporting a single or multiple trusted applications: (1) It protects TEE assets from general software attacks; (2) defines rigid safeguards as to data and functions that a trusted application can access; and (3) resists a set of described threats. The isolation of the TEE from the REE can be achieved by either HW or SW means, or a combination thereof, however this aspect is out of the scope of the present patent application. The CD 370E is using the security mechanisms and requirements which are described in the 3GPP TS 33.320 and comprises the TEE 376B and the HW RoT 371B. It should be apparent to any person skilled in the art, that there are multiple security technologies created by different standard bodies that can be used to implement the TEE 376B and/or the HW RoT 371B, e.g. the following non-exhaustive examples: (1) The ISO-11889 standards by the International Organization for Standardization/International Electrotechnical Commission (ISO/IEC) in cooperation with the Trusted Computing Group (TCG), regarding the Trusted Platform Module (TPM); and (2) an Open Mobile Terminal Platform (OMTP) standard, the OMTP TR1, regarding the TEE.

The HW RoT 371B is a component that enables trust in computing platforms. The HW RoT 371B comprises the following: (1) Authentication keys storage for one or more entities, e.g. the NT Protocol Stack which is part of the AT/NT Entity 520U as described with reference to FIG. 29, wherein the authentication keys are used for platform authentication; and (2) a cryptographic engine for the TEE comprising a Random Number Generator (RNG) and a HW accelerator for ciphering/de-ciphering computations. It should be apparent to any person skilled in the art that if more than one entity is using the services provided by the HW RoT 371B, then due to security requirements, these entities are isolated from each other. In some embodiments, the HW RoT 371B is implemented as a stand-alone HW component, e.g. the TPM specified by the TCG. In other embodiments, the HW RoT 371B is implemented as an integral component of the SoC on which the TEE is built, e.g. TrustZone® System Security by ARM®.

The REE 376A is governed by the ROS 373A, potentially in conjunction with other supporting operating systems and hypervisors. The ROS 373A is an Operating System (OS) with a rich capability set that allows consumers to install and run the RAs 375A. The following list comprises non-exhaustive examples for the ROS 373A: Android™, Linux®, Symbian OS™, and Microsoft® Windows® Phone 7.

The TOS 373B, in conjunction with the HW RoT 371B, provide unique functionalities which are not provided by the ROS 373A. The TOS 373B functionalities comprise: (1) Maintaining the integrity of the TEE 376B by managing the data in such a manner that it can be altered or moved only by entities having appropriate and authorized access rights; and (2) Maintaining the security of the TEE 376B that it can be viewed only by entities having appropriate access rights authorization.

The TEE API 374B is used by both the UE-LL Protocol Stacks 360E and the TE-LL/AT/NT Protocol Stacks 370Z for communicating with the TOS 373B. The TEE API 374B also provides a number of different sub-sets of functionalities to the UE-LL Protocol Stacks 360E, the TE-LL/AT/NT Protocol Stacks 370Z and the TA 375E e.g.: (1) integration, scheduling, communication, memory management, and system information retrieval interfaces; (2) trusted storage for keys and general data; and (3) cryptographic capabilities, as described in the GPD_SPE_009 standard.

The UICC 343G comprises an IMSI and a USIM application (not shown) for supporting the following: (1) The TA 375E; (2) the UE-LL Protocol Stacks 360E, for Security and Authentication procedures, as described in the 3GPP specifications; (3) the TE-LL Protocol Stacks, which are part of the TE-LL/AT/NT Protocol Stacks 370Z, for Security and Authentication procedures, as described in the 3GPP specifications; and (4) optionally, the NT Protocol Stacks, which are part of the TE-LL/AT/NT Protocol Stacks 370Z, for HP Authentication as described in TS 33.320. It should be apparent to any person skilled in the art that if HP Authentication is required, than the UICC 343G becomes a Dual IMSI UICC, wherein the 2nd IMSI is used for the HP Authentication. It should be apparent to any person skilled in the art that In case the (W)LAN Adapter 342C is operating in accordance with one of the Wireless Local Area Network (WLAN) standards requiring an IMSI, e.g. the Passpoint (Hotspot 2.0), then the WLAN IMSI is either the same IMSI as the UE/TE IMSI, or a different IMSI, according to MNO policy. The USIM application is hosted by the UICC 343G. The USIM application performs security procedures and securely store the IMSI, authentication and ciphering information for the entities described above. Credentials for the entities comprising the CD 370E, and using the CN services, are dependent on the MNO policy. In the prior art there is a mechanism in the USIM application which enables the MNO to distinguish between a UE and a HNB. In the present patent application the same mechanism is used to distinguish among a UE, a HNB and the CD 370E. This mechanism allows the MNO to activate the policy in which location requirement is nullified, when the CD 370E is operating in the I-Mode.

The TE-LL/AT/NT Protocol Stacks 370Z operating in the I-Mode, communicate with the MNO network (not shown) via the Internet Protocol security Encapsulating Security Payload (IPsec ESP) Secured Tunnel through the Broadband IP Network (not shown). In other embodiments another security protocol can be used.

The (W)LAN Adapter 342C provides wired/wireless communication between the CD 370E and the CN (not shown) over the Iuh/Iurh Interfaces 393G. In some embodiments the (W)LAN Adapter 342C operates in the wireless mode and is comprised of the WLAN Protocol Stacks 540G as described with reference to FIG. 29.

In some embodiments, the TA 375E together with the Common Layers 317Z and the UE-LL Protocol Stacks 360E represent a prior art UE SW e.g. a Smartphone SW. The figure does not show the HW components associated with the UE-LL Protocol Stacks 360E, however it should be apparent to any person skilled in the art that those components are integral part of the CD 370E. In the operation of the I-Mode, the TE-LL/AT/NT Protocol Stacks 370Z are connected to the MNO network over the Iuh/Iurh Interfaces 393G. In the operation of the U-Mode, the UE-LL Protocol Stacks 360E are connected to the MNO network through the Uu Air Interface 390. In some embodiments, the CD 370E is operating according to the Frequency Division Duplex (FDD) mode, in accordance with the 3GPP 3G specifications or the LTE-FDD specifications or both. The TE and AT which are part of the TE-LL/AT/NT Protocol Stacks 370Z do not have a radio, therefore frequency synchronization with the UE-LL Protocol Stacks 360E is not required. In other embodiments the CD 370E is operating according to the Time Division Duplex (TDD) mode, in accordance with the 3GPP LTE-TDD specifications. Transmit/Receive phase synchronization information for the TE and AT are provided by the UE-LL Protocol Stacks 360E. The AME 592 as described with reference to FIG. 29, which is part of the Common Layers 317Z, is responsible to control the CD 370E mode of operation, either the I-Mode, or the U-Mode according to the requirements. Upon the requirements, mobility between the I-Mode and the U-Mode can be activated, which enables a Seamless Session Transfer (SST), as described in other parts of the present patent application.

FIG. 28 illustrates the untrusted environment CD architecture in some embodiments.

The figure illustrates a single SoC, I/U-Mode, CD configuration, referred to as the CD 470J.

The execution environment of the CD 470J is comprised of the REE 476A supporting the RAs 475A.

The structure and implementation of the TE-LL/AT/NT Protocol Stacks 470Z are described in Provisional Patent Application 61/768,239 filed on 22 Feb. 2013.

It should be apparent to any person skilled in the art, that a typical implementation example for the CD 470J is a Smartphone, wherein both the Base-Band Processor and the Application Processor are sharing the SoC 472B.

The figure also includes interfaces as described in the 3GPP Specifications: (1) The Uu Air Interface 490, used in the operation of the U-Mode, between the UE-LL Protocol Stacks 460E and the RNS as described with reference to 290 in FIG. 26; and (2) the Iuh/Iurh Interfaces 493G, used in the operation of the I-Mode, between the NT Protocol Stack and the HNS as described with reference to 293G in FIG. 26, wherein the NT Protocol Stack is part of the TE-LL/AT/NT Protocol Stacks 470Z and communicates with the HNB-GW (not shown) via the (W)LAN Adapter 442C.

The REE 476A is built on the SoC 472B.

The REE 476A is comprised of the following: (1) The plurality of the RAs 475A; (2) the Common Layers 417Z; (3) the UE-LL Protocol Stacks 460E; (4) the TE-LL/AT/NT Protocol Stacks 470Z; (5) the ROS 473A supporting both the UE-LL Protocol Stacks 460E and the TE-LL/AT/NT Protocol Stacks 470Z; (6) the SoC 472B; (7) the UICC 443G; and (8) the (W)LAN Adapter 442C. It should be apparent to any person skilled in the art, that this component can be implemented as either an integral component of the SoC 472B or as a separate element dependent on the SoC 472B design. The figure does not show the HW components of the (W)LAN Adapter 442C used for communication with the (W)LAN (not shown), however it should be apparent to any person skilled in the art that those components are integral part of the CD 470J.

The Common Layers 417Z are comprised of the following: (1) The NAS Layer 519N, the Common CD-RRC Layer 517N and the AME 592 as described with reference to FIG. 29; (2) the PS Application Layer 719P e.g. a browser, and the Common CD-PDCP Layer 716P as described with reference to FIG. 31; and (3) the CS Application Layer 819Q e.g. a Fax and e.g. an AMR audio codec as described with reference to FIG. 32.

The UE-LL Protocol Stacks 460E are comprised of the following: (1) The UE-L2/L1 Entity 560R as described with reference to FIG. 29; (2) the UE-L2/L1 Entity 760S as described with reference to FIG. 31; and (3) the UE-L2/L1 Entity 860T as described with reference to FIG. 32.

The TE-LL/AT/NT Protocol Stacks 470Z are comprised of the following: (1) C-Plane entities as described with reference to FIG. 29: (a) The TE-L2/L1 Entity 510R; and (b) the AT/NT Entity 520U; (2) U-Plane PS entities as described with reference to FIG. 31: (a) The TE-L2/L1 Entity 710S; and (b) the AT/NT Entity 720V; and (3) U-Plane PS entities as described with reference to FIG. 32: (a) The TE-L2/L1 Entity 810T; and (b) the AT/NT Entity 820W.

The REE 476A is governed by the ROS 473A. The ROS 473A is an operating system with a rich capability set that allows consumers to install and run the RAs 475A. The following list comprises non-exhaustive examples for the ROS 473A: Android™, Linux®, Symbian OS™, and Microsoft® Windows® Phone 7.

The UICC 443G comprises an IMSI and a USIM application (not shown) for supporting the following: (1) The RAs 475A; (2) the UE-LL Protocol Stacks 460E, for Security and Authentication procedures, as described in the 3GPP specifications; and (3) the TE-LL Protocol Stacks, which are part of the TE-LL/AT/NT Protocol Stacks 470Z, for Security and Authentication procedures, as described in the 3GPP TS 33.234 specifications. It should be apparent to any person skilled in the art that In case the (W)LAN Adapter 442C is operating in accordance with one of the WLAN standards requiring an IMSI, e.g. the Passpoint (Hotspot 2.0), then the WLAN IMSI is either the same IMSI as the UE/TE IMSI, or a different IMSI, according to MNO policy. The USIM application perform security procedures and securely store the IMSI, authentication and ciphering information. Credentials for the entities comprising the CD 470J, and using the CN services, are dependent on the MNO policy. In the prior art there is a mechanism in the USIM application which enables the MNO to distinguish between a UE and a HNB. In the present patent application the same mechanism is used to distinguish among a UE, a HNB and the CD 470J. This mechanism allows the MNO to activate the policy in which location requirement is nullified, when the CD 470J is operating in the I-Mode.

The TE-LL/AT/NT Protocol Stacks 470Z operating in the I-Mode, communicate with the MNO network (not shown) via the IPsec ESP Secured Tunnel through the Broadband IP Network (not shown). In other embodiments another security protocol can be used.

The (W)LAN Adapter 442C provides wired/wireless communication between the CD 470J and the CN (not shown) over the Iuh/Iurh Interfaces 493G. In some embodiments the (W)LAN Adapter 442C operates in the wireless mode and is comprised of the WLAN Protocol Stacks 540G as described with reference to FIG. 29.

In some embodiments, the RAs 475A together with the Common Layers 417Z and the UE-LL Protocol Stacks 460E represent prior art UE SW e.g. a Smartphone SW. The figure does not show the HW components associated with the UE-LL Protocol Stacks 460E, however it should be apparent to any person skilled in the art that those components are integral part of the CD 470J. In the operation of the I-Mode, the TE-LL/AT/NT Protocol Stacks 470Z are connected to the MNO network over the Iuh/Iurh Interfaces 493G. In the operation of the U-Mode, the UE-LL Protocol Stacks 460E are connected to the MNO network through the Uu Air Interface 490. In some embodiments, the CD 470J is operating according to the FDD mode, in accordance with 3GPP 3G specifications or the LTE-FDD specifications or both. The TE and AT which are part of the TE-LL/AT/NT Protocol Stacks 470Z do not have a radio, therefore frequency synchronization with the UE-LL Protocol Stacks 460E is not required. In other embodiments the CD 470J is operating according to the TDD mode, in accordance with the 3GPP LTE-TDD specifications. Transmit/Receive phase synchronization information for the TE and AT are provided by the UE-LL Protocol Stacks 460E. The AME 592 as described with reference to FIG. 29, which is part of the Common Layers 417Z, is responsible to control the CD 470J mode of operation, either the I-Mode, or the U-Mode according to the requirements. Upon the requirements, mobility between the I-Mode and the U-Mode can be activated, which enables a SST, as described in other parts of the present patent application.

FIG. 29 illustrates the CD Control Plane (C-Plane) protocol architecture in some embodiments.

The figure includes: (1) The C-Plane Protocol Stacks 570N; (2) a CD WLAN Protocol Stacks, the WLAN Protocol Stacks 540G; and (3) the UICC 543G.

The figure also includes: (1) The UTRAN 552; (2) the HPLMN CN 553A; and (3) a Wi-Fi Access Point (WAP), the WAP 540D.

The C-Plane Protocol Stacks 570N are comprised of the following: (1) The NAS Layer 519N, which communicates with its peer entity in the HPLMN CN 553A; (2) the Common CD-RRC Layer 517N; (3) the AME 592 as described with reference to 692 in FIG. 28, wherein the AME 592 is implemented by one of the suitable IPC methods; (4) a UE lower layers protocol stack, the UE-L2/L1 Entity 560R communicating with the UTRAN 552 through the Uu Air Interface 590; (5) the TE lower layers, the TE-L2/L1 Entity 510R communicating with the AT/NT Entity 520U over the Ui Interface 591, wherein the Ui Interface 591 is implemented by one of the suitable IPC methods; and (6) the AT/NT Entity 520U providing HNB functionality for the CD.

The UE-L2/L1 Entity 560R represents a 3GPP UE lower layers protocol stack, is comprised of the following: (1) A UE Layer2 Entity (U-L2), the U-L2 Entity 512A further comprising of: (a) The standard Radio Link Control (RLC) (not shown); and (b) the standard Media Access Control (MAC) (not shown) sub-layers; and (2) a UE Layer1 Entity (U-L1), the U-L1 Layer 511B.

As described in Provisional Patent Application 61/768, 239 filed on 22 Feb. 2013, the C-Plane Protocol Stack architecture of the Ui Interface 591, used for communications between the TE-L2/L1 Entity 510R and the AT/NT Entity 520U are comprised of the following: (1) An AT Resource Control layer (A-RC), the A-RC Layer 527U, acting as the peer entity for the Common CD-RRC Layer 517N; (2) The peer entities of the Link Control layer/entity (LC) further comprising: (a) A Terminal-equipment LC Layer/Entity (T-LC), the T-LC Layer 513D; and (b) an Access-termination LC layer/entity (A-LC), the A-LC Layer 523D; and (3) the peer entities of the Transport Layer (TrL) further comprising: (a) A Terminal-equipment Transport Layer entity (T-TrL), the T-TrL 511T; and (b) an Access-termination Transport Layer entity (A-TrL), the A-TrL 521T.

As described in Provisional Patent Application 61/768, 239 filed on 22 Feb. 2013, the intermediation Transport Interface Common Point entity (TICP), the TICP Entity 591T, which belongs to the hosting OS, gives transport services to both the T-TrL 511T and the A-TrL 521T in terms of the bi-directional data pass between the peer entities, the T-LC Layer 513D and the A-LC Layer 523D.

As described in Provisional Patent Application 61/768, 239 filed on 22 Feb. 2013, the AT/NT Entity 520U is comprised of the following: (1) The AT; and (2) the NT. The NT section of the AT/NT Entity 520U is responsible for communicating with the HPLMN CN 553A via a HNB-GW (not shown). The NT section is comprised of the following: (1) a HNB Application Part (HNBAP), The HNBAP Entity 527F which is responsible for the following non-exhaustive list of functions as described in the 3GPP specifications: (a) Management of the underlying transport; (b) the HNB-GW discovery; (c) the AT/NT Entity 520U registration procedures; (d) the TE-L2/L1 Entity 510R registration; (e) registration updates; and (f) access Identification of the AT/NT Entity 520U; (2) a Radio Access Network Application Part (RANAP), the RANAP Entity 527G, including RANAP User Adaptation (RUA), which is responsible for handling the Iuh interface as described in the 3GPP specifications; (3) a Radio Network Subsystem Application Part (RNSAP), the RNSAP Entity 527H, including RNSAP User Adaptation (RNA), which is responsible for handling the Iurh interface as described in 3GPP specifications for supporting the enhanced relocation and soft handover capabilities; (4) a combined Stream Control Transmission Protocol (SCTP) Layer and IP layers, the IP/SCTP Entity 523G; and (5) a NT L2/L1 layers, the N-L2/L1 Layers 521E. An AT/NT Interworking function (A-IWF) entity, the A-IWF Entity 528E performs protocol conversion and message/data relay between the AT and the NT sections of the AT/NT Entity 520U. It should be apparent to any person skilled in the art that in order to simplify the drawing, the following entities comprising the IP/SCTP Entity 523G are not shown: (1) The Remote IP layer; (2) the IPsec ESP Layer; and (3) the Transport IP Layer.

The WLAN Protocol Stacks 540G is comprised of the following: (1) A WLAN L2/L1 layers, the W-L2/L1 Layers 521F; (2) the NW Layers 523Z providing the transport service for the peer entities of the AT/NT Entity 520U and the WAP 540D. The N-L2/L1 Layers 521E of the AT/NT Entity 520U communicate with the W-L2/L1 Layers 521F of the WLAN Protocol Stacks 540G over one of the standard wired Local Area Network (LAN) protocols, e.g. Ethernet.

The WAP 540D is part of an Indoor/outdoor AN (not shown) providing connection between the CD and the HNB-GW (not shown). It should be apparent to any person skilled in the art that the AN can comprise either the WAP 540D, or a wired LAN Adapter (not shown), or both.

The mapping of the CD C-Plane protocol architecture entities to the trusted environment CD architecture entities is described with reference to FIG. 28. The mapping of the CD C-Plane protocol architecture entities to the untrusted environment CD architecture entities is described with reference to FIG. 28.

Interfaces:

The figure also includes the following external interfaces as described in the 3GPP specifications: (1) The Uu Air Interface 590; (2) the Iuh/Iurh Interfaces 593G. It should be apparent to any person skilled in the art that the Iuh and Iurh are separate interfaces which are shown as a single entity for the sake of simplicity of the drawing.

The figure also includes the following internal interfaces, implemented by Service Access Points (SAPs) shown as ellipses: (1) The RRC-SAP 518E between the NAS Layer 519N and the Common CD-RRC Layer 517N, further comprising the following SAPs as described in the 3GPP specifications: (a) A General Control (GC) SAP that provides an information broadcast service; (b) a Notification (Nt) SAP that provides paging and notification broadcast services; and (c) a Dedicated Control (DC) SAP that provides services for establishment/release of a connection and transfer of messages using this connection; (2) the RLC-SAP 514 between the Common CD-RRC Layer 517N and the AME 592, used for data transfer as described with reference to FIG. 28, further comprising the following SAPs as described in the 3GPP specifications: (a) A Transparent Mode (TM) SAP; (b) an Unacknowledged Mode (UM) SAP; and (c) an Acknowledged Mode (AM) SAP; (3) a RRC Control SAP (C-RRC-SAP), the C-RRC-SAP 567C between the Common CD-RRC Layer 517N and the AME 592, used for control messages and measurements transfer as described with reference to 667C in FIG. 28; (4) the RLC-SAP 564G between the AME 592 and the U-L2 Entity 512A, used for data transfer as described with reference to FIG. 28, further comprising the following SAPs: (a) The TM SAP; (b) the UM SAP; and (c) the AM SAP; (5) the LC-SAP 514G between the AME 592 and the T-LC Layer 513D, used for data transfer as described with reference to FIG. 28, further comprising the following SAPs: (a) The TM SAP; (b) the UM SAP; and (c) the AM SAP; (6) a Control SAPs (C-SAPs), the C-SAPs 518 between the AME 592 and the Layer-2 entities of the UE/TE, the U-L2 Entity 512A and the T-LC Layer 513D respectively, wherein the C-SAPs 518 used for control messages and measurements messages transfer as described with reference to FIG. 28; (7) the C-SAPs between the AME 592 and the Layer-1 entities of the UE/TE, the C-L1-SAP 561C and the C-TrL-SAP 511X for the U-L1 Layer 511B and the T-TrL 511T respectively, wherein the C-SAPs used for control messages and measurements messages transfer as described with reference to FIG. 28; and (8) the C-SAP 518D between the T-TrL 511T and the W-L2/L1 Layers 521F, used for control messages and measurements messages transfer as described with reference to FIG. 28, wherein the T-TrL 511T is used as relay between the C-TrL-SAP 511X and the C-SAP 518D. In another embodiment (not shown) the C-SAP 518D is interfacing directly between the W-L2/L1 Layers 521F and the AME 592, bypassing the T-TrL 511T.

It should be apparent to any person skilled in the art, that the C-SAPs are comprised of either a unidirectional SAP or a bidirectional SAP as described with reference to FIG. 28.

CD Modes of Operation:

Operation in the U-Mode.

The CD is communicating with the UTRAN 552 through the Uu Air Interface 590 as described with reference to FIG. 26. The communication involves several entities comprising the following: (1) The NAS Layer 519N; (2) the Common CD-RRC Layer 517N; (3) the AME 592; (4) the UE-L2/L1 Entity 560R; and (5) the UICC 543G. As described in the 3GPP specifications, the Uu Air Interface 590 allows for the UE-L2/L1 Entity 560R to be connected simultaneously with several entities in the UTRAN 552, e.g. during soft handover. Also, during normal NW operation, the Uu Air Interface 590 allows for the UTRAN 552 to be connected simultaneously with several of the UE-L2/L1 Entity 560R.

Operation in the I-Mode.

The CD communicates with the HNB-GW (Not shown) over the Iuh/Iurh Interfaces 593G as described with reference to FIG. 26. The communication involves several entities comprising the following: (1) The NAS Layer 519N; (2) the Common CD-RRC Layer 517N; (3) the AME 592; (4) the TE-L2/L1 Entity 510R; (5) the Ui Interface 591; (6) the AT/NT Entity 520U; (7) the WLAN Protocol Stacks 540G; (8) the WAP 540D; and (9) the UICC 543G. In contrast to the Uu Air Interface 590 which is a multi-to-multi interface, i.e. allows for multiple entities on either side, the Ui Interface 591 is a PTP interface, i.e. allows for only a single entity on either side.

Functionalities:

The NAS Layer 519N functionality is described in the 3GPP specifications.

The Common CD-RRC Layer 517N functionalities are described in the 3GPP specifications.

The AME 592 is comprised of the following functionalities: (1) Abstracting a single Lower-Layer entity to the Common CD-RRC Layer 517N, making it insensitive to whether the control/measurement/user information is coming from an entity operating in the U-Mode, or coming from an entity operating in the I-Mode, as described with reference to Diagrams A & B in FIG. 28; (2) reflecting a single RRC entity, the Common CD-RRC Layer 517N, to entities comprising: (a) The Lower-Layers entities making the Common CD-RRC Layer 517N insensitive to whether the control information is going to an entity operating in the U-Mode, or going to an entity operating in the I-Mode as described with reference to Diagram-A in FIG. 28; and (b) the HPLMN CN 553A making the Common CD-RRC Layer 517N insensitive to whether the control/user information is going via an entity operating in the U-Mode, or going via an entity operating in the I-Mode, as described with reference to Diagram-B in FIG. 28; (3) performing route control among the entities operating in the U-Mode, the corresponding entities operating in the I-Mode, and the Common CD-RRC Layer 517N which is common to both modes, as described with reference to Diagrams A & B in FIG. 28; (4) converting control message protocols/formats, as appropriate, between the I-Mode and the U-Mode protocols/formats as described with reference to Diagram-A in FIG. 28; and (5) converting measurements message formats, between the I-Mode and the U-Mode formats, as described with reference to Diagram-A in FIG. 28.

It should be apparent to any person skilled in the art that the C-Plane also comprises user information, e.g. SMS, as described in the 3GPP specifications. The user information is treated as the external control information as described with reference to Diagram-B in FIG. 28.

The UE-L2/L1 Entity 560R functionalities are described in the 3GPP specifications. The TE-L2/L1 Entity 510R functionalities are described in the Provisional Patent Application 61/768,239 filed on 22 Feb. 2013. It should be apparent to any person skilled in the art that from an external entity perspective, e.g. the Common CD-RRC Layer 517N or the HPLMN CN 553A, the functionalities of the UE-L2/L1 Entity 560R and the TE-L2/L1 Entity 510R are the same. The UE-L2/L1 Entity 560R and the TE-L2/L1 Entity 510R are operating as a mirror image of each other. During an internal control/measurement message session, the Common CD-RRC Layer 517N treats the UE-L2/L1 Entity 560R and the TE-L2/L1 Entity 510R as if they were a single entity. The AME 592 decides with which entity the actual communication takes place, as described with reference to Diagram-A in FIG. 28. During an external control message session or a user message session, the NAS Layer 519N, the Common CD-RRC Layer 517N and the HPLMN CN 553A treat the UE-L2/L1 Entity 560R and the TE-L2/L1 Entity 510R as if they were a single entity. The AME 592 decides via which entity the actual communication takes place, as described with reference to Diagram-B in FIG. 28.

The AT/NT Entity 520U is comprised of the following functionalities as described in the 3GPP specifications: (1) The Source AT/NT Entity 1020U, as described with reference to FIG. 34A & FIG. 34B; (2) the Target AT/NT Entity 1120U, as described with reference to FIG. 35A & FIG. 35B; (3) the Serving AT/NT Entity 1220U, as described with reference to FIG. 36A & FIG. 36B; and (4) the Drift AT/NT Entity 1320U, as described with reference to FIG. 37A & FIG. 37B.

The UICC 543G structure and functionalities are described with reference to 343G in FIGS. 28 & 443G in FIG. 28.

It should be apparent to any person skilled in the art that the discovery/authentication procedures associated with the WAP 540D can be done either manually by the user, or automatically according to the standards known in the art, e.g. the Passpoint (Hotspot 2.0).

The functionalities of the rest of the entities comprised in the figure are described with reference to either the 3GPP specifications, or the Provisional Patent Application 61/768, 239 filed on 22 Feb. 2013, or both.

FIG. 28 illustrates the C-Plane Access Manager Entity (AME) architecture & methods in some embodiments.

The AME 692 is the main entity acting in the mobility scenarios between the U-Mode and the I-Mode as described with reference to FIG. 26, FIG. 28, FIG. 28 & FIG. 29.

Access Manager Architecture section—General.

The figure describes two embodiments of the AME 692 architecture: (1) Diagram-A describes the C-Plane functionality for CD Control messages and Measurements data, wherein the C-Plane protocol architecture is described with reference to FIG. 29; and (2) Diagram-B describes the C-Plane functionality for NW Uplink/Downlink messages, wherein the C-Plane protocol architecture is described with reference to FIG. 29. Additional two embodiments of the AME 692 architecture are described with reference to FIG. 33: (1) Diagram-C describes the U-Plane PS functionality for NW Uplink/Downlink data, wherein the U-Plane PS protocol architecture is described with reference to FIG. 31; and (2) Diagram-D describes the U-Plane CS functionality for NW Uplink/Downlink data, wherein the U-Plane CS protocol architecture is described with reference to FIG. 32.

Diagram-A comprises a Uu Stratum (UuS), the UuS Entity 649C as described in the 3GPP specifications.

Diagram-B comprises the following entity domains as described in the 3GPP specifications: (1) An Access Stratum (AS), the AS Entity 649B; and (2) the UuS Entity 649C.

It should be apparent to any person skilled in the art that an uplink message flow direction, aka transmit mode, is from the AS Entity 649B to the UuS Entity 649C then to the CN (not shown). A downlink message flow direction, aka receive mode, is from the CN (not shown) to the UuS Entity 649C then to the AS Entity 649B.

It should be apparent to any person skilled in the art that the AS Entity 649B comprises the Duplication Avoidance entity (not shown) as described in the 3GPP specifications.

It should be apparent to any person skilled in the art that the C-Plane also comprises user information, e.g. SMS, as described in the 3GPP specifications. The user information is treated as the external control information as described with reference to the Diagram-B sections of the AME 692.

Access Manager Architecture Section: Diagram-A.

The UuS Entity 649C is comprised of the following: (1) The Common CD-RRC Entity 617N; (2) the U-L1 Entity 611B which is responsible for the Uu Air Interface 590 of the UE, as described in the 3GPP specifications, and further described with reference to the operation in the U-Mode in FIG. 29; and (3) the T-TrL Entity 611T which is responsible for the Ui Interface 591 of the TE, as described with reference to Provisional Patent Application 61/768,239 filed on 22 Feb. 2013, and further described with reference to the operation in the I-Mode in FIG. 29.

Diagram-A also comprises of the following bidirectional C-SAPs, shown as ellipses: (1) The C-RRC-SAP 667C between the AME 692 and the Common CD-RRC Entity 617N; (2) the C-L1-SAP 661C between the AME 692 and the U-L1 Entity 611B; and (3) the C-TrL-SAP 611X between the AME 692 and the T-TrL Entity 611T. In another embodiment (not shown), as described with reference to FIG. 29, Diagram-A also comprises the C-SAP 518D between the W-L2/L1 Layers 521F and the AME 592.

It should be apparent to any person skilled in the art that in order to increase the readability of the figure during the operation of the U-Mode, Diagram-A is showing only the C-L1-SAP 661C & the U-L1 Entity 611B pair. However Diagram-A is also applicable wherein the described pair is being replaced by corresponding pairs as described in the 3GPP specifications: (1) The bidirectional MAC C-SAP & the UE MAC Entity; (2) the unidirectional RLC C-SAP & the UE RLC Entity; and (3) the unidirectional PDCP C-SAP & the UE PDCP Entity.

It should be apparent to any person skilled in the art that in order to increase the readability of the figure during the operation of the I-Mode, Diagram-A is showing only the C-TrL-SAP 611X & the T-TrL Entity 611T pair. However Diagram-A is also applicable wherein the described pair is being replaced by the unidirectional C-LC-SAP & the T-LC Entity respectively, as described in the Provisional Patent Application 61/768,239 filed on 22 Feb. 2013.

It should be apparent to any person skilled in the art that a C-SAP is unidirectional wherein the corresponding entity is being controlled by the Common CD-RRC Entity 617N. A C-SAP is bidirectional wherein the corresponding entity is being controlled by, and sending measurements to the Common CD-RRC Entity 617N.

Access Manager Architecture Section: Diagram-B.

The UuS Entity 649C is comprised of the following: (1) The Common CD-RRC Entity 617N; (2) the AME 692; and (3) the Link sub-layer entities further comprising: (a) a UE RLC entity (U-RLC), the U-RLC Entity 613B which is responsible for the Link Control of the UE, as described in the 3GPP specifications, and further described with reference to the operation in the U-Mode in FIG. 29; and (b) the T-LC Entity 613D which is responsible for the Link Control of the TE as described with reference to Provisional Patent Application 61/768,239 filed on 22 Feb. 2013, and further described with reference to the operation in the I-Mode in FIG. 29.

Diagram-B also comprises of the following bidirectional SAPs, shown as ellipses: (1) The GC-SAP 618F on the boundary between the UuS Entity 649C and the AS Entity 649B carrying the Uplink/Downlink messages between the AS Entity 649B and the Common CD-RRC Entity 617N; (2) the AM-SAP 614T between the AME 692 and the Common CD-RRC Entity 617N; (3) the AM-SAP 664U between the AME 692 and the U-RLC Entity 613B; and (4) the AM-SAP 614U between the AME 692 and the T-LC Entity 613D.

It should be apparent to any person skilled in the art that in order to increase the readability of the figure, the following SAPs between the AS Entity 649B and the Common CD-RRC Entity 617N, as described in the 3GPP specifications, are not shown: (1) The DC SAP; and (2) the Nt SAP.

It should be apparent to any person skilled in the art that in order to increase the readability of the figure, only the AM-SAPs are shown in Diagram-B. However Diagram-B is also applicable wherein the bidirectional AM-SAPs are replaced by corresponding uplink/downlink unidirectional UM-SAPs or by corresponding uplink/downlink unidirectional TM-SAPs as described in the 3GPP specifications, and wherein the arrowheads denoting the message flow direction are unidirectional as appropriate.

Access Manager Functionality Section: Diagram-A.

The Common CD-RRC Entity 617N functionalities are described in the 3GPP specifications.

With reference to Diagram-A, the AME 692 is comprised of the following functionalities: (1) Abstracting a single Layer-1 entity to the Common CD-RRC Entity 617N, making it insensitive to whether the measurement information is coming from the U-L1 Entity 611B during operation in the U-Mode, or coming from the HNS via the T-TrL Entity 611T during operation in the I-Mode; (2) reflecting a single RRC entity, the Common CD-RRC Entity 617N, to the Layer-1 entities making the Common CD-RRC Entity 617N insensitive to whether the control information is going to the U-L1 Entity 611B during operation in the U-Mode, or going to the U-L1 Entity 611B during operation in the I-Mode; (3) performing route control among the U-L1 Entity 611B operating in the U-Mode, the T-TrL Entity 611T operating in the I-Mode, and the Common CD-RRC Entity 617N which is common to both modes; (4) converting control message protocols/formats, as appropriate, between the I-Mode and the U-Mode protocols/formats; and (5) converting measurements message formats, between the I-Mode and the U-Mode formats.

With reference to Diagram-A, the U-L1 Entity 611B functionalities are described in the 3GPP specifications. The T-TrL Entity 611T functionalities are described in the Provisional Patent Application 61/768,239 filed on 22 Feb. 2013. It should be apparent to any person skilled in the art that from an external entity perspective, e.g. the Common CD-RRC Entity 617N, the functionalities of the U-L1 Entity 611B and the T-TrL Entity 611T are the same. The U-L1 Entity 611B and the T-TrL Entity 611T are operating as a mirror image of each other. During an internal control/measurement message session, the Common CD-RRC Entity 617N treats the U-L1 Entity 611B and the T-TrL Entity 611T as if they were a single entity. The AME 692 decides with which entity the actual communication takes place, as described with reference to the routing rules section of the AME 692. It should be apparent to any person skilled in the art that from the mirror functionality perspective, the T-TrL Entity 611T is mirroring the functionality of the U-L1 Entity 611B in conjunction with the UE MAC Entity (not shown). It should be apparent to any person skilled in the art that the mirror entity pair comprising the U-L1 Entity 611B and the T-TrL Entity 611T can be replaced by the mirror entity pair comprising the U-RLC Entity (not shown) and the T-LC Entity (not shown) respectively.

Access Manager Functionality Section: Diagram-B.

The Common CD-RRC Entity 617N functionalities are described in the 3GPP specifications.

With reference to Diagram-B, the AME 692 is comprised of the following functionalities: (1) Abstracting a single Link-Layer entity to the Common CD-RRC Entity 617N, making it insensitive to whether the control/user information is coming from the RNS via the U-RLC Entity 613B during operation in the U-Mode, or coming from the HNS via the T-LC Entity 613D during operation in the I-Mode; (2) reflecting a single RRC entity, the Common CD-RRC Entity 617N, to the HPLMN CN (not shown) making the Common CD-RRC Entity 617N insensitive to whether the control/user information is going to the RNS via the U-RLC Entity 613B during operation in the U-Mode, or going to the HNS via the T-LC Entity 613D during operation in the I-Mode; and (3) performing route control among the U-RLC Entity 613B operating in the U-Mode, the T-LC Entity 613D operating in the I-Mode, and the Common CD-RRC Entity 617N which is common to both modes.

With reference to Diagram-B, the U-RLC Entity 613B functionalities are described in the 3GPP specifications. The T-LC Entity 613D functionalities are described in the Provisional Patent Application 61/768,239 filed on 22 Feb. 2013. It should be apparent to any person skilled in the art that from an external entity perspective, e.g. the Common CD-RRC Entity 617N, the functionalities of the U-RLC Entity 613B and the T-LC Entity 613D are the same. The U-RLC Entity 613B and the T-LC Entity 613D are operating as a mirror image of each other. During an external control message session or a user message session, the Common CD-RRC Entity 617N and the HPLMN CN (not shown) treat the U-RLC Entity 613B and the T-LC Entity 613D as if they were a single entity. The AME 692 decides via which entity the actual communication takes place, as described with reference to the routing rules section of the AME 692.

Access Manager Routing Rules Section: Diagram-A.

With reference to Diagram-A, the routing rules in the uplink direction used by the AME 692 are comprised of the following: (1) An internal control message arriving from the Common CD-RRC Entity 617N to the C-RRC-SAP 667C, and going to the C-SAP of the L1 and/or the MAC entities is routed: (a) without conversion to the U-L1 Entity 611B, via the C-L1-SAP 661C; (b) with conversion to the T-TrL Entity 611T via the C-TrL-SAP 611X, then forwarded to the W-L2/L1 Layers 521F via the C-SAP 518D as described with reference to FIG. 29, wherein in another embodiment (not shown), the AME 692 routes the control messages directly to the C-SAP 518D; (2) an internal control message arriving from the Common CD-RRC Entity 617N to the C-RRC-SAP 667C, and going to the C-SAP of the RLC is routed: (a) without conversion to the U-RLC Entity (not shown), via the C-RLC-SAP (not shown); (b) with conversion to the T-LC Entity (not shown) via the C-TrL-SAP (not shown); and (3) an internal control message arriving from the Common CD-RRC Entity 617N to the C-RRC-SAP 667C, and going to the C-SAP of the PDCP is routed without conversion to the Common PDCP Entity (not shown), via the C-PDCP-SAP (not shown).

With reference to Diagram-A, the routing rules in the downlink direction used by the AME 692 are comprised of the following: (1) A measurement message arriving from a UE entity e.g. the U-L1 Entity 611B, via the appropriate C-SAP e.g. the C-L1-SAP 661C is routed without conversion to the Common CD-RRC Entity 617N via the C-RRC-SAP 667C; and (2) a measurement message arriving as described with reference to FIG. 29, from the W-L2/L1 Layers 521F via the C-SAP 518D to the T-TrL Entity 611T, then to the AME 692 via C-TrL-SAP 611X, is routed with conversion to the Common CD-RRC Entity 617N via the C-RRC-SAP 667C, wherein in another embodiment (not shown), a measurement message arriving to the AME 692 directly from the W-L2/L1 Layers 521F via the C-SAP 518D, is routed with conversion to the Common CD-RRC Entity 617N via the C-RRC-SAP 667C.

Access Manager Routing Rules Section: Diagram-B.

As described with reference to FIG. 29, the Ui Interface 591 is a PTP interface therefore there is only a single Cell-ID which can be associated with the I-Mode of operation, wherein this Cell-ID is known to the AME 692. By parsing a control message arriving from the Common CD-RRC Entity 617N, and analyzing the Cell-ID field of the message, the AME 692 can determine whether the destination of the message is associated with the U-Mode or with the I-Mode of operation.

With reference to Diagram-B, the routing rules in the uplink direction used by the AME 692 are comprised of the following: (1) An external control message or a user message arriving from the Common CD-RRC Entity 617N to the AM-SAP 614T, and identified by the Cell-ID as belonging to the U-Mode of operation, is routed to the U-RLC Entity 613B, via the AM-SAP 664U; (2) an external control message or a user message arriving from the Common CD-RRC Entity 617N to the AM-SAP 614T, and identified by the Cell-ID as belonging to the I-Mode of operation, is routed to the T-LC Entity 613D, via the AM-SAP 614U; and (3) an external control message or a user message arriving from the Common CD-RRC Entity 617N to the AM-SAP 614T, and identified by the Cell-ID as belonging to both the I-Mode and the U-Mode of operation, is routed to both the U-RLC Entity 613B and the T-LC Entity 613D, via the AM-SAP 664U and via the AM-SAP 614U respectively.

With reference to Diagram-B, the routing rules in the downlink direction used by the AME 692 are comprised of the following: (1) An external control message or a user message arriving from the U-RLC Entity 613B, via the AM-SAP 664U is routed to the Common CD-RRC Entity 617N via the AM-SAP 614T; and (2) an external control message or a user message arriving from the T-LC Entity 613D, via the AM-SAP 614U is routed to the Common CD-RRC Entity 617N via the AM-SAP 614T.

Access Manager Protocol/Format Conversion Section: Diagram-A.

With reference to Diagram-A, the measurement and control message protocol/formats used during the operation of the U-Mode are described in the 3GPP specifications. The measurement and control message protocols/formats used during the operation of the I-Mode are described in the appropriate WLAN and Broadband IP Network specifications. In order for the Common CD-RRC Entity 617N to communicate with the other entities participating in the operation of the I-Mode, a conversion entity is provided by the AME 692.

Conversions for control messages related to measurements and the corresponding measurement messages are comprised of the following measured entities: (1) UE Radio Frequency (RF) parameters to/from WLAN RF parameters, wherein the RF parameters comprise: (a) Signal strength; (b) signal to noise; and (c) other parameters as described in the appropriate 3GPP and WLAN specifications; (2) UE parameters to/from end-to-end Quality of Service (QoS) parameters, wherein end-to-end QoS parameters comprise: (a) Packet jitter; (b) Packet Error Rate (PER); and (c) other parameters as described in the appropriate Broadband IP Network specifications; and (3) combinations of the above measured entities.

Conversions for control messages not related to measurements are comprised of the following: (1) The UE RF parameters to/from the corresponding TE parameters, wherein the RF parameters comprise: (a) Signal Power; (b) signal frequency; and (c) other parameters as described in the 3GPP specifications; (2) the UE logical entities to/from the corresponding TE entities, wherein the logical entities comprise: (a) Logical Channels; and (b) other entities as described in the 3GPP specifications; and (3) other UE entities to/from the corresponding TE entities, as described in the 3GPP specifications.

Access Manager protocol/format conversion section: Diagram-B.

With reference to Diagram-B, control/user message protocol/formats used by the Common CD-RRC Entity 617N, during operation of the U-Mode, for communication with the RNS (not shown) are described in the 3GPP specifications. Control/user message protocol/formats used by the Common CD-RRC Entity 617N, during operation of the I-Mode, for communication with the HNS (not shown) are described in the 3GPP specifications. Therefore no conversion is done for the control/user message protocol/formats, either in the uplink direction or the downlink direction.

FIG. 31 illustrates the CD User Plane (U-Plane) Packet Switched (PS) protocol architecture in some embodiments.

The figure includes: (1) The U-Plane PS Protocol Stacks 770P; (2) the WLAN Protocol Stacks 740G; and (3) the UICC 743G.

The figure also includes: (1) The UTRAN 752; (2) the HPLMN CN 753A; and (3) the WAP 740D.

The U-Plane Protocol Stacks 770P are comprised of the following: (1) The PS Application Layer 719P, comprising a PS data applications, e.g. browser, which communicates with its peer entity in the HPLMN CN 753A; (2) the Common CD-PDCP Layer 716P; (3) the AME 792 as described with reference to 992 in FIG. 33/Diagram-C, wherein the AME 792 is implemented by one of the suitable IPC methods; (4) a UE lower layers protocol stack, the UE-L2/L1 Entity 760S communicating with the UTRAN 752 through the Uu Air Interface 790; (5) the TE lower layers, the TE-L2/L1 Entity 710S communicating with the AT/NT Entity 720V over the Ui Interface 791, wherein the Ui Interface 791 is implemented by one of the suitable IPC methods; and (6) the AT/NT Entity 720V providing HNB functionality for the CD.

The UE-L2/L1 Entity 760S represents a 3GPP UE lower layers protocol stack, is comprised of the following: (1) A UE Layer2 Entity (U-L2), the U-L2 Entity 712E further comprising of: (a) The standard RLC (not shown); and (b) the standard MAC (not shown) sub-layers; and (2) the U-L1 Layer 711B.

As described in Provisional Patent Application 61/768, 239 filed on 22 Feb. 2013, the C-Plane Protocol Stack architecture of the Ui Interface 791, used for communications between the TE-L2/L1 Entity 710S and the AT/NT Entity 720V are comprised of the following: (1) An AT Packet Data Convergence Protocol (A-PDCP), the A-PDCP Layer 726V, acting as the peer entity for the Common CD-PDCP Layer 716P; (2) The peer entities of the LC Layer further comprising: (a) The T-LC Layer 713D; and (b) The A-LC Layer 723D; and (3) the peer entities of the TrL further comprising: (a) The T-TrL 711T; and (b) the A-TrL 721T.

As described in Provisional Patent Application 61/768, 239 filed on 22 Feb. 2013, the TICP Entity 791T, which belongs to the hosting OS, gives transport services to both the T-TrL 711T and the A-TrL 721T in terms of the bi-directional data pass between the peer entities, the T-LC Layer 713D and the A-LC Layer 723D.

As described in Provisional Patent Application 61/768, 239 filed on 22 Feb. 2013, the AT/NT Entity 720V is comprised of the following: (1) The AT; and (2) the NT. The NT section of the AT/NT Entity 720V is responsible for communicating with the HPLMN CN 753A via a HNB-GW (not shown). The NT section is comprised of the following: (1) A GPRS Tunneling Protocol for User Plane (GTP-U) entity, the GTP-U Layer 726H, which is an IP-based communication protocol used to carry GPRS traffic within UMTS In 3GPP architectures; (2) a combined User Datagram Protocol (UDP) layer and IP layers, the IP/UDP Entity 723H, which is a transport entity for IP packets; and (3) the N-L2/L1 Layers 721E. The A-IWF Entity 728E performs data relay between the AT and the NT sections of the AT/NT Entity 720V. It should be apparent to any person skilled in the art that in order to simplify the drawing, the following entities comprising the IP/UDP Entity 723H are not shown: (1) The Remote IP layer; (2) the IPsec ESP Layer; and (3) the Transport IP Layer.

The WLAN Protocol Stacks 740G is comprised of the following: (1) The W-L2/L1 Layers 721F; (2) the NW Layers 723Z providing the transport service for the peer entities of the AT/NT Entity 720V and the WAP 740D. The N-L2/L1 Layers 721E of the AT/NT Entity 720V communicate with the W-L2/L1 Layers 721F of the WLAN Protocol Stacks 740G over one of the standard wired LAN protocols, e.g. Ethernet.

The WAP 740D is part of an Indoor/outdoor AN (not shown) providing connection between the CD and the HNB-GW (not shown). It should be apparent to any person skilled in the art that the AN can comprise either the WAP 740D, or a wired LAN Adapter (not shown), or both.

The mapping of the CD U-Plane PS protocol architecture entities to the trusted environment CD architecture entities is described with reference to FIG. 28. The mapping of the CD U-Plane PS protocol architecture entities to the untrusted environment CD architecture entities is described with reference to FIG. 28.

Interfaces:

The figure also includes the following external interfaces as described in the 3GPP specifications: (1) The Uu Air Interface 790; (2) the Iuh/Iurh Interfaces 793G. It should be apparent to any person skilled in the art that the Iuh and Iurh are separate interfaces which are shown as a single entity for the sake of simplicity of the drawing.

The figure also includes the following internal interfaces, implemented by SAPs, shown as ellipses: (1) The PDCP-SAPs 766J between the PS Application Layer 719P and the Common CD-PDCP Layer 716P, wherein each PDCP entity comprises a dedicated SAP, and wherein the Common CD-PDCP Layer 716P is controlled by the Common CD-RRC Layer (not shown) via a control SAP (not shown) as described in FIG. 28; (2) the RLC-SAP 714 between the Common CD-PDCP Layer 716P and the AME 792, used for data transfer as described with reference to FIG. 33, further comprising the following SAPs as described in the 3GPP specifications: (a) The TM SAP; (b) the UM SAP; and (c) the AM SAP; (3) the RLC-SAP 764G between the AME 792 and the U-L2 Entity 712E, used for data transfer as described with reference to FIG. 33, further comprising the following SAPs: (a) The TM SAP; (b) the UM SAP; and (c) the AM SAP; and (4) the LC-SAP 714G between the AME 792 and the T-LC Layer 713D, used for data transfer as described with reference to FIG. 33, further comprising the following SAPs: (a) The TM SAP; (b) the UM SAP; and (c) the AM SAP.

CD Modes of Operation:

Operation in the U-Mode.

The CD is communicating with the UTRAN 752 through the Uu Air Interface 790 as described with reference to FIG. 26. The communication involves several entities comprising the following: (1) The PS Application Layer 719P; (2) the Common CD-PDCP Layer 716P; (3) the AME 792; (4) the UE-L2/L1 Entity 760S; and (5) the UICC 743G.

Operation in the I-Mode.

The CD communicates with the HNB-GW (Not shown) over the Iuh/Iurh Interfaces 793G as described with reference to FIG. 26. The communication involves several entities comprising the following: (1) The PS Application Layer 719P; (2) the Common CD-PDCP Layer 716P; (3) the AME 792; (4) the TE-L2/L1 Entity 710S; (5) the Ui Interface 791; (6) the AT/NT Entity 720V; (7) the WLAN Protocol Stacks 740G; (8) the WAP 740D; and (9) the UICC 743G.

Functionalities:

The Common CD-PDCP Layer 716P functionality is described in the 3GPP specifications.

As described with reference to Diagram-C in FIG. 33, the AME 792 is comprised of the following functionalities: (1) Abstracting a single Link-Layer entity to the Common CD-PDCP Layer 716P, making it insensitive to whether the PS Data information is coming via an entity operating in the U-Mode, or coming via an entity operating in the I-Mode; (2) reflecting a single PDCP entity, the Common CD-PDCP Layer 716P, to the HPLMN CN 753A making the Common CD-PDCP Layer 716P insensitive to whether the PS Data information is going via an entity operating in the U-Mode, or going via an entity operating in the I-Mode; and (3) performing route control among the entities operating in the U-Mode, the corresponding entities operating in the I-Mode, and the Common CD-PDCP Layer 716P which is common to both modes.

The UE-L2/L1 Entity 760S functionalities are described in the 3GPP specifications. The TE-L2/L1 Entity 710S functionalities are described in the Provisional Patent Application 61/768,239 filed on 22 Feb. 2013. It should be apparent to any person skilled in the art that from an external entity perspective, e.g. the Common CD-PDCP Layer 716P or the HPLMN CN 753A, the functionalities of the UE-L2/L1 Entity 760S and the TE-L2/L1 Entity 710S are the same. The UE-L2/L1 Entity 760S and the TE-L2/L1 Entity 710S are operating as a mirror image of each other. During a PS Data session, the PS Application Layer 719P, the Common CD-PDCP Layer 716P and the HPLMN CN 753A treat the UE-L2/L1 Entity 760S and the TE-L2/L1 Entity 710S as if they were a single entity. The AME 792 decides via which entity the actual communication takes place, as described with reference to Diagram-C in FIG. 33.

The UICC 743G structure and functionalities are described with reference to 343G in FIGS. 28 & 443G in FIG. 28.

The functionalities of the rest of the entities comprised in the figure are described with reference to either the 3GPP specifications, or the Provisional Patent Application 61/768,239 filed on 22 Feb. 2013, or both.

FIG. 32 illustrates the CD User Plane (U-Plane) Circuit Switched (CS) protocol architecture in some embodiments.

The figure includes: (1) The U-Plane CS Protocol Stacks 870Q; (2) the WLAN Protocol Stacks 840G; and (3) the UICC 843G.

The figure also includes: (1) The UTRAN 852; (2) the HPLMN CN 853A; and (3) the WAP 840D.

The U-Plane Protocol Stacks 870Q are comprised of the following: (1)) The CS Application Layer 819Q, comprising a CS applications, e.g. AMR,/Fax, which communicates with its peer entity in the HPLMN CN 853A; (2) the AME 892 as described with reference to 992 in FIG. 33/Diagram-D, wherein the AME 892 is implemented by one of the suitable IPC methods; (3) a UE lower layers protocol stack, the UE-L2/L1 Entity 860T communicating with the UTRAN 852 through the Uu Air Interface 890; (4) the TE lower layers, the TE-L2/L1 Entity 810T communicating with the AT/NT Entity 820W over the Ui Interface 891, wherein the Ui Interface 891 is implemented by one of the suitable IPC methods; and (5) the AT/NT Entity 820W providing HNB functionality for the CD.

The UE-L2/L1 Entity 860T represents a 3GPP UE lower layers protocol stack, is comprised of the following: (1) The U-L2 Entity 812E further comprising of: (a) The standard RLC (not shown); and (b) the standard MAC (not shown) sub-layers; and (2) the U-L1 Layer 811B.

As described in Provisional Patent Application 61/768,239 filed on 22 Feb. 2013, the C-Plane Protocol Stack architecture of the Ui Interface 891, used for communications between the TE-L2/L1 Entity 810T and the AT/NT Entity 820W are comprised of the following: (1) The peer entities of the LC Layer further comprising: (a) The T-LC Layer 813D; and (b) The A-LC Layer 823D; and (2) the peer entities of the TrL further comprising: (a) The T-TrL 811T; and (b) the A-TrL 821T.

As described in Provisional Patent Application 61/768,239 filed on 22 Feb. 2013, the TICP Entity 891T, which belongs to the hosting OS, gives transport services to both the T-TrL 811T and the A-TrL 821T in terms of the bi-directional data pass between the peer entities, the T-LC Layer 813D and the A-LC Layer 823D.

As described in Provisional Patent Application 61/768,239 filed on 22 Feb. 2013, the AT/NT Entity 820W is comprised of the following: (1) The AT; and (2) the NT. The NT section of the AT/NT Entity 820W is responsible for communicating with the HPLMN CN 853A via a HNB-GW (not shown). The NT section is comprised of the following: (1) An Iu User Plane (Iu-UP) entity, the Iu-UP Entity 8271, which is a communication protocol, carrying the CS Application Layer 819Q data streaming to the HPLMN CN 853A via the HNB-GW (not-shown); (2) a Real Time Protocol/Multiplexer (RTP/Mux) entity, the RTP/Mux Entity 8261, which is a transport protocol for real-time applications; (3) a combined UDP layer and IP layers, the IP/UDP Entity 823H, which is a transport entity for IP packets; and (4) the N-L2/L1 Layers 821E. The A-IWF Entity 828E performs data relay between the AT and the NT sections of the AT/NT Entity 820W. It should be apparent to any person skilled in the art that in order to simplify the drawing, the following entities comprising the IP/UDP Entity 823H are not shown: (1) The Remote IP layer; (2) the IPsec ESP Layer; and (3) the Transport IP Layer.

The WLAN Protocol Stacks 840G is comprised of the following: (1) The W-L2/L1 Layers 821F; (2) the NW Layers 823Z providing the transport service for the peer entities of the AT/NT Entity 820W and the WAP 840D. The N-L2/L1 Layers 821E of the AT/NT Entity 820W communicate with the W-L2/L1 Layers 821F of the WLAN Protocol Stacks 840G over one of the standard wired LAN protocols, e.g. Ethernet.

The WAP 840D is part of an Indoor/outdoor AN (not shown) providing connection between the CD and the HNB-GW (not shown). It should be apparent to any person skilled in the art that the AN can comprise either the WAP 840D, or a wired LAN Adapter (not shown), or both.

The mapping of the CD U-Plane CS protocol architecture entities to the trusted environment CD architecture entities is described with reference to FIG. 28. The mapping of the CD U-Plane CS protocol architecture entities to the untrusted environment CD architecture entities is described with reference to FIG. 28.

Interfaces:

The figure also includes the following external interfaces as described in the 3GPP specifications: (1) The Uu Air Interface 890; (2) the Iuh/Iurh Interfaces 893G. It should be apparent to any person skilled in the art that the Iuh and Iurh are separate interfaces which are shown as a single entity for the sake of simplicity of the drawing.

The figure also includes the following internal interfaces, implemented by SAPs, shown as ellipses: (1) The RLC-SAP 814 between the CS Application Layer 819Q and the AME 892, used for data transfer as described with reference to FIG. 33, further comprising the following SAPs as described in the 3GPP specifications: (a) The TM SAP; (b) the UM SAP; and (c) the AM SAP; (2) the RLC-SAP 864G between the AME 892 and the U-L2 Entity 812E, used for data transfer as described with reference to FIG. 33, further comprising the following SAPs: (a) The TM SAP; (b) the UM SAP; and (c) the AM SAP; and (3) the LC-SAP 814G between the AME 892 and the T-LC Layer 813D, used for data transfer as described with reference to FIG. 33, further comprising the following SAPs: (a) The TM SAP; (b) the UM SAP; and (c) the AM SAP.

CD Modes of Operation:

Operation in the U-Mode.

The CD is communicating with the UTRAN 852 through the Uu Air Interface 890 as described with reference to FIG. 26. The communication involves several entities comprising the following: (1) The CS Application Layer 819Q; (2) the AME 892; (3) the UE-L2/L1 Entity 860T; and (4) the UICC 843G.

Operation in the I-Mode.

The CD communicates with the HNB-GW (Not shown) over the Iuh/Iurh Interfaces 893G as described with reference to FIG. 26. The communication involves several entities comprising the following: (1) The CS Application Layer 819Q; (2) the AME 892; (3) the TE-L2/L1 Entity 810T; (4) the Ui Interface 891; (5) the AT/NT Entity 820W; (6) the WLAN Protocol Stacks 840G; (7) the WAP 840D; and (8) the UICC 843G.

Functionalities:

The CS Application Layer 819Q functionality is described in the 3GPP specifications.

As described with reference to Diagram-D in FIG. 33, the AME 892 is comprised of the following functionalities: (1) Abstracting a single Link-Layer entity to the CS Application Layer 819Q, making it insensitive to whether the CS Data information is coming via an entity operating in the U-Mode, or coming via an entity operating in the I-Mode; (2) reflecting a single CS Application entity, the CS Application Layer 819Q, to the HPLMN CN 853A making the CS Application Layer 819Q insensitive to whether the CS Data information is going via an entity operating in the U-Mode, or going via an entity operating in the I-Mode; and (3) performing route control among the entities operating in the U-Mode, the corresponding entities operating in the I-Mode, and the CS Application Layer 819Q which is common to both modes.

The UE-L2/L1 Entity 860T functionalities are described in the 3GPP specifications. The TE-L2/L1 Entity 810T functionalities are described in the Provisional Patent Application 61/768,239 filed on 22 Feb. 2013. It should be apparent to any person skilled in the art that from an external entity perspective, e.g. the CS Application Layer 819Q or the HPLMN CN 853A, the functionalities of the UE-L2/L1 Entity 860T and the TE-L2/L1 Entity 810T are the same. The UE-L2/L1 Entity 860T and the TE-L2/L1 Entity 810T are operating as a mirror image of each other. During a CS Data session, the CS Application Layer 819Q and the HPLMN CN 853A treat the UE-L2/L1 Entity 860T and the TE-L2/L1 Entity 810T as if they were a single entity. The AME 892 decides via which entity the actual communication takes place, as described with reference to Diagram-D in FIG. 33.

The UICC 843G structure and functionalities are described with reference to 343G in FIGS. 28 & 443G in FIG. 28.

The functionalities of the rest of the entities comprised in the figure are described with reference to either the 3GPP specifications, or the Provisional Patent Application 61/768,239 filed on 22 Feb. 2013, or both.

FIG. 33 illustrates the U-Plane AME architecture & methods in some embodiments.

The figure describes two embodiments of the AME 992 architecture: (1) Diagram-C describes the U-Plane PS functionality for NW Uplink/Downlink data, wherein the U-Plane PS protocol architecture is described with reference to FIG. 31; and (2) Diagram-D describes the U-Plane CS functionality for NW Uplink/Downlink data, wherein the U-Plane CS protocol architecture is described with reference to FIG. 32. Additional two embodiments of the AME 992 architecture are described with reference to FIG. 28: (1) Diagram-A describes the C-Plane functionality for CD Control messages and Measurements data, wherein the C-Plane protocol architecture is described with reference to FIG. 29; and (2) Diagram-B describes the C-Plane functionality for NW Uplink/Downlink messages, wherein the C-Plane protocol architecture is described with reference to FIG. 29;

Diagram-C comprises the following entity domains as described in the 3GPP specifications: (1) The AS Entity 949B; and (2) the UuS Entity 949C.

Diagram-D comprises the following entity domains as described in the 3GPP specifications: (1) The AS Entity 949B; and (2) the UuS Entity 949C.

It should be apparent to any person skilled in the art that the AS Entity 949B comprises the Duplication Avoidance entity (not shown) according to the 3GPP specifications.

Access Manager Architecture Section: Diagram-C.

The UuS Entity 949C is comprised of the following: (1) The Common CD-PDCP Entity 916P; (2) the AME 992; and (3) the Link sub-layer entities further comprising: (a) The U-RLC Entity 913B which is responsible for the Link Control of the UE, as described in the 3GPP specifications, and further described with reference to the operation in the U-Mode in FIG. 31; and (b) the T-LC Entity 913D which is responsible for the Link Control of the TE as described with reference to Provisional Patent Application 61/768,239 filed on 22 Feb. 2013, and further described with reference to the operation in the I-Mode in FIG. 31.

Diagram-C also comprises of the following bidirectional SAPs, shown as ellipses: (1) The PDCP-SAPs 966J on the boundary between the UuS Entity 949C and the AS Entity 949B carrying the Uplink/Downlink Data between the AS Entity 949B and the Common CD-PDCP Entity 916P; (2) the AM-SAP 914T between the AME 992 and the Common CD-PDCP Entity 916P; (3) the AM-SAP 964U between the AME 992 and the U-RLC Entity 913B; and (4) the AM-SAP 914U between the AME 992 and the T-LC Entity 913D.

It should be apparent to any person skilled in the art that in order to increase the readability of the figure, only the AM-SAPs are shown in Diagram-C. However Diagram-C is also applicable wherein the bidirectional AM-SAPs are replaced by corresponding uplink/downlink unidirectional UM-SAPs or by corresponding uplink/downlink unidirectional TM-SAPs as described in the 3GPP specifications, and wherein the arrowheads denoting the data flow direction are unidirectional as appropriate.

Access Manager Architecture Section: Diagram-D.

The UuS Entity 949C is comprised of the following: (1) The AME 992; and (2) the Link sub-layer entities further comprising: (a) The U-RLC Entity 913B which is responsible for the Link Control of the UE, as described in the 3GPP specifications, and further described with reference to the operation in the U-Mode in FIG. 32; and (b) the T-LC Entity 913D which is responsible for the Link Control of the TE as described with reference to Provisional Patent Application 61/768,239 filed on 22 Feb. 2013, and further described with reference to the operation in the I-Mode in FIG. 32.

Diagram-D also comprises of the following bidirectional SAPs, shown as ellipses: (1) The AM-SAP 914T on the boundary between the UuS Entity 949C and the AS Entity 949B carrying the Uplink/Downlink Data between the AS Entity 949B and the Link Control entities; (2) the AM-SAP 964U between the AME 992 and the U-RLC Entity 913B; and (3) the AM-SAP 914U between the AME 992 and the T-LC Entity 913D.

It should be apparent to any person skilled in the art that in order to increase the readability of the figure, only the AM-SAPs are shown in Diagram-D. However Diagram-D is also applicable wherein the bidirectional AM-SAPs are replaced by corresponding uplink/downlink unidirectional UM-SAPs or by corresponding uplink/downlink unidirectional TM-SAPs as described in the 3GPP specifications, and wherein the arrowheads denoting the data flow direction are unidirectional as appropriate.

Access Manager Functionality Section: Diagram-C.

The Common CD-PDCP Entity 916P functionalities are described in the 3GPP specifications.

With reference to Diagram-C, the AME 992 is comprised of the following functionalities: (1) Abstracting a single Link-Layer entity to the Common CD-PDCP Entity 916P, making it insensitive to whether the PS Data unit is coming from the RNS via the U-RLC Entity 913B during operation in the U-Mode, or coming from the HNS via the T-LC Entity 913D during operation in the I-Mode; (2) reflecting a single PDCP entity, the Common CD-PDCP Entity 916P, to the HPLMN CN (not shown) making the Common CD-PDCP Entity 916P insensitive to whether the PS Data unit is going to the RNS via the U-RLC Entity 913B during operation in the U-Mode, or going to the HNS via the T-LC Entity 913D during operation in the I-Mode; and (3) performing route control among the U-RLC Entity 913B operating in the U-Mode, the T-LC Entity 913D operating in the I-Mode, and the Common CD-PDCP Entity 916P which is common to both modes.

With reference to Diagram-C, the U-RLC Entity 913B functionalities are described in the 3GPP specifications. The T-LC Entity 913D functionalities are described in the Provisional Patent Application 61/768,239 filed on 22 Feb. 2013. It should be apparent to any person skilled in the art that from an external entity perspective, e.g. the Common CD-PDCP Entity 916P, the functionalities of the U-RLC Entity 913B and the T-LC Entity 913D are the same. The U-RLC Entity 913B and the T-LC Entity 913D are operating as a mirror image of each other. During a Data session, the Common CD-PDCP Entity 916P and the HPLMN CN (not shown) treat the U-RLC Entity 913B and the T-LC Entity 913D as if they were a single entity. The AME 992 decides via which entity the actual communication takes place, as described with reference to the routing rules section of the AME 992.

Access Manager Functionality Section: Diagram-D.

With reference to Diagram-D, the AME 992 is comprised of the following functionalities: (1) Abstracting a single Link-Layer entity to the CS Application Layer (not shown), making it insensitive to whether the CS Data unit is coming from the RNS via the U-RLC Entity 913B during operation in the U-Mode, or coming from the HNS via the T-LC Entity 913D during operation in the I-Mode; (2)) reflecting a single CS Application entity (not shown), to the HPLMN CN (not shown) making the CS Application entity insensitive to whether the CS Data unit is going to the RNS via the U-RLC Entity 913B during operation in the U-Mode, or going to the HNS via the T-LC Entity 913D during operation in the I-Mode; and (3) performing route control among the U-RLC Entity 913B operating in the U-Mode, the T-LC Entity 913D operating in the I-Mode, and the CS Application entity which is common to both modes.

With reference to Diagram-D, the U-RLC Entity 913B functionalities are described in the 3GPP specifications. The T-LC Entity 913D functionalities are described in the Provisional Patent Application 61/768,239 filed on 22 Feb. 2013. It should be apparent to any person skilled in the art that from an external entity perspective, e.g. the CS Application entity (not shown) or the HPLMN CN entity (not shown), the functionalities of the U-RLC Entity 913B and the T-LC Entity 913D are the same. The U-RLC Entity 913B and the T-LC Entity 913D are operating as a mirror image of each other. During a Data session, the CS Application entity (not shown) and the HPLMN CN (not shown) treat the U-RLC Entity 913B and the T-LC Entity 913D as if they were a single entity. The AME 992 decides via which entity the actual communication takes place, as described with reference to the routing rules section of the AME 992.

Access Manager Routing Rules Section: Diagram-C.

As described with reference to FIG. 31, the Ui Interface 791 is a PTP interface therefore there is only a single Cell-ID which can be associated with the I-Mode of operation, wherein this Cell-ID is known to the AME 992. By parsing a PS Data unit arriving from the Common CD-PDCP Entity 916P, and analyzing the Cell-ID field of the unit, the AME 992 can determine whether the destination of the PS Data unit is associated with the U-Mode or with the I-Mode of operation.

With reference to Diagram-C, the routing rules in the uplink direction used by the AME 992 are comprised of the following: (1) A PS Data unit arriving from the Common CD-PDCP Entity 916P to the AM-SAP 914T, and identified by the Cell-ID as belonging to the U-Mode of operation, is routed to the U-RLC Entity 913B, via the AM-SAP 964U; (2) a PS Data unit arriving from the Common CD-PDCP Entity 916P to the AM-SAP 914T, and identified by the Cell-ID as belonging to the I-Mode of operation, is routed to the T-LC Entity 913D, via the AM-SAP 914U; and (3) a PS Data unit arriving from the Common CD-PDCP Entity 916P to the AM-SAP 914T, and identified by the Cell-ID as belonging to both the I-Mode and the U-Mode of operation, is routed to both the U-RLC Entity 913B and the T-LC Entity 913D, via the AM-SAP 964U and via the AM-SAP 914U respectively.

With reference to Diagram-C, the routing rules in the downlink direction used by the AME 992 are comprised of the following: (1) A PS Data unit arriving from the U-RLC Entity 913B, via the AM-SAP 964U is routed to the Common CD-PDCP Entity 916P via the AM-SAP 914T; and (2) a PS Data unit arriving from the T-LC Entity 913D, via the AM-SAP 914U is routed to the Common CD-PDCP Entity 916P via the AM-SAP 914T.

Access Manager Routing Rules Section: Diagram-D.

As described with reference to FIG. 32, the Ui Interface 891 is a PTP interface therefore there is only a single Cell-ID which can be associated with the I-Mode of operation, wherein this Cell-ID is known to the AME 992. By parsing a CS Data unit arriving from the CS Application entity (not shown), and analyzing the Cell-ID field of the unit, the AME 992 can determine whether the destination of the CS Data unit is associated with the U-Mode or with the I-Mode of operation.

With reference to Diagram-D, the routing rules in the uplink direction used by the AME 992 are comprised of the following: (1) A CS Data unit arriving from the CS Application entity (not shown) to the AM-SAP 914T, and identified by the Cell-ID as belonging to the U-Mode of operation, is routed to the U-RLC Entity 913B, via the AM-SAP 964U; (2) a CS Data unit arriving from the CS Application entity (not shown) to the AM-SAP 914T, and identified by the Cell-ID as belonging to the I-Mode of operation, is routed to the T-LC Entity 913D, via the AM-SAP 914U; and (3) a CS Data unit arriving from the CS Application entity (not shown) to the AM-SAP 914T, and identified by the Cell-ID as belonging to both the I-Mode and the U-Mode of operation, is routed to both the U-RLC Entity 913B and the T-LC Entity 913D, via the AM-SAP 964U and via the AM-SAP 914U respectively.

With reference to Diagram-D, the routing rules in the downlink direction used by the AME 992 are comprised of the following: (1) A CS Data unit arriving from the U-RLC Entity 913B, via the AM-SAP 964U is routed to the CS Application entity (not shown) via the AM-SAP 914T; and (2) a CS Data unit arriving from the T-LC Entity 913D, via the AM-SAP 914U is routed to the CS Application entity (not shown) via the AM-SAP 914T.

FIG. 34A illustrates the CD C-Plane Message Sequence Chart for Outbound Hard Hand-Over (HHO) with Enhanced Serving Radio Network Subsystem (SRNS) Relocation, in some embodiments.

The figure includes: (1) The Target RNS 1058C; (2) the UE-L2/L1 Entity 1060R that is described with reference to FIG. 29; (3) a Common CD-RRC Layer/Entity, the Common CD-RRC Entity 1017N; (4) the TE-L2/L1 Entity 1010R that is described with reference to FIG. 29; (5) a source RNS entity, the Source AT/NT Entity 1020U, that is described with reference to the AT/NT Entity 520U in FIG. 29; (6) the HNB-GW 1050E; and (7) the HPLMN CN 1053A. In order to increase the readability of the figure, the HPLMN CN 1053A is drawn twice, on the left and on the right sides of the chart, however it should be apparent to any person skilled in the art that both instances must be understood as one single entity. Furthermore, the relations and signaling between entities inside of the HPLMN CN 1053A, e.g. in the PS domain: among Old SGSN, New SGSN and GGSN, during the Enhanced SRNS Relocation Procedure is out of scope of the present patent application. Therefore the Enhanced SRNS Relocation Procedure is valid for both intra-SGSN SRNS relocation and inter-SGSN relocation.

Step 0: The step comprises the following pre-conditions for the Enhanced SRNS Relocation Procedure: (1) An ongoing PS/CS session carried between the Common CD-RRC Entity 1017N and the Source AT/NT Entity 1020U, via the TE-L2/L1 Entity 1010R; and (2) the Iuh/Iurh interface instances are established between the HNB-GW 1050E and the Source AT/NT Entity 1020U as described in the 3GPP specifications. It should be apparent to any person skilled in the art that that the Iurh interface establishment can be deferred and performed at the beginning of Step 3. It should be apparent to any person skilled in the art that prior to Step 0 there are WLAN discovery/authentication procedures associated with the WAP (not shown), which can be done either manually by the user, or automatically according to the standards known in the art, e.g. the Passpoint (Hotspot 2.0).

Step 1a: While the CD is under Cellular coverage and if registration has not performed during previous session, the Common CD-RRC Entity 1017N registers with the Target RNS 1058C. The UE-L2/L1 Entity 1060R, configured by the Common CD-RRC Entity 1017N, performs background Uu air interface link measurement procedure with the Target RNS 1058C, as described in the 3GPP specifications. The measurement results are reported internally to the Common CD-RRC Entity 1017N via a Control SAP, the C-RRC-SAP 667C, as described with reference to FIG. 28.

Step 1b: The Common CD-RRC Entity 1017N prepares and sends the RRC Measurement Report message via the TE-L2/L1 Entity 1010R, over the Ui interface, to the Source AT/NT Entity 1020U. The RRC Measurement Report message comprises measurements of the link with the Target RNS 1058C, as described in the 3GPP specifications.

Step 2: Upon reception of the RRC Measurement Report from the Common CD-RRC Entity 1017N the Source AT/NT Entity 1020U, which in co-operation with the HNB-GW 1050E comprising the functionality of a Source RNS, decides to handover to the Target RNS 1058C.

Step 3: The Source AT/NT Entity 1020U sends a RNA CONNECT message carrying the RNSAP Enhanced Relocation Request (Enh.Rel.Req.) Protocol Data Unit (PDU), over the Iurh interface, to the HNB-GW 1050E. The message comprises the following: (1) The Relocation Type; (2) the Cause; (3) the Source ID; (4) the Target ID; and (5) the Source RNC to Target RNC transparent container. The Source RNC to Target RNC Transparent Container comprises the following: (1) The necessary information for Relocation co-ordination; (2) the security functionality; and (3) the RRC protocol context information, including UE Capabilities. The specific details of the message information elements are described in the 3GPP specifications.

Step 4: In response, The HNB-GW 1050E sends the RNSAP Relocation Request message, over the Iur interface, to the Target RNS 1058C. The message comprises the following: (1) The Permanent NAS UE Identity i.e. an IMSI;

(2) the Cause; (3) the CN Domain Indicator; (4) the Radio Access Bearers (RABs) to be set up; (5) the Service Handover related information; and (6) the Source-RNC to Target-RNC Transparent Container, as described in Step 3 above.

Step 5: The Target RNS 1058C allocates RABs for the UE-L2/L1 Entity 1060R requested in the RNSAP Relocation Request message, then returns the RNSAP Enhanced Relocation Response (Enh.Rel.Resp.) message, over the Iur interface, to the HNB-GW 1050E.

Step 6: The HNB-GW 1050E encapsulates the RNSAP Enhanced Relocation Response PDU into a RNA DIRECT TRANSFER message and forwards it, over the Iurh interface, to the Source AT/NT Entity 1020U.

Step 7: The Source AT/NT Entity 1020U triggers the relocation by sending a RNA DIRECT TRANSFER message carrying the RNSAP Enhanced Relocation Commit (Enh.Rel.Commit) PDU, comprising the RABs to be released and RABs that are subject to data forwarding, over the Iurh interface, to the HNB-GW 1050E.

Step 8: The HNB-GW 1050E forwards the RNSAP Enhanced Relocation Commit message, over the Iur interface, to the Target RNS 1058C. The Source AT/NT Entity 1020U is now ready to forward downlink user data directly to the Target RNS 1058C via the HNB-GW 1050E over the Iurh/Iur interfaces. This forwarding is performed for downlink user data only.

FIG. 34B is the continuation of FIG. 34A.

Step 9: The Source AT/NT Entity 1020U sends a RRC Physical Channel Reconfiguration Request message, through the Ui interface (not shown) and via the TE-L2/L1 Entity 1010R, to the Common CD-RRC Entity 1017N. The Physical Channel Reconfiguration message is only a single example of the various messages which can be used to trigger a handover. In some embodiments other messages are used as described in the 3GPP specifications.

Step 10: The Common CD-RRC Entity 1017N performs all needed reconfigurations and sends the RRC Physical Channel Reconfiguration Complete message, via the UE-L2/L1 Entity 1060R and through the Uu air interface (not shown), to the Target RNS 1058C.

In the prior art, both Step 9 & Step 10 are done via the UE and through the Uu air interface (not shown), wherein Step 9 is done between the UE and the HNB acting as part of the Source RNS, and wherein Step 10 is done between the UE and the Node-B acting as part of the Target RNS. In the present patent application, as described with reference to FIG. 28, the AME 692 is taking care that Step 9 & Step 10 are done via the TE-L2/L1 Entity 1010R, and the UE-L2/L1 Entity 1060R respectively, through the Ui interface and Uu air interface respectively.

Step 11: The Target RNS 1058C sends the RANAP Enhanced Relocation Complete Request (Enh.Rel.Comp.Req.) message, over the Iu interface, to the MSC/SGSN (not shown) which is part of the HPLMN CN 1053A.

Step 12: The MSC/SGSN (not shown) which is part of the HPLMN CN 1053A configures the necessary Iu resources for the Target RNS 1058C and acknowledges with the RANAP Enhanced Relocation Complete Response (Enh.Rel.Comp.Resp.) message, over the Iu interface.

Step 13: As described in the 3GPP specifications, this step is performed for CS session only. The Target RNS 1058C responds with the RANAP Enhanced Relocation Complete Confirmation (Enh.Rel.Comp.Conf) message, over the Iu interface, to the MSC (not shown) which is part of the HPLMN CN 1053A.

Step 14: After Step 12 in the PS session or Step 13 in the CS session, the HPLMN CN 1053A initiates release of the resources in the Source AT/NT Entity 1020U by sending the RANAP Iu Release Command, over the Iu interface, to the HNB-GW 1050E.

Step 15: The HNB-GW 1050E forwards a RUA DIRECT TRANSFER message carrying the Iu Release Command PDU, over the Iuh interface, to the Source AT/NT Entity 1020U.

Step 16: The Source AT/NT Entity 1020U confirms the Iu release by sending a RUA DIRECT TRANSFER message carrying the RANAP Iu Release Complete PDU, over the Iuh interface, to the HNB-GW 1050E.

Step 17: The HNB-GW 1050E forwards the RANAP Iu Release Complete message, over the Iu interface, to the HPLMN CN 1053A.

FIG. 35A illustrates the CD C-Plane Message Sequence Chart for Inbound HHO with Enhanced SRNS Relocation, in some embodiments.

The figure includes: (1) The Source RNS 1158B; (2) the UE-L2/L1 Entity 1160R that is described with reference to FIG. 29; (3) the Common CD-RRC Entity 1117N; (4) the TE-L2/L1 Entity 1110R that is described with reference to FIG. 29; (5) a Target RNS entity, the Target AT/NT Entity 1120U, that is described with reference to the AT/NT Entity 520U in FIG. 29; (6) the HNB-GW 1150E; and (7) the HPLMN CN 1153A. In order to increase the readability of the figure, the HPLMN CN 1153A is drawn twice, on the left and on the right sides of the chart, however it should be apparent to any person skilled in the art that both instances must be understood as one single entity. Furthermore, the relations and signaling between entities inside of the HPLMN CN 1153A, e.g. in the PS domain: among Old SGSN, New SGSN and GGSN, during the Enhanced SRNS Relocation Procedure is out of scope of the present patent application. Therefore the Enhanced SRNS Relocation Procedure is valid for both intra-SGSN SRNS relocation and inter-SGSN relocation.

Step 0: The step comprises the following pre-conditions for the Enhanced SRNS Relocation Procedure: (1) An ongoing PS/CS session carried between the Common CD-RRC Entity 1117N and the Source RNS 1158B, via the UE-L2/L1 Entity 1160R; and (2) the Iuh/Iurh interface instances are established between the HNB-GW 1150E and the Target AT/NT Entity 1120U as described in the 3GPP specifications. It should be apparent to any person skilled in the art that the Iurh interface establishment can be deferred and performed at the beginning of Step 4. It should be apparent to any person skilled in the art that prior to Step 0 there are WLAN discovery/authentication procedures associated with the WAP (not shown), which can be done either manually by the user, or automatically according to the standards known in the art, e.g. the Passpoint (Hotspot 2.0).

Step 1a: While the CD is under WLAN coverage and if registration has not performed during previous session, the Common CD-RRC Entity 1117N registers with the Target AT/NT Entity 1120U. The TE-L2/L1 Entity 1110R, configured by the Common CD-RRC Entity 1117N, performs background end to end link measurement procedure with the HNB-GW 1150E comprising the following: (1) The WLAN link between the Target AT/NT Entity 1120U and the WAP (not shown), through the WLAN air interface; and (2) the link between the WAP (not shown) and the HNB-GW 1150E, through the Broadband IP Network. The measurement results are converted by the AME 692, from the format of the WLAN/Broadband IP Network, to the format of the Common CD-RRC Entity 1117N, and then reported internally to the Common CD-RRC Entity 1117N via a Control SAP, the C-RRC-SAP 667C, as described with reference to FIG. 28. In another embodiment, only the WLAN air interface link measurements are performed, between the Target AT/NT Entity 1120U and the WAP (not shown).

Step 1b: The Common CD-RRC Entity 1117N prepares and sends the RRC Measurement Report message via the UE-L2/L1 Entity 1160R, over the Uu interface, to the Source RNS 1158B. The RRC Measurement Report message comprises measurements of the link with the Target AT/NT Entity 1120U, as described in the 3GPP specifications.

Step 2: Upon reception of the RRC Measurement Report from the Common CD-RRC Entity 1117N, the Source RNS 1158B decides to handover to the Target AT/NT Entity 1120U, which in co-operation with the HNB-GW 1150E comprising the functionality of a Target RNS.

Step 3: The Source RNS 1158B sends the RNSAP Enhanced Relocation Request (Enh.Rel.Req.), over the Iur interface, to the HNB-GW 1150E. The message comprises the following: (1) The Relocation Type; (2) the Cause; (3) the Source ID; (4) the Target ID; and (5) the Source RNC to Target RNC transparent container. The Source RNC to Target RNC Transparent Container comprises the following: (1) The necessary information for Relocation co-ordination; (2) the security functionality; and (3) the RRC protocol context information, including UE Capabilities. The specific details of the message information elements are described in the 3GPP specifications.

Step 4: In response, The HNB-GW 1150E sends a RNA CONNECT message carrying the RNSAP Relocation Request PDU, over the Iurh interface, to the Target AT/NT Entity 1120U. The message comprises the following: (1) The Permanent NAS UE Identity i.e. an IMSI; (2) the Cause; (3) the CN Domain Indicator; (4) the RABs to be set up; (5) the Service Handover related information; and (6) the Source-RNC to Target-RNC Transparent Container, as described in Step 3 above.

Step 5: The Target AT/NT Entity 1120U allocates RABs for the TE-L2/L1 Entity 1110R requested in the RNSAP Relocation Request message, then returns a RNA DIRECT TRANSFER message carrying the RNSAP Enhanced Relocation Response (Enh.Rel.Resp.) PDU, over the Iurh interface, to the HNB-GW 1150E.

Step 6: The HNB-GW 1150E forwards the RNSAP Enhanced Relocation Response message, over the Iur interface, to the Source RNS 1158B.

Step 7: The Source RNS 1158B triggers the relocation by sending the RNSAP Enhanced Relocation Commit (Enh.Rel.Commit) message, comprising the RABs to be released and RABs that are subject to data forwarding, over the Iur interface, to the HNB-GW 1150E.

Step 8: The HNB-GW 1150E forwards a RNA DIRECT TRANSFER message carrying the RNSAP Enhanced Relocation Commit PDU, over the Iurh interface, to the Target AT/NT Entity 1120U. The Source RNS 1158B is now ready to forward downlink user data directly to the Target AT/NT Entity 1120U via the HNB-GW 1150E over the Iurh/Iur interfaces. This forwarding is performed for downlink user data only.

FIG. 35B is the continuation of FIG. 35A.

Step 9: The Source RNS 1158B sends a RRC Physical Channel Reconfiguration Request message, through the Uu interface (not shown) and via the UE-L2/L1 Entity 1160R, to the Common CD-RRC Entity 1117N. The Physical Channel Reconfiguration message is only a single example of the various messages which can be used to trigger a handover. In some embodiments other messages are used as described in the 3GPP specifications.

Step 10: The Common CD-RRC Entity 1117N performs all needed reconfigurations and sends the RRC Physical Channel Reconfiguration Complete message, via the TE-L2/L1 Entity 1110R and through the Ui air interface (not shown), to the Target AT/NT Entity 1120U.

In the prior art, both Step 9 & Step 10 are done via the UE and through the Uu air interface (not shown), wherein Step 9 is done between the UE and the Node-B acting as part of the Source RNS, and wherein Step 10 is done between the UE and the HNB acting as part of the Target RNS. In the present patent application, as described with reference to FIG. 28, the AME 692 is taking care that Step 9 & Step 10 are done via the UE-L2/L1 Entity 1160R, and the TE-L2/L1 Entity 1110R respectively, through the Uu air interface and Ui interface respectively.

Step 11: The Target AT/NT Entity 1120U sends a RUA DIRECT TRANSFER message carrying the RANAP Enhanced Relocation Complete Request (Enh.Rel.Comp.Req.) PDU, over the Iuh interface, to the HNB-GW 1150E.

Step 12: The HNB-GW 1150E forwards the RANAP Enhanced Relocation Complete Request message, over the Iu interface, to the MSC/SGSN (not shown) which is part of the HPLMN CN 1153A.

Step 13: The MSC/SGSN (not shown) which is part of the HPLMN CN 1153A configures the necessary Iu resources for the Target AT/NT Entity 1120U and acknowledges with the RANAP Enhanced Relocation Complete Response (Enh.Rel.Comp.Resp.) message, over the Iu interface.

Step 14: The HNB-GW 1150E forwards a RUA DIRECT TRANSFER message carrying the RANAP Enhanced Relocation Complete Response PDU, over the Iuh interface, to the Target AT/NT Entity 1120U.

Step 15: As described in the 3GPP specifications, this step is performed for CS session only. After completion of the U-Plane initialization, the Target AT/NT Entity 1120U responds with a RUA DIRECT TRANSFER message carrying the RANAP Enhanced Relocation Complete Confirmation (Enh.Rel.Comp.Conf) PDU, over the Iuh interface, to the HNB-GW 1150E. It should be apparent to any person skilled in the art that U-Plane initialization can be different from the standard, as described in the 3GPP specifications, according to the Ui interface requirements.

Step 16: As described in the 3GPP specifications, this step is performed for CS session only. The HNB-GW 1150E forwards the RANAP Enhanced Relocation Complete Confirm message, over the Iu interface, to the MSC (not shown) which is part of the HPLMN CN 1153A.

Step 17: After Step 13 in the PS session or Step 16 in the CS session, the HPLMN CN 1153A initiates release of the resources in the Source RNS 1158B by sending the RANAP Iu Release Command message, over the Iu interface, to the Source RNS 1158B.

Step 18: The Source RNS 1158B confirms the Iu release by sending the RANAP Iu Release Complete message, over the Iu interface, to the HPLMN CN 1153A.

FIG. 36A illustrates the CD C-Plane Message Sequence Chart for Outbound Soft Hand-Over (SHO), in some embodiments.

The outbound SHO is performed by means of Radio Link (RL) addition between the UE-L2/L1 Entity 1260R, controlled by the Common CD-RRC Entity 1217N and the DRNS 1258E.

The figure includes: (1) The UE-L2/L1 Entity 1260R that is described with reference to FIG. 29; (2) a Common CD-RRC Layer/Entity, the Common CD-RRC Entity 1217N; (3) the TE-L2/L1 Entity 1210R that is described with reference to FIG. 29; (4) a serving RNS entity, the Serving AT/NT Entity 1220U, that is described with reference to the AT/NT Entity 520U in FIG. 29; (5) the HNB-GW 1250E; and (6) the DRNS 1258E. In order to increase the readability of the figure, the DRNS 1258E is drawn twice, on the left and on the right sides of the chart, however it should be apparent to any person skilled in the art that both instances must be understood as one single entity.

The AME is not shown in this figure. However as described with reference to FIG. 29 the Common CD-RRC Entity 1217N communicates, via the AME 592, with two protocol-stack entities: (1) The UE-L2/L1 Entity 560R; and (2) the TE-L2/L1 Entity 510R.

Step 0: The step comprises the following pre-conditions for the SHO Procedure: (1) An ongoing PS/CS session carried between the Common CD-RRC Entity 1217N and the Serving AT/NT Entity 1220U, via the TE-L2/L1 Entity 1210R; (2) the Iuh/Iurh interface instances are established between the HNB-GW 1250E and the Serving AT/NT Entity 1220U as described in the 3GPP specifications; and (3)) the Iur interface is established between the HNB-GW 1250E and the DRNS 1258E as described in the 3GPP specifications. It should be apparent to any person skilled in the art that the Iurh interface establishment can be deferred and performed at the beginning of Step 3. It should be apparent to any person skilled in the art that prior to Step 0 there are WLAN discovery/authentication procedures associated with the WAP (not shown), which can be done either manually by the user, or automatically according to the standards known in the art, e.g. the Passpoint (Hotspot 2.0).

Step 1a: While the CD is under Cellular coverage and if registration has not performed during previous session, the Common CD-RRC Entity 1217N registers with the DRNS 1258E. The UE-L2/L1 Entity 1260R, configured by the Common CD-RRC Entity 1217N, performs background Uu air interface link measurement procedure with the DRNS 1258E, as described in the 3GPP specifications. The measurement results are reported internally to the Common CD-RRC Entity 1217N via a Control SAP, the C-RRC-SAP 667C, as described with reference to FIG. 28.

Step 1b: The Common CD-RRC Entity 1217N prepares and sends the RRC Measurement Report message via the TE-L2/L1 Entity 1210R, over the Ui interface, to the Serving AT/NT Entity 1220U. The RRC Measurement Report message comprises measurements of the link with the DRNS 1258E, as described in the 3GPP specifications.

Step 2: Upon reception of the RRC Measurement Report from the Common CD-RRC Entity 1217N, the Serving AT/NT Entity 1220U, which in co-operation with the HNB-GW 1250E comprising the functionality of a Serving RNS, decides to set up a new RL with the DRNS 1258E.

Step 3: The Serving AT/NT Entity 1220U sends a RNA CONNECT message carrying the RNSAP Radio Link Setup Request (Radio.Link.Setup.Req.) PDU, over the Iurh interface, to the HNB-GW 1250E.

Step 4: The HNB-GW 1250E forwards the RNSAP Radio Link Setup Request message, over the Iur interface, to the DRNS 1258E.

Step 5: If requested resources are available, the DRNS 1258E allocates resources for the UE-L2/L1 Entity 1260R, requested in the RNSAP Radio Link Setup Request message, then returns the RNSAP Radio Link Setup Response (Radio.Link.Setup.Resp.) message, over the Iur interface, to the HNB-GW 1250E.

Step 6: The HNB-GW 1250E encapsulates the RNSAP Radio Link Setup Response PDU into a RNA DIRECT TRANSFER message and forwards it, over the Iurh interface, to the Serving AT/NT Entity 1220U.

FIG. 36B is the continuation of FIG. 36A.

Step 7: The DRNS 1258E issues the RNSAP Radio Link Restore Indication (Radio.Link.Restore.Ind.) message and sends it, over the Iur interface, to the HNB-GW 1250E.

Step 8: The HNB-GW 1250E encapsulates the RNSAP Radio Link Restore Indication PDU into a RNA DIRECT TRANSFER message and forwards it, over the Iurh interface, to the Serving AT/NT Entity 1220U.

In some embodiments, as described in the 3GPP specifications, the RNSAP Radio Link Restore Indication message is sent after the data bearer synchronization, as described in Step 9 and Step 10 below.

Step 9: The Serving AT/NT Entity 1220U in co-operation with the HNB-GW 1250E, and the DRNS 1258E, establish synchronization for the Data Transport Bearer/Bearers by means of exchange of the appropriate Dedicated Channel (DCH) Frame Protocol (FP) Downlink Synchronization frames.

Step 10: The DRNS 1258E and the Serving AT/NT Entity 1220U in co-operation with the HNB-GW 1250E, establish synchronization for the Data Transport Bearer/Bearers by means of exchange of the appropriate DCH FP Uplink Synchronization frames. Then the Serving AT/NT Entity 1220U starts DL data transfer (not shown) towards the TE-L2/L1 Entity 1210R.

Step 11: The Serving AT/NT Entity 1220U sends the RRC Active Set Update (Radio Link Addition) message, over the Dedicated Control Channel (DCCH), to the Common CD-RRC Entity 1217N.

Step 12: The Common CD-RRC Entity 1217N configures the UE-L2/L1 Entity 1260R to add RL with the DRNS 1258E, as indicated in the Active Set Update message.

Step 13: Upon successful RL addition with the DRNS 1258E, the Common CD-RRC Entity 1217N acknowledges with the Active Set Update Complete message, over the DCCH, to the Serving AT/NT Entity 1220U.

FIG. 37A illustrates the CD C-Plane Message Sequence Chart for Inbound SHO, in some embodiments.

The inbound SHO is performed by means of RL addition between the TE-L2/L1 Entity 1310R, controlled by the Common CD-RRC Entity 1317N, and a DRNS comprised of the Drift AT/NT Entity 1320U in co-operation with the HNB-GW 1350E.

The figure includes: (1) The UE-L2/L1 Entity 1360R that is described with reference to FIG. 29; (2) a Common CD-RRC Layer/Entity, the Common CD-RRC Entity 1317N; (3) the TE-L2/L1 Entity 1310R that is described with reference to FIG. 29; (4) the Drift AT/NT Entity 1320U, that is described with reference to the AT/NT Entity 520U in FIG. 29; (5) the HNB-GW 1350E; and (6) the SRNS 1358D. In order to increase the readability of the figure, the SRNS 1358D is drawn twice, on the left and on the right sides of the chart, however it should be apparent to any person skilled in the art that both instances must be understood as one single entity.

The AME is not shown in this figure. However as described with reference to FIG. 29 the Common CD-RRC Entity 1317N communicates, via the AME 592, with two protocol-stack entities: (1) The UE-L2/L1 Entity 560R; and (2) the TE-L2/L1 Entity 510R.

Step 0: The step comprises the following pre-conditions for the SHO Procedure: (1) An ongoing PS/CS session carried between the Common CD-RRC Entity 1317N and the SRNS 1358D, via the UE-L2/L1 Entity 1360R; (2) the Iuh/Iurh interface instances are established between the HNB-GW 1350E and the Drift AT/NT Entity 1320U as described in the 3GPP specifications; and (3)) the Iur interface is established between the HNB-GW 1350E and the SRNS 1358D as described in the 3GPP specifications. It should be apparent to any person skilled in the art that the Iurh interface establishment can be deferred and performed at the beginning of Step 4. It should be apparent to any person skilled in the art that prior to Step 0 there are WLAN discovery/authentication procedures associated with the WAP (not shown), which can be done either manually by the user, or automatically according to the standards known in the art, e.g. the Passpoint (Hotspot 2.0).

Step 1a: While the CD is under WLAN coverage and if registration has not performed during previous session, the Common CD-RRC Entity 1317N registers with the Drift AT/NT Entity 1320U. The TE-L2/L1 Entity 1310R, configured by the Common CD-RRC Entity 1317N, performs background end to end link measurement procedure with the HNB-GW 1350E comprising the following: (1) The WLAN link between the Drift AT/NT Entity 1320U and the WAP (not shown), through the WLAN air interface; and (2) the link between the WAP (not shown) and the HNB-GW 1350E, through the Broadband IP Network. The measurement results are converted by the AME 692, from the format of the WLAN/Broadband IP Network, to the format of the Common CD-RRC Entity 1317N, and then reported internally to the Common CD-RRC Entity 1317N via a Control SAP, the C-RRC-SAP 667C, as described with reference to FIG. 28. In another embodiment, only the WLAN air interface link measurements are performed, between the Drift AT/NT Entity 1320U and the WAP (not shown).

Step 1b: The Common CD-RRC Entity 1317N prepares and sends the RRC Measurement Report message via the UE-L2/L1 Entity 1360R, over the Uu interface, to the SRNS 1358D. The RRC Measurement Report message comprises measurements of the link with the Drift AT/NT Entity 1320U, as described in the 3GPP specifications.

Step 2: Upon reception of the RRC Measurement Report from the Common CD-RRC Entity 1317N, the SRNS 1358D decides to set up a new RL with the Drift AT/NT Entity 1320U, which in co-operation with the HNB-GW 1350E comprising the functionality of a DRNS.

Step 3: The SRNS 1358D sends the RNSAP Radio Link Setup Request (Radio.Link.Setup.Req.) message, over the Iur interface, to the HNB-GW 1350E.

Step 4: The HNB-GW 1350E encapsulates the RNSAP Radio Link Setup Request PDU into a RNA DIRECT TRANSFER message and forwards it, over the Iurh interface, to the Drift AT/NT Entity 1320U.

Step 4a: The Drift AT/NT Entity 1320U allocates requested resources, i.e. creates the following entities which are described with reference to FIG. 29 comprising: (1) The corresponding Link Control entities further comprising: (a) The A-LC Layer 523D; and (b) The T-LC Layer 513D; and (2) the Transport Layer entities further comprising: (a) The A-TrL 521T; and (b) the T-TrL 511T.

Step 5: Successful outcome of the resources allocation is reported by the Drift AT/NT Entity 1320U in a RNA DIRECT TRANSFER message carrying the RNSAP Radio Link Setup Response (Radio.Link.Setup.Resp.) PDU, over the Iurh interface, to the HNB-GW 1350E.

Step 6: The HNB-GW 1350E forwards the RNSAP Radio Link Setup Response message, over the Iur interface, to the SRNS 1358D.

FIG. 37B is the continuation of FIG. 37A.

Step 7: The Drift AT/NT Entity 1320U issues a RNA DIRECT TRANSFER message carrying the RNSAP Radio Link Restore Indication (Radio.Link.Restore.Ind.) PDU and sends it, over the Iurh interface, to the HNB-GW 1350E.

Step 8: The HNB-GW 1350E forwards the RNSAP Radio Link Restore Indication message, over the Iur interface, to the SRNS 1358D.

In some embodiments, as described in the 3GPP specifications, the RNSAP Radio Link Restore Indication message is sent after the data bearer synchronization, as described in Step 9 and Step 10 below.

Step 9: The SRNS 1358D and the Drift AT/NT Entity 1320U in co-operation with the HNB-GW 1350E, establish synchronization for the Data Transport Bearer/Bearers by means of exchange of the appropriate DCH FP Downlink Synchronization frames.

Step 10: The Drift AT/NT Entity 1320U in co-operation with the HNB-GW 1350E, and the SRNS 1358D, establish synchronization for the Data Transport Bearer/Bearers by means of exchange of the appropriate DCH FP Uplink Synchronization frames.

Step 11: The SRNS 1358D sends the RRC Active Set Update (Radio Link Addition) message, over the DCCH, to the Common CD-RRC Entity 1317N.

Step 12: The Common CD-RRC Entity 1317N configures the TE-L2/L1 Entity 1310R to add RL with the Drift AT/NT Entity 1320U, as indicated in the Active Set Update message.

Step 13: Upon successful RL addition with the Drift AT/NT Entity 1320U, the Common CD-RRC Entity 1317N acknowledges with the Active Set Update Complete message, over the DCCH, to the SRNS 1358D.

FIG. 38A shows a table of abbreviations and terms used in the present patent application.

The table contains a glossary of the non-standard abbreviations and terms encountered in the present patent application. The standard abbreviations and terms appear in the 3GPP TR 21.905 Rd-12 titled: "Vocabulary for 3GPP Specifications".

FIG. 38B is the continuation of FIG. 38A.

The figure includes the continuation of the glossary table.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present system have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present system. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present system should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present system. Various modifications to these embodiments will be readily apparent to those skilled in the art, and the generic principles defined herein may be applied to other embodiments without departing from the spirit or scope of the invention. Thus, the present system is not intended to be limited to the embodiments shown herein but is to be accorded the widest scope consistent with the principles and novel features disclosed herein.

What is claimed is:

1. A communication system comprising:
    a cellular Core Network (CN);
    a plurality of cellular Base Stations (BS);
    a cellular Gateway (GW);
    a Communication Device (CD) with an embedded Home Node-B (HNB) or cellular Small Cell Base Station (SC-BS) as a mobile or location independent portable entity with interprocess communication (IPC), wherein said CD interconnects to the CN by interconnecting to the GW over an Internet Protocol Network (IP NW), wherein said CD includes a Communication Apparatus (CA) comprising multi-layered protocol stacks for implementing a control plane functionality, user plane functionality and management functionality for automatic switching between a cellular network and a wireless local area network (WLAN); and
    an Access Manager Entity (AME) to manipulate a Terminal Equipment Lower Layers entity and a User Equipment Lower Layers entity to appear as one or more mirror image entities as reflected to Common Layers entities and a core network,
    wherein in a Handover (HO) process in said AME manipulates a flow of Control Messages, Measurements Information and Data Packets among said Lower Layers entity and said Common Layers to assure a Seamless Session Transfer (SST) between said Lower Layers entity,
    wherein the SST is performed between a Radio Link (RL) associated with the Lower Layers entity and plurality of RLs associated with the Lower Layers entity, or wherein the SST is performed among plurality of RLs associated with the Lower Layers entity.

2. The system of claim 1, wherein said CD comprises:
    a User Equipment (UE) entity; and
    a physical (W)LAN entity, wherein said (W)LAN includes a Local Area Network (LAN) adapter, or a Wireless Local Area Network (WLAN) adapter.

3. The system of claim 1, comprising a 3GPP Core Network (CN), wherein said AME includes a Quality of Service/Quality of Experience (QoS/QoE) measuring entity which measures TE to CN end-to-end QoS/QoE parameters, wherein said AME then performs conversion between said measured QoS/QoE parameters and 3GPP Uu Air Interface parameters so a Common Radio Resource Control (RRC) entity treats the data in compliance with the 3GPP specifications, wherein said Common RRC entity included in said Common Layers,
    wherein said UE entity includes:
        a 3GPP Physical Radio entity for supporting said UE-L2/L1;

said 3GPP UE-L2/L1 residing below said AME; and
said 3GPP Common Layers entities residing above said AME,
wherein said CA includes:
- a Terminal Equipment Protocol Stacks (TE) entity, wherein said TE includes a Transport Layer (TrL) entity, wherein said TE includes computer readable code providing an equivalent radio functionality of a 3GPP User Equipment (UE), and wherein said TE includes:
  said TE-L2/L1 residing below said AME, wherein said TE-L2/L1 includes said TrL entity; and
  said 3GPP Common Layers entities residing above said AME;
- an Access Termination Protocol Stacks (AT) entity, wherein said AT includes said TrL entity, and wherein said AT includes computer readable code providing an equivalent radio functionality of a 3GPP HNB;
- said TrL entity provides a Ui Interface between said TE and said AT entities, wherein said Ui is a Point-to-Point (PTP) Non-Wireless Interface having computer readable code providing an equivalent Uu Air Interface functionality, wherein said Uu Interface interfacing said 3GPP Physical Radios;
- a Network Termination Protocol Stacks (NT) entity, wherein said NT includes computer readable code providing an equivalent network functionality of a 3GPP HNB; and
- an Inter-Working Function (IWF) layer, wherein said IWF layer provides relay and translation functionalities between said AT and said NT; and
wherein said (W)LAN entity supporting said NT.

4. The system of claim 1, wherein the cellular network comprises a 4G or 5G network and the WLAN comprises an 802.11 network.

5. The system of claim 1, wherein an interconnection between said CD and said CN enables the CD to offload traffic from a Radio Access Network (RAN) for reduced congestion in said RAN service area, wherein said interconnection includes multiple routes, and wherein mobility between said routes accomplished by means of 3GPP processes comprising:
Soft Handover (SHO); Hard Handover (HHO); Relocation; and Enhanced Relocation.

6. The system of claim 1, wherein an interconnection between said Common Layers and said CN through said UE-L2/L1 selected from two alternate routes, and wherein a first interconnection route between said Common Layers and said CN includes:
- an interconnection route between said Common Layers and an (e)NB complying with the 3GPP specifications, wherein said (e)NB is a 3G Node-B (NB) or a Long Term Evolution (LTE) Evolved Node-B (eNB), and wherein said interconnection route includes:
  an interconnection between said Common Layers and said AME;
  an interconnection between said AME and said UE-L2/L1; and
  an interconnection between said UE-L2/L1 and said (e)NB through said Uu Air Interface by means of said Physical Radio; and
- an interconnection route between said (e)NB and said CN complying with the 3GPP specifications,
wherein said first interconnection route used for network access, and wherein said AME manipulates a flow of Control Messages, Measurements Information and Data Packets between said Common Layers and said UE-L2/L1.

7. The system of claim 1, wherein an interconnection between said Common Layers and said CN through said UE-L2/L1 selected from two alternate routes, and wherein a second interconnection route between said Common Layers and said CN includes:
- an interconnection route between said Common Layers and a H(e)NB complying with the 3GPP specifications, wherein said H(e)NB is a 3G Home Node-B (HNB) or an LTE Home Evolved Node-B (HeNB), and wherein said interconnection route includes:
  an interconnection between said Common Layers and said AME;
  an interconnection between said AME and said UE-L2/L1; and
  an interconnection between said UE-L2/L1 and said H(e)NB through said Uu Air Interface by means of said Physical Radio; and
- an interconnection route between said H(e)NB and said CN complying with the 3GPP specifications,
wherein said second interconnection route used for network access, and wherein said AME manipulates a flow of Control Messages, Measurements Information and Data Packets between said Common Layers and said UE-L2/L1.

8. The system of claim 1, wherein an interconnection route between said Common Layers and said CN comprising a third interconnection route through said TE-L2/L1, and wherein said third interconnection route includes:
- an interconnection route between said Common Layers and a H(e)NB-GW complying with the 3GPP specifications, wherein said H(e)NB-GW is a 3G Home Node-B Gateway (HNB-GW) or an LTE Home Evolved Node-B Gateway (HeNB-GW), and wherein said interconnection route includes:
an interconnection between said Common Layers and said AME;
an interconnection between said AME and said TE-L2/L1;
an interconnection between said TE-L2/L1 and said AT through said Ui Interface by means of said TrL, wherein said TrL is implemented by Inter-Process Communication (IPC) methods;
an interconnection between said AT and said IWF;
an interconnection between said IWF and said NT; and
an interconnection between said NT and said H(e)NB-GW by means of said Physical (W)LAN; and
an interconnection route between said H(e)NB-GW and said CN complying with the 3GPP specifications,
wherein said third interconnection route used for network access, and wherein said AME manipulates a flow of Control Messages, Measurements Information and Data Packets between said Common Layers and said TE-L2/L1.

9. The system of claim 1, wherein said CN is a 3GPP CN, wherein said UE entity provides a 3GPP UE functionality, wherein said TE entity provides a 3GPP UE functionality, wherein said AT entity provides a 3GPP Base-Station (BS) radio functionality, wherein said NT provides a 3GPP BS network functionality.

10. The system of claim 1, wherein said system entities operate in a single mode supporting one network standard specifications, or wherein said system entities operate in a multi-mode supporting multiple network standard specifications, and wherein said CD supports one of the following network standard specifications, or a combination thereof: 3GPP 3G; 3GPP LTE Frequency Division Duplex (LTE-FDD); and 3GPP LTE Time Division Duplex (LTE-TDD).

11. The system of claim 1, wherein said CA includes a Terminal Equipment Access Termination entity (TE-AT), wherein said TE-AT entity is a single entity having computer readable code providing a combined functionality of said TE and said AT, and wherein said TE-AT entity interconnects directly with said NT.

12. The system of claim 1, wherein said CD included in one of: Mobile Internet Devices (MID); Ultra Mobile Personal Computers (UMPC); Notebooks; Netbooks; e-Readers; e-Cameras; Desktop Personal Computers (PC); Smartphones; Tablets; Gaming Consoles; or Machine to Machine (M2M) devices.

13. The system of claim 1, wherein said CD includes a Rich Execution Environment (REE), wherein said REE includes:
 said Physical Radio for connecting said CD to said CN through said Uu Air Interface; and said CA,
 wherein said REE further comprising:
 a Physical (W)LAN adapter for connecting said CD to said CN over Iuh/Iurh Interfaces;
 a Universal Integrated Circuit Card (UICC) for said CD authentication;
  Rich Applications (RAs) residing above said CA, wherein said RAs installed and operated by an owner of said CD;
  a Rich Operating System (ROS) residing below said CA for supporting said CA and said RAs; and
  a System on Chip (SoC) for serving said REE.

14. The system of claim 1, wherein said CD includes an REE and a Trusted Execution Environment (TEE),
 wherein said TEE includes:
 said Physical Radio for connecting said CD to said CN through said Uu Air Interface; and said CA,
 wherein said TEE further comprising:
 a UICC for said CD authentication; a Trusted Application (TA) residing above said CA;
 a Trusted Operating System (TOS) residing below said CA for supporting said CA and said TA;
 a System on Chip (SoC); and
 a Hardware Root of Trust (HW-RoT) for supporting the integrity and security of said TEE, wherein said REE includes:
 a Physical (W)LAN adapter for connecting said CD to said CN over Iuh/Iurh Interfaces;
 Rich Applications (RAs), wherein said RAs installed and operated by an owner of said CD;
 a Rich Operating System (ROS) residing below said RAs for supporting said RAs; and said SoC,
 wherein said TEE and said REE are isolated and interconnected by means of a TEE/REE Application Programming Interface (API) entity for preserving said TEE integrity and security, and wherein said SoC serving said TEE and said REE.

15. A method for a communication system comprising:
 a cellular Core Network (CN);
 a plurality of cellular Base Stations (BS);
 a cellular Gateway (GW);
 a Communication Device (CD) with an embedded Home Node-B (HNB) or cellular Small Cell Base Station (SC-BS) as a mobile or location independent portable entity with interprocess communication (IPC),
 wherein said CD interconnects to the CN by interconnecting to the GW over an Internet Protocol Network (IP NW),
 wherein said CD includes a Communication Apparatus (CA) comprising multi-layered protocol stacks for implementing a control plane functionality, user plane functionality and management functionality for automatic switching between a cellular network and a wireless local area network (WLAN);
 an Access Manager Entity (AME) to manipulate a Terminal Equipment Lower Layers entity and a User Equipment Lower Layers entity to appear as one or more mirror image entities as reflected to Common Layers entities and a core network,
 wherein in a Handover (HO) process in said AME manipulates a flow of Control Messages, Measurements Information and Data Packets among said Lower Layers entity and said Common Layers to assure a Seamless Session Transfer (SST) between said Lower Layers entity,
 wherein the SST is performed between a Radio Link (RL) associated with the Lower Layers entity and plurality of RLs associated with the Lower Layers entity, or wherein the SST is performed among plurality of RLs associated with the Lower Layers entity.

16. The method of claim 15, comprising:
 a Communication Device (CD);
 a 3GPP HNB Gateway (HNB-GW);
 a 3GPP Core Network (CN);
 plurality of 3GPP Node-Bs (NBs);
 plurality of 3GPP Home Node-Bs (HNBs) with one HNB embedded in the CD; and
 a plurality of 3GPP Radio Network Controllers (RNCs),
 wherein said NBs and one of said RNCs comprising a Radio Network Subsystem (RNS) acting as a Serving entity,
 wherein said CD includes:
 a User Equipment (UE) comprising:
 a Common Radio Resource Control (RRC) entity; an AME; and a UE Lower Layers entity (UE-L2/L1); and
 a Communication Apparatus (CA) comprising:
 a Terminal Equipment Protocol Stacks (TE) entity comprising:
  said Common RRC entity; said AME; and a TE Lower Layers entity (TE-L2/L1); and
 an AT/NT entity comprising:
 an Access Termination Protocol Stacks (AT) entity; and
 a Network Termination Protocol Stacks (NT) entity comprising:
 a Radio Network Subsystem Application Part (RNSAP) entity; and
 an RNSAP User Adaptation (RNA) entity,
 wherein said AT/NT includes computer readable code providing an equivalent functionality of a 3GPP HNB, and
 wherein said AT/AT entity acting as a Drift entity,
 wherein communication between said Common RRC entity and network entities done either via said UE-L2/L1 or via said TE-L2/L1, executing the same procedures and operating in compliance with the same processes, as described in the 3GPP specifications, and
 wherein said Inbound SHO performed by means of adding a Radio Link (RL) between said TE-L1/L2 and said Drift entity,
 the method comprising:
 performing a first procedure of preconditions for said Inbound SHO,
 wherein said first procedure includes:

performing an ongoing Packet-Switched/Circuit-Switched (PS/CS) sessions carried between said Common RRC entity and said Serving entity, via said UE-L2/L1;
establishing Iuh/Iurh Interfaces between said Drift entity and said HNB-GW; and
establishing an Iur Interface between said HNB-GW and said Serving entity;
performing TE Registration and Measurements procedure by means of said Common RRC entity, said TE-L2/L1 and said Drift entity;
sending an RRC Measurement Report message from said Common RRC entity to said Serving entity, through said UE-L2/L1;
performing at said Serving entity a procedure for decision to set up new RL;
performing a second procedure comprising:
sending an RNSAP Radio Link Setup Request message from said Serving entity to said HNB-GW; and
sending an RNA Connect message from said HNB-GW to said Drift entity, wherein said message encapsulates said RNSAP Radio Link Setup Request message;
performing an allocation of requested resources between said TE-L2/L1 and said Drift entity;
performing a third procedure comprising:
sending an RNA Direct Transfer message from said Drift entity to said HNB-GW, wherein said message encapsulates an RNSAP Radio Link Setup Response message;
sending said RNSAP Radio Link Setup Response message from said HNB-GW, to said Serving entity;
sending an RNA Direct Transfer message from said Drift entity to said HNB-GW, wherein said message encapsulates an RNSAP Radio Link Restore Indication message;
sending said RNSAP Radio Link Restore Indication message from said HNB-GW, to said Serving entity;
sending a Dedicated Channel Frame Protocol (DCH-FP) Downlink Synchronization message from said Serving entity to said Drift entity, through said HNB-GW; and
sending a DCH-FP Uplink Synchronization message from said Drift entity to said Serving entity, through said HNB-GW;
sending an Active Set Update message over a Dedicated Control Channel (DCCH), from said Serving entity to said Common RRC entity, through said UE-L2/L1, wherein said message is a RL Addition;
performing a procedure for RL Addition by means of said Common RRC entity, said TE-L2/L1 and said Drift entity; and
sending an Active Set Update Complete message over a DCCH, from said Common RRC entity to said Serving entity, through said UE-L2/L1.

17. The method according to claim 16, wherein said HNBs interconnected by means of said HNB-GW over said Iurh Interface, wherein said Serving entity is one of said HNBs, and
wherein said first procedure includes:
performing an ongoing Packet-Switched/Circuit-Switched (PS/CS) sessions carried between said Common RRC entity and said Serving entity, via said UE-L2/L1;
establishing said Iuh/Iurh Interfaces between said Drift entity and said HNB-GW; and
establishing said Iurh Interface between said HNB-GW and said Serving entity.

18. The method according to claim 16, wherein said HNBs interconnected directly over said Iurh Interface, wherein said Serving entity is one of said HNBs,
wherein said first procedure includes:
performing an ongoing Packet-Switched/Circuit-Switched (PS/CS) sessions carried between said Common RRC entity and said Serving entity, via said UE-L2/L1;
establishing said Iuh Interface between said Drift entity and said HNB-GW; and
establishing said Iurh Interface between said Drift entity and said Serving entity,
wherein said second procedure includes the step of:
sending an RNA Connect message from said Serving entity to said Drift entity, wherein said message encapsulates an RNSAP Radio Link Setup Request message, and
wherein said third procedure includes:
sending an RNA Direct Transfer message from said Drift entity to said Serving entity, wherein said message encapsulates an RNSAP Radio Link Setup Response message;
sending an RNA Direct Transfer message from said Drift entity to said Serving entity, wherein said message encapsulates an RNSAP Radio Link Restore Indication message;
sending a Dedicated Channel Frame Protocol (DCH-FP) Downlink Synchronization message from said Serving entity to said Drift entity; and
sending a DCH-FP Uplink Synchronization message from said Drift entity to said Serving entity.

19. A method for a communication system comprising:
a cellular Core Network (CN);
a plurality of cellular Base Stations (BS);
a cellular Gateway (GW);
a Communication Device (CD) with an embedded Home Node-B (HNB) or cellular Small Cell Base Station (SC-BS) as a mobile or location independent portable entity with interprocess communication (IPC),
wherein said CD interconnects to the CN by interconnecting to the GW over an Internet Protocol Network (IP NW),
wherein said CD includes a Communication Apparatus (CA) comprising multi-layered protocol stacks for implementing a control plane functionality, user plane functionality and management functionality for automatic switching between a cellular network and a wireless local area network (WLAN);
an Access Manager Entity (AME) to manipulate a Terminal Equipment Lower Layers entity and a User Equipment Lower Layers entity to appear as one or more mirror image entities as reflected to Common Layers entities and a core network,
wherein in a Handover (HO) process in said AME manipulates a flow of Control Messages, Measurements Information and Data Packets among said Lower Layers entity and said Common Layers to assure a Seamless Session Transfer (SST) between said Lower Layers entity,
wherein the SST is performed between a Radio Link (RL) associated with the Lower Layers entity and plurality of RLs associated with the Lower Layers entity, or
wherein the SST is performed among plurality of RLs associated with the Lower Layers entity, the method comprising performing inbound or outbound soft handover (SH).

20. The method of claim 19, comprising:
   a Communication Device (CD);
   a 3GPP HNB Gateway (HNB-GW);
   a 3GPP Core Network (CN);
   plurality of 3GPP Node-Bs (NBs);
   plurality of 3GPP Home Node-Bs (HNBs) with one HNB embedded in the CD; and
   a plurality of 3GPP Radio Network Controllers (RNCs), wherein said NBs and one of said RNCs comprising a Radio Network Subsystem (RNS) acting as a Drift entity,
   wherein said CD includes:
   a User Equipment (UE) comprising:
   a Common Radio Resource Control (RRC) entity; an AME; and a UE Lower Layers entity (UE-L2/L1); and
   a Communication Apparatus (CA) comprising:
   a Terminal Equipment Protocol Stacks (TE) entity comprising:
      said Common RRC entity; said AME; and a TE Lower Layers entity (TE-L2/L1); and an AT/NT entity comprising:
      an Access Termination Protocol Stacks (AT) entity; and
      a Network Termination Protocol Stacks (NT) entity comprising:
      a Radio Network Subsystem Application Part (RNSAP) entity; and an RNSAP User Adaptation (RNA) entity,
      wherein said AT/NT entity includes computer readable code providing an equivalent functionality of a 3GPP HNB, and
      wherein said AT/AT entity acting as a Serving entity,
      wherein communication between said Common RRC entity and network entities done either via said UE-L2/L1 or via said TE-L2/L1, executing the same procedures and operating in compliance with the same processes, as described in the 3GPP specifications, and wherein said Outbound SHO performed by means of adding a Radio Link (RL) between said UE-L1/L2 and said Drift entity.

21. The method of claim 20, comprising:
   performing a first procedure of preconditions for said Outbound SHO,
   wherein said first procedure includes:
   performing an ongoing Packet-Switched/Circuit-Switched (PS/CS) sessions carried between said Common RRC entity and said Serving entity, via said TE-L2/L1;
   establishing Iuh/Iurh Interfaces between said Serving entity and said HNB-GW; and
   establishing an Iur Interface between said HNB-GW and said Drift entity;
   performing UE Registration and Measurements procedure by means of said Common RRC entity, said UE-L2/L1 and said Drift entity;
   sending an RRC Measurement Report message from said Common RRC entity to said Serving entity, through said TE-L2/L1;
   performing at said Serving entity a procedure for decision to set up new RL;
   performing a second procedure comprising:
   sending an RNA Connect message from said Serving entity to said HNB-GW, wherein said message encapsulates an RNSAP Radio Link Setup Request message;
   sending said RNSAP Radio Link Setup Request message from said HNB-GW to said Drift entity;
   sending an RNSAP Radio Link Setup Response message from said Drift entity to said HNB-GW;
   sending an RNA Direct Transfer message from said HNB-GW to said Serving entity, wherein said message encapsulates said RNSAP Radio Link Setup Response message;
   sending an RNSAP Radio Link Restore Indication message from said Drift entity to said HNB-GW;
   sending an RNA Direct Transfer message from said HNB-GW to said Serving entity, wherein said message encapsulates said RNSAP Radio Link Restore Indication message;
   sending a Dedicated Channel Frame Protocol (DCH-FP) Downlink Synchronization message from said Serving entity to said Drift entity, through said HNB-GW; and
   sending a DCH-FP Uplink Synchronization message from said Drift entity to said Serving entity, through said HNB-GW;
   sending an Active Set Update message over a Dedicated Control Channel (DCCH), from said Serving entity to said Common RRC entity, through said TE-L2/L1, wherein said message is a RL Addition;
   performing a procedure for RL Addition by means of said Common RRC entity, said UE-L2/L1 and said Drift entity; and
   sending an Active Set Update Complete message over a DCCH, from said Common RRC entity to said Serving entity, through said TE-L2/L1.

22. The method according to claim 20, wherein said HNBs interconnected by means of said HNB-GW over said Iurh Interface, wherein said Drift entity is one of said HNBs, and
   wherein said first procedure includes:
   performing an ongoing Packet-Switched/Circuit-Switched (PS/CS) sessions carried between said Common RRC entity and said Serving entity, via said TE-L2/L1;
   establishing said Iuh/Iurh Interfaces between said Serving entity and said HNB-GW; and
   establishing said Iurh Interface between said HNB-GW and said Drift entity.

23. The method according to claim 20, wherein said HNBs interconnected directly over said Iurh Interface, wherein said Drift entity is one of said HNBs,
   wherein said first procedure includes:
   performing an ongoing Packet-Switched/Circuit-Switched (PS/CS) sessions carried between said Common RRC entity and said Serving entity, via said TE-L2/L1;
   establishing said Iuh Interface between said Serving entity and said HNB-GW; and
   establishing said Iurh Interface between said Serving entity and said Drift entity, and wherein said second procedure includes:
   sending an RNA Connect message from said Serving entity to said Drift entity, wherein said message encapsulates an RNSAP Radio Link Setup Request message;
   sending an RNA Direct Transfer message from said Drift entity to said Serving entity, wherein said message encapsulates an RNSAP Radio Link Setup Response message;
   sending an RNA Direct Transfer message from said Drift entity to said Serving entity, wherein said message encapsulates an RNSAP Radio Link Restore Indication message;

sending a Dedicated Channel Frame Protocol (DCH-FP) Downlink Synchronization message from said Serving entity to said Drift entity; and sending a DCH-FP Uplink Synchronization message from said Drift entity to said Serving entity.

* * * * *